March 31, 1964 F. EK ETAL 3,127,480

AUTOMATIC TELEPHONE SYSTEM

Filed Sept. 9, 1960 69 Sheets-Sheet 1

INVENTORS
FOLKE EK
JOHN S. LINDENHALL
ARNE OXAAL
BY [signature]
Attys

INVENTORS
FOLKE EK
JOHN S. LINDENHALL
ARNE OXAAL
BY [signature] Attys

INVENTORS
FOLKE EK
JOHN S. LINDENHALL
ARNE OXAAL

BY Brown, Jackson, Boettcher & Dienner
Attys

AUTOMATIC TELEPHONE SYSTEM

Filed Sept. 9, 1960

INVENTORS
FOLKE EK
JOHN S. LINDENHALL
ARNE OXAAL
BY Stevens, Davis, Miller & Mosher
Attys INVENTORS
FOLKE EK
JOHN S. LINDENHALL
ARNE OXAAL
BY Dawson, Jackson, Beckley & Dunne
Attys INVENTORS
FOLKE EK
JOHN S. LINDENHALL
ARNE OXAAL
BY Brown Jackson Boettcher & Dienner
Attys March 31, 1964 F. EK ETAL 3,127,480

AUTOMATIC TELEPHONE SYSTEM

Filed Sept. 9, 1960 69 Sheets-Sheet 7

10 TH. 90 LINE GROUP

INVENTORS
FOLKE EK
JOHN S. LINDENHALL
ARNE OXAAL
BY Brown Jackson Boettcher & Dienner
attys March 31, 1964 F. EK ETAL 3,127,480
AUTOMATIC TELEPHONE SYSTEM
Filed Sept. 9, 1960 69 Sheets-Sheet 8

INVENTORS
FOLKE EK
JOHN S. LINDENHALL
BY ARNE OXAAL
Brown Jackson Boettcher & Dienner
Attys INVENTORS
FOLKE EK
JOHN S. LINDENHALL
ARNE OXAAL
BY Brown Jackson Boettcher & Dienner
Attys March 31, 1964

F. EK ETAL 3,127,480

AUTOMATIC TELEPHONE SYSTEM

Filed Sept. 9, 1960

69 Sheets-Sheet 10

INVENTORS
FOLKE EK
JOHN S. LINDENHALL
ARNE OXAAL
BY Brown, Jackson, Boettcher & Dienner
Attys.

INVENTORS
FOLKE EK
JOHN S. LINDENHALL
BY ARNE OXAAL
Darby, Jackson, Bittleson & Dunner
Attys March 31, 1964 F. EK ETAL 3,127,480

AUTOMATIC TELEPHONE SYSTEM

Filed Sept. 9, 1960 69 Sheets-Sheet 12

INVENTORS
FOLKE EK
JOHN S. LINDENHALL
ARNE OXAAL
BY

INVENTORS
FOLKE EK
JOHN S. LINDENHALL
BY ARNE OXAAL
Beam Jackson Buttler & Dummer
Attys INVENTORS
FOLKE EK
JOHN S. LINDENHALL
BY ARNE OXAAL
Dean, Jackson, Bottker & Dunner
Attys March 31, 1964 F. EK ETAL 3,127,480
AUTOMATIC TELEPHONE SYSTEM
Filed Sept. 9, 1960 69 Sheets-Sheet 15

INVENTORS
FOLKE EK
JOHN S. LINDENHALL
BY ARNE OXAAL

March 31, 1964 F. EK ETAL 3,127,480

AUTOMATIC TELEPHONE SYSTEM

Filed Sept. 9, 1960 69 Sheets-Sheet 16

FOLKE EK
JOHN S. LINDENHALL
ARNE OXAAL
INVENTORS

BY [signature]
Attys

INVENTORS
FOLKE EK
JOHN S. LINDENHALL
ARNE OXAAL
BY Brown, Jackson, Boettcher & Dienner
Attys FOLKE EK
JOHN S. LINDENHALL
ARNE OXAAL
INVENTORS
BY Brown Jackson Boettcher & Dienner
Attys INVENTORS
FOLKE EK
JOHN S. LINDENHALL
BY ARNE OXAAL
Brown Jackson Boettcher & Dienner
Attys INVENTORS
FOLKE EK
JOHN S. LINDENHALL
ARNE OXAAL
BY
Brown, Jackson, Boettcher & Dienner
Attys FOLKE EK *INVENTORS*
JOHN S. LINDENHALL
BY ARNE OXAAL
*Brown, Jackson, Boettcher & Dienner*
*Attys*

March 31, 1964

F. EK ETAL 3,127,480

AUTOMATIC TELEPHONE SYSTEM

Filed Sept. 9, 1960

69 Sheets-Sheet 22

*INVENTORS*
FOLKE EK
JOHN S. LINDENHALL
ARNE OXAAL
BY Brown, Jackson, Boettcher & Dienner
Attys INVENTORS
FOLKE EK
JOHN S. LINDENHALL
ARNE OXAAL
BY Brown Jackson Boettcher & Dienner
Attys INVENTORS
FOLKE EK
JOHN S. LINDENHALL
ARNE OXAAL
BY Brown, Jackson, Boettcher & Dienner
Attys March 31, 1964 F. EK ETAL 3,127,480

AUTOMATIC TELEPHONE SYSTEM

Filed Sept. 9, 1960 69 Sheets-Sheet 25

FOLKE EK
JOHN S. LINDENHALL
ARNE OXAAL
INVENTORS

BY Brown, Jackson, Boettcher & Dienner
Attys

AUTOMATIC TELEPHONE SYSTEM

INVENTORS
FOLKE EK
JOHN S. LINDENHALL
ARNE OXAAL
BY Burns, Jackson, Bottler + Dumas
Attys INVENTORS
FOLKE EK
JOHN S. LINDENHALL
BY ARNE OXAAL
Brown Jackson Boettcher & Dienner
Attys INVENTORS
FOLKE EK
JOHN S. LINDENHALL
ARNE OXAAL
BY *Brown Jackson Boettcher & Dienner*
*Attys*

March 31, 1964 F. EK ETAL 3,127,480

AUTOMATIC TELEPHONE SYSTEM

Filed Sept. 9, 1960 69 Sheets-Sheet 29

INVENTORS
FOLKE EK
JOHN S. LINDENHALL
ARNE OXAAL
BY Brown Jackson Boettcher & Dienner
Attys

UNIT SELECTION RELAYS

INVENTORS
FOLKE EK
JOHN S. LINDENHALL
ARNE OXAAL
BY Brown Jackson Boettcher & Dienner
Attys March 31, 1964 F. EK ETAL 3,127,480

AUTOMATIC TELEPHONE SYSTEM

Filed Sept. 9, 1960 69 Sheets-Sheet 31

INVENTORS
FOLKE EK
JOHN S. LINDENHALL
ARNE OXAAL
BY Brown Jackson Boettcher & Dienner
Attys

*INVENTORS*
FOLKE EK
JOHN S. LINDENHALL
BY ARNE OXAAL
Baum, Jackson, Bultelier & Dunner
Attys INVENTORS
FOLKE EK
JOHN S. LINDENHALL
ARNE OXAAL
BY
Brown, Jackson, Boettcher & Dienner
Attys INVENTORS
FOLKE EK
JOHN S. LINDENHALL
BY ARNE OXAAL
Brown, Jackson, Boettcher & Dienner
Attys.

INVENTORS
FOLKE EK
JOHN S. LINDENHALL
ARNE OXAAL
BY *Brown, Jackson, Boettcher & Dienner*
*Attys*

FOLKE EK
JOHN S. LINDENHALL
ARNE OXAAL
INVENTORS
BY [signature]
Attys

March 31, 1964 F. EK ETAL 3,127,480

AUTOMATIC TELEPHONE SYSTEM

Filed Sept. 9, 1960

69 Sheets-Sheet 37

FOLKE EK INVENTORS
JOHN S. LINDENHALL
BY ARNE OXAAL
Burns Jackson Battles & Dennis
Attys INVENTORS
FOLKE EK
JOHN S. LINDENHALL
ARNE OXAAL
BY Brown Jackson Boettcher & Dienner
Attys FOLKE EK INVENTORS
JOHN S. LINDENHALL
BY ARNE OXAAL
Burns, Jackson, Bottcher & Renner
Attys March 31, 1964 F. EK ETAL 3,127,480

AUTOMATIC TELEPHONE SYSTEM

Filed Sept. 9, 1960 69 Sheets-Sheet 40

INVENTORS
FOLKE EK
JOHN S. LINDENHALL
BY ARNE OXAAL

INVENTORS
FOLKE EK
JOHN S. LINDENHALL
ARNE OXAAL
BY [signature]
Attys

INVENTORS
FOLKE EK
JOHN S. LINDENHALL
BY ARNE OXAAL
Baum, Jackson, Bartholow & Dunner
Attys INVENTORS
FOLKE EK
JOHN S. LINDENHALL
ARNE OKAAL
BY Brown, Jackson, Boettcher & Dienner
Attys March 31, 1964 F. EK ETAL 3,127,480

AUTOMATIC TELEPHONE SYSTEM

Filed Sept. 9, 1960 69 Sheets-Sheet 44

INVENTORS
FOLKE EK
JOHN S. LINDENHALL
ARNE OXAAL
BY Brown, Jackson, Boettcher & Dienner
Attys FOLKE EK INVENTORS
JOHN S. LINDENHALL
ARNE OXAAL
BY Baron Jackson Bottcher & Dunner
Attys INVENTORS
FOLKE EK
JOHN S. LINDENHALL
ARNE OXAAL
BY
Brown Jackson Boettcher & Dienner
Attys March 31, 1964 F. EK ETAL 3,127,480

AUTOMATIC TELEPHONE SYSTEM

Filed Sept. 9, 1960

69 Sheets-Sheet 47

INVENTORS
FOLKE EK
JOHN S. LINDENHALL
BY ARNE OXAAL
Brown Jackson Boettcher & Dienner
Attys INVENTORS
FOLKE EK
JOHN S. LINDENHALL
BY ARNE OXAAL
Brown, Jackson, Boettcher & Dienner
Attys March 31, 1964 F. EK ETAL 3,127,480

AUTOMATIC TELEPHONE SYSTEM

Filed Sept. 9, 1960 69 Sheets-Sheet 49

INVENTORS
FOLKE EK
JOHN S. LINDENHALL
BY ARNE OXAAL
Larson, Jackson, Brittler & Dunner
Attys

AUTOMATIC TELEPHONE SYSTEM

Filed Sept. 9, 1960

69 Sheets-Sheet 50

INVENTORS
FOLKE EK
JOHN S. LINDENHALL
ARNE OXAAL
BY Brown, Jackson, Boettcher & Dienner
Attys INVENTORS
FOLKE EK
JOHN S. LINDENHALL
ARNE OXAAL
BY Burns, Jackson, Bottcher & Dummer
Attys INVENTORS
FOLKE EK
JOHN S. LINDENHALL
ARNE OXAAL
BY Brown, Jackson, Boettcher & Dienner
Attys INVENTORS
FOLKE EK
JOHN S. LINDENHALL
ARNE OXAAL
BY Brown, Jackson, Boettcher & Dienner
Attys March 31, 1964 F. EK ETAL 3,127,480

AUTOMATIC TELEPHONE SYSTEM

Filed Sept. 9, 1960 69 Sheets-Sheet 54

*INVENTORS*
FOLKE EK
JOHN S. LINDENHALL
ARNE OXAAL
*BY* Brown, Jackson, Boettcher & Dienner, Attys March 31, 1964 F. EK ETAL 3,127,480

AUTOMATIC TELEPHONE SYSTEM

Filed Sept. 9, 1960 69 Sheets-Sheet 55

INVENTORS
FOLKE EK
JOHN S. LINDENHALL
ARNE OXAAL
BY Brown, Jackson, Boettcher & Dienner
Attys INVENTORS
FOLKE EK
JOHN S. LINDENHALL
BY ARNE OXAAL
Brown, Jackson, Boettcher & Dienner
Attys INVENTORS
FOLKE EK
JOHN S LINDENHALL
BY ARNE OXAAL
Brown, Jackson, Boettcher & Dienner
Attys March 31, 1964 F. EK ETAL 3,127,480

AUTOMATIC TELEPHONE SYSTEM

Filed Sept. 9, 1960 69 Sheets-Sheet 58

INVENTORS
FOLKE EK
JOHN S. LINDENHALL
ARNE OXAAL
BY Brown Jackson Boettcher & Dienner
Attys

INVENTORS
FOLKE EK
JOHN S LINDENHALL
ARNE OXAAL
BY

INVENTORS
FOLKE EK
JOHN S. LINDENHALL
ARNE OXAAL
BY Brown Jackson Boettcher & Dienner
attys INVENTORS
FOLKE EK
JOHN S. LINDENHALL
ARNE OXAAL
BY Brown, Jackson, Boettcher & Dienner
Attys March 31, 1964 F. EK ETAL 3,127,480

AUTOMATIC TELEPHONE SYSTEM

Filed Sept. 9, 1960 69 Sheets-Sheet 62

INVENTORS
FOLKE EK
JOHN S LINDENHALL
ARNE OXAAL

BY Brown, Jackson, Boettcher & Dienner
Attys

INVENTORS
FOLKE EK
JOHN S. LINDENHALL
ARNE OXAAL
BY Brown Jackson Boettcher & Dienner
Attys March 31, 1964 F. EK ETAL 3,127,480

AUTOMATIC TELEPHONE SYSTEM

Filed Sept. 9, 1960 69 Sheets-Sheet 64

INVENTORS
FOLK EK
JOHN S LINDENHALL
BY ARNE OXAAL

INVENTORS
FOLKE EK
JOHN S LINDENHALL
ARNE OXAAL
BY Brown Jackson Boettcher & Dienner
Attys

AUTOMATIC TELEPHONE SYSTEM

Filed Sept. 9, 1960

69 Sheets-Sheet 66

INVENTORS
FOLKE EK
JOHN S. LINDENHALL
ARNE OXAAL
BY *Baum, Jackson, Bottcher & Dunner*
*Attys*

INVENTORS
FOLKE EK
JOHN S. LINDENHALL
ARNE OXAAL
BY
Attys

AUTOMATIC TELEPHONE SYSTEM

Filed Sept. 9, 1960 69 Sheets-Sheet 68

INVENTORS
FOLKE EK
JOHN S. LINDENHALL
ARNE OXAAL

BY Busser, Jackson, Buttelar & Dunne
Atty

INVENTORS
FOLKE EK
JOHN S. LINDENHALL
ARNE OXAAL
BY [signature] Attys

United States Patent Office 3,127,480
Patented Mar. 31, 1964

3,127,480
AUTOMATIC TELEPHONE SYSTEM

Folke Ek, Hagersten, Sweden, and John Sture Lindenhall and Arne Oxaal, Galion, Ohio, assignors to Telefonaktiebolaget L M Ericsson, Stockholm, Sweden Filed Sept. 9, 1960, Ser. No. 54,896
10 Claims. (Cl. 179—22)

The present invention relates to a novel automatic telephone system, and particularly to a system of the crossbar type which is particularly adapted for use in smaller and medium size exchanges while yet being of a flexibility which permits ready expansion for future growth.

There has been a definite need in the telephone field for an automatic telephone system which has the operating advantages and flexibility of a metropolitan type crossbar system, and which also satisfies the small office requirements of low cost, an absolute minimum of maintenance, and compatibility with direct distance dialling concepts. It is a principal object of the present invention to provide a novel system of such type.

In the achievement of such object, and particularly in the accomplishment of reduced installation and maintenance costs, it is necessary to provide a crossbar switching system which is fundamentally comprised of modular or package units which may be factory-wired and tested so that installation is limited to plug-in of the package modules, and maintenance may be quickly and readily effected. Further, the module units must be of a sufficiently basic construction as to permit the building of a switching system for even the smallest sizes of offices (such as for example a thirty line office), but are yet sufficiently flexible to permit the addition of similar modules to expand the exchange to a system for serving as many as two and three thousand lines. It is a further object of the invention to provide a system of modular units which is capable of use in such manner.

The novel arrangement disclosed herein basically contemplates the provision of switching units for line groups consisting of ninety lines, each of which groups is in turn divided into groups of thirty lines. Such arrangement is further made possible by the provision of new and novel thirty line crossbar switch combinations which utilize two group selection magnets and a group selection relay to control the three groups of ten lines on each switch combination, and the provision of such switch is considered to be a further novel aspect of the invention.

It is apparent that the provision of a low-cost office which has the desired utility will necessarily include common control or "by-path" equipment which is used only during the period of establishment of the connections between the subscriber lines or between lines and trunks over the "main path" switches, and is then released for use in establishing other calls, and it is an object of the present invention to provide a new and novel by-path switching system which uses a reduced amount of switching equipment and yet provides increased traffic capacity.

In achieving such object, the invention provides a novel by-path system which includes a direct pulling system for setting up local connections and connections to trunks, and particularly a novel by-path link circuit which uses marking conductors to transmit information from the register and number group to the control circuit for the selector and connector crossbar switches.

It is a further object of the invention to provide a novel by-path circuit which permits the operation of the by-path system in such manner, while yet utilizing a minimum number of operating components. In the present arrangement such object is achieved by providing a by-path circuit which includes means for seizing an idle connector control as certain of the called subscriber digits are registered, means for signalling the selector control of such seizure, means for extending information relative to the group of the called line to the selector control circuit, and means for extending information to the connector control relative to the called line location. As the selector control is notified by the by-path circuit that a connector control has been seized, means in the selector control obtain information from the by-path circuit as to the called line group, and extend the main path connection over the selector crossbar switch to an idle subscriber terminating trunk which connects itself to the seized connector control. The selector control can now be released in that the trunk and the connector control can complete or release the connection with information received over the by-path link circuit.

The release of the selector control in such manner is an important feature of the invention in that the system permits use of the selector control in the extension of a call to a trunk while the call to a local subscriber is still being completed, and a substantial increase in traffic-carrying capacity is obtained. The other circuits in the by-path system are released for use in the establishment of other calls as soon as the busy test is made to the called line. The manner in which the further by-path equipment is released in such manner is also of import in providing increased traffic capacity with a reduced amount of equipment.

These and other objects, features and advantages of the present invention will become apparent with consideration of the following detailed description of a specific embodiment thereof when taken in conjunction with the accompanying drawings wherein:

FIGURES 1 and 2 set forth a block schematic layout of the system;

FIGURES 3–8 set forth a single line diagram showing main path connections with certain by-path arrangements in a nine hundred line switchboard;

FIGURES 9 and 10 are a schematic illustration of the basic thirty line switches of the system;

FIGURES 11–68 set forth in detail the circuit connections of one embodiment of the novel crossbar system;

GENERAL DESCRIPTION

*General Components*

Figure 1:
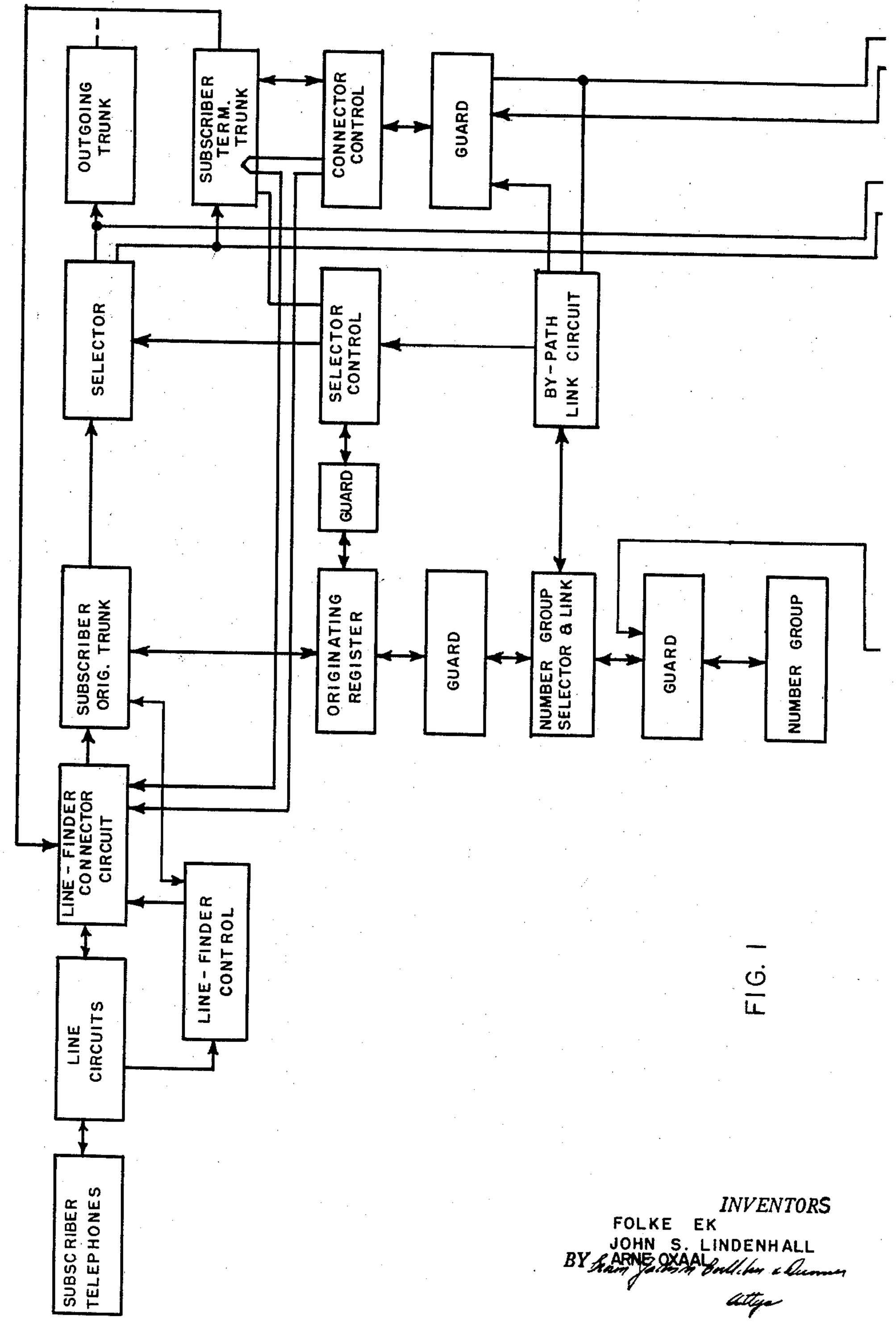
Figure 2:
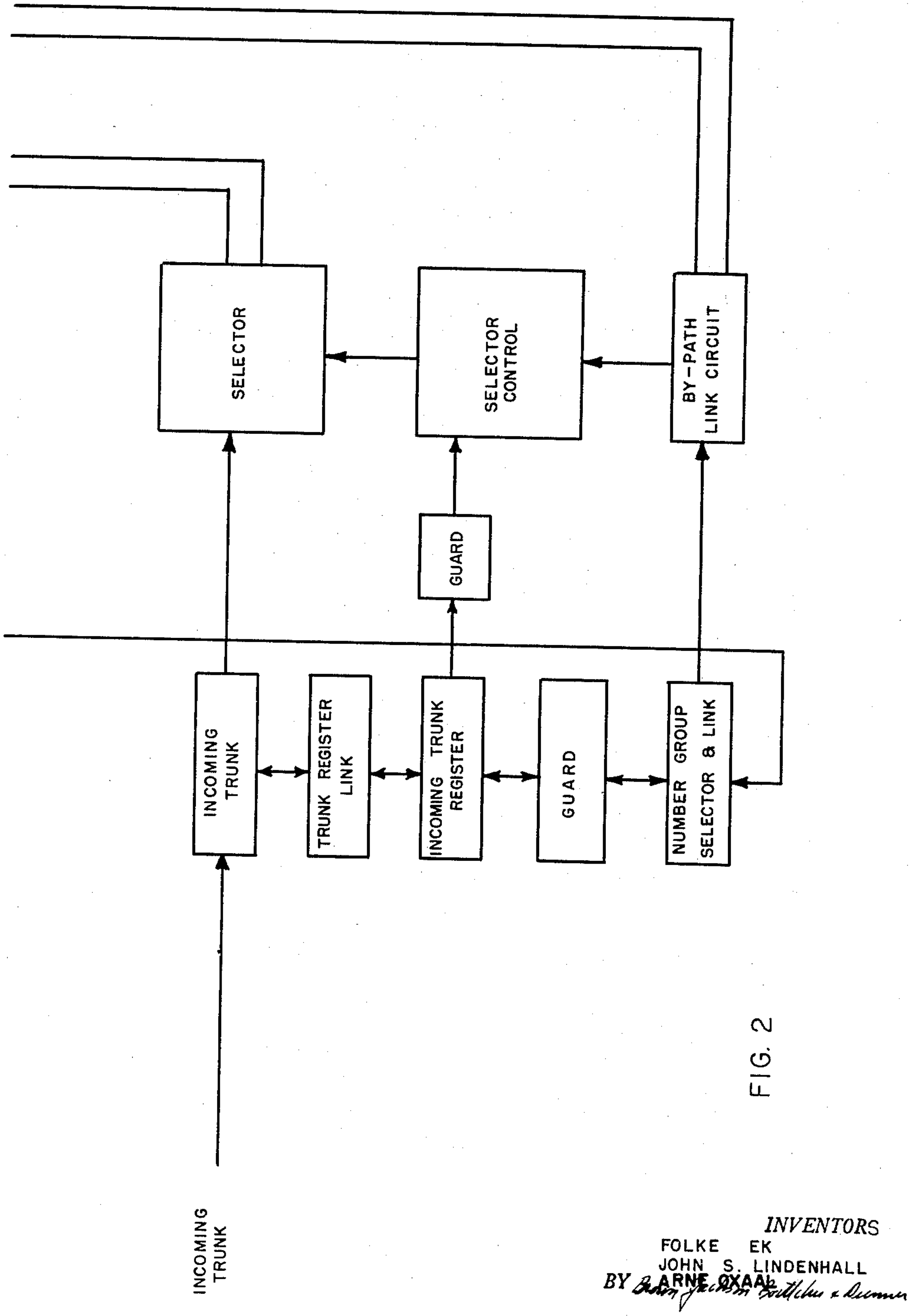

With reference to FIGURES 1 and 2, it will be apparent that the system basically includes a plurality of switching circuits which are interconnected in a novel pattern to extend connections from local telephone substations to other local substations of the exchanges in a reliable and expeditious manner. Briefly stated, the switches (and the identifying nomenclature used hereinafter in the text) include:

LF Switch—Line Finder Crossbar Switch
LF Control—Line Finder Control Relays
SOT—Subscriber Originating Trunk
REG–O—Originating Register
NG—Number Group
Sel Switch—Selector Crossbar Switch
Sel Control—Selector Control Relays
STT—Subscriber's Terminating Trunk
Conn Switch—Connector Crossbar Switch
Conn Control—Connector Control Relays
TRL—Trunk Register Link
REG–I—Incoming Register
TRK—Trunk Relays
Trk Sel Switch—Trunk Selector Crossbar Switch
Trk Sel Control—Trunk Selector Control Relays The term "module" is used to signify a factory wired unit consisting of one or more of the above switch or relay sets.

The switches used in the crossbar system are based on standard ninety line groups, each consisitng of three module A's and one module B. Each module A consists of thirty line equipments, one line finder switch, one connector switch and three subscriber terminating trunks. The module B is comprised of one line finder control, one connector control and three subscriber terminating trunks. These units are arranged to eliminate any possibilities of simultaneous seizures by duplicate equipment components, and the line modules are multiplied in steps of thirty, sixty, or ninety line units to obtain the required line capacity.

In addition to the line groups, selector units are provided, consisting of local and trunk selectors, subscriber originating trunks and associated originating registers along with the required quantities of incoming registers and trunk register links in module units to accommodate the trunk facilities of the individual office.

In each of the line finder, connector and selector switching stages a crossbar switch having ten verticals and six horizontal bars is used. As shown in more detail hereinafter, each vertical is used as a separate switch with twenty outlets in the selector and thirty outlets in the line finder and connector units. A method of grading verticals is used in order to obtain required capacity.

The line finder and connector multiplies have a maximum capacity of ninety lines per line group. The capacity is obtained by connecting three thirty-line groups together. Switchboards not larger than ninety lines including trunks can be arranged without selectors by connecting line finders and connectors back to back.

Offices with more than one line group require a selector stage. This stage is expandable in increments of 20 outlets for the smaller systems and in increments of 200 outlets when used in the larger systems. Either additions can be accomplished by adding pre-wired crossbar switch units on a parallel basis to the switching stage.

The system may be arranged on a "terminal per station" or "terminal per line" basis. In the terminal per station office, a pair of number group modules must be added for each one thousand stations. In this arrangement, the number group associates the directory number with the line number to which it has been assigned and supplies the marking to provide the marking to provide the necessary frequency or code to ring the subscriber station. In the terminal per line office, no number group is required since the directory number is also the line number and a ring digit is incorporated in the number dialed.

The physical layout of this system is arranged by utilizing single sided frames 48 inches wide, 9¾ inches deep and approximately 8 feet 10 inches high, each frame capable of containing four modules. These frames are so arranged to economically contain the required number of the various types of modules. The frameworks are then laid out in any desired arrangement to fit into the allocated floor space.

The system is powered by storage batteries of sufficient size to provide adequate reserve in the event of a charging failure, along with charging and distribution equipment, ringing equipment and alarm facilities, as required.

*Switching Stages*

The novel crossbar system as shown in FIGURES 1 and 2 basically comprises a plurality of switching stages including a line finder stage, a selector stage and a connector stage. The components and functions of each of these stages are now set forth briefly hereat.

*Line Finder Stage*

The line finder stage (FIG. 1) consists of the line relay equipment, line finder switch, line finder control, subscriber originating trunks SOT and originating registers REG–O. The line relay equipment is connected to engage the line finder control which is in turn connected to select and set up an idle path through the line finder switch and subscriber originating trunk SOT to the originating register REG–O. The originating register REG–O then releases the line finder control, making it available to other calls. At this point dial tone is returned to the calling line, indicating that the register is now ready to receive the dialing of the desired number.

The register now receives, stores and analyzes the first three digits of a 2L–5N number. If these digits indicate that a number in this office is being called, these digits are then released and the register prepared to receive the last four digits of the called number. If the prefix digits indicate that the called number is in another office, a local selector is engaged and a path is selected and set up to a trunk for the desired office.

In a terminal per station office, the dialing of the fourth digit calls in a number group, which in turn analyzes the last three digits of the called number and translates them into a line terminal number.

*Selector Stage*

The selector stage (FIG. 1) includes a selector switch, a selector control switch and a by-path link circuit. When the register has received sufficient information to route the call to the desired office or local line, the register seizes the associated local selector control, which in turn selects and sets up a path through the selector switches to either a trunk to another office, or to a subscriber terminating trunk STT in this office. When the connection is established the selector control is released for use in succeeding calls.

As indicated heretofore, the crossbar system is designed to be technically and economically suitable for Community Dial offices in the range of 30–3000 lines, and the wide range of required capacity has been accomplished by the use of two different kinds of selector arrangements. The selector used in switchboards up to approximately 200 lines is a single stage arrangement, while the selector used in larger systems is arranged in two stages using the link connection principle.

*Connector Stage*

The connector stage (FIG. 1) is comprised of the subscriber's terminating trunk STT, connector control and connector switch. The subscriber's terminating trunk STT connects itself to the connector control, which has already been seized and marked busy by the by-path link circuit and connected to a by-path link over which the information from the register is passed to the connector control. The connector control then selects and sets up a path to the called line, through the connector switch. The "line idle" test is then made and the connector control is released. The subscriber's terminating trunk STT provides the equipment for line busy or for the ringing of the called station as well as answer supervision.

The release of the connector control then sets up the release of the register leaving only the actual talking train (line finder switch, subscriber originating trunk SOT, selector switch, subscriber terminating trunk STT, and connector switch).

*Incoming Trunk Stage*

The trunk stage (FIG. 2) consists of the trunk relays, trunk register link TRL, incoming register REG–I, trunk selector control and trunk selector switches. In terminal per station offices, the incoming register REG–I has access to the number groups in the same manner as the originating register REG–O. An incoming trunk call lands in the trunk relays and is extended through a trunk register link TRL to the incoming register REG–I. The register then receives the digits dialed over the trunk. These digits are analyzed either in the incoming register REG–I or the number group. The trunk selector control is then called in and a path is set up on the trunk selector switch either to another trunk group or to a subscriber terminating trunk STT associated with the desired connector group. In the latter case the call is extended to the desired line number as described hereafter. The trunk selector control, the incoming register REG–I and the trunk register link TRL are then released for further availability.

*Applications of Crossbar System*

The equipment thus described is arranged to handle most of the presently accepted standard types of services: main line, party line, PBX trunks, coin box lines (pre-pay or post-pay) and two-five numbering. Standard party line service is either ten party semi-selective bridged or full-selective divided ringing.

Pre-pay coin box service is available by the addition of special equipment and circuits. Post-pay or semi post-pay operation provides identifying tone to the operator. Reverting service can be arranged with either a recorded announcement or special reverting tone, returned to the originating subscriber. The switchboard may be further arranged to provide automatic line identification of the calling line to permit its usage in a customer direct distance dialing network.

If desired, five lines on each line switch may be arranged for PBX trunk hunting service. The 15 lines in the three modules of the ninety line group may be associated together in any desired arrangement, one group of fifteen lines or six groups of two lines and one group of three lines or any intervening combination. No consective terminal assignment is needed, thus eliminating number and line reserve problems. Hunting terminals not assigned for PBX service can be used for any other service.

*Brief Description of Operation of Switches in Establishing a Connection*

As the subscriber removes the receiver to initiate a call, the substation loop is completed to signal the line circuit which signals the linefinder control circuit to locate an idle register via a subscriber originating trunk and to connect the calling line thereto. The idle originating register returns dial tone to the calling subscriber.

The subscriber now dials the called 2–5 number into the originating register. If the first three digits indicate a call to a distant office, the register signals the register-selector guard circuit which connects with a selector control circuit, operating a route relay appropriate to the destination. The route relay pulled enables the selector control to make connection with an idle outgoing trunk, releasing the originating register, etc., which subsequent digits are extended through the selector and directly out over the trunk.

If the first three digits indicate a call to a local subscriber, the originating register (after the receipt of all digits) calls in a number group selector and link via a guard which on the basis of the thousands digit passed thereto calls in a number group circuit via a number group guard. The hundreds, tens, and units digits are now passed to the number group and the number group translates this information to terminal and ringing information. Thereupon, the number group transmits the thousand and hundreds digits to the "by-path link circuit" or "by-path to connector control circuit" which indicates to the circuit the line group in which the called line is found, thus enabling it to seize a connector control via a guard circuit associated with the called line group.

The "by-path to connector control circuit" seizes the connector control associated with the called line group via a guard circuit and passes a call signal to the selector control (indicating that it has an idle connector control circuit) via the "Number Group Selector and Link Circuit," "Guard," "Originating Register" and "Guard Circuit." The class information from the originating register and the tens, units, and ring digit from the number group pass to the connector control via the "By-Path to Connector Control Circuit."

The selector control signals the "By-Path to Connector Control Circuit" which gives it information as to the called line group. Thereupon the selector controls tests for an idle subscriber terminating trunk in the called group and seizes same to close the selector main path crosspoints. The seized subscriber terminating trunk connects itself to the connector control whereupon ringing and class marking information is passed to the subscriber's terminating trunk from the connector control. Thereupon the connector control operates the appropriate horizontal magnets of the line finder-connector circuit according to the tens and units information via a by-path connection and operates the appropriate vertical magnet according to the selected terminating trunk making connection to the called line.

The connector control now busy tests the called line via the subscriber's terminating trunk over main path connections. At the conclusion of the busy test the connector control signals the originating register which (1) causes the subscriber's originating trunk to extend connections, (2) releases itself and by-path connections. If the called line is busy the connector control signals such to the subscriber terminating trunk which returns busy tone to the calling subscriber. If the called line is idle, the connector control signals such to the subscriber terminating trunk which rings the called party.

As the called party answers, the subscriber terminating trunk trips ring and extends the tip and ring conductors to the calling subscriber.

*Specific Description of Switch Layout for Nine Hundred Line System*

Figure 3:
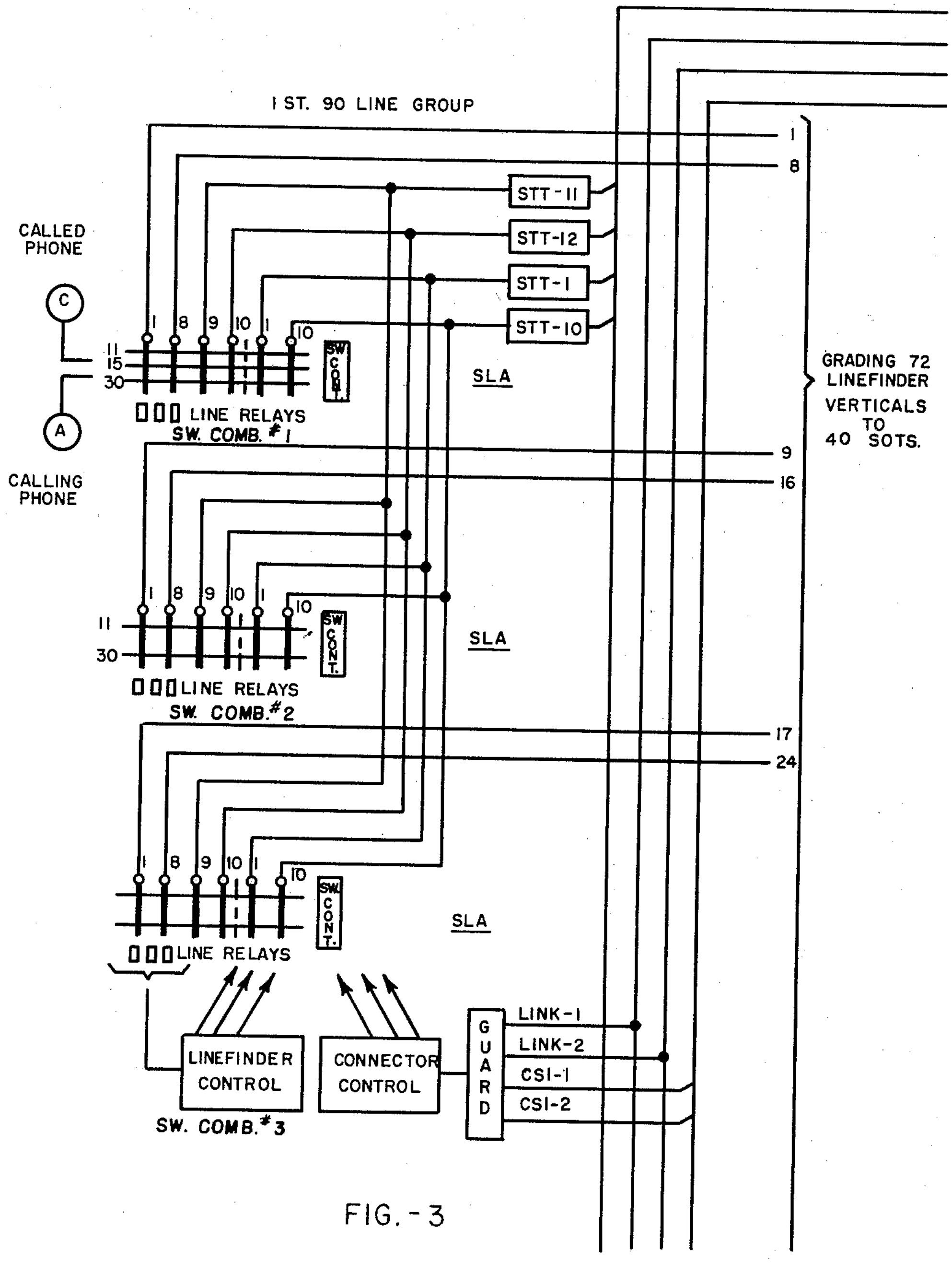

As an aid to the understanding of the function of the different switching stages and the layout pattern there is set forth hereat one of the routes which may be utilized in extending a call from calling subscriber phone A on the multiparty line in FIG. 3 to called subscriber phase C. As there shown, subscriber phase A is connected to horizontal input 30 of the first SLA or switch combination #1 in the first ninety line group, and the call may be extended therefrom over vertical 1, through the graded cross-connect to SOT–1 (FIG. 4) thence over vertical 1 of the GSA–1, common horizontal 1 of GSA–1 and GSA–2, vertical 1 of GSB–1, horizontal 1 of GSB–1 to outlet 1, through the graded cross-connect to STT1, over vertical 1 of the first switch combination #1 (FIG. 3), over horizontal 15 to the subscriber line connected to horizontal 15 and thence to the called party C. Other paths are, of course, used in the call extension in accordance with the availability thereof. It is believed however that the illustration of such path will simplify an understanding of the switching stage and the functions thereof.

Figures 69, 70:
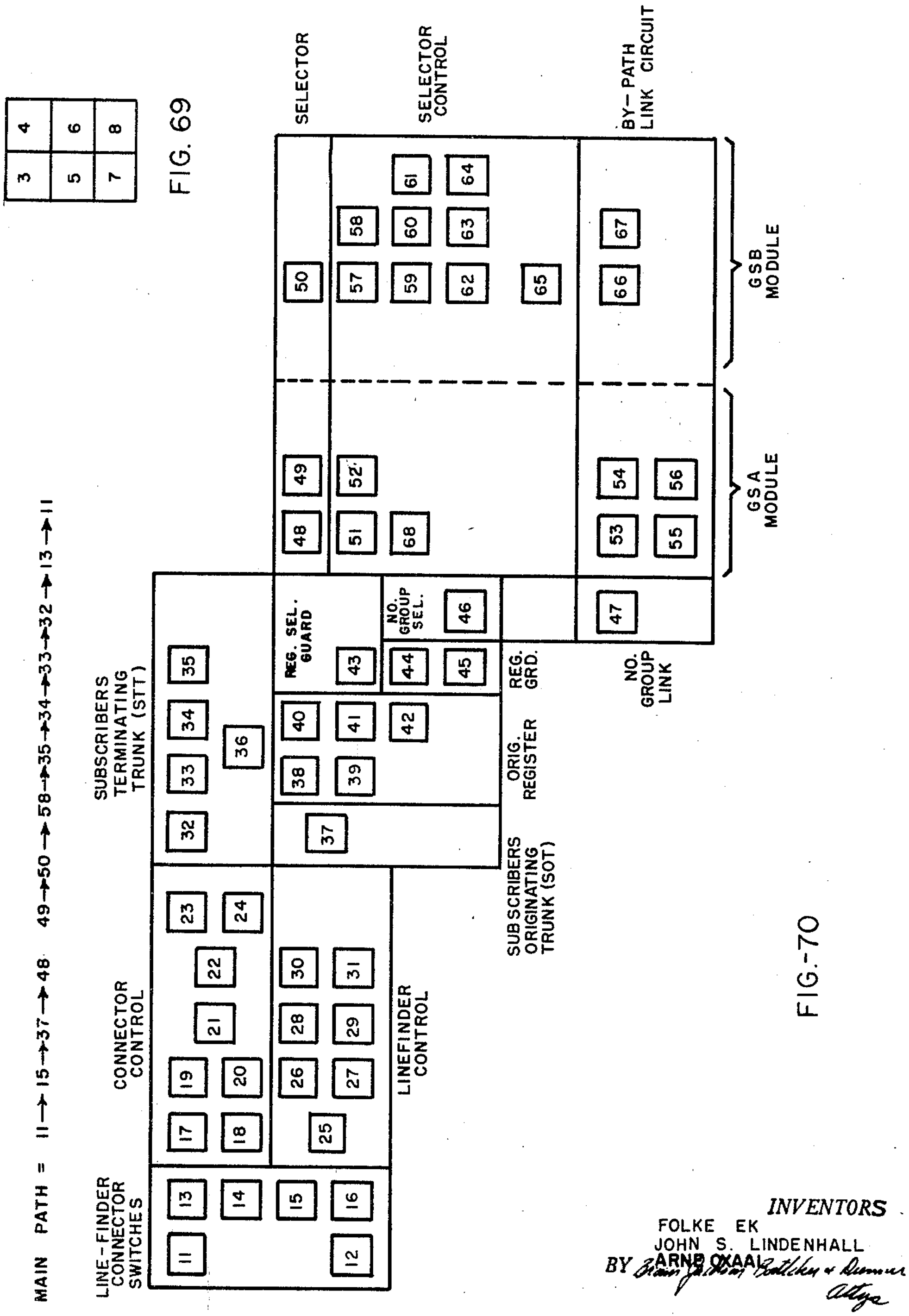
FIGURE 69 is a schematic showing of the manner of assembly of FIGURES 3–8.
FIGURE 70 is a schematic showing of the manner of assembly of FIGURES 11–67.

With reference now to FIGURES 3–8, assembled in the manner shown in FIGURE 69, a more detailed disclosure of the switches (but yet in block form) is set forth thereat. The left hand portion (FIGS. 3, 5, 7) includes a plurality of crossbar switches connected to ten groups of ninety lines each, each ninety line group being subdivided into three thirty line groups, each thirty lines being terminated on the thirty horizontal inputs of a crossbar switch combination. Each crossbar switch combination (shown in more detail in FIGS. 9–10) comprises two crossbar switches (see FIG. 3 for example) each having ten vertical members (making a total of twenty verticals) with their horizontal inputs connected in multiple. The first eight verticals of the first switch are connected for line-finding purposes, and verticals 9 and 10 of the first switch and all ten verticals of the second switch are connected to subscriber terminating trunks for completing calls.

Figure 4:
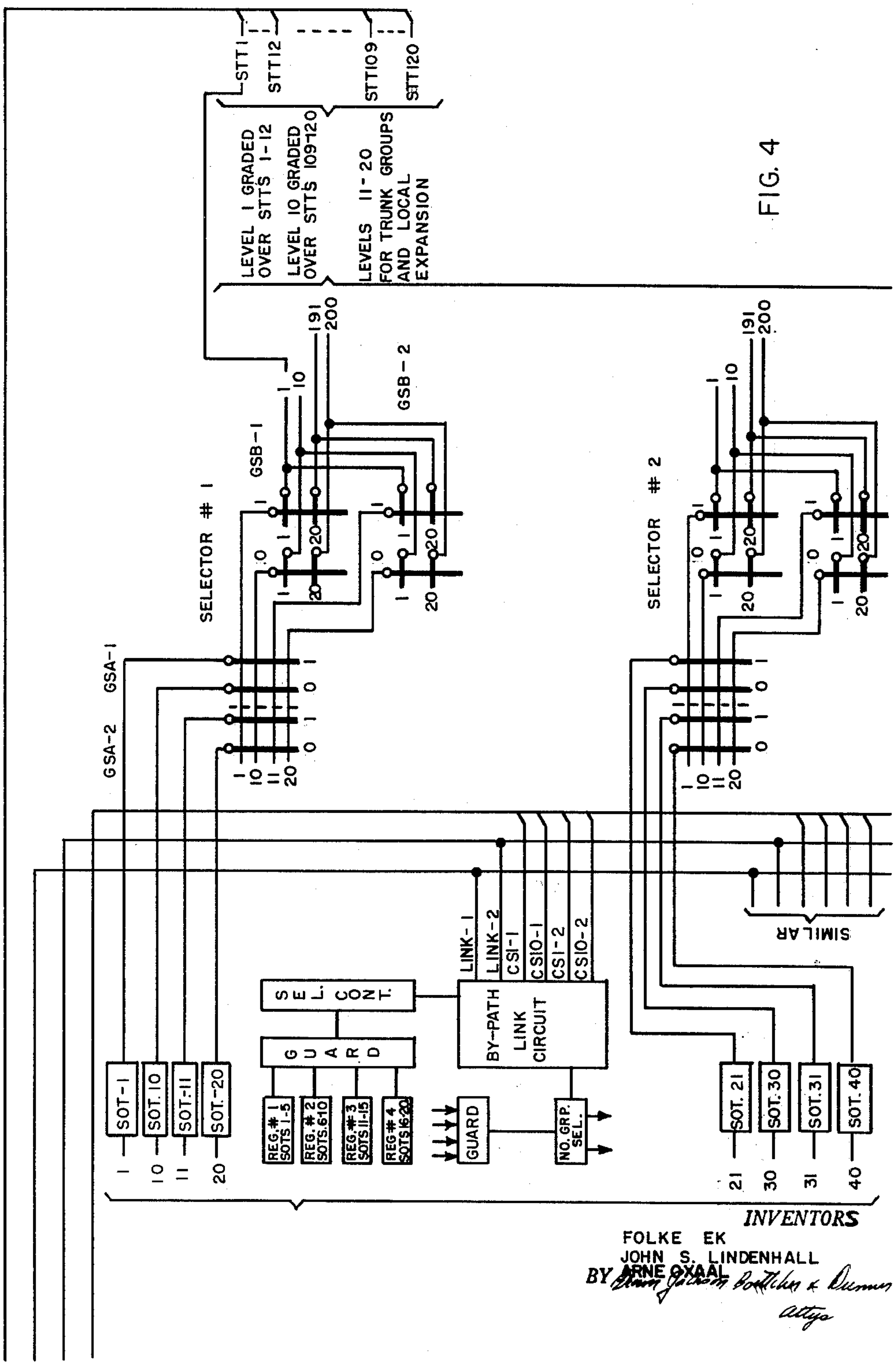
Figure 5:
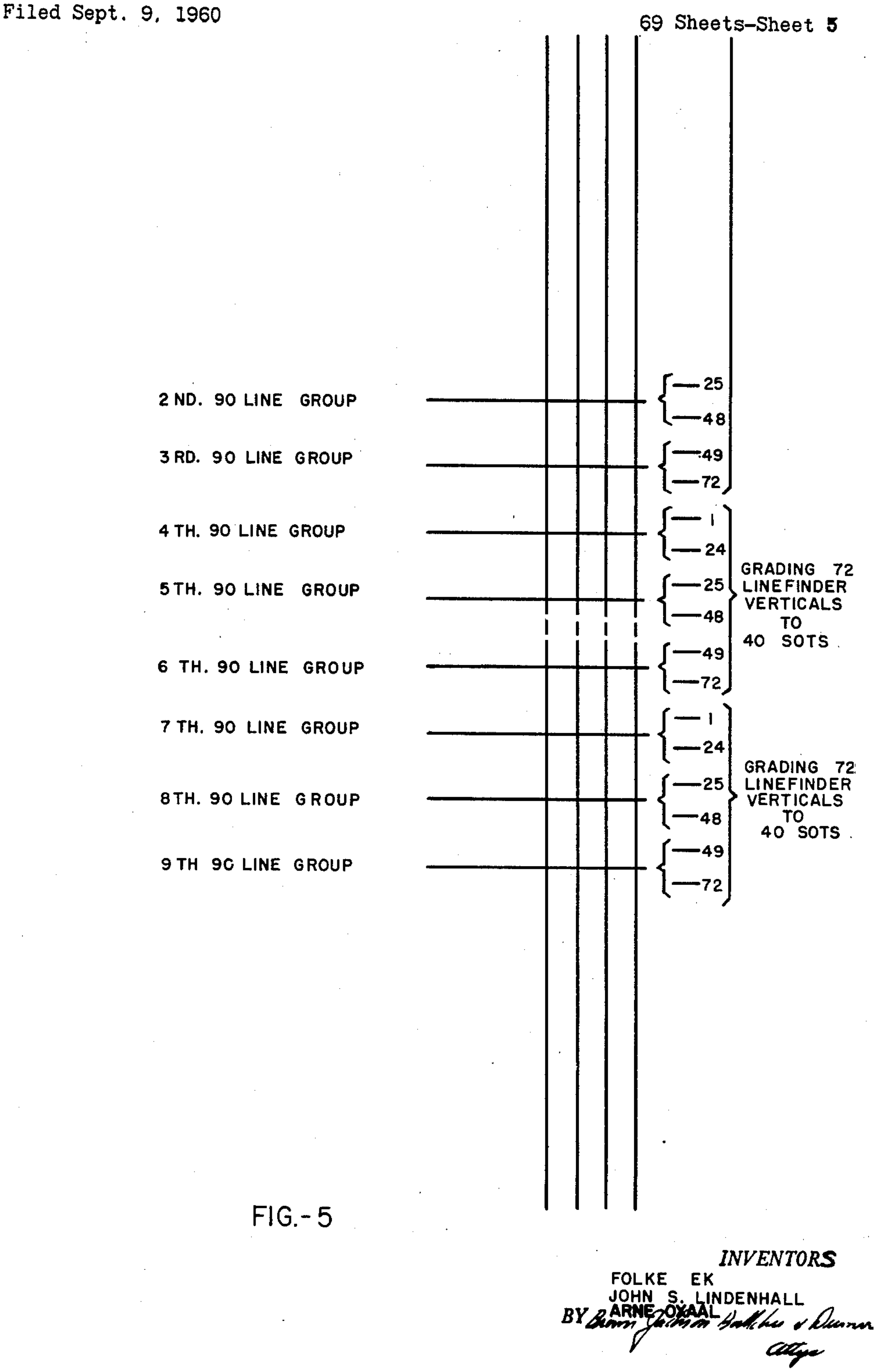
Figure 6:
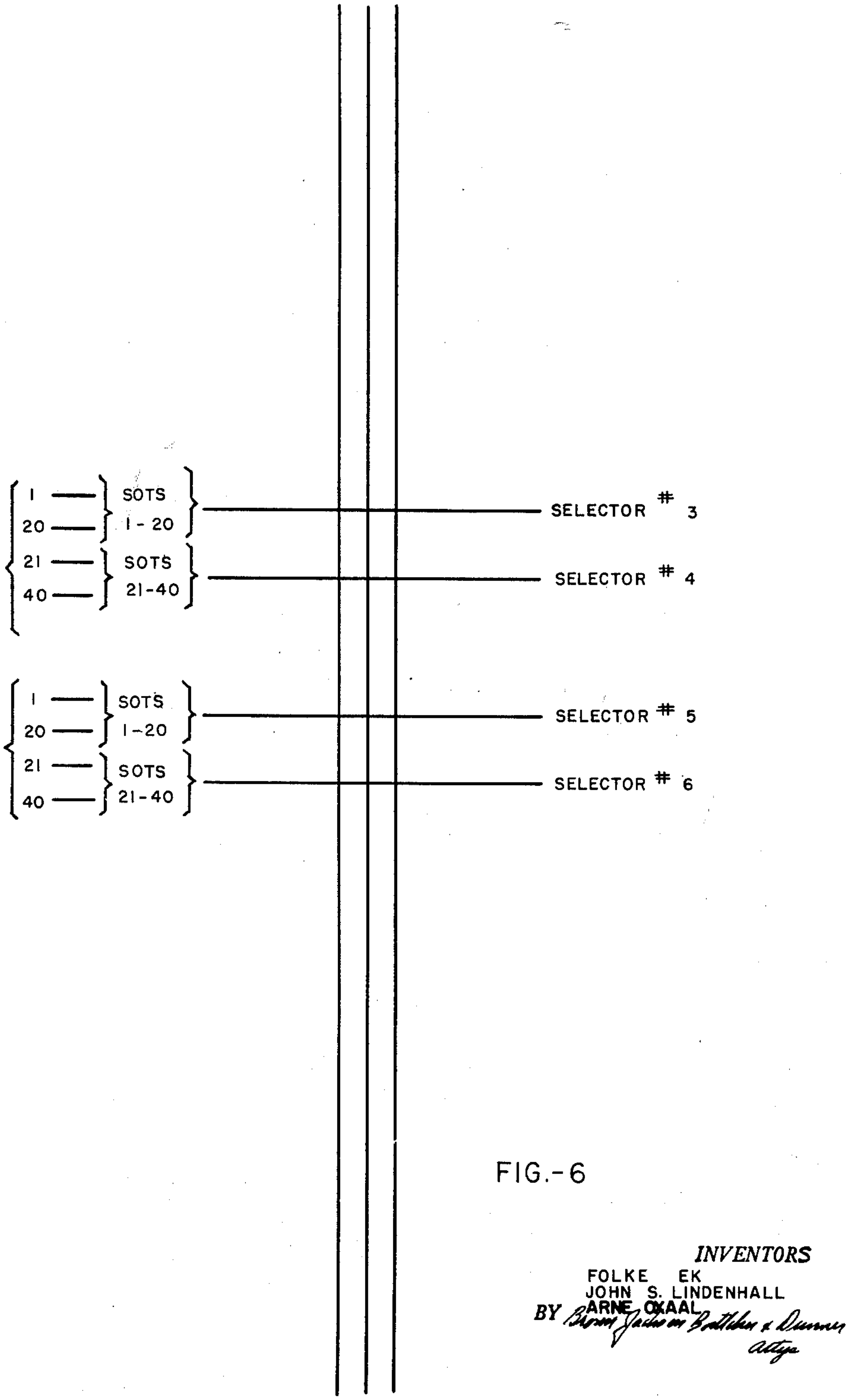
Figure 7:
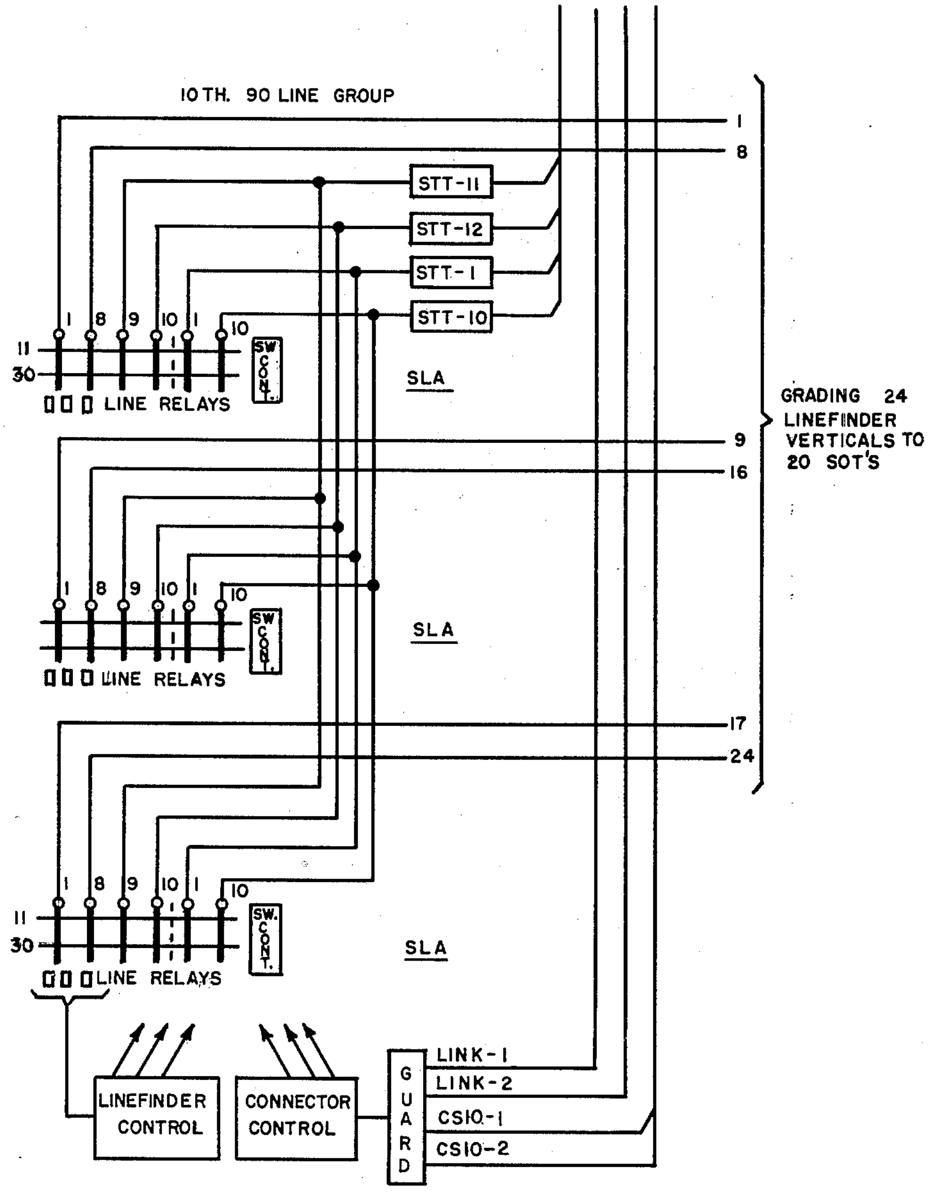
Figure 8:
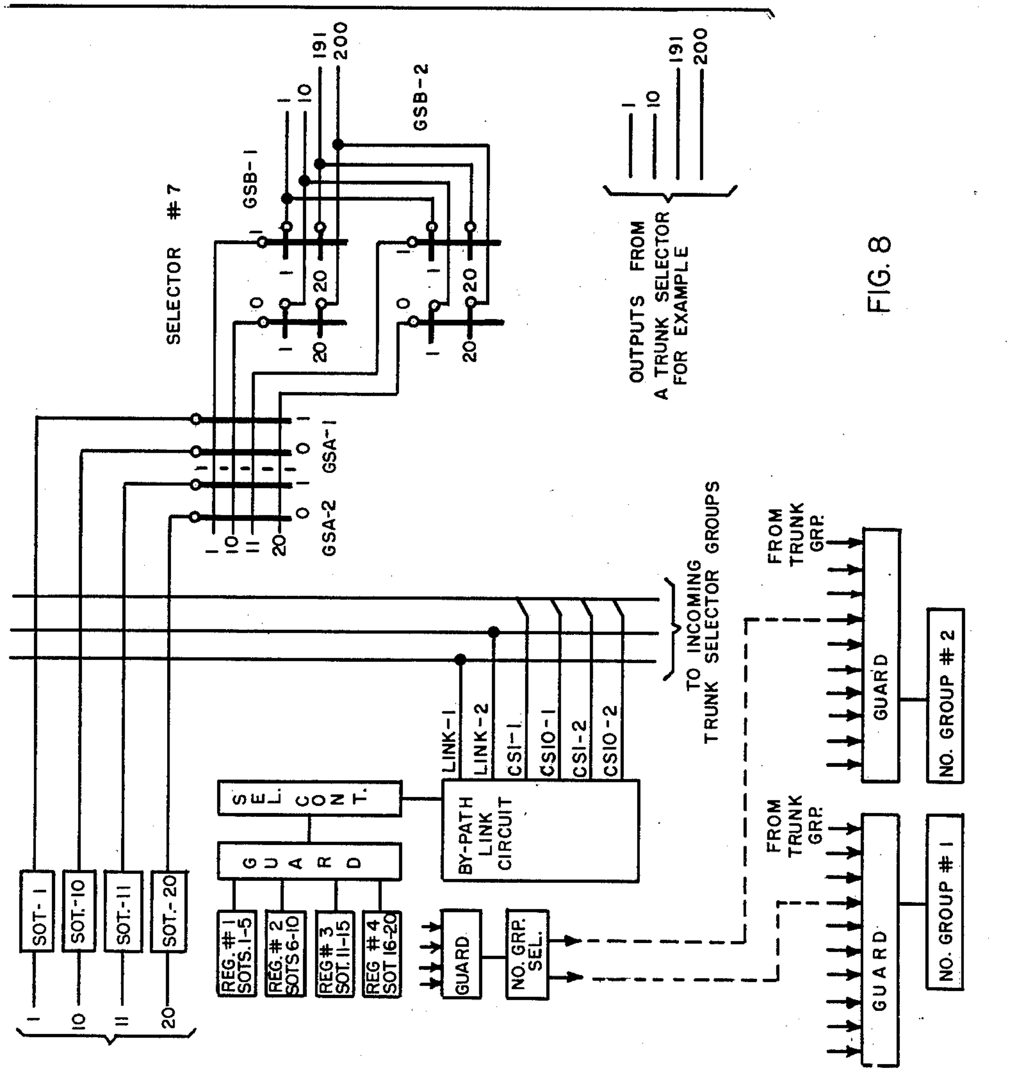

In the center portion of the assembled drawings (see FIGS. 3 and 5 for example) the twenty-four line finding verticals of the first ninety line group (verticals 1–24) together with the twenty-four verticals of the second ninety line group (verticals 25–48) together with the twenty-four verticals of the third ninety line group (49–72) making a total of seventy-two line finding verticals, are shown graded to forty subscriber originating trunks (SOT's) in two groups of twenty each. Similarly, the seventy-two line finding verticals of the fourth, fifth, and sixth groups of ninety lines (FIG. 5) are graded to the next forty SOT's; the seventy-two line finding verticals of the seventh, eighth and ninth groups of ninety lines (FIG. 5) are graded to the next forty SOT's; and the twenty-four line finding verticals of the last or tenth group of ninety lines (FIG. 7) are shown graded to the last 20 SOT's. The grading is accomplished by means of four grading cables, each of which is plugged into its group of line finding verticals at the left and into the associated group of SOT's (FIG. 4).

If an eleventh ninety line group were added, the cable for the tenth ninety line group would be unplugged, and an appropriate cross-connect cable would interconnect the tenth and eleventh ninety line groups with forty SOT's. If a twelfth ninety line group were added, the cable for the tenth group would be unplugged and an appropriate cross-connect cable would interconnect the tenth, eleventh, and twelfth ninety line groups with the associated forty SOT's.

It should be observed that each ninety line group is served by twelve subscriber terminating trunks (STT1–12—see FIG. 3 for first ninety line group) connected in multiple to the three switch combinations comprised of the six crossbar switches.

Each group of twenty SOT's (FIG. 4) is connected to a selector, and since there are seven groups of twenty SOT's, there are seven selectors. Each selector stage comprises two crossbar switches GSA–1 and GSA–2 and two crossbar switches GSB–1 and GSB–2 so interconnected as to provide twenty input circuits and two hundred output circuits comprised of twenty levels with ten outputs per level.

In more detail, the twenty SOT's are connected respectively to the twenty verticals of switches GSA–1 and GSA–2 (FIG. 4) and the twenty horizontals of switch GSA–1 are multiplied respectively to the twenty horizontals of GSA–2. The first ten horizontals of switches GSA–1 and GSA–2 are connected respectively to the ten verticals of switch GSB–1, and the last ten verticals of switches GSA–1 and GSA–2 are connected respectively to the ten verticals of switch GSB–2. Horizontal 1 of vertical 1 of GSB–1, and horizontal 1 of vertical 1 of GSB–2 are connected in multiple to form output circuit 1 of level 1. Horizontal 1 of vertical 10 of GSB–1 and horizontal 1 of vertical 10 of GSB–2 are connected in multiple to form outlet 10 of level 1. Horizontal 20 of vertical 1 of GSB–1 and horizontal 20 of vertical 1 of GSB–2 are connected in multiple to form outlet 191 which is the first outlet of level 20. Horizontal 20 of vertical 10 of GSB–1 and horizontal 20 of vertical 10 of GSB–2 are connected in multiple to form outlet 200 which is the tenth outlet of level 20.

It should be observed that the ten outlets of level 1 of each of the local and trunk selectors are graded over the twelve STT's (FIG. 12) of the first ninety line group; the ten outlets of level 2 of each of the local and trunk selectors are graded over the twelve STT's of the second ninety line group; etc., and that the ten outlets of level 10 of each of the local and trunk selectors are graded over the twelve STT's of the tenth ninety line group. Levels 11–20 are available for access to trunk groups or to additional local ninety line groups as installed.

It is apparent therefore that the first, second, and third ninety line groups are each served by twelve STT's, but are served in common by forty SOT's and two selector switches.

Each group of twenty SOT's has its own group of four registers (FIG. 4 for example), register #1 serving SOT's 1–5, register #2 serving SOT's 6–10, register #3 serving SOT's 11–15, and register #4 serving SOT's 16–20.

Each of the registers 1–4 has access via a first guard circuit to a common selector control circuit and via a second guard circuit to a number group selector.

Each number group selector associated with the SOT's (or trunks—see FIGS. 1–2) has access via guard circuits to the various number group circuits, such as number group #1 and number group #2. The dialed directory number information passes from the register to the seized number group (terminal per station operation) which gives back translated information as to group and terminal location, ringing, etc. Such information then passes from the number group selector to the By-Path Link Circuit, which in turn extends portions of this information to the selector control and portions of the information over Link 1 or Link 2 (which are common highways between the various By-Path Link Circuits and the various connector controls), to a guard circuit and the appropriate connector control.

Ten call signal leads 1–10 (see FIG. 4 for example) are associated with Link 1 which are connected in multiple to each By-Path Link Circuit and pass to the guard circuits of the respective connector controls, call signal lead 1 being connected to the guard circuit of the connector control of the first ninety line group, call signal lead 2 being connected to the guard circuit of the connector control of the second ninety line group, etc. Ten call signal leads 1–10 are similarly associated with Link 2.

The connector control, on the basis of information received over a link, actuates the switch control associated with the particular switch combinations to which the called line is connected. Every ten line group has its associated line relay, and on origination of a call the line relay for the group actuates the line finder control associated with the ninety line group which actuates the switch control associated with the switch combination to which the calling line is connected.

In terminal per line operation as contrasted to terminal per station operation, no number groups are required and information for completing calls passes from the register to the By-Path Link Circuit and thence to the selector control and connector control. In both terminal per line and terminal per station operation certain other information passes from the register to the By-Path Link Circuit.

The By-Path Link Circuit Arrangements as shown hereinafter, constitute an important feature of the invention in that the inclusion of such circuit permits release of the selector control equipment during the completion of the setting up of a call to a local subscriber. As a result, the selector control can handle the extension of a call to a trunk while the call to the local subscriber is being completed, and the traffic carrying capacity of the arrangement is substantially increased.

Although the embodiment of the present disclosure illustrates two hundred outlets per selector stage, if four hundred outlets per selector were required, additional switches GSB–1 and GSB–2 (called hereinafter, an additional selector B unit) could be provided with the verticals thereof connected in multiple with the corresponding GSB–1 and GSB–2 verticals shown. Similarly, if six hundred outlets per selector were required, two sets of additional switches GSB–1 and GSB–2 would be connected in multiple with the illustrated switches.

*Switching Stage Description*

Figure 9:
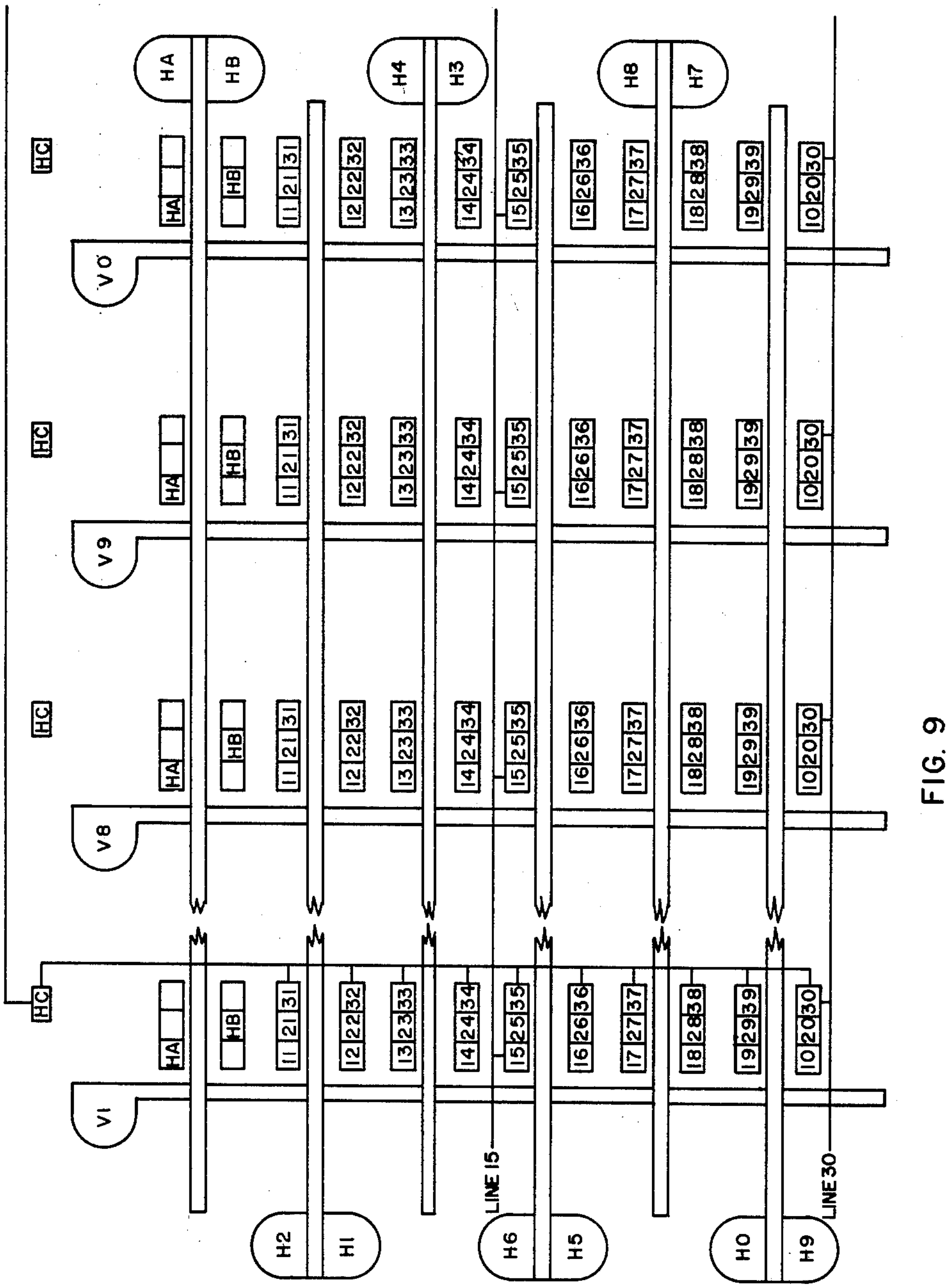
Figure 68:
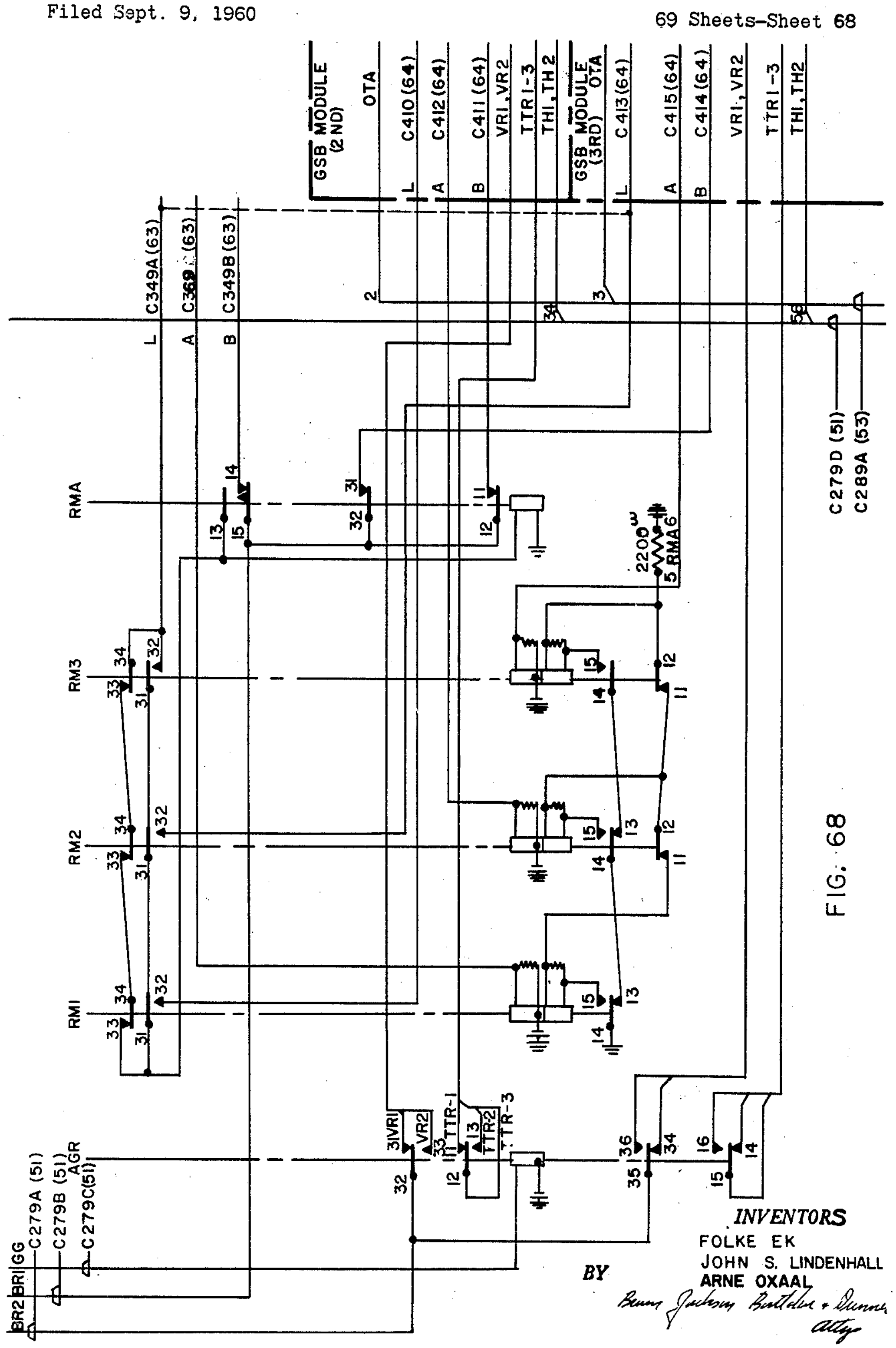

The specific construction of the different switches set forth in the block schematic illustration of FIGURES 1–8 are illustrated in detail in FIGURES 9–68. The structure of each of the switches and the identity and connection of the different component parts are first set forth hereat and thereafter as an exemplary call is extended over the switches for the purpose of more fully disclosing the manner of operation of each of the switches in the system.

*Line Terminating Switches*

Figure 10:
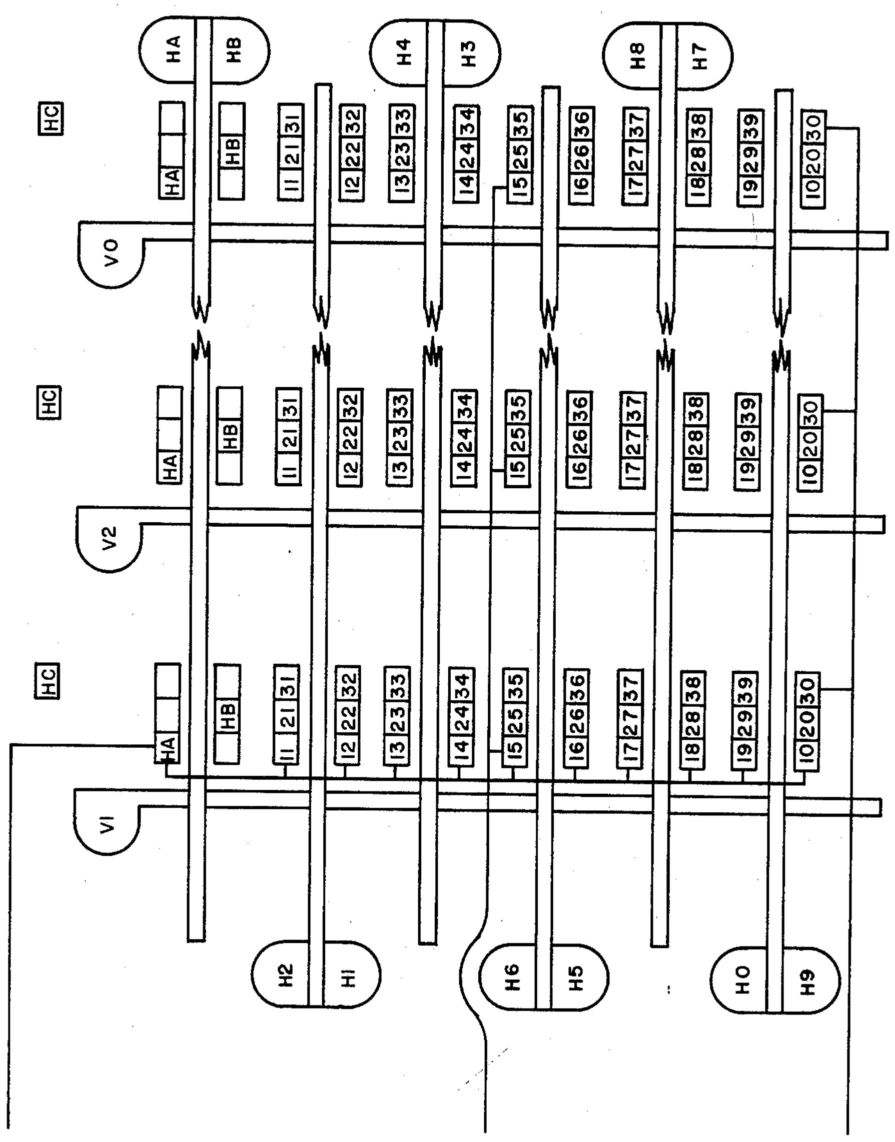

With reference first to FIGURES 9 and 10, the SLA switch combination for terminating subscriber lines in the manner of the showing of FIG. 3 is shown in more detail. As there shown, each of the twenty verticals of two crossbar switches is divided into three sections. The first section of the vertical is controlled by the HA magnet; the second section by the HB magnet; and the third section by an HC relay. Horizontal inputs are multiplied to all twenty verticals of the two crossbar switches. Verticals 1–8 of the first switch are used for line finding. Verticals 9 and 0 of the first switch and the ten verticals 1—0 of the second switch are used for connecting the subscribers to called lines. Each line finder vertical of the group of verticals 1–8 has its own HC relay whose contacts HC are shown in FIGS. 9 and 10. Each connector vertical of the group of verticals 9, 0; 1—0, is served by HC relay contacts which are shared in parallel with the corresponding verticals of the other two switch combinations of the ninety line group.

Figure 15:
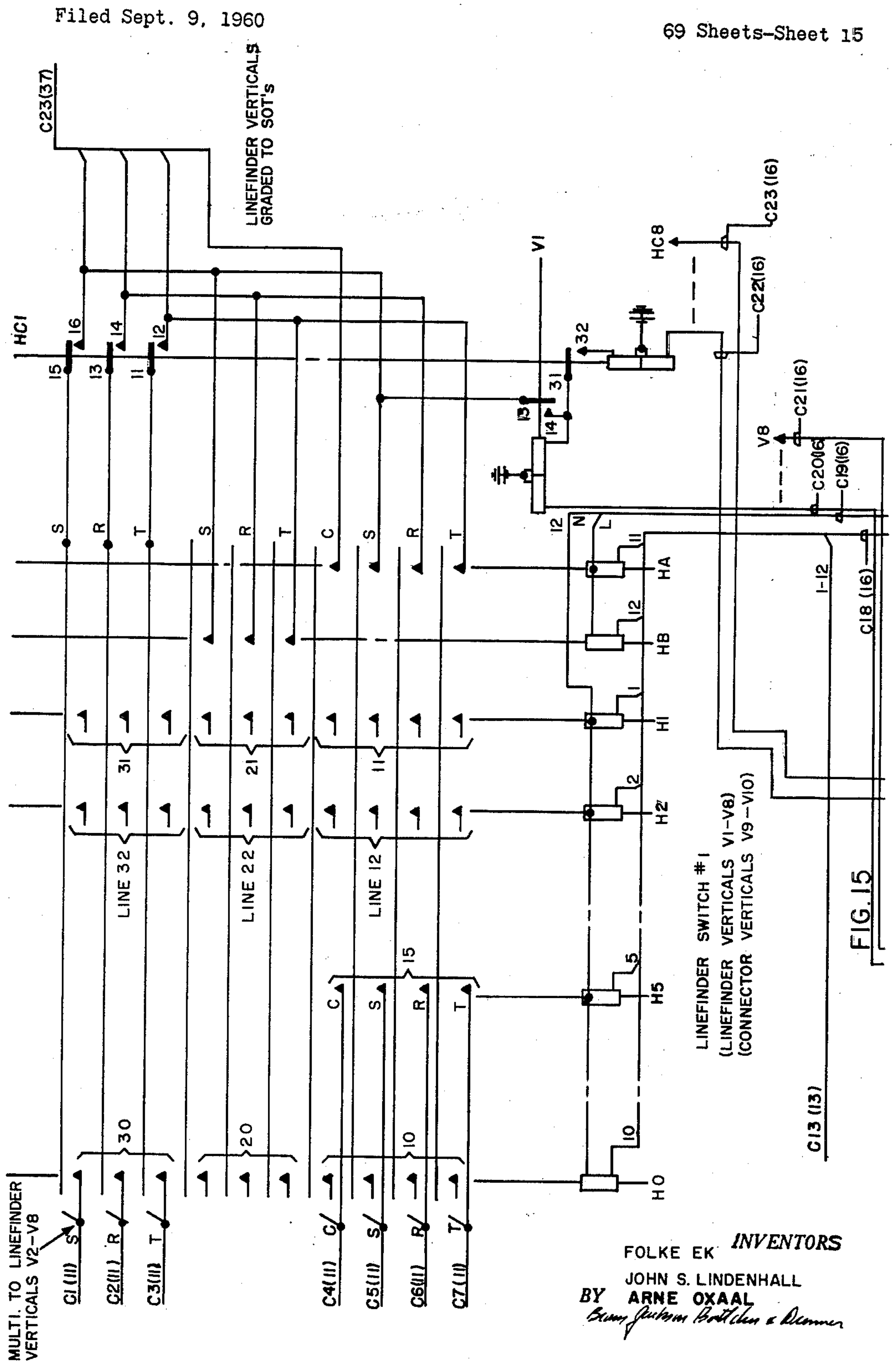

Thus, the exemplary call from line 30 to line 15 described above can be traced through the combination switch SLA in more detail, the call extending over the path which extends from line 30 over crosspoint contacts 30 on vertical V1 through the third portion of vertical V1, through contacts HC of relay HC1 (see FIG. 15 for relay HC1), through intervening switching equipment indicated by a dotted line, through HA contacts associated with the first portion of connector vertical V1 to crosspoint contacts 15 and line 15.

*Line-Finder—Connector Switches (FIGS. 11–16)*

The line-finder switch provides the path whereby the subscriber line may be connected to a subscriber's originating trunk (SOT). As noted above, the line-finder and connector switches comprise the basic 30 line unit building block of the system. Each of the line finder and connector switches in the system is represented by the switch shown in FIGS. 11–16, and as there shown contains the line relay sets and line finding and connecting switches for thirty lines of crossbar equipment. The switching relays and operating functions of the relays are listed briefly hereat.

*Relay and Lead Designations*

RELAYS (FIGS. 11–16)

LO (FIG. 11)—Line Lockout relays.
CO (FIG. 11)—Line cutoff relays.
UC1, UC2, UC3 (FIG. 12)—Units connect relays for the first, second and third ten line group. Pulled from the line-finder control to transfer the lines from the common line relays into the control.
UC1A, UC2A, UC3A (FIG. 12)—Units connect auxiliary relays. Same function as UC relays, and in addition determine whether the A or B horizontal, or the HC relays will be pulled.
LR1, LR2, LR3 (FIG. 12)—Common line relays.
FVP (FIG. 16)—Finder vertical pull relay. Connects the 8 line-finder vertical pulling leads to the multiple from the line-finder control. Also carries contacts which block entry to the switches from the connector control when the line-finder control is using them.
CVP (FIG. 13)—Connector vertical pulling leads to the multiple from the STT's.
HCC (FIG. 16)—HC connect relay. Connects the HC relays associated with each line-finder vertical to the VP leads when lines in the third tens group are identified.
FE (FIG. 16)—Line-finder horizontal connecting relay. Connects the pulling leads for the switch horizontals to the multiple from the line-finder control.
CE (FIG. 16)—Connector horizontal connecting relay. Connects the pulling leads for the switch horizontals to the multiple from the connector control.
HE (FIG. 16)—Horizontal pulling relay. Provides the operating grounds for pulling horizontals. Also provides a back signal to the control to indicate that the horizontals have been pulled.
CBL (FIG. 16)—Connector blocking relay. Blocks entry by the line-finder control when the connector control is using the switches.

LEADS (FIGS. 11–16)

Leads to the STT's (to FIGS. 32–36):
- H—Holding for the connector switch vertical Grounded by the MB relay in the STT.
- T, R, S—Tip, ring, and sleeve for lines connected by horizontals HA and HB.
- C—Additional control or signal wire for trunks and paystations. Found only on the first ten lines of each module (11—10, 41—40, 71—70).
- HT, HR, HS—Tip, ring, and sleeve of the last ten lines of a module are connected by an HC relay lines (31—30, 61—60, 91—90).
- VP—Vertical pulling lead for connector vertical.

Leads to the Connector Control (to FIGS. 17–24):
- CCH—Back signal check to the control indicating that the switch circuit has been coupled and the horizontals are being pulled.
- CPC—Connect relay pulling lead from the control.
- H1–H0, HA, HB—Horizontal pulling leads from the control.
- A, B, C—PBX selection leads. These leads are strapped in the connector control to form a PBX group, with the "A" lead of one line tied to the "B" lead of the next. When a ground is placed on the "B" lead of the first line of a group, it will return on the "C" lead of that line if the line is idle, causing that line to be selected. If the line is busy, the ground will pass through the "A" lead to the "B" lead of the next line, and so on until an idle PBX line is found.

Leads to the Line-Finder Control (to FIGS. 25–31):
- H1–H0—Horizontal pulling leads from the control.
- VP1–8—Vertical pulling leads from the control.
- FCH—Back signal check to the control, indicating that the switch circuit has been occupied and the horizontals are being pulled.
- FPC—Connect relay pulling lead from the control.
- UC1–3 (4–6) (7–9)—Units connect relay pulling leads from the control.
- TA1–3 (4–6) (7–9)—Line tens identification leads from the common line relays to the control.
- U1–U10—Ring side of the ten lines identified by the common line relay, connected by the UC relays to the units identifier in the control.
- TG—Test ground to the control indicating that a line relay is up. When this ground disappears as a result of operation of the UC relays, and is not replaced by a ground from the UA relays in the control, the REL relay in the control will operate, indicating a leakage landing.

It will be noted that lockout and cutoff relays are equipped for thirty lines, and yet only three line relays are provided. As shown in more detail hereinafter the novel line relay arrangement as thus used in the system permits ten lines to share one line relay. When a line lands, it is identified on its common line relay and that identification is passed on into the line finder control where a units identification is made to select that particular line out of its group of ten. Once the line has been identified and connected to a register and the rest of the system, the lockout and cutoff relays for that line take over all control functions for that line, and the line relay is released so that it may be used by other lines in the ten line group.

As noted above, the line-finder switch comprises a crossbar switch having ten verticals of which only eight are used as paths to SOT's. The remaining two verticals are used functionally as part of the connector switch, so that the resultant arrangement gives eight paths into the system and twelve out for each thirty line group. The twenty-four line-finder verticals for a ninety-line group, and line-finder verticals from other ninety-line groups served by the same local selectors are graded into the SOT's serving the selectors. When one ninety-group is provided with one local selector and one originating register (REG–O) group, there will be twenty SOT's serving the twenty-four verticals. Where two, three, or four ninety-groups are cross-graded into two selectors and REG–O groups, there will be forty SOT's serving forty-eight, seventy-two, or ninety-six verticals. Each of the twelve connector verticals in the thirty-line group is multiplied with the corresponding connector verticals in the other switches in the ninety-group, to the twelve subscriber terminating trunks (STT's).

Figure 16:
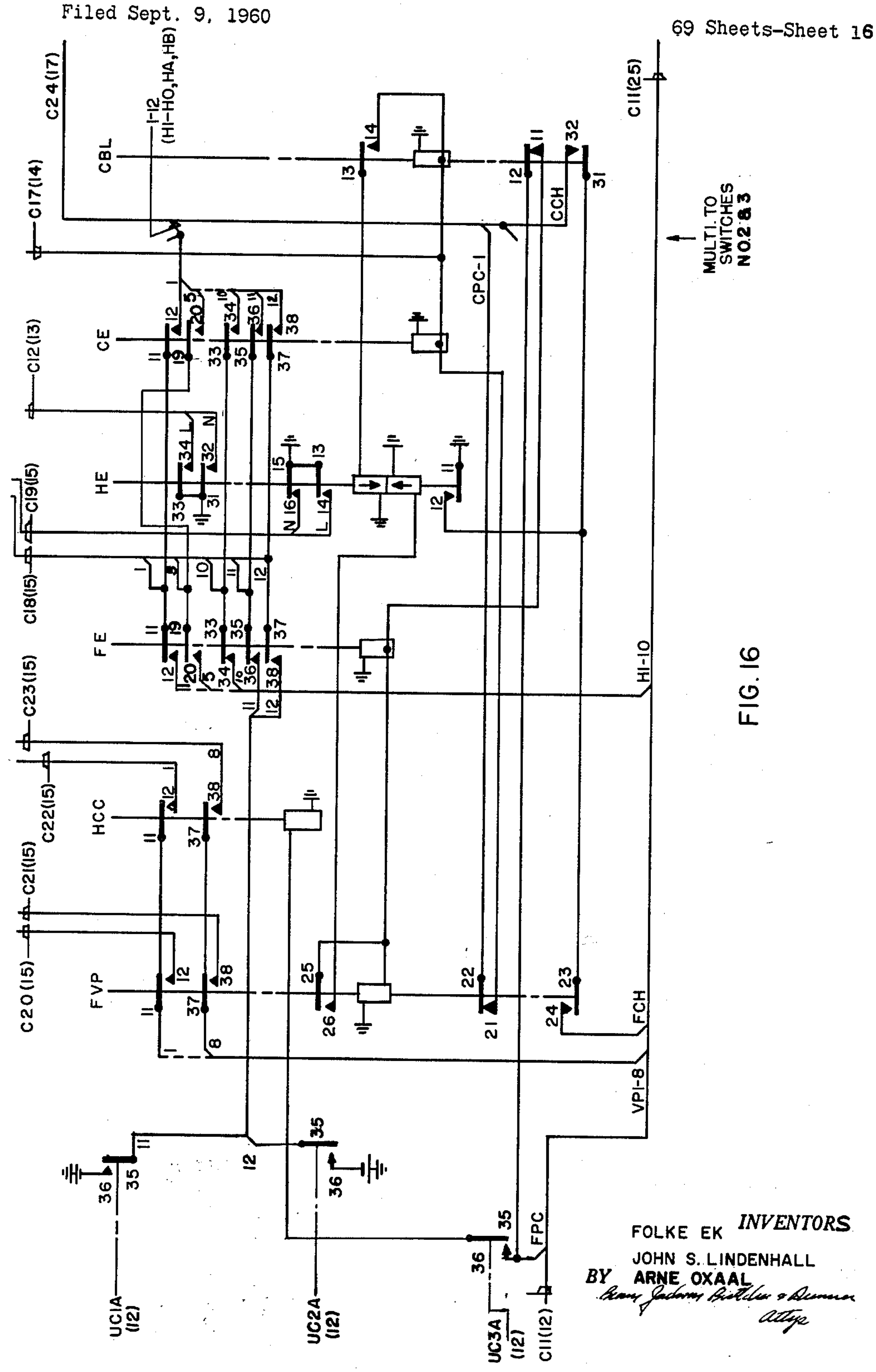

The connector switch provides the path from the subscriber terminating trunks (STT's) to the line for terminating traffic. Since some of the connector verticals are physically located in the connector switch and some of them are in the line-finder switch, the horizontals or common selecting bars of the crossbar switches are pulled in parallel from either the line-finder control or the connector control as appropriate. An arrangement for guarding and blocking to prevent occupation of the switches by both controls simultaneously is provided in the following group of relays: FVP, HCC, FE, HE, CE and CBL (FIG. 16).

It will be recalled that the switches are wired with thirty lines appearing in multiple across the verticals. Lines 11—10 enter the switch on the first four crosspoints corresponding to the numbered horizontals, and leave on the HA crosspoints. Lines 21—20 enter on the next three crosspoints of the numbered horizontals, and leave on the HB crosspoints. Lines 31—30 enter on the last three crosspoints of the numbered horizontals, and leave by direct connections to the vertical contact strips. These leads (HT, HR, HS) must then pass through connecting relays which perform the function of a non-existant HC horizontal. The HC relays for the line-finder verticals are found in the line-finder switch circuits, while those for the connector verticals are in the STT's. Each line-finding vertical has its associated HC relay. Corresponding connector verticals (i.e., vertical 1, switch combination 1, vertical 2, switch combination 2, and vertical 1, switch combination 3) have a common associated HC relay.

Out of each group of thirty lines, 20 are equipped with only tip, ring, and sleeve; but the first ten lines in each switch are equipped with tip, ring, sleeve, and C-wire. These lines are suitable for use where paystations or trunks on lines are required, the C-wire being made available for signalling purposes. In addition, the first five lines in each switch are arranged for PBX service. The lockout relay for the PBX lines has extra contacts on it which are used by the connector control for selecting an idle line in the PBX group. Between the lockout and cut-off relay equipment and the common line relays are a group of UC relays or units connect relays (FIG. 12) which are operated by the line-finder control once a tens group line identification has been established to split off the ten individual lines so that they may be further identified in the line-finder control.

The system of this application is built with a line group consisting of ninety lines. Therefore, such a line group would consist of three of these line-finder connector switch circuits. However, smaller groups may be composed containing only one or two thirty-line groups.

*Line-Finder Connector Control (FIGS. 17–31); Line-Finder Control (FIGS. 25–31)*

The line-finder control is a common control relay set which provides all the control and testing functions for an incoming local call from the time it lands until the time it is placed in the originating register and receives dial tone. It has three basic functions:

(*a*) The first function is to find and completely identify the calling line. It is activated upon receipt of a signal from one of the common line relays in a line-finder and connector switch circuit. A calling group of ten lines is identified on the TA relays in the line-finder control, which will cause the units connect UC relays in the line-finder connector switch circuit to be operated for that group of ten lines whereby the ring side of those ten lines will be brought into the units relays in the control where the individual calling line is identified.

(*b*) The second function of the line-finder control is to find an idle SOT or subscriber originating trunk path into the system. The control locates such a path by testing over the test battery leads of the SOT's, one of which is associated with each line-finder switch vertical. The test is made on the F relay ripple chain of FIG. 27. When an idle SOT is located, the control is ready for its third and last function—that of switch connecting and pulling.

(*c*) By means of the identification made on the tens and units relays, the control causes the horizontal selecting bars of the line-finder switch to be operated to a position ready to select the calling line. When the horizontals have been set, it causes the line-finder switch vertical associated with the selected SOT to be operated, thereby connecting the line to the SOT. When the SOT is seized, a signal is sent from the line-finder control to the register which serves the SOT. This signal causes the H relay in the register to be pulled which serves the SOT. This signal causes the H relay in the register to be pulled which places a ground on the sleeve of the calling line operating the cut-off relay and the lockout relay, which removes the loop of the calling line from the line relay circuit, thereby removing the call signal which was originally placed upon the line-finder control and causing the release of the control.

The line-finder control contains certain other features necessary for its operation. It contains an arrangement whereby special markings may be placed on the M lead of the SOT depending on the line which has been identified. This M lead marking is used to pass a signal into the register to indicate a line which is providing some special sort of service such as certain types of paystations, trunk on lines, restricted service lines, and such other uses as may arise.

Since in the line-finder switch circuit ten lines use one common line relay, it is conceivable that ten lines in one group might under certain conditions develop such line leakage that ten of them in parallel could appear as a valid line landing. This would cause a tens identification but when the lines were separated and placed on the units relays no units identification would result. The line-finder control circuit is therefore arranged so that should such a false leakage landing occur, that tens group will be locked into the line-finder control without blocking the control and that call will be held until a succeeding call either within that tens group or outside of it arrives and releases the control. In such manner a leakage situation is prevented from blocking the line finding functions of the system. Should during periods of congestion the line-finder control be unable to find an idle SOT path, it will continue to re-cycle by means of a time out until such time as either a path becomes idle or the call is abandoned.

*Relay and Lead Designations—Line-Finder Control (FIGS. 25–31)*

RELAYS

TA1–TA9 (FIG. 26)—Line tens identifier and guard relays. Identify one group of ten lines and provide for the pulling of proper units connect and switch connect relays.
TAA (FIG. 26)—End relay for TA chain.
TAB (FIG. 26)—Secondary relay for TAA.
U1–U10 (FIG. 28)—Secondary line relays for units identification.
UA1–UA10 (FIG. 30)—Line units identifier and guard relays. Provide for pulling proper switch horizontal on basis of units identification.
UAA, UAB (FIG. 30)—End and auxiliary relays for UA identifier.
REL (FIG. 30)—Release relay. Blocks time-out in case of a leakage landing.
R1–R9 (FIG. 28)—Rotator relays. Change the preference on TA relays.
TO1–TO2 (FIG. 30)—Timeout relays.
F1–F8 (FIG. 27)—Ripple test relays for SOT finding. The chain advances until an idle SOT is found, then steps over to the next relay, ready for the next call.
1T1 (FIG. 29)—Test relay for odd numbered test battery leads.
2T1 (FIG. 29)—Test relay for even numbered test battery leads.
1T2–2T2 (FIG. 29)—Secondary relays for 1T1 and 2T1 respectively. These relays close the VP, M, and PH leads.
PV (FIG. 29)—Vertical pulling relay. Shunted down upon receipt of the FCH Signal from the line-finder switch. Release of the relay causes pulling of the vertical.
E (FIG. 29)—End of test relay. Operates when an idle SOT has been found.
ST (FIG. 29)—Start of test relay. Operates when test battery leads are connected to the F chain.
PH1, 2, 3 (FIG. 31)—PH lead connecting relays.
M1, 2, 3 (FIG. 31)—M lead connecting relays.
TB1, 2, 3 (FIG. 31)—Test battery lead connecting relays.

LEADS (FIGS. 25–31)—LEADS TO THE LINE-FINDER CONNECTOR SWITCHES (FIG. 25)

H1–H0—Horizontal pulling leads to the switches.
VP1–8—Vertical pulling leads to the switches.
FCH—Back signal check from the switches, indicating that the switch circuit has been occupied and the horizontals are being pulled.
FPC—Connect relay pulling lead to the switches.
UC1–3 (4–6) (7–9)—Units connect relay pulling leads to the switches.
TA1–3 (4–6) (7–9)—Line tens identification leads from the common line relays to the control.
U1–U10—Ring side of the ten lines identified by the common line relay, connected by the UC relays to the units identifier in the control.
TG—Test ground to the control indicating that a line relay is up. When this ground disappears as a result of operation of the UC relays in the switches, and is not replaced by a ground from the UA relays, the REL relay will operate, indicating a leakage landing.

Figure 31:
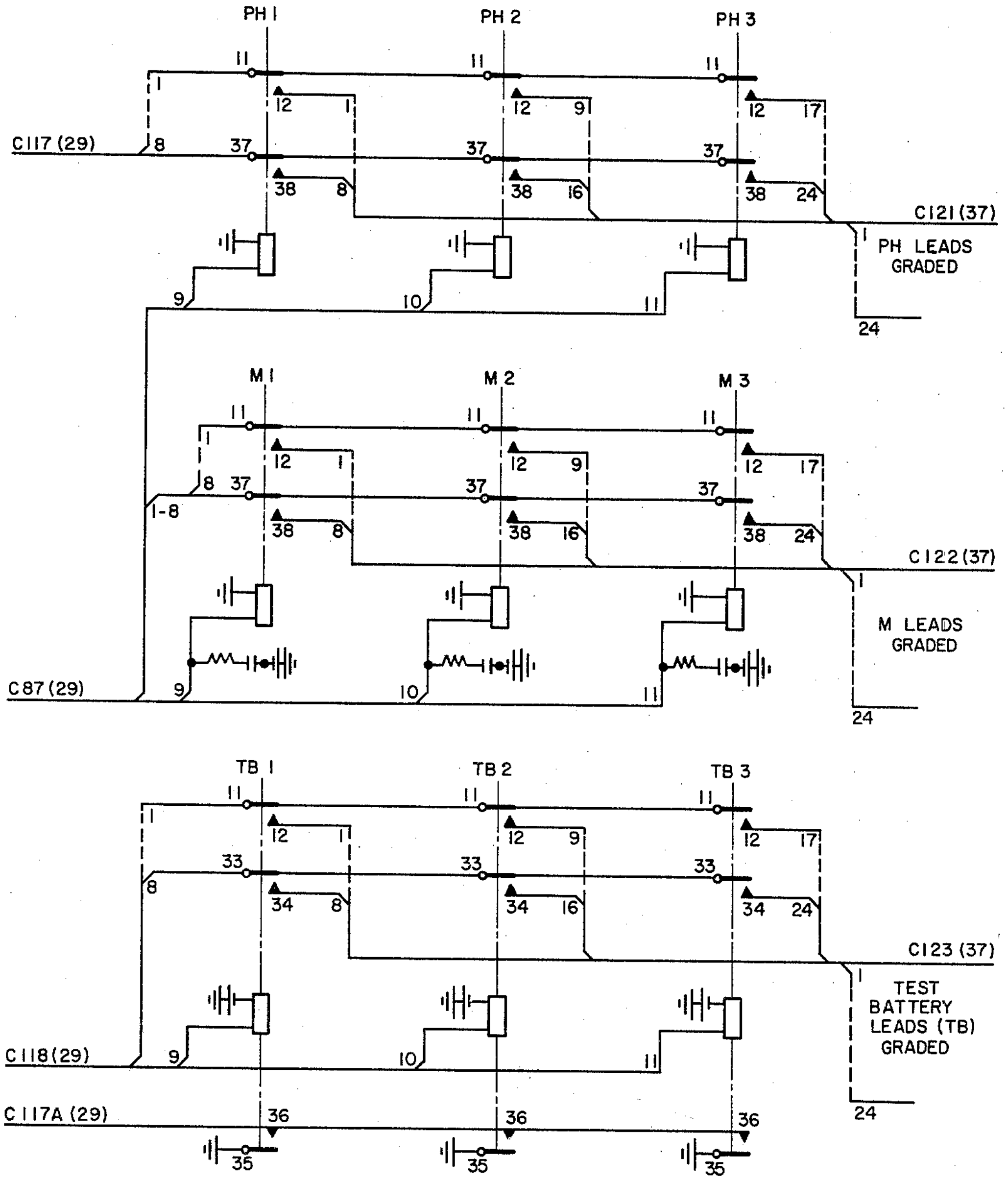
Figure 32:
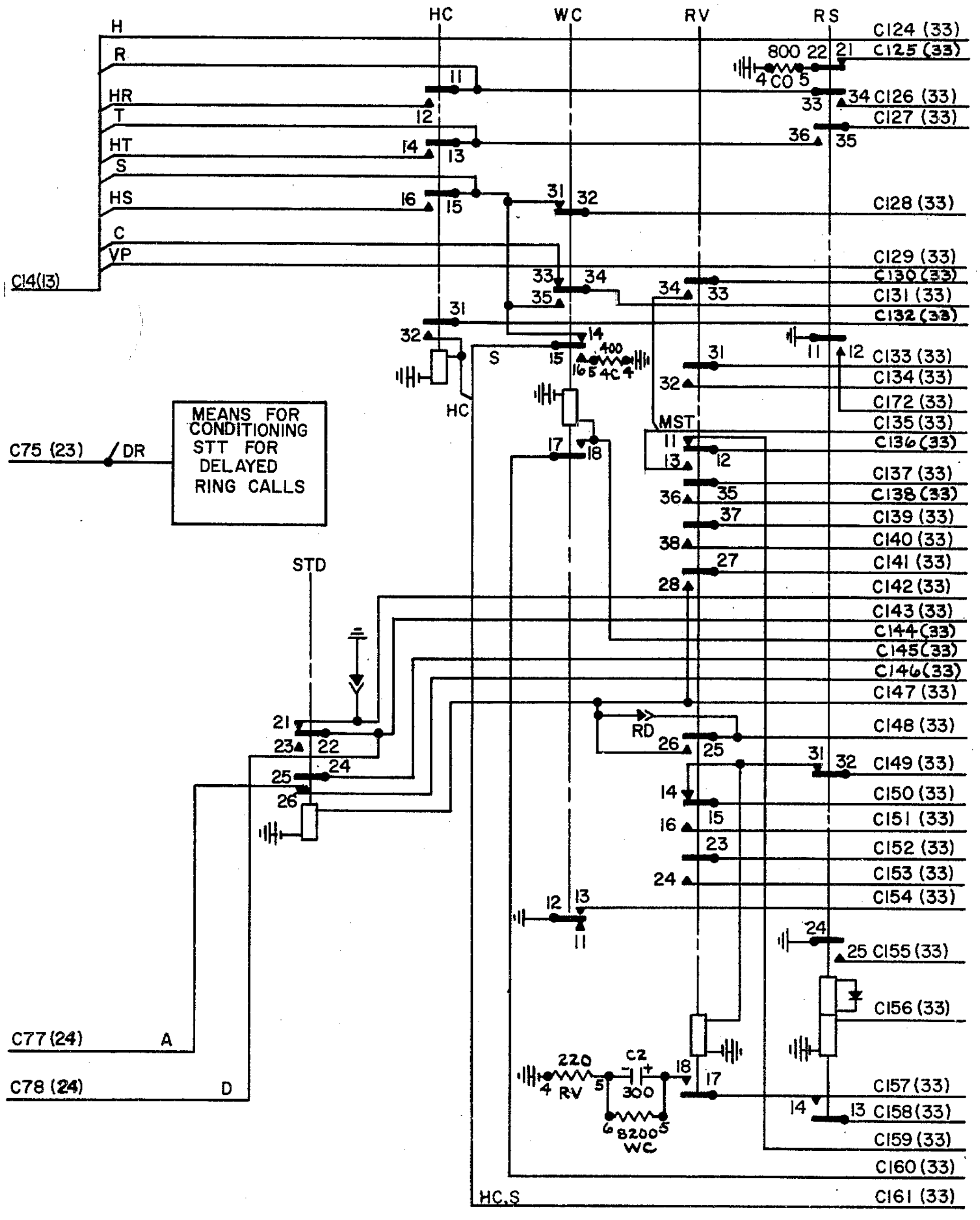
Figure 33:
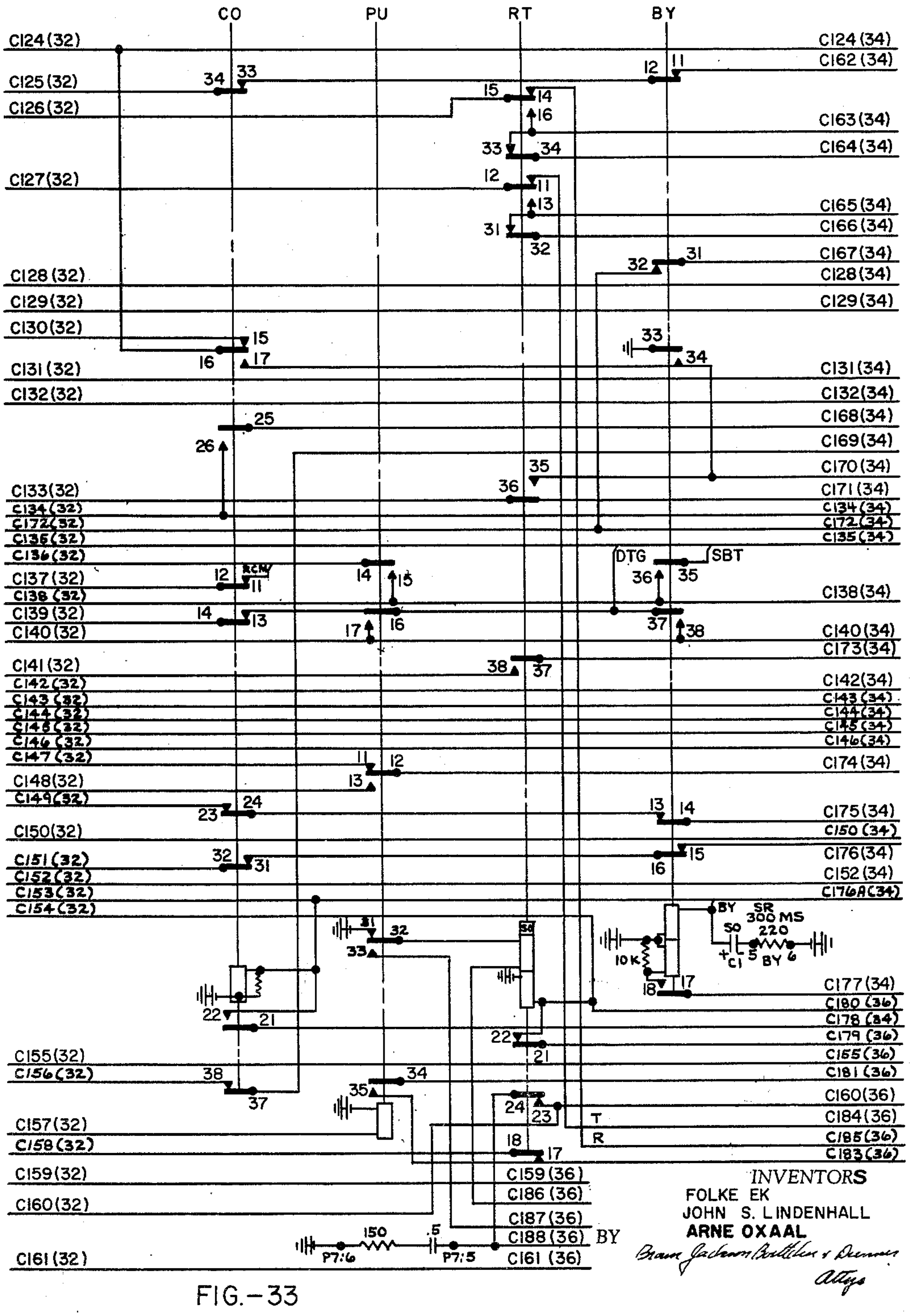
Figure 34:
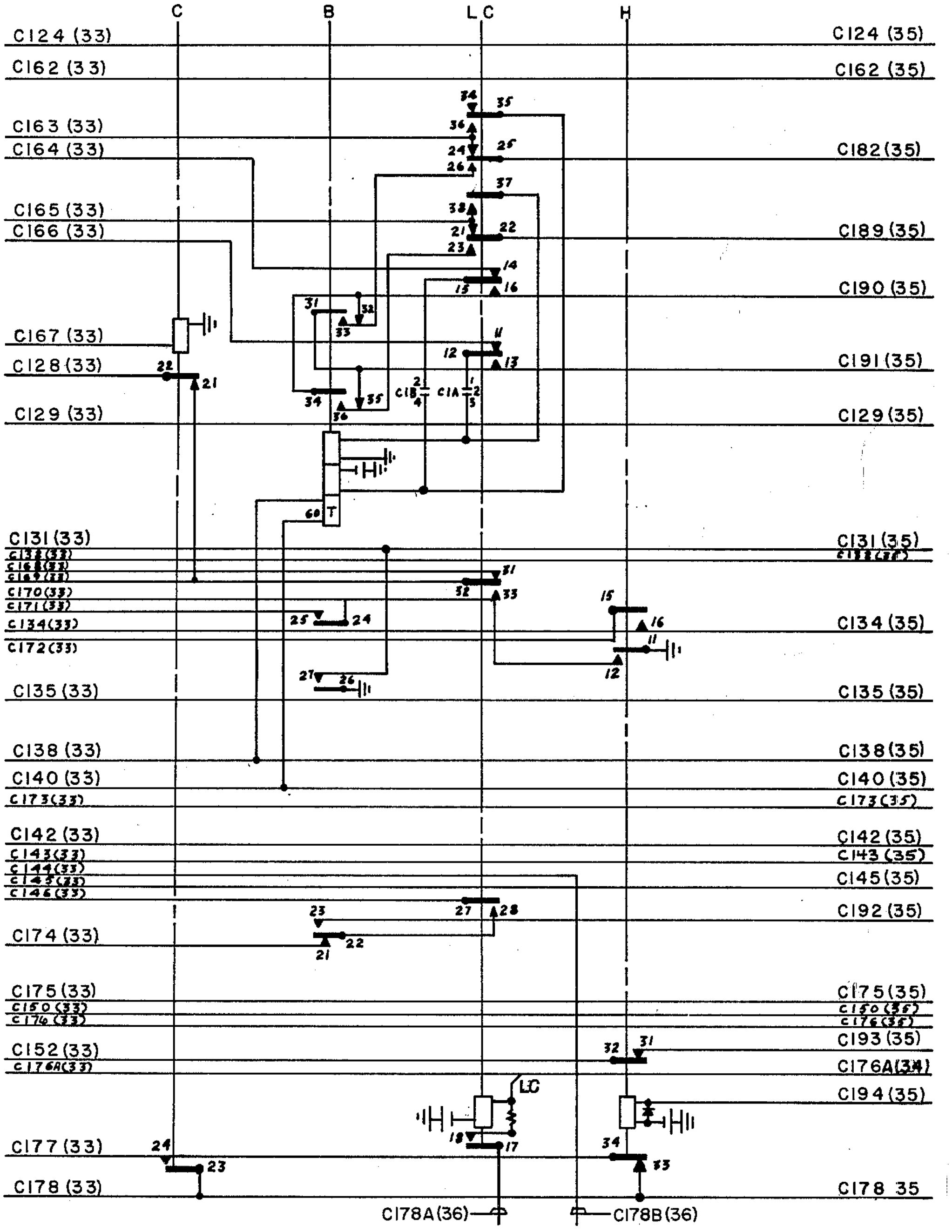
Figure 35:
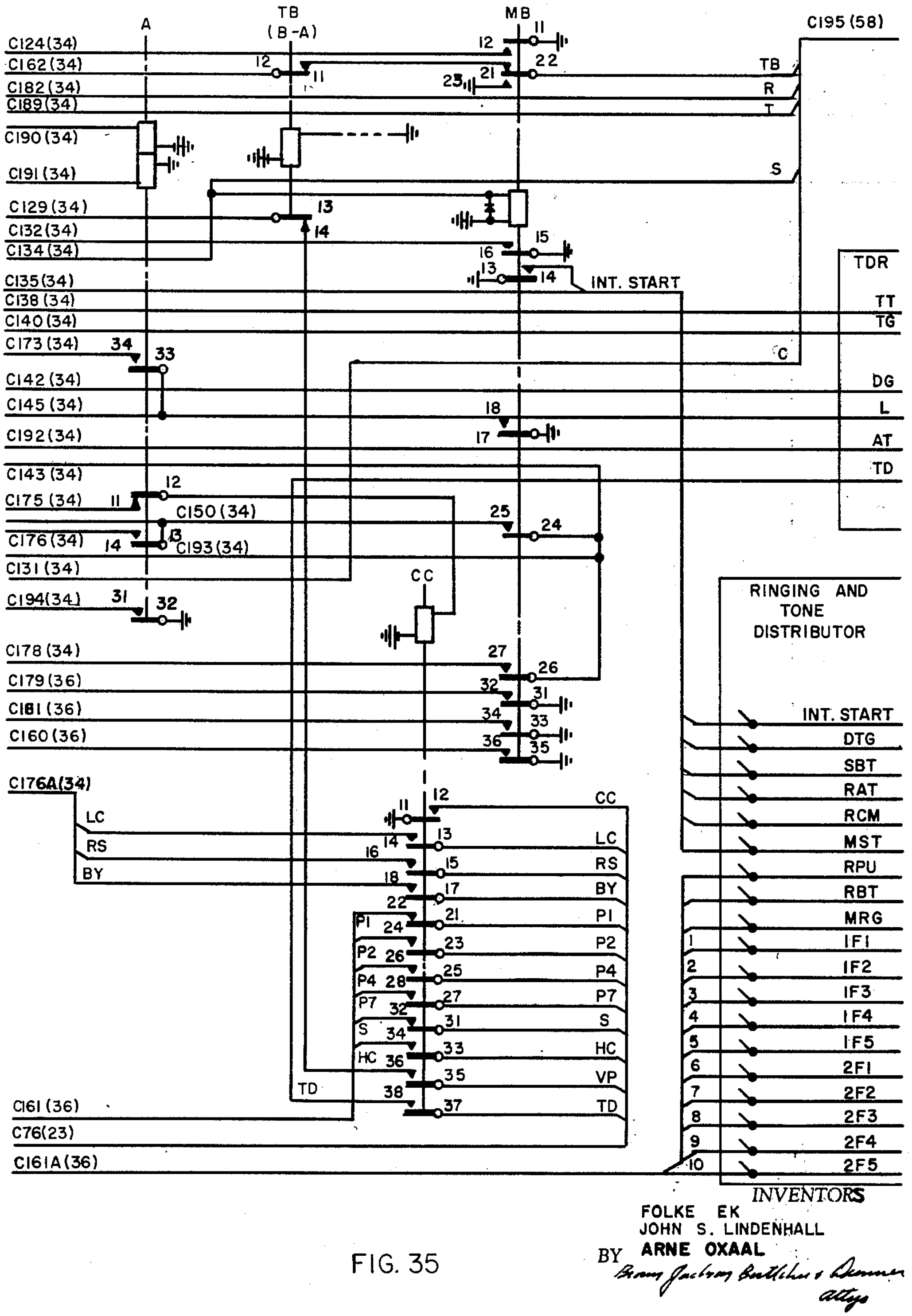
Figure 36:
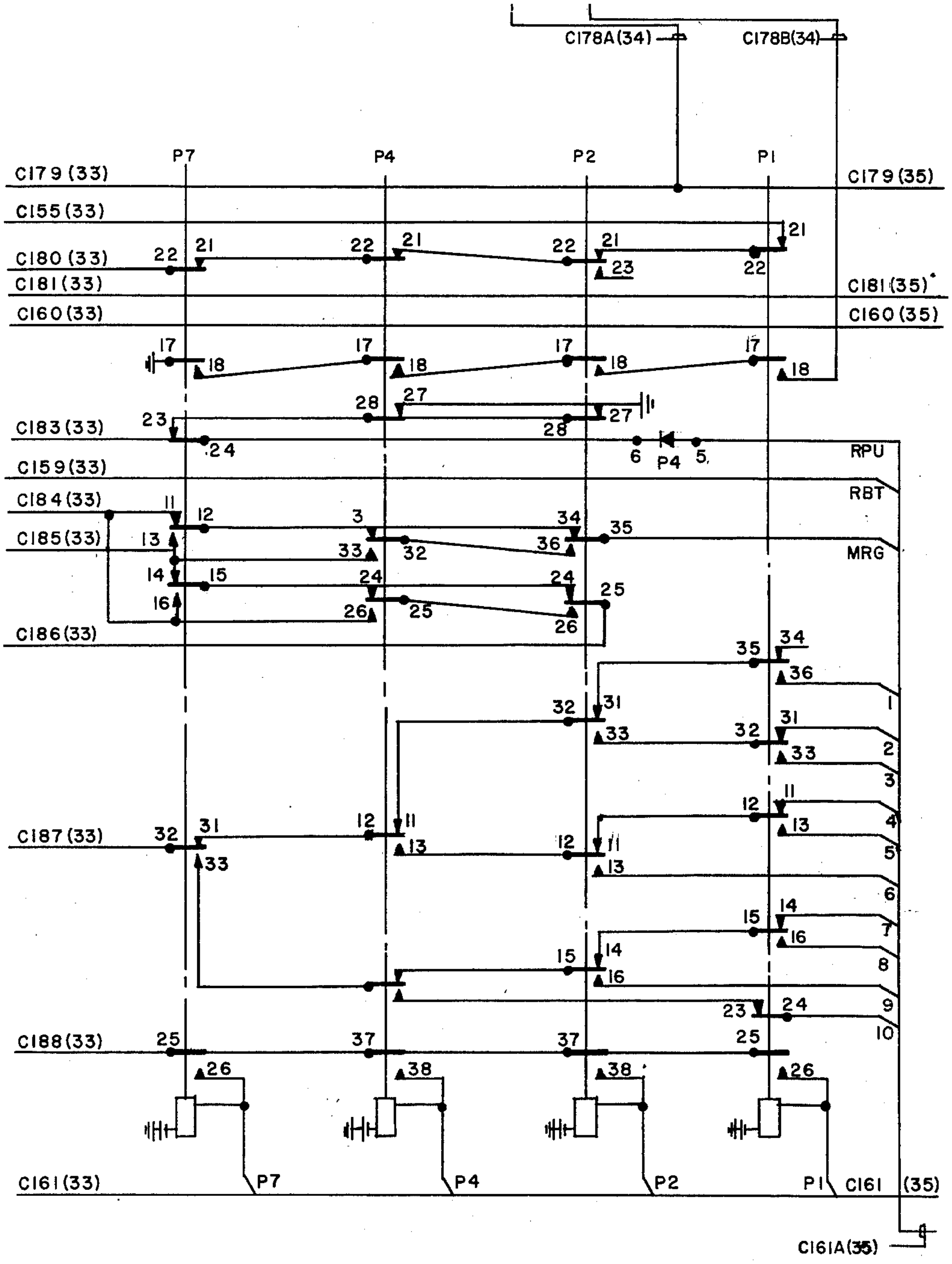

LEADS TO THE SOT's (FIG. 31)

PH—H relay pulling leads from the control through the SOT to the REG–O.
M—Marking leads from the control through the SOT to the REG–O. Ground or resistance ground is placed on the M lead through strapping options on the TA and UA relays.
TB—Test battery leads from the REG–O, through the SOT's and the TB relays, to the F chain.

*Connector Control (FIGS. 17–24)*

The connector control is the common control equipment which operates to set up a path between the subscriber's terminating trunk (STT) and the called line in a ninety-line group. The connector control receives information regarding the desired line from the register or number group and the markings to be placed upon the STT from the register through the By-Path Link Circuit of FIGS. 53, 56; 66, 67. Upon receipt of this information and upon receipt of a connect signal from an STT that has been selected by the group selector, the connector control functions to set up a path through the connector switch from the called line to the STT. The switch horizontals are set according to the line number, and the vertical is pulled through the STT with which it is associated. There is an STT for each of the twelve verticals in the connector switch, and the corresponding verticals of the three switches are multipled to the STT's.

When the STT has been connected to the line, the connector control then proceeds to test the sleeve wire of the called line via a path through the STT and the connector switch to determine whether the called line is idle, busy or on line lockout. Should the line prove to be idle, the connector control will signal the STT to proceed with ringing. Should the line be busy or on lockout, the connector control will signal the STT to send back busy tone to the calling subscriber, and in the case where the call has originated from an incoming trunk, will signal the trunk that a line busy has been encountered, thereby causing the trunk to disengage from the terminating train.

When the tens digit of the line number is zero, indicating that the call is destined for a PBX group, the connector control recognizes the situation and instead of connecting to the line number as indicated by received information instead sets up to test over the lines of a PBX group. When an idle line is found, the control proceeds to make an idle test as in the case of a call to a regular local line.

*Relay and Lead Designations—Connector Control*

RELAYS (FIGS. 17–24)

C (FIG. 17)—STT check relay. Operates when STT connects to the control. Closes the CPC leads to the switch circuits and pre-pulls the VP relay.
PB1–3 (FIG. 17)—Secondary PBX identification relays. Identify and cause the CPC lead to be extended to the proper switch on PBX calls.
PA1–5 (FIG. 18)—Primary PBX identification relays. Identify a PBX line out of the five in each switch, and cause the proper horizontal to be pulled for that line. Also extend the line identification lead up to the PB relays.
ICT (FIG. 19)—Intercept relay for TPL systems only. Calls directed to unequipped switches or unused PBX groups may be strapped to this relay which will override the original line number and direct the call to special intercept equipment on line 10.
CT1, 2, 4, 7 (FIG. 19)—Tens receiving relays. Receive tens digit of line number from the link, and set up pulling path for the proper connector switch and HA or HB horizontals, or HC relay. Pull PBX relay when 4 and 7 (0) are received.
CU1, 2, 4, 7 (FIG. 20)—Units receiving relays. Receive units digit of line number from the link, and set up pulling path for the proper line horizontal, H1–H0. On PBX calls, selects the desired PBX group.
PBX (FIG. 21)—PBX call transfer relay. Operates upon receipt of a PBX indicator digit (tens 0) to disconnect the normal horizontal pulling and switch connecting paths, and to activate the PBX hunting circuits.
CH (FIG. 21)—Switch check relay. Operates from the HE relay in the switch over the CCH lead. When CH operates, the horizontals in the switch are pulled, and the slow release of the VP relay begins.
VP (FIG. 21)—Vertical pulling relay. Release of the VP causes the pulling of the connector switch vertical. Slow release to allow time for operation and stabilization of the horizontals. Release of VP also starts the idle test and the release of the TT, which times the idle test.
T (FIG. 21)—Idle test relay. Tests on the sleeve of the called line, and will operate for an idle condition (370 ohm battery), but will not operate for lockout (1450 ohm battery) or busy (ground). Operation of the T pulls TA, stops the release of TT, and grounds the RS lead to the STT.

TA (FIG. 21)—Test auxiliary relay. Operates from T and releases the horizontals, grounds the sleeve to release T and operate the line lockout and cutoff, and sends the RD signal to the register.

TT (FIG. 21)—Test time relay. Releases 130 ms. after the release of VP if T and TA do not operate. Signals a busy to the STT, and sends an RD signal to the register.

1A1, 1A2 (FIG. 22)—Link guard and connect relays.

2A1, 2A2 (FIG. 22)—Secondary link connect relays.

AA (FIG. 24)—End relay for 1A1, 1A2.

A1, A2 (FIG. 24)—Preference alternator relays for 1A1, 1A2.

CTO1, CTO2, TO3 (FIG. 24)—Timeout relays.

AT, DT (FIG. 24)—Time disconnect pulse repeater relays.

TK (FIG. 23)—Trunk marking relay. Pulled from PBX group selection tree (CU relays) to mark trunks on lines to the STT.

DR (FIG. 23)—Operates from a solid ground on the DR lead to mark delayed ring calls into the STT. (Special STT only.)

WC (FIG. 23)—Operates from a resistance ground on the DR lead to mark a Wire Chief or BV call into the STT. Marking is by means of grounds on all four party leads.

LEADS (FIGS. 17–24)

Leads to the Connector Switches (FIGS. 17 and 20):

- CCH—Back signal check indicating that the switch circuit has been occupied and the horizontals are being pulled.
- CPC1, 2, 3—Connect relay pulling leads to the switches.
- H1–HO, HA, HB—Horizontal pulling leads to the switches.
- A, B, C—PBX selection leads. These leads are strapped in the connector control to form a PBX group, with the "A" lead of one line tied to the "B" lead of the next. When a ground is placed on the "B" lead of the first line of a group, it will return on the "C" lead of that line if the line is idle, causing that line to be selected. If the line is busy, the ground will pass through the "A" lead to the "B" lead of the next line, and so on until an idle PBX line is found.

Leads to the STT (FIGS. 23 and 24):

- DR—Delayed ring marking. Used only with delayed ring STT.
- P1, 2, 4, 7—Party marking. In addition to marking party codes 1–10, marking on all leads indicates a wire chief (test) call, and no marking indicates a call to a trunk on line.
- CC—Connect signal to control indicating that an STT is ready to receive a call.
- LC—Local call class marking. Absence of ground on the LC indicates a trunk call.
- RS—Ring start marking.
- BY—Busy line marking.
- S—Test sleeve from the STT. Connected to sleeve of called line.
- HC—Marking to connect lines in the group 31–30.
- VP—Connector switch vertical pulling lead.
- TD—Conversation time disconnect marking. May be strapped in the control with a solid ground, or strapped through the tens relays to provide disconnect by tens groups.
- A, D—Time disconnect pulse leads. One A lead and one D lead to each STT.

Leads to the TDD (Time Disconnect Distributor) (FIG. 24): A, D—Time disconnect pulse leads.

Leads to the By-Path Link Circuit or Register Guard and Number Group Links (Connector board) (FIG. 24):

- T1, 2, 4, 7—Tens digit marking leads.
- U1, 2, 4, 7—Units digit marking leads.
- P1, 2, 4, 7—Party digit marking leads.
- LC—Local call class marking.
- BY—Busy back signal to the register. Solid ground indicates a congestion busy, and 1200 ohm ground indicates a line busy.
- DR—Delay ring and wire chief class marking lead. Solid ground indicates delay ring marking, and resistance ground indicates wire chief (test) or BV marking.
- RD—Register disconnect back signal.
- VP—(Used only on connector boards.) Back signal from the control to the register which causes seizure of the STT.
- VS—Vacant switch back signal to the register. Used only on TPL boards to direct misdialed calls to silent lockout.
- CS1, CS2—Call signal leads from link.

*Originating Register and Associated Circuitry (FIGS. 37–47)*

The originating register module contains four originating registers, twenty subscriber originating trunks (five SOT's per register), one register guard and number group link and one selector guard.

Figure 37:
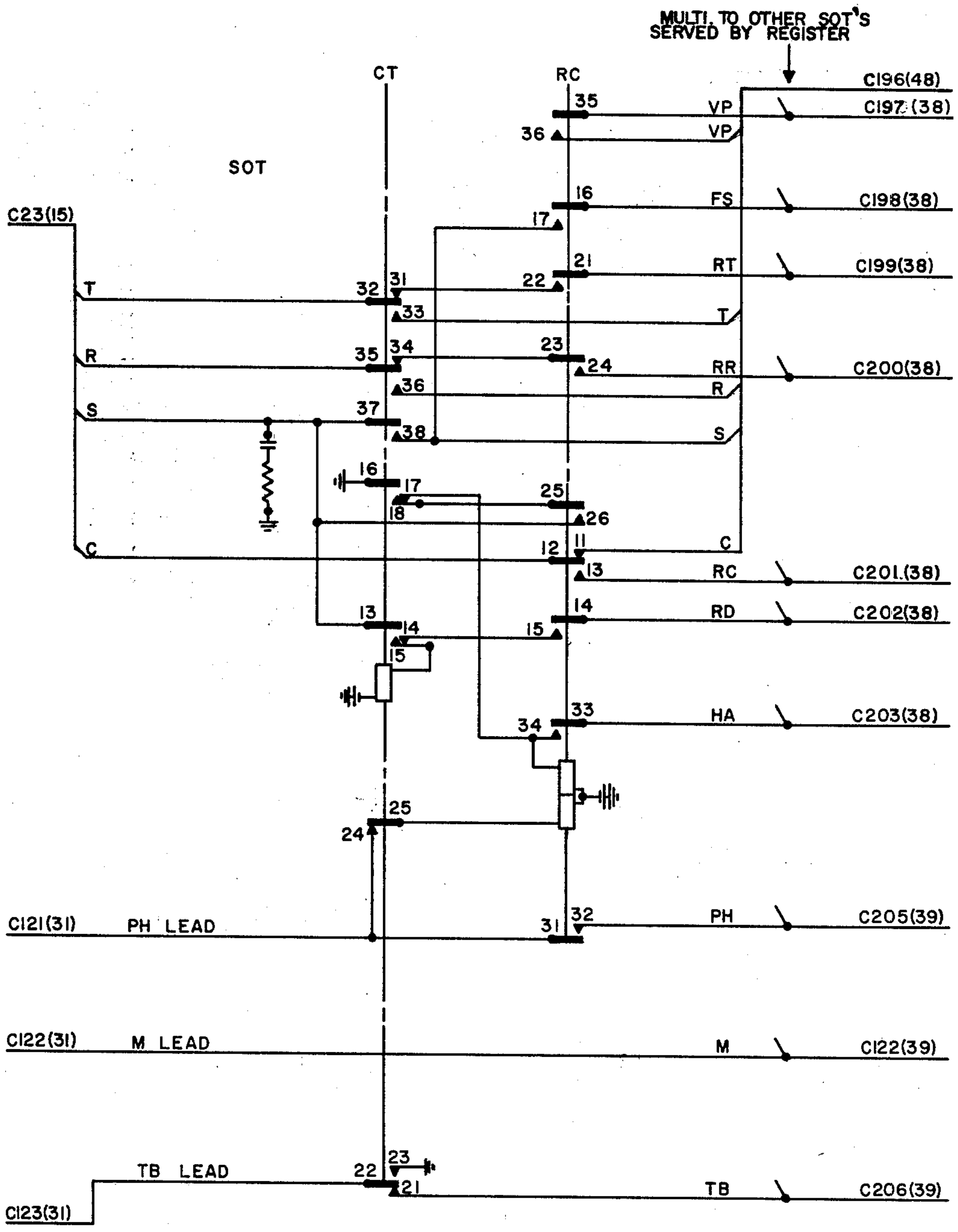

The SOT is arranged so that access to one of the four registers in the module is obtained via the link relay RC in the SOT of FIG. 37. Dial tone is returned to the subscriber over tip and ring by induction via the tone winding of the P relay in the register.

On completion of dialling, the SOT is arranged to cut through on receipt of a signal via the RD lead from the register.

The register is arranged to receive up to seven digits. On local calls, with forced seven digit dialling, the first three digits of the seven digit directory number are analyzed and flushed out and the remaining four digits are stored on three bins and the counting chain. Where 2–5 dialling is to be furnished, the register is strapped in such a manner that the first three digits are flushed out when seven digits are dialled and the fifth digit from the end is flushed out when five digits are dialled. In either case, the last four digits of the directory number are stored on the bins and the counting chain as described above. The register is also arranged to select a trunk level after one, two or three digits by means of strapping options.

The register is arranged for use with trunks incoming on lines and is arranged to receive marking via the M lead from the line-finder, and marking via the RC wire from the trunk. In addition, provisions are made to pass a signal back to the incoming trunk via the RC wire on completion of dialling on a locally terminated call in order that the trunk may switch from loop to battery feed.

The register equipment includes the following relays and leads:

*Relays*

Subscriber Originating Trunk Relays (FIG. 37):

- CT (FIG. 37)—Cut through Relay.
- RC (FIG. 37)—Register Connect Relay.

Originating Register Relays (FIGS. 38–42):

- BY (FIG. 38)—Busy Relay.
- CO (FIG. 38)—Cut off Relay.
- TO1 (FIG. 38)—Initial Time-out Relay.
- TO2 (FIG. 38)—Secondary Time-out Relay.
- PA (FIG. 38)—Pulsing Auxiliary Relay.
- RD (FIG. 38)—Register Disconnect Relay.
- H (FIG. 38)—Holding or Master Ground Relay.
- P (FIG. 38)—Pulsing Relay (has tone winding)
- ON1 (FIG. 40)—Off Normal Relay.
- ON2 (FIG. 40)—Off Normal Relay.
- CC1–CC6 (FIG. 40)—Counting Chain Relays.
- FL (FIG. 40)—Flush Relay.

M1 (FIG. 39)—Toll Marking Relay (for trunks on lines).
M2 (FIG. 39)—Marking Relay (for trunks on lines).
M3 (FIG. 39)—Marking Relay.
BV (FIG. 39)—Busy Verification Marking Relay.
MI (FIG. 39)—Manual Intercept Relay.
AI (FIG. 39)—Automatic Intercept Relay.
PC (FIG. 41)—Analyzing Relay.
RP1 (FIG. 41)—Analyzing Relay.
RQ1 (FIG. 41)—Analyzing Relay.
RP2 (FIG. 41)—Analyzing Relay.
RQ2 (FIG. 41)—Analyzing Relay.
TCS (FIG. 41)—Trunk Call Signal Relay.
RA1 (FIG. 42)—Register Advance Relay.
RA2 (FIG. 42)—Register Advance Relay.
RA3 (FIG. 42)—Register Advance Relay.
11–17 (FIG. 42)—1st Bin Registration Relays (4 Relays).
21–27 (FIG. 42)—2nd Bin Registration Relays (4 Relays).
31–37 (FIG. 42)—3rd Bin Registration Relays.

Register Guard and Number Group Link Relays (FIGS. 44–47):
R1 (FIG. 44)—Guard Relay Register 1.
R2 (FIG. 44)—Guard Relay Register 2.
R3 (FIG. 44)—Guard Relay Register 3 (indicated but not shown).
R4 (FIG. 44)—Guard Relay Register 4.
RC1 (FIG. 44)—Guard Common Relay.
C1 (FIG. 45—Slave Relay Associated with Relay R1.
C1A (FIG. 45)—Slave Relay Associated with Relay R1.
C2 (FIG. 45)—Slave Relay Associated with Relay R2.
C2A (FIG. 45)—Slave Relay Associated with Relay R2.
C3 (FIG. 45)—Slave Relay Associated with Relay R3 (indicated but not shown).
C3A (FIG. 45)—Slave Relay Associated with Relay R3 (indicated but not shown).
C4 (FIG. 45)—Slave Relay Associated with Relay R4.
C4A (FIG. 45)—Slave Relay Associated with Relay R4.
VP (FIG. 44)—Vertical Pull Relay (common to four registers).
RST (FIG. 46)—Reset Relay.
HG (FIG. 46)—Holding Ground Relay.
TO (FIG. 46)—Time-out Relay.
TH1 (FIG. 46)—Number Group Selection Relay.
TH2 (FIG. 46)—Number Group Selection Relay.
TH4 (FIG. 46)—Number Group Selection Relay.
TH7 (FIG. 46)—Number Group Selection Relay.
N1 (FIG. 47)—Number Group 1 Link Relay.
N1A (FIG. 47)—Number Group 1 Auxiliary.
N2 (FIG. 47)—Number Group 2 Link Relay (indicated but not shown).
N2A (FIG. 47)—Number Group 2 Auxiliary Link Relay (indicated but not shown).
N3 (FIG. 47)—Number Group 3 Link Relay.
N3A (FIG. 47)—Number Group 3 Auxiliary Link Relay.

Register Selector Guard Relays (FIG. 43):
GR1 (FIG. 43)—Guard Relay Register 1.
GR2 (FIG. 43)—Guard Relay Register 2.
GR3 (FIG. 43)—Guard Relay Register 3 (indicated but not shown).
GR4 (FIG. 43)—Guard Relay Register 4.
GC1 (FIG. 43)—Slave Relay Associated with Relay GR1.
GC2 (FIG. 43)—Slave Relay Associated with Relay GR2.
GC3 (FIG. 43)—Slave Relay Associated with Relay GR3 (indicated but not shown).
GC4 (FIG. 43)—Slave Relay Associated with Relay GR4.

*Leads*

Leads to Line-finder Vertical (FIG. 37):
T—Tip Conductor.
R—Ring Conductor.
S—Sleeve Wire.
C—C Wire (fourth wire).

Leads to Line-finder Control (FIG. 37):
PH—Hold Wire.
M—Marking Lead.
TB—Test Battery Lead.

Figure 38:
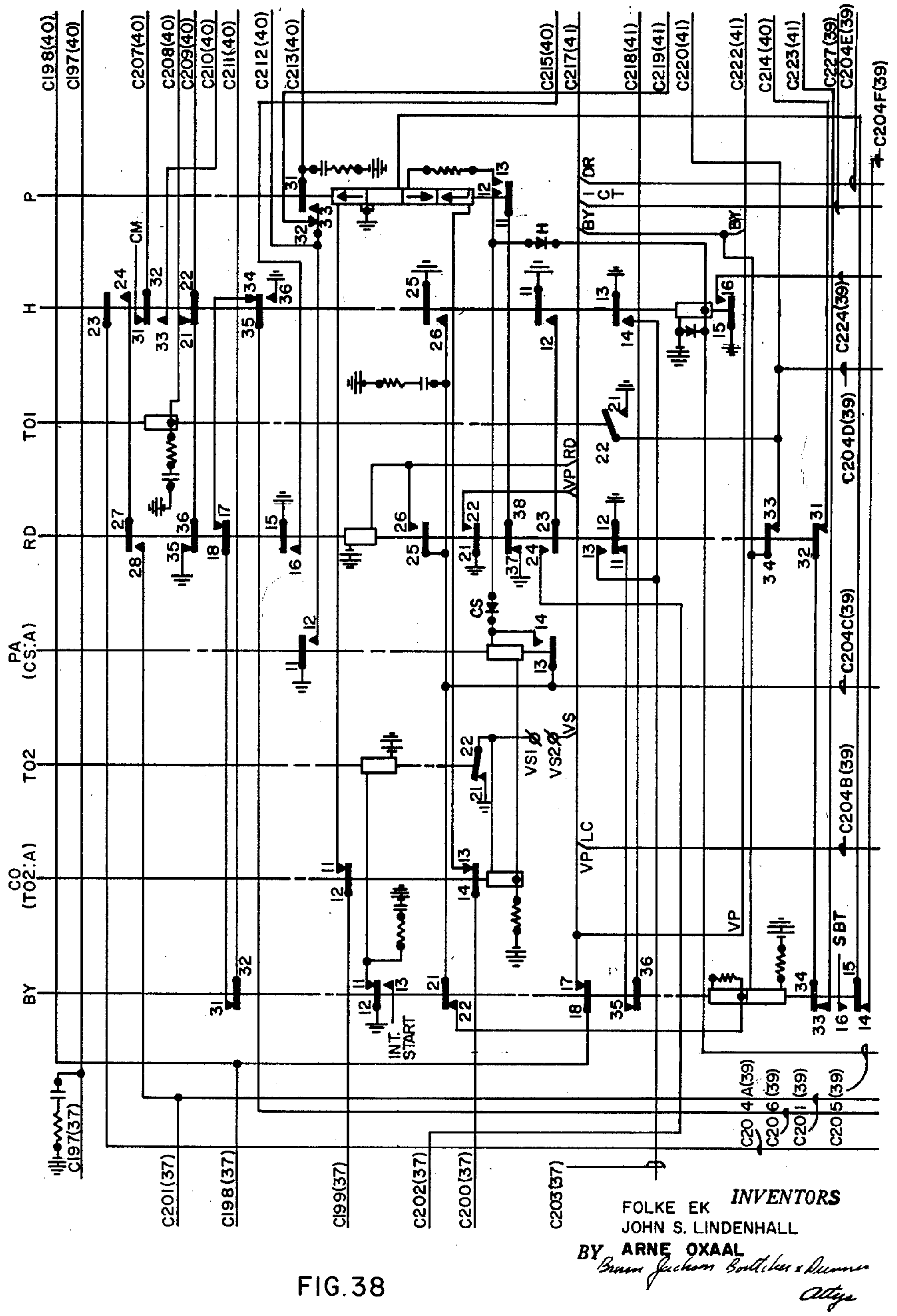
Figure 39:
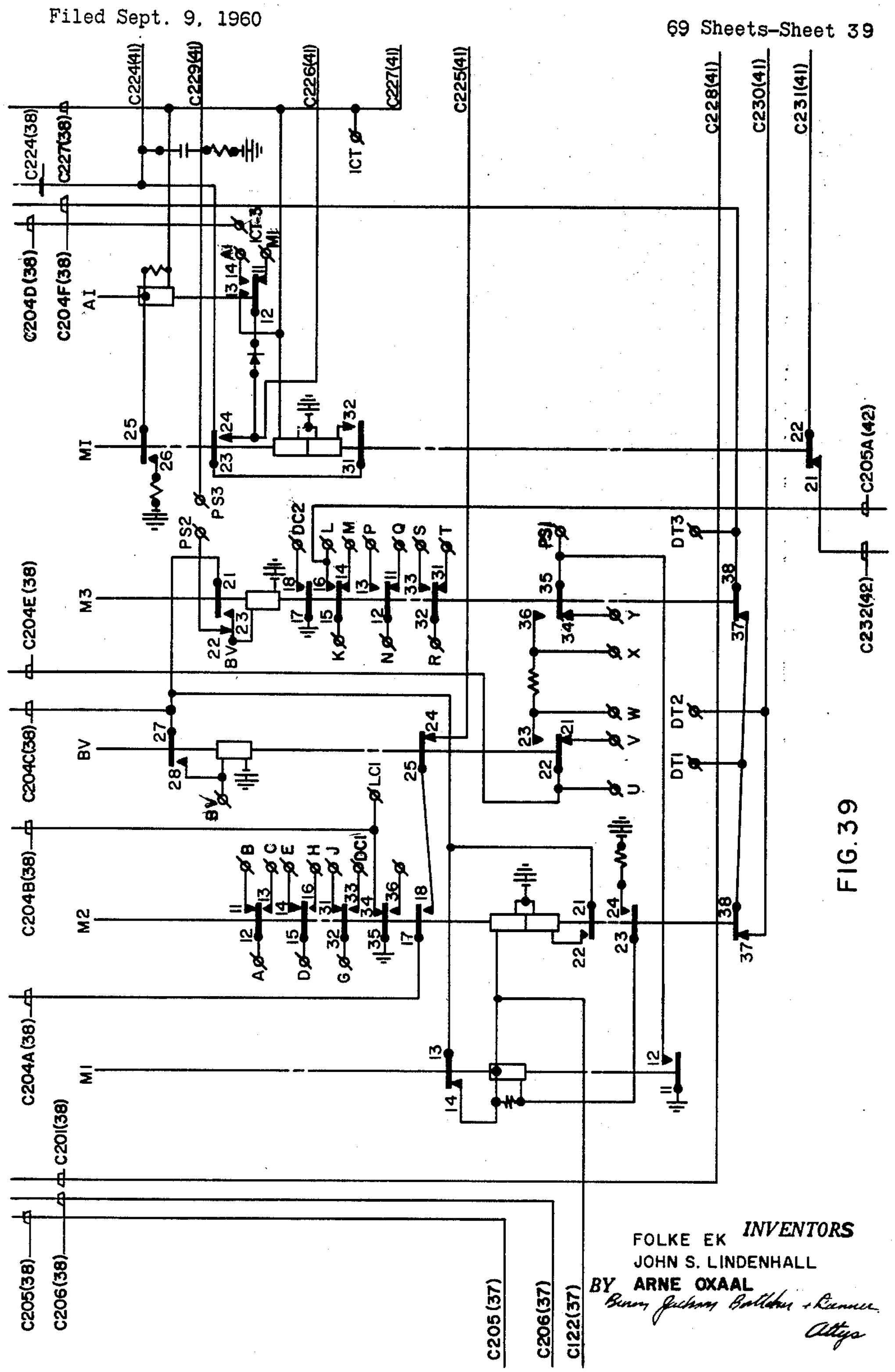
Figure 41:
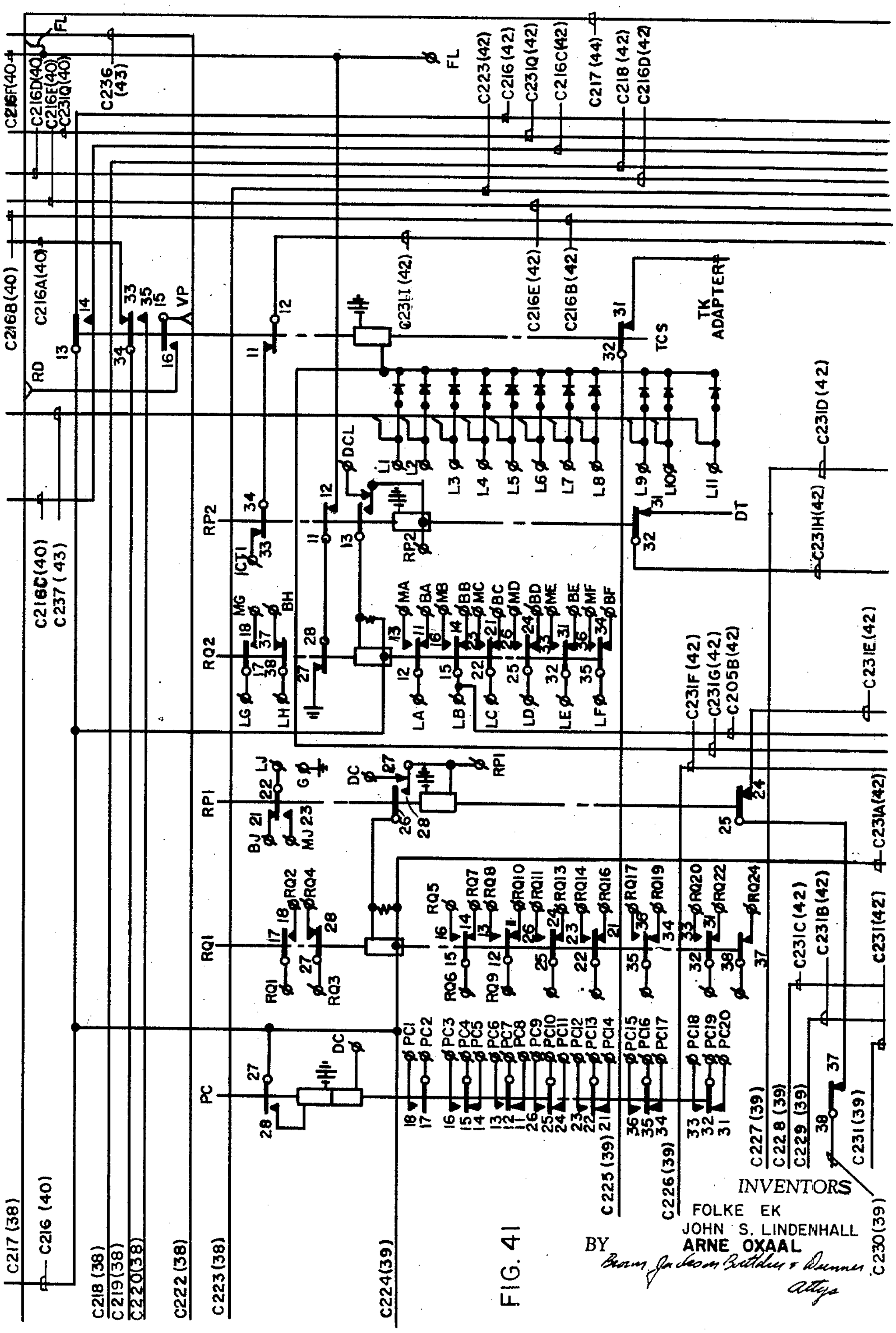

Leads—Miscellaneous:
INT—Interrupter Start (FIG. 38).
DT—Dial Tone (FIG. 41).
SBT—Slow Busy Tone (FIG. 38).
CM—Call Meter (FIG. 38).

Leads to Adapter (FIG. 41); TK—Trunk (marking signal to inc. trunk on line —96V).

Leads to ATM (FIG. 46): ATM—Automatic Time-out Monitor.

Figure 44:
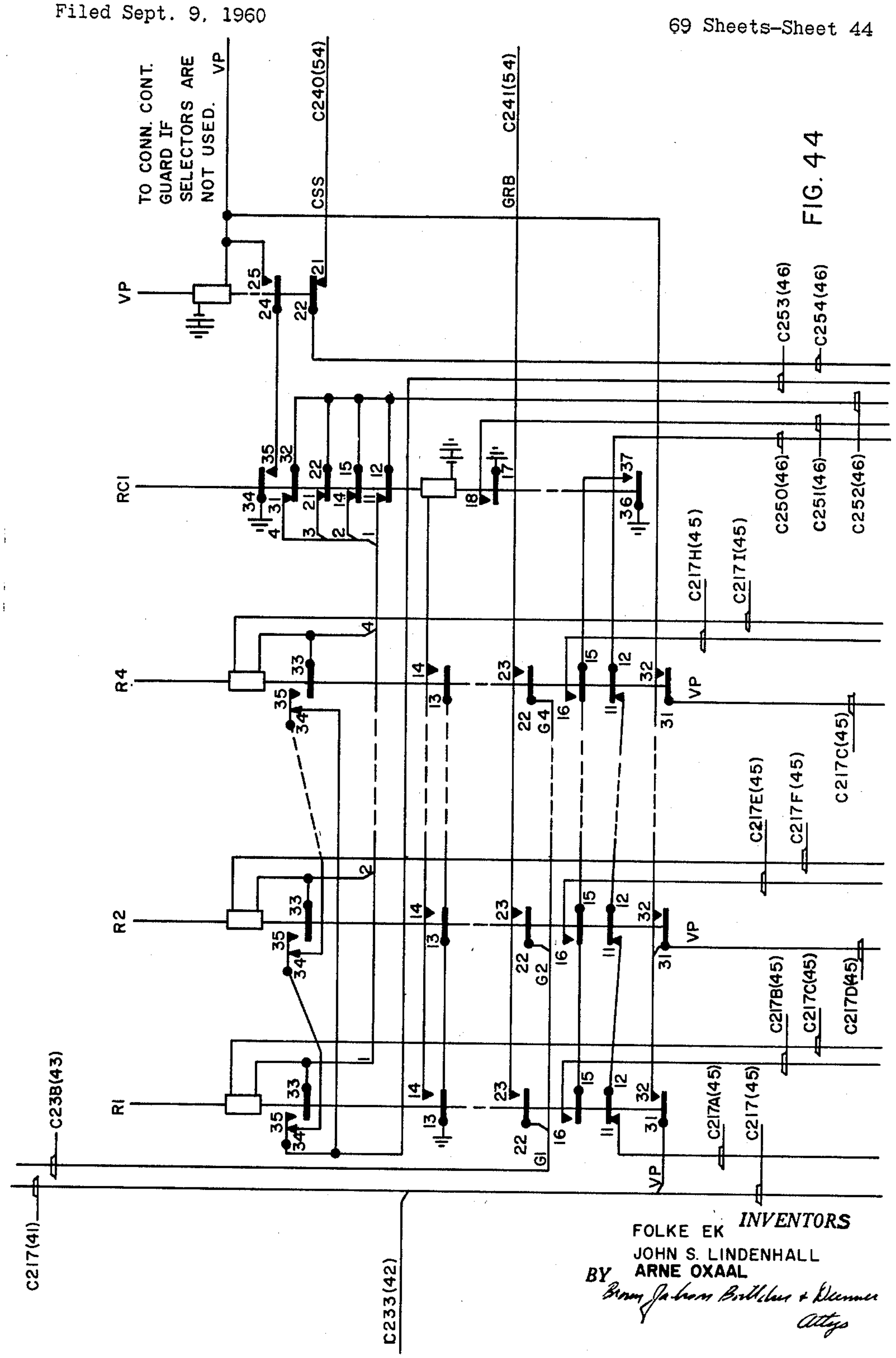
Figure 47:
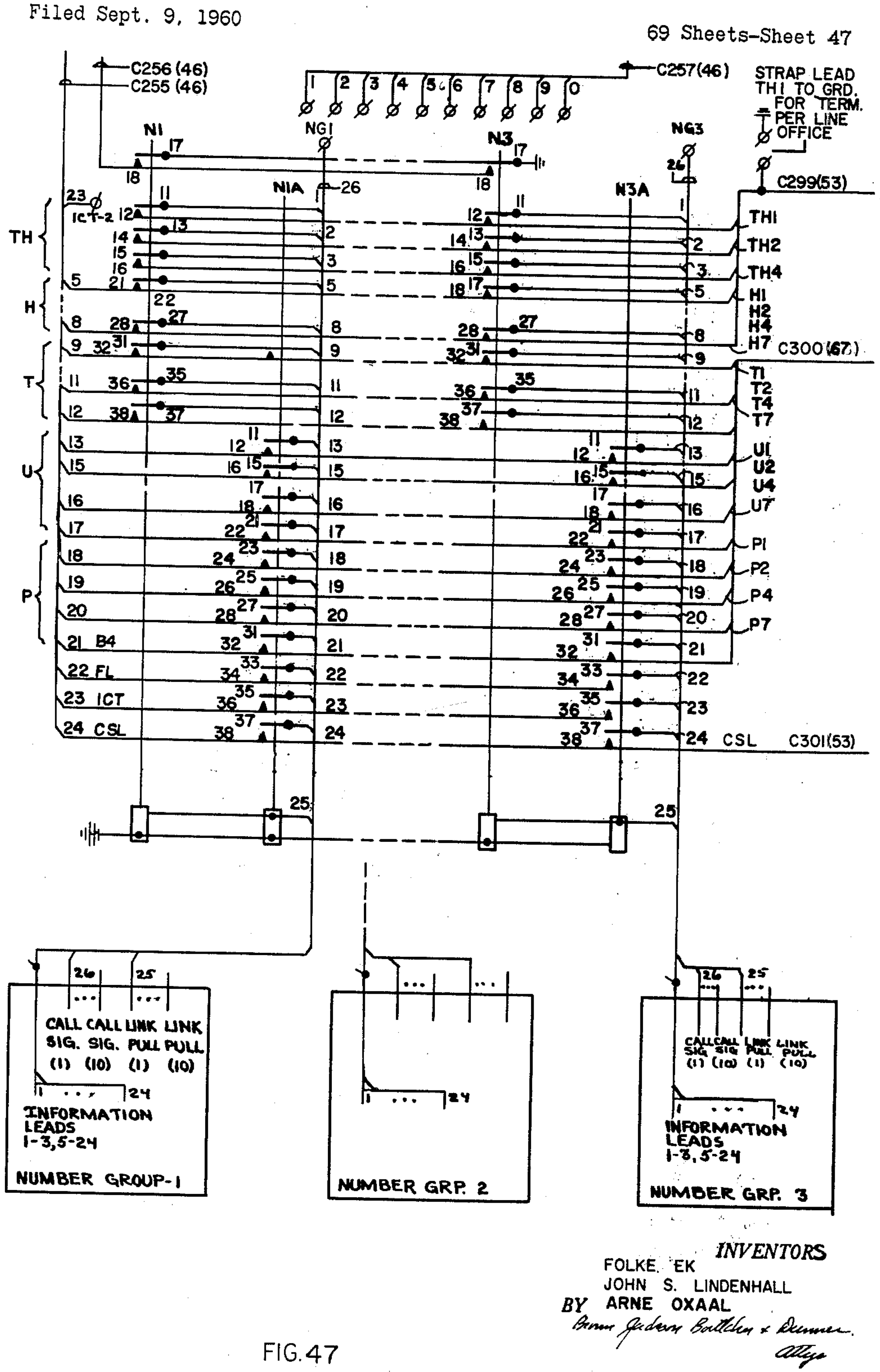
Figure 48:
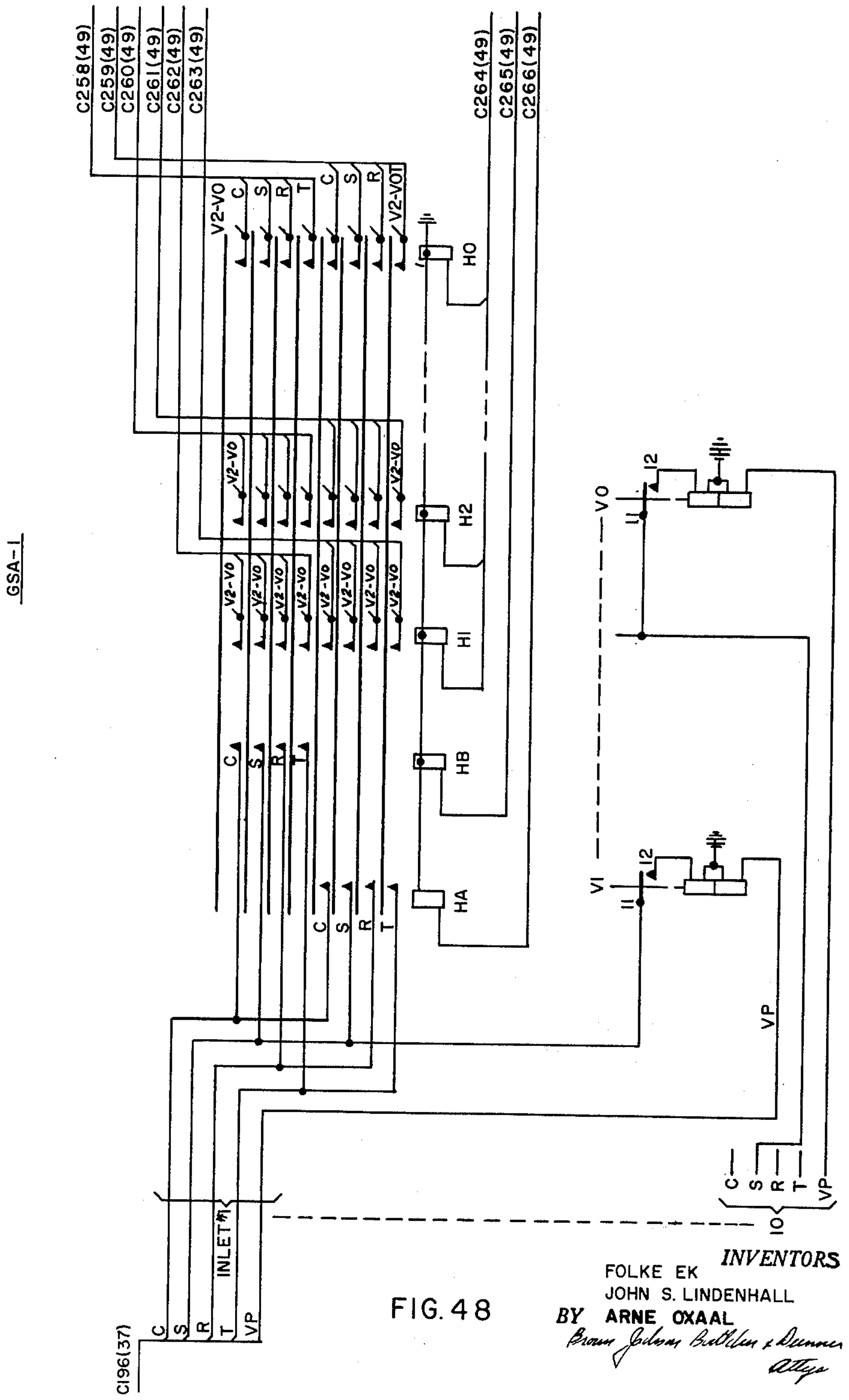
Figure 49:
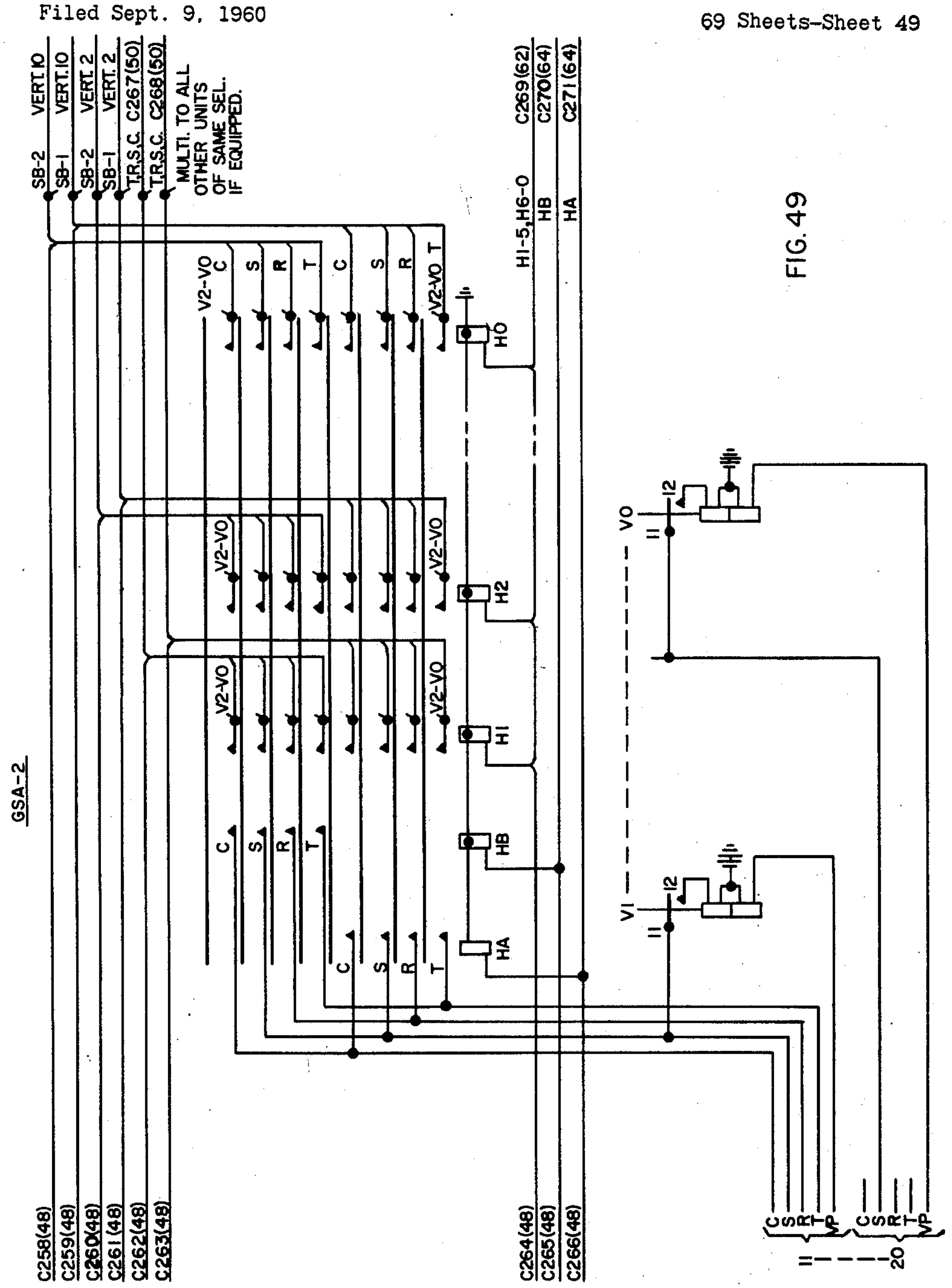
Figure 50:
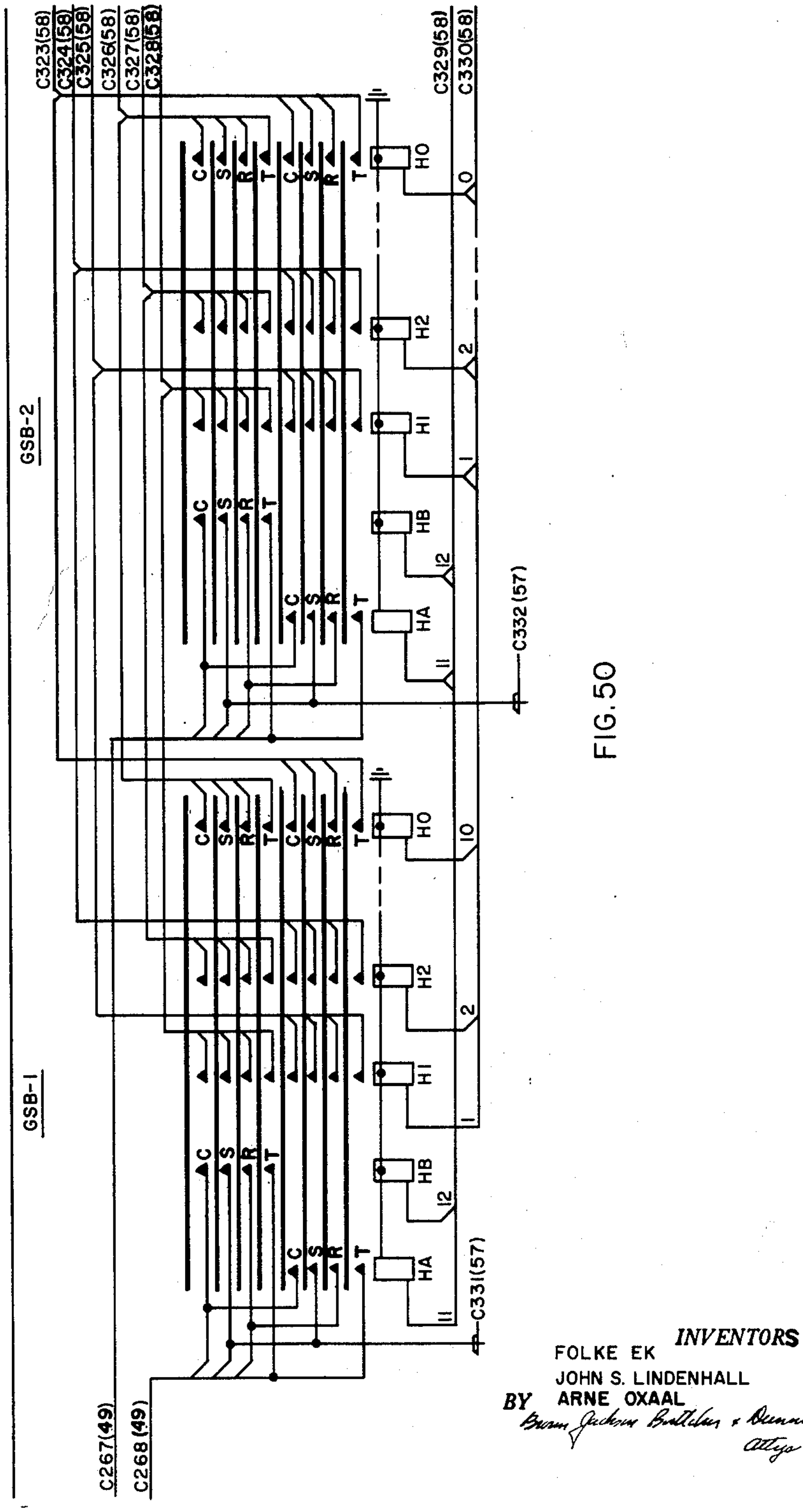
Figure 51:
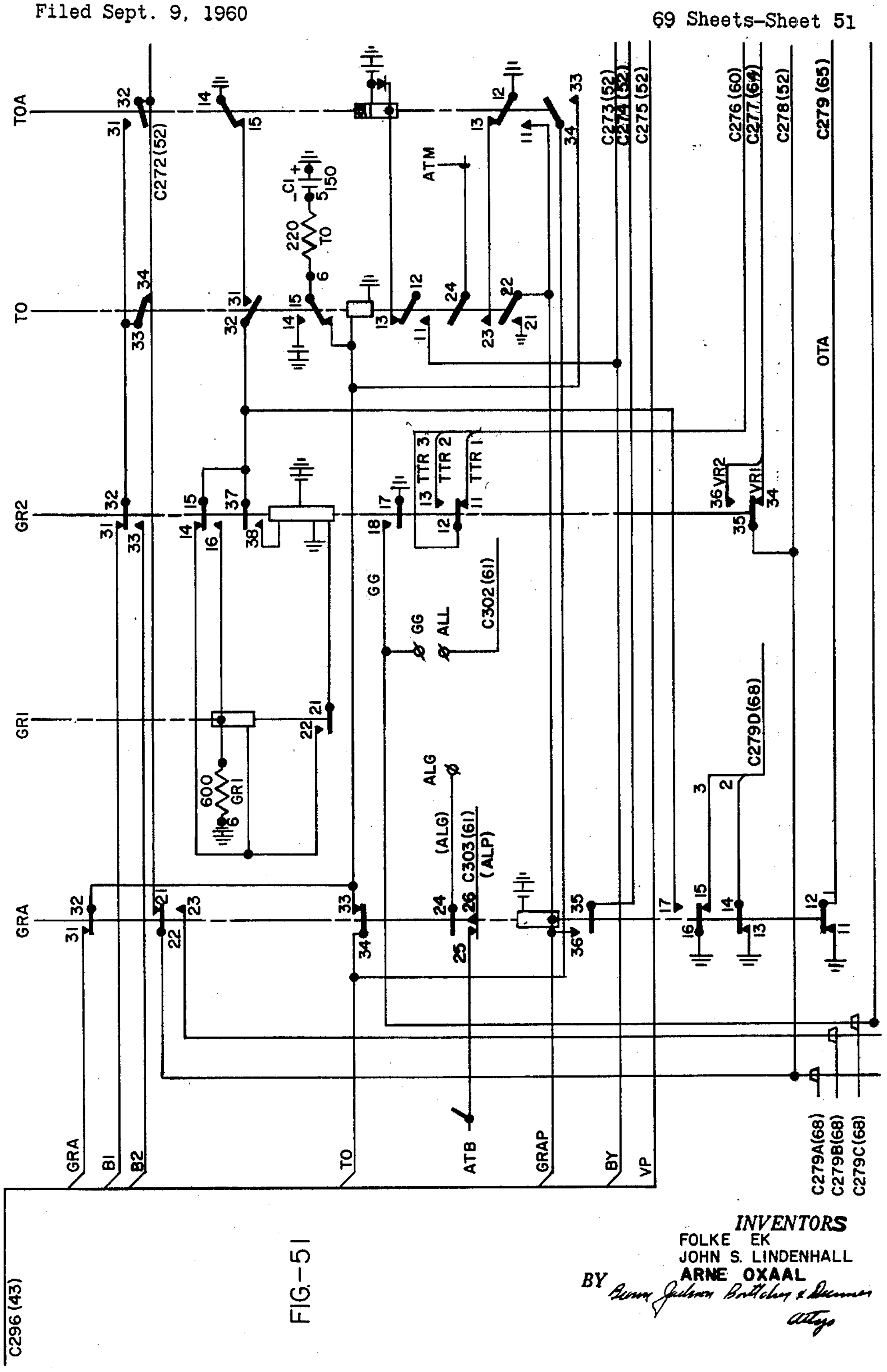
Figure 52:
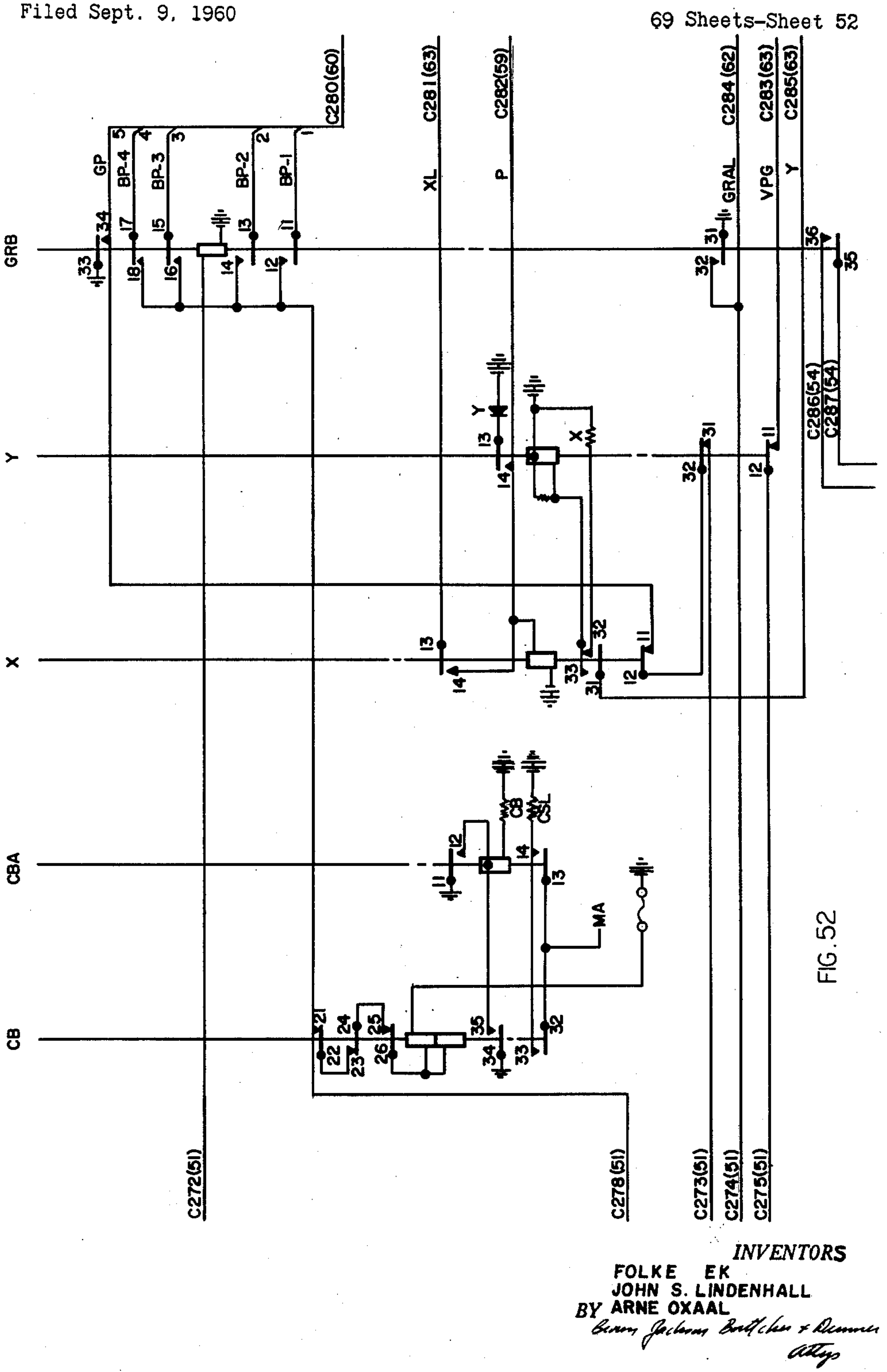

Leads to By-Path Link Circuit Only:
TH1—Thousands 1 (FIG. 47).
TH2—Thousands 2 (FIG. 47).
TH4—Thousands 4 (FIG. 47).
CSS—Call Signal Selector (FIG. 44).
GRB—Hundreds Fan Energizing Lead (FIG. 44).

Figure 45:
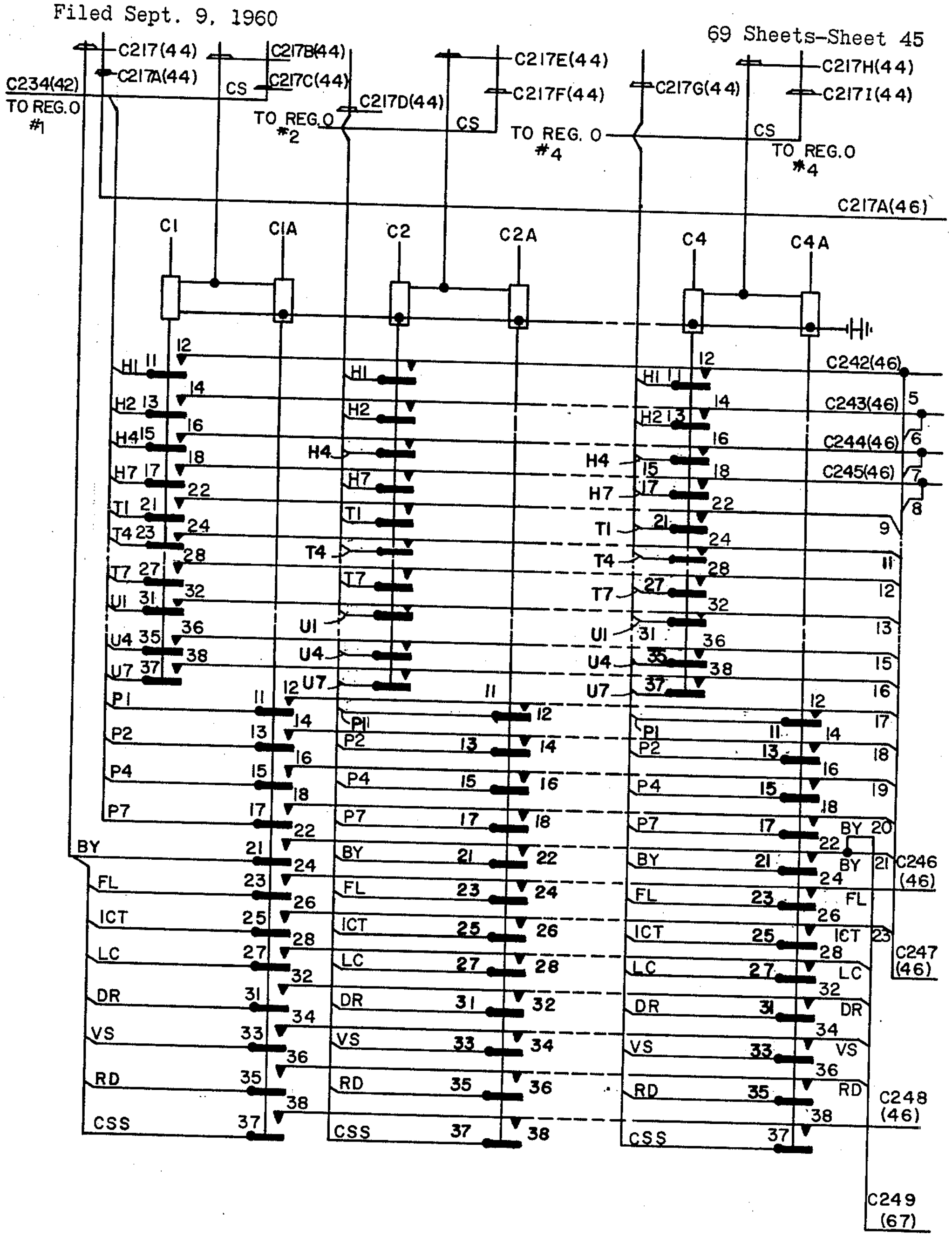
Figure 46:
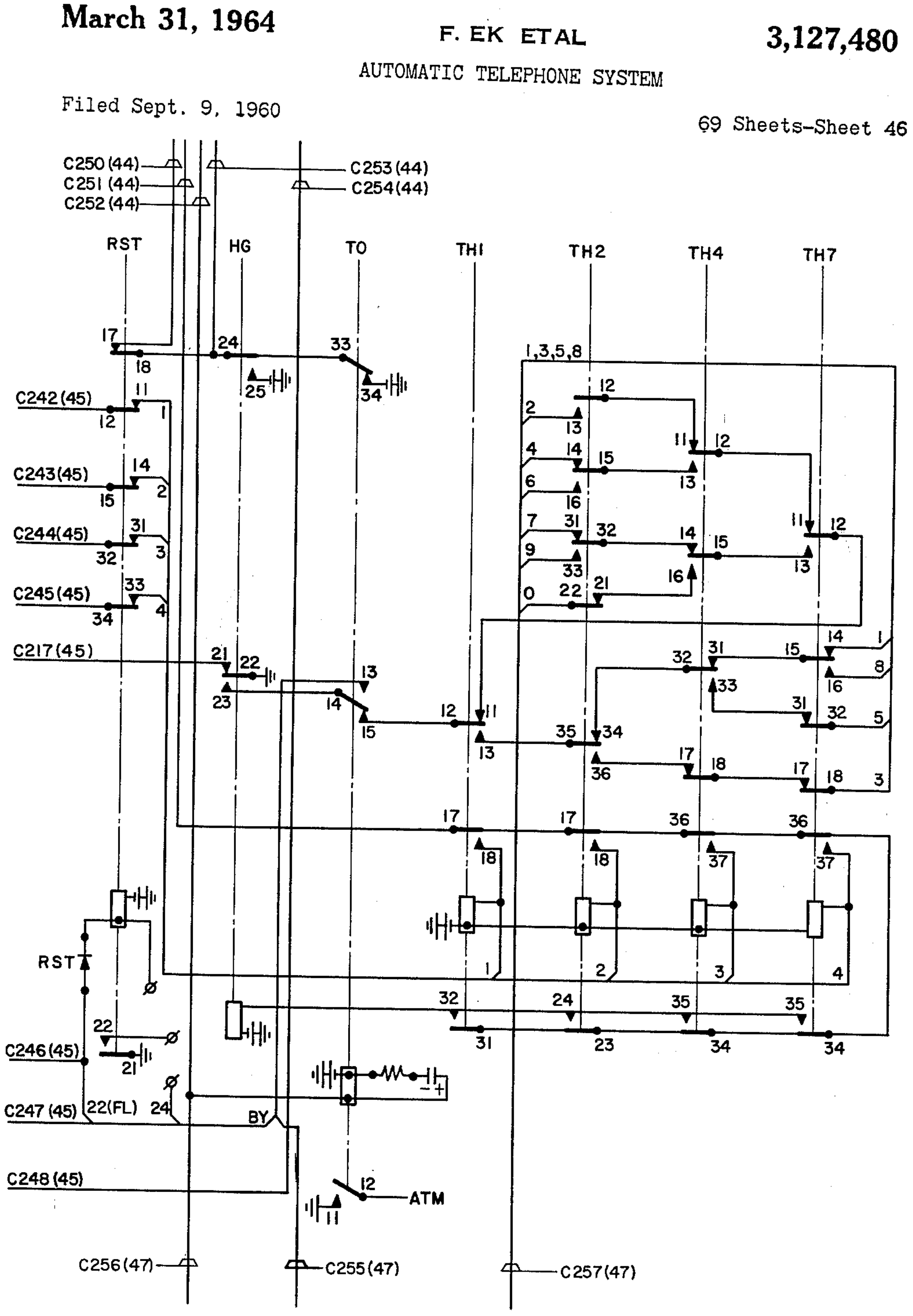

Leads to By-Path Link Circuit (or connector control when selector not equipped, FIGS. 45, 47);
H1—Hundreds 1 (FIG. 47).
H2—Hundreds 2 (FIG. 47).
H4—Hundreds 4 (FIG. 47).
H7—Hundreds 7 (FIG. 47).
T1—Tens 1 (FIG. 47).
T2—Tens 2 (FIG. 47).
T4—Tens 4 (FIG. 47).
T7—Tens 7 (FIG. 47).
U1—Units 1 (FIG. 47).
U2—Units 2 (FIG. 47).
U4—Units 4 (FIG. 47).
U7—Units 7 (FIG. 47).
P1—Party 1 (FIG. 47).
P2—Party 2 (FIG. 47).
P4—Party 4 (FIG. 47).
P7—Party 7 (FIG. 47).
CSL—Call Signal Link (FIG. 47).
BY—Busy (FIG. 45).
LC—Local Call (marking) (FIG. 45).
DR—Delayed Ring (marking) (FIG. 45).
VS—Vacant Switch (FIG. 45).
RD—Register Disconnect (FIG. 45).
VP—Vertical Pull (FIG. 45).

Leads to 1st Selector or STT (FIG. 37):
C—C Wire.
S—Sleeve Wire.
R—Ring Conductor.
T—Tip Conductor.
VP—Vertical Pull.

Leads to Selector Control (FIG. 43):
GRA—Lead to end relay.
B1—Battery 1.
B2—Battery 2.
TO—Time Out.
GRAP—End relay pulling wire.
G1—Ground Lead.
VP—Vertical Pull.
BY—Busy.

*Operation of Register Guard and Number Group Link—Terminal Per Station (TPS) Case.*—When all digits have been dialled on a local call, a call signal is sent to the Register Guard and Number Group Link Circuit. The Register Guard allows only one register to call in a number group (terminal per station) or By-Path Link Circuit (terminal per line). The operation of the Guard relay in turn causes the register link relays associated with that register to pull. The thousands, hundreds, tens and units information of the directory number in the terminal per station case is passed via contacts on these relays to the number group selection circuit and into the number group itself. The thousands digit is used to select the particular number group by means of a fan on relays TH1, TH2, TH4, and TH7. The number group in turn operates its associated link relays and the hundreds, tens and units digit of the directory number is passed via contacts on these link relays into the number group.

The number group upon receiving the hundreds, tens and units digits of the directory number, makes a translation and returns the tens and units digits of the terminal of the called line and a party digit. It also flushes the bins in the register and sends a call signal CSL to the By-Path Link Circuit. In case the number group times out, a congestion busy signal is returnd to the register via contacts on the number group link and register link relays on the BY lead. The register in turn returns busy tone to the subscriber.

The number group is arranged to provide intercept signals to the register via contacts on the number group link and register link relays on the ICT lead. If the call is to be routed to automatic intercept by the register, a direct ground is placed on the ICT lead. If the call is to be routed to manual intercept, a 1200 ohm ground is placed on the ICT lead.

*Operation of Register Guard and Number Group Link (TPL Case).*—When all digits have been dialled on a local call, a call signal is sent to the Register Guard and Number Group Link Circuit. The Register Guard allows only one register to call in the By-Path Link Circuit. The Operation of the guard relay in turn causes the register link relays associated with that register to pull. The hundreds, tens, units and party information of the directory number is passed via contacts on these relays to the number group selection relays and to the By-Path Link Circuit or direct to the connector control when selectors are not equipped. The hundreds digit is used to pull the number group selection relays TH1–TH4 as was the case in a TPS call. However, instead of being strapped to the number group terminals NG1, NG2 or NG3, the output of the fan is strapped to terminal TPL1. In this manner, valid hundreds digits will cause relay RST to operate. With a strap connected between terminals TPL2 and CSL, the operation of relay RST places a ground on the call signal lead CSL to the By-Path Link Circuit. Unused hundreds digits appearing at the output of the fan on the NG selection relays are strapped to intercept.

*Operation of Register Selector Guard (Local Call).*—The operation of the PR relay in the By-Path Link Circuit in series with a relay in the connector guard circuit causes a CSS (call signal selector) signal to be returned to the register via contacts on the register link relays. This signal passes through contacts in the register and operates a relay in the register selector guard to call in the selector. The selector then proceeds to set the switches to set up the path between the calling and called line.

*Operation of Register Selector Guard (Trunk Call).*—In this case, the subscriber dials one, two or three digits and selects a trunk level. The proper level is grounded by means of analyzing relays, and the CSS lead to the selector guard is grounded. The guard relay associated with this register operates and in turn operates a slave relay. The level signal is passed through contacts of the slave relay to the selector. Except for the level signal and the fact that the CSS signal originates in the register, the operation is the same as the locally terminated call described in the previous paragraph.

*Operation of Trunk on Line Adapter.*—This adapter is furnished in order that trunks on lines may be reached by dialling one, two or three digit trunk codes. The adapter is common to the four registers in the module and access to it is provided by the register selector guard. The relays in the adapter perform a translation and convert the level signal to tens and units terminal information. The control relay in the adapter cannot operate unless the register guard and number group link circuit is idle. This prevents mutilation of an existing call. Additional circuitry in the adapter provides a −96 volt marking signal to the incoming trunk on line as mentioned previously.

*Number Group Guard and Selection (Bottom of FIG. 47)—General*

The Number Groups serve to translate directory numbers into terminal numbers in terminal-per-station systems. They are accessed from the registers, through the Register Guard and Number Group Link, and deliver their information to the By-Path Link Circuit through the same link. Each number group serves up to 1000 directory numbers (stations). The Number Groups also provide 100% intercept for changed and unassigned numbers, by providing a signal to the register on such calls which causes them to be routed to the appropriate intercept trunk.

The circuit performs translation by passing a high current pulse through a jumper which represents the selected directory number. The jumper is threaded through ferrite core transformers which correspond to the terminal number information, and then grounded. When the current pulse passes through a jumper, a voltage is induced in the secondary winding on each core through which it is threaded. This voltage triggers a transistor relay circuit associated with each core and information from these relays is returned through the link to the By-Path Link Circuit. Regulated now voltage for the transistor relays is provided by a zener diode and power transistor.

*Leads*

LEADS TO REGISTER GUARD AND NUMBER GROUP LINKS (FIG. 47)

| Lead Number | Information to Nr. Gp. | Information from Nr. Gp. |
|---|---|---|
| 1 | None | TH1 |
| 2 | None | TH2 |
| 3 | None | TH4 |
| 5 | None | H1 |
| 6 | None | H2 |
| 7 | None | H4 |
| 8 | None | H7 |
| 9 | DH1 | T1 |
| 10 | DH2 | T2 |
| 11 | DH4 | T4 |
| 12 | DH7 | T7 |
| 13 | DT1 | U1 |
| 14 | DT2 | U2 |
| 15 | DT4 | U4 |
| 16 | DT7 | U7 |
| 17 | DU1 | P1 |
| 18 | DU2 | P2 |
| 19 | DU4 | P4 |
| 20 | DU7 | P7 |
| 21 | None | BY |
| 22 | None | FL |
| 23 | None | ICT |
| 24 | None | CSL |

CS1–10—Call signal from ten Register Guard and Number Group Links.

Link Pull 1–10—Return signal to close link relays in Reg. Guard and Nr. Gp. Link.

*Access*

The number group may be accessed from ten register modules (60 modules, if a Number Group Guard Auxiliary is equipped). Each register module contains a Register Guard and Number Group Link, which contains relays for connecting any of the four registers in the module to any of three number groups, and also provides entry to the By-Path Links Circuit.

When a register has a local directory number for translation by the number group, it delivers the last four digits of the number to the number group link. There, the thousands digit is used to select the desired number group, and a call signal is extended.

*Selector (FIGS. 48–67)*

The function of the selector is to provide connecting links between the individual line groups and between line groups and trunks. Basically the selector is built up from four crossbar switches in a two stage arrangement, the GSA stage and the GBS stage, with two switches in each stage. Associated relays control the operation of the switches. The capacity of this basic selector is 20 inlets and 200 outlets in 20 group, or levels, of 10 outlets each. Each inlet and outlet contains 4 leads: T, R, S, and C.

The selector components include the following relay and lead functions:

Relays (FIGS. 48–49; 51–56; 68):
- GRA (FIG. 51)—End relay to register selector guard relays in the register module. It is operated from the guard relays over lead GRAP.
- GRB (FIG. 52)—Furnishes ground and battery for a number of functions in the GSB module. It operates in the locking circuit for the guard relay when relay GRA becomes operated. It also furnishes locking for GRA and prepares ground for lead BY.
- GR1 and GR2 (FIG. 51)—Alternately operated and released on successive calls to alternate the preference in the guard over leads B1 and B2, to alternate the preference for outlets 1–5 and 6–10 over over leads TTR and the preference for GSB1 and GSB2 over leads VR.
- TO, TOA (FIG. 51)—Selector Time out Relays.
- X (FIG. 52)—Measures time for the trunk test operation. Releases in case of unsuccessful test and signals the register over lead BY, when relay Y releases.
- Y (FIG. 52)—Measures time for the closure of the VP lead on successful tests.
- CB (FIG. 52)—Circuit Breaker Relay.
- CBA (FIG. 52)—Circuit Breaker alarm relay.
- H1, H2, H4, H7 (FIG. 54)—Hundred's marking code relays.
- TH1, TH2, TH4 (FIG. 53)—Thousand's marking code relays.
- PR (FIG. 54)—Proceed relay indicating when the wanted connector control is available.
- ITL1, ITL2 (FIGS. 55, 56)—Register-connector link test relays for links 1 and 2 respectively.
- 2TL1, 2TL2 (FIGS. 55, 56)—Auxiliary relays to the link test relays.
- LOT, LOTA (FIGS. 55, 56)—Alternately operated and released on successive calls to alternate the preference of the register-connector links.
- CH1, CH2 (FIG. 55)—Pulsing relays opening intermittently the circuit for the link test relays to prevent blocking of the test process on simultaneous link tests by two or more selectors.

Relays (FIG. 68):
- RM1, RM2, RM3—Rotator relays for rotating the preference of the GSB modules in selectors with 2 or 3 such modules. Effective when calls are made to trunk groups with trunks in more than one of the GSB modules.
- RMA—End relay for rotator relays.
- AGR—Operates and releases with relay GR2 (C–H6006–E) and alternates the preference for outlets 1–5 and 6–10 over leads TTR and the preference for switches GSB1 and GSB2 over leads VR in the 2nd and 3rd 2E2 modules.

Figure 43:
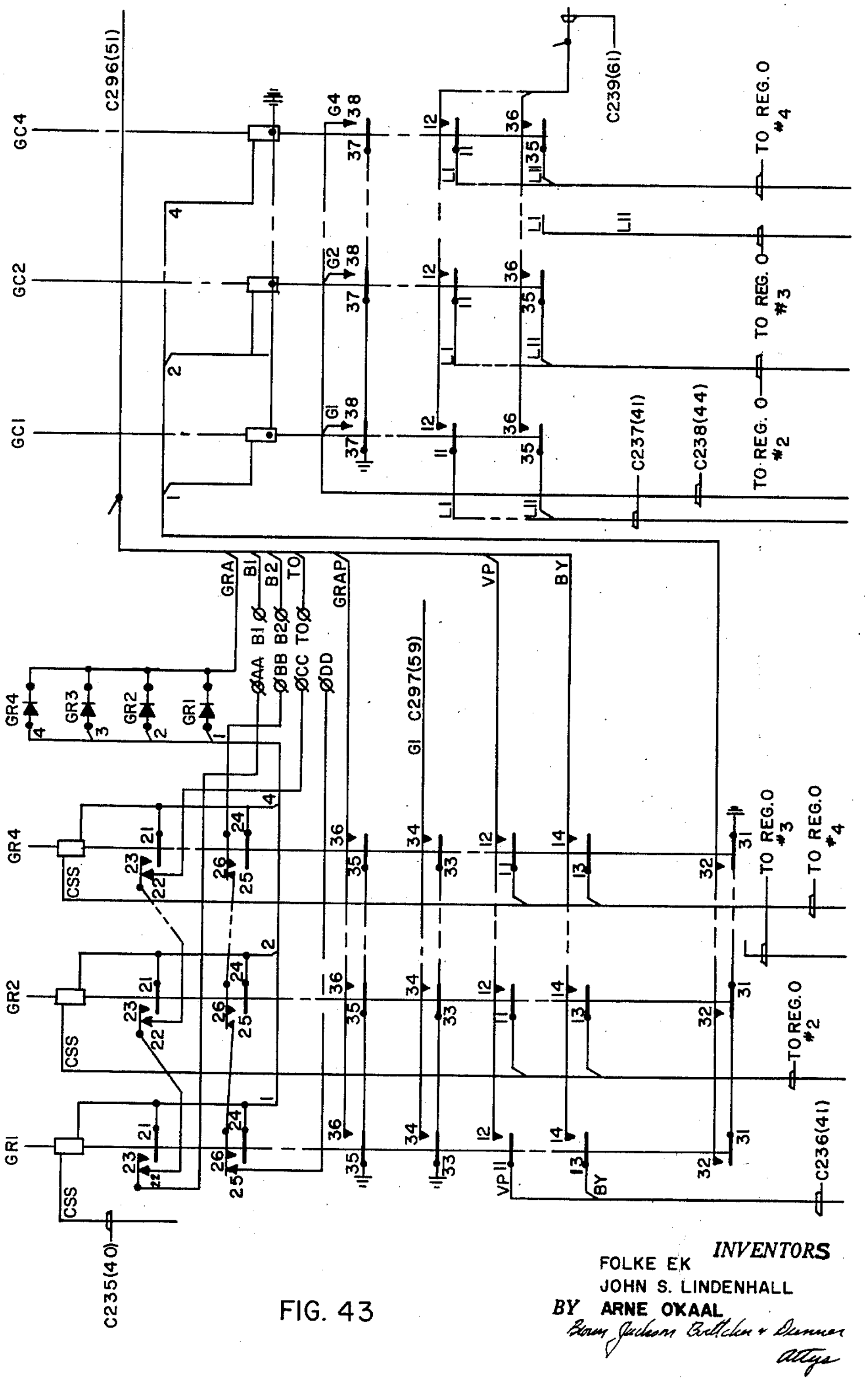

Leads—GSA Module (FIGS. 48–49; 51–56; 68):
- B1, B2 (FIG. 51)—Furnish battery to the checking and locking contacts of the register-selector guard relays of FIGS. 43.
- TO (FIG. 51)—Return lead for checking circuits contacts of the guard relays.
- GRA (FIG. 51)—Furnishes battery for operation of the guard relays.
- GRAP (FIG. 51)—Connects ground from the guard, when seized, to operate relay GRA.
- BY (FIG. 51)—Signals congestion or time out to the register.
- VP (FIG. 51)—Transmits ground from the selector, via the register, to operate the GSA vertical and to operate the VP relay in the register-number group link.
- ATB (FIG. 51)—Signals selector to test for trunks in an alternate route when all trunks in the primary route are busy.
- CSS (FIG. 54)—Signals the register-selector guard on calls to local line to call in the selector when relay PR operates, indicating the availability of the wanted connector control.
- GRB (FIG. 54)—Connects ground from the guard to the hundreds fan for local level indication.
- H1, 2, 4, 7 (FIG. 53)—Carry the hundred's information originating in the register or number group, to the hundred's code relays.
- TH1, 2, 4 (FIG. 53)—Carry the thousand's information from the register or number group, to the thousand's code relays.
- CSL (FIG. 53)—Carries the register-connector link call signal, originating in the register-number group link, to the register connector link relay CSL.
- VPG (FIG. 52)—Carries ground from the GSB modules to the VP lead.
- P (FIG. 52)—Carries ground through relay contacts in the GSB modules for the operation of relay X.
- TTR1–TTR3 (FIG. 51)—Give alternately preference to outlets 1–5 and 6–10 during trunk test.
- GP (FIG. 52)—Connects ground from relay GRB for use in GSB modules.
- BP1–BP4 (FIG. 52)—Connect battery from relay GRB for use in GSB modules.
- HA, HB (FIG. 49)—Carry battery from the GSB modules for the operation of GSA horizontals HA and HB.
- H1–H0 (FIG. 49)—Carry battery from the GSB modules for the operation of GSA horizontals H1–H0.
- ALP (FIG. 51)—Optionally used for alternate test over two levels on successive calls in conjunction with option GG strapped to ALG.
- ALL (and ALP) (FIG. 51)—Optionally used to effect test on alternate trunk route in conjunction with the use of lead ATB and option ALL strapped to ALG.
- GRAL (FIG. 52)—Locking lead for relay GRA to effect proper release sequence.
- VR1, VR2 (FIG. 51)—Give alternately preference to switches GSB1 and GSB2.
- OTA (FIG. 51)—Advances the preference relay chain for the 5 trunk test relays successively one step per call.
- XL (FIG. 52)—Provides locking ground for relay X after successful trunk test.
- Y (FIG. 52)—Pulling circuit for relay Y.
- LOC, RT (FIG. 54)—Local level marking leads.
- TL1 and TL2 (FIG. 56)—Test leads for By-Path Links 1 and 2 respectively.
- TH1 and TH2 (FIG. 53)—Marking leads for 1st and 2nd thousand group respectively reached from the 1st GSB module.
- CSC (FIG. 54)—Connector group call leads.

Leads (FIG. 68):
- A—Advance lead for preference chain relays RM.

L—Locking lead for the test relay chain and relay in GSB modules.

B—Provides battery for the test relay chain end relay in GSB modules.

OTA—Advances the preference relay chain for the trunk test relays successively one step per call.

VR1, VR2—Give alternately preference to switches GSB1 and GSB2.

TTR1–TTR3—Give alternately preference to outlets 1–5 and 6–10 during the trunk test operation.

TH1, TH2—Marking leads for 1st and 2nd thousand group in the respective GSB module.

Relays: GSB Module (FIGS. 50; 57–67):

W1–W20 (FIG. 58)—Route relays. Each relay connects the test leads of the ten outlets in the level to the selector control for busy-idle test.

WA (FIG. 60)—Route end relay for regular test of ten outlets.

WB (FIG. 60)—Route end relay for ripple test on small trunk groups.

WC (FIG. 60)—Route end relay for test on trunk group with trunks in more than one module 2E2.

ALA (FIG. 61)—Alternate route relay operated from the ATB lead of the primary route, or alternate level test control relay, operated on every other call from relay GR2 in the GSA module.

TG15, CK15, VP15 (FIG. 59)—Connecting relays for closing trunk test leads, free vertical check leads and vertical pulling leads for testing on outlets 1–5.

TG60, CK60, VP60 (FIG. 59)—Connecting relay for testing on outlets 6–10.

TR (FIG. 60)—Transfer test from one 5 outlet group, when unsuccessful to the other 5 outlet group.

RP (FIG. 59)—Ripple test relay governing test over 3 outlets, 2 outlets, 3 outlets, 2 outlets of the level in succession on calls to small trunk groups.

ATA (FIG. 60)—Battery and ground connecting relay for various functions.

IT1–IT5 (FIGS. 62–63)—Trunk test relays.

2T1–2T5 (FIGS. 62–63)—Auxiliary relays to test relays.

TA (FIG. 63)—End relay for the test relay chain.

VR1, VR2 (FIG. 64)—Checks for free verticals in GSB1 and GSB2 respectively.

OT1–OT5 (FIGS. 62–63)—Rotator relays advancing the preference from one trunk test relay to the next on successive calls.

1TH1, 2TH1 (FIG. 66)—Register-Connector link relays operating to extend the local level marking leads 1–10 to the selector route relays and to extend the connector call leads 1–10 to the connector controls. Relay 1TH1 further closes the link test battery leads for both links back to the link test relays in the GSA module, and relay 2HT1 closes the pulling leads for the link connect relays of both links back to the link test relays.

1TH2, 2TH2 (FIG. 66)—Register-connector link relays operating to extend local level marking leads 11–20 to the selector route relays and to extend the connector call leads 11–20 to the connector controls. The relays further close the link test battery leads and the pulling leads for the connect relays for both links.

LC1, 2LC1, 3LC1 (FIG. 67)—Link connecting relays for link 1. The relays operate when link 1 is selected and extend the information leads and the call leads to the connector controls.

1LC2, 2LC2, 3LC2 (FIG. 67)—Link connecting relays for link 2. The relays operate when link 2 is selected and extend the information leads and the call leads to the connector controls.

Leads: GSB Module (FIGS. 50; 57–67):

1–20 (FIG. 57)—Leads multipled to the holding windings of corresponding verticals in all GSB modules of the selector, when more than one such module is equipped per selector, in order to operate and make busy all corresponding verticals when the vertical in one of the modules is in use.

L1–L11—Trunk route marking leads for operating the route relays W1–W20.

G1 (FIG. 59)—Carries ground from the register-selector guard when the guard operates to engage the selector.

GX (FIG. 59)—Connect ground, controlled by contacts of relays VP, to lead PG and further to lead P for the operation of relay X in the GSA module.

GY (FIG. 59)—Connects ground, controlled by contacts of relays VR (and WC when used) to lead YP and further to lead Y for the operation of relay Y in module GSA.

VPG (FIG. 63)—Carrier ground to the GSA module for the energization of lead VP when relay TA operates on successful test.

TTR1–TTR3 (FIG. 60)—Carry ground for the operation of test connecting relays TG, CK and VP through contacts of relay GR2 in the GSA module.

BP1–BP4 (FIG. 60)—Carry ground and battery from contacts of relay GRB in the GSA module for various functions in the GSB module.

Referring to FIGURES 3–8 and 48–50, it will be recalled that each of the twenty verticals in the GSA switches constitutes an inlet. The twenty four-wire outlets, or horizontals, of the GSA verticals are multipled over all twenty verticals and wired one outlet to each of the twenty GSB verticals. The outlets, or horizontals, of these verticals are not multipled between verticals of the same switch but the twenty outlets of vertical of of GSB–1 are multipled respectively to the twenty outlets of vertical 1 of GSB–2. These twenty outlets constitute the first point in each of the twenty levels. Similarly, the twenty outlets from the 2nd verticals of GSB–1 and GSB–2 constitute the 2nd point in the twenty levels, and verticals 10 provide the 10th point in each level. In this manner any of the selector inlets in the GSA switches may be connected to any of the 200 selector outlets in the GSB multiple, and twenty connections may exist simultaneously through the selector.

When the combined number of levels for line groups and trunks exceeds twenty, the reach of the selector may be expanded to 400 outlets in forty levels by adding a 2nd pair of GSB switches and associated control relays (designated the second unit of the selector), and further to 600 outlets in 60 levels by adding a third pair of GSB switches and control relays (designated the third unit of the selector). The verticals of the second and third pair of GSB switches are wired in parallel with the corresponding verticals of the initial GSB pair to the twenty horizontals of the GSA switches, and twenty simultaneous connections may be established to twenty different points in the 400, or 600 point selector multiple.

In one commercial embodiment, the equipment is mounted in standard frames, or modules, 24 inches high by 44$^{15}/_{16}$ inches wide. The GSA switches with a part of the control relays are contained in one GSA module. The initial GSB switches, with the balance of the control relays, are contained in another module. The second and third pairs of GSB switches, when required, are mounted with control relays in additional GSB modules, both identical to the first GSB module.

The GSA module (FIGURES 48–56 and 68) in addition to the two GSA switches and the control relays, also contains the following miscellaneous sets of relays:

(*a*) Thousands and hundreds code relays (FIGS. 53, 54) determining, on the basis of information from the register, or number group, to which associated GSB module and to which level in the same the call should be directed. This applies to calls to local levels. On calls to trunk levels the information is received in the selector control directly from the register on the basis of one lead per trunk level.

(*b*) A set of relays (FIG. 55) which tests and seizes a free by-path from the register and number group, to the selector and connector control circuits. The function of the by-path links is to establish a direct connection from the register and number group to the selector control and connector control for the transmission of information such as line tens and units digits, ringing information and class markings to the connector, and level marking to the selector.

(*c*) Two by-path links are provided for each twenty levels, that is, for each GSB module, and are shared by corresponding GSB modules in all selectors. This arrangement will become evident by referring to the circuit diagram of FIGS. 57–67. The by-path links are engaged only during the setting up of connections to local lines and their holding time amounts to only a fraction of a second. The by-path links are not engaged on calls to trunk levels.

(*d*) A set of rotator relays (FIG. 68) which serve to distribute calls to trunks over the GSB modules of a selector with more than one such module, when there are trunk groups with trunks in more than one of the GSB modules.

A GSB module (FIGS. 50; 57–67) in addition to the GSB switches and associated control relays contains the following sets of two relays:

(*a*) One set of connecting relays (FIG. 67) which connects the information leads and the connector call leads to the selected by-path link.

(*b*) One set of relays (FIG. 66) which connect the proper set of ten local level marking leads to the selector and the proper set of ten connector call leads to the connectors. These relays are operated according to the setting of the thousands code relays in the GSA module, and one of the ten local level marking leads to the selector and the corresponding connector call lead are energized in accordance with the setting of the hundreds code relays in the GSA module.

*Subscriber's Terminating Trunk (STT)—FIGS. 32–36*

The STT serves as a connector trunk on calls to local lines. System-wise it is located between the selector and the called line and is occupied for the entire length of the call. Physically the STTs are located in the linefinder connector switch module (A) and in the linefinder connector control module (B). Three STTs are located in each A module and three in the B or control module giving a total of twelve STTs for a full ninety line group.

Each substation link (STT) basically comprises the following relay and lead designations.

Relays (FIGS. 32–36):

MB (FIG. 35)—Make busy relay. Operates from ground on the incoming sleeve to cut off STT test battery and provide holding ground for other relays.

CC (FIG. 35)—Connector control connecting relay. Connects marking leads from ocntrol to STT. Operates from MB and releases when ring start or busy marking is received from the control.

TB (FIG. 35)—Test battery removal relay. Opens test battery and VP leads when a busy plug or test box is connected to the test block.

A (FIG. 35)—"A" subscriber's battery feed relay. Operates H relay.

H (FIG. 34)—Holding relay. Operates from A relay on local calls to provide holding ground on incoming and outgoing sleeve wires. Slow release to prevent "dialling off" of connection.

LC (FIG. 34)—Local call marking relay. Connects condenser transmission bridge and battery feed coils for local calls.

B (FIG. 34)—"B" subscriber's battery feed relay. Provides tones by transformer action from tone winding, and when operated switches A relay to provide reverse battery supervision to "A" subscriber.

C (FIG. 34)—Revertive call test relay. On local calls to busy lines, C provides ground on the originating sleeve, and will operate if it is the only source. If the call is revertive, C will not operate due to the ground placed on the terminating sleeve by the STT returning on the originating sleeve. Operation of C stops the slow release of BY, and removes the ground on the terminating sleeve.

BY (FIG. 33)—Busy marking relay. Operates from BY lead from connector control and applies slow busy tone to tone winding of B relay.

RT (FIG. 33)—Ring trip relay. Operates from D.C. loop on called subscriber's line. Cuts off ringing and connects A and B subscribers.

PU (FIG. 33)—Ring pickup relay. Connects ringing during silent period of parties 6–10. Slow release on revertive calls to time revert answer tone.

CO (FIG. 33)—Cutoff pulling relay—Operates from Ring Start lead from control or from RV relay to place ground on outgoing sleeve to insure operation of the line cutoff relay before ringing is applied. Slow operate to permit release of "A" subscriber's switch train on revertive calls.

RS (FIG. 32)—Ring start relay. Cuts through terminating tip and ring after line cutoff relay has operated.

RV (FIG. 32)—Revert call relay. Operates when A operates with BY and CO both down to mark revert call.

WC (FIG. 32)—Wire chief marking relay. Operates from WC marking (all four party relays) to change sleeve circuit and pull RT.

HC (FIG. 32)—Functions as a "C" horizontal for the connector switch. Connects lines in third tens group of each switch.

STD (FIG. 32)—Supervisory time disconnect relay. Gives 2–4 minute time disconnect on post-supervision, revert call ringing, and busy tone.

P1, 2, 4, 7 (FIG. 36)—Party marking relays, Select ring frequency, line polarity, and ring code.

Leads (FIGS. 32–36)—Leads to the Connector Switches (FIG. 32):

H—Holding for the connector switch vertical. Grounded by the MB relay.

T, R, S—Tip, ring, and sleeve for lines connected by horizontals HA and HB.

C—Additional control or signal wire for trunks and paystations. Found only on lines 11–10.

HT, HR, HS—Tip, ring, and sleeve for lines connected by an HC relay. (Lines 31–30.)

VP—Vertical pulling lead for connector vertical.

Leads to the Connector Control (FIG. 32):

P1, 2, 4, 7—Party marking. In addition to marking party codes 1–10, marking on all leads indicates a wire chief (test) call, and no marking indicates a call to a trunk on line.

CC—Connect signal to control indicating that the STT is ready to receive a call.

LC—Local call class marking. Absence of ground on the LC indicates a trunk call.

RS—Ring start marking.

BY—Busy line marking.

S—Test sleeve from the STT. Goes to idle test relay in control.

HC—Marking to connect lines in the group 31—30.

VP—Connector switch vertical pulling lead.

TD—Conversation time disconnect marking. May be strapped in the control with a solid ground, or strapped through the tens relays to provide disconnect by tens groups.

A, D—Time disconnect pulse leads. One A lead and one D lead to each STT.

Leads to the Selector (FIG. 35):

T, R, S, C—Tip, Ring, Sleeve, and C wire from SOT or trunk through selector multiple.

TB—STT test battery for selector.

Leads to the TDR (Time Disconnect Relays) (FIG. 35):

TT, TG—Timeout tone and tone return ground to B relay tone winding.

DG—Time disconnect holding ground from TDR.

L—Locking ground for TDR relays.

AT—"A" time period pulse to TDR.

TD—Conversation time disconnect marking to TDR.

Leads to the Ringing and Tone Distribution Module (PMB) (FIG. 35):

Int. Start—Interrupter start ground.

DTG—Dial tone ground. Return for all tones.

SBT—Slow busy tone.

RAT—Revert answer tone. Uninterrupted ringback tone.

RCM—Revert call message (or tone).

MST—Message repeater start ground for RCM.

RPU—Ring pickup.

RBT—Ringback tone.

MRG—Ring return ground.

1F1–1F5—One ring ringing current, frequencies 1–5.

2F1–2F5—Two ring ringing current, frequencies 1–5.

In operation, the STT receives its control and information from the connector control common relay set. It provides the ringing and ring trip functions on all calls which terminate locally, and on calls from local lines also provides the battery feed and supervision. On calls orginating from incoming trunks, the STT cuts through in a full metallic state after the ringing is tripped.

On any call of local origin which reaches a line busy in the STT, the STT automatically goes into a test cycle during which it determines whether the call is of a revertive nature. In other words, it tests by means of comparison of grounds on the terminating and originating sleeves whether the call is in effect for a subscriber on the same line as the originating caller. If it finds that it is a revertive call, the STT, instead of providing busy tone to the calling subscriber, provides the revert call message which will normally be a recorded message instructing the subscriber to hang up and allow the called party's telephone to ring. (In TPL systems, a distinctive tone may be used.) Upon release by the originating subscriber on a revertive call, the STT places ringing on the line and when the call is answered provides three seconds of uninterrupted ringback tone as an identification to the answering subscriber that the call is a reverting call, and that he should wait a reasonable amount of time to allow the calling party to again pick up his telephone.

All STT's are arranged to perform as test connectors. That is, when the STT has been marked that the call it is handling is from a wire chief or BV trunk, or from a trunk which is so privileged and has indicated a BV call in the incoming register, the STT will set up a false idle condition so that when the connector control tests for an idle on the line, it will signal the STT to cut through regardless of whether the line is actually idle or busy. On a wire chief call the STT connects the sleeve wire of the called line with the C wire of the WC trunk so that the wire chief may, if necessary, perform tests upon the sleeve wire of the called line and also operate or release the line and cutoff relays. A wire chief call is indicated to the STT by the presence of grounds on all four of the party leads.

DETAILED DESCRIPTION

Figure 11:
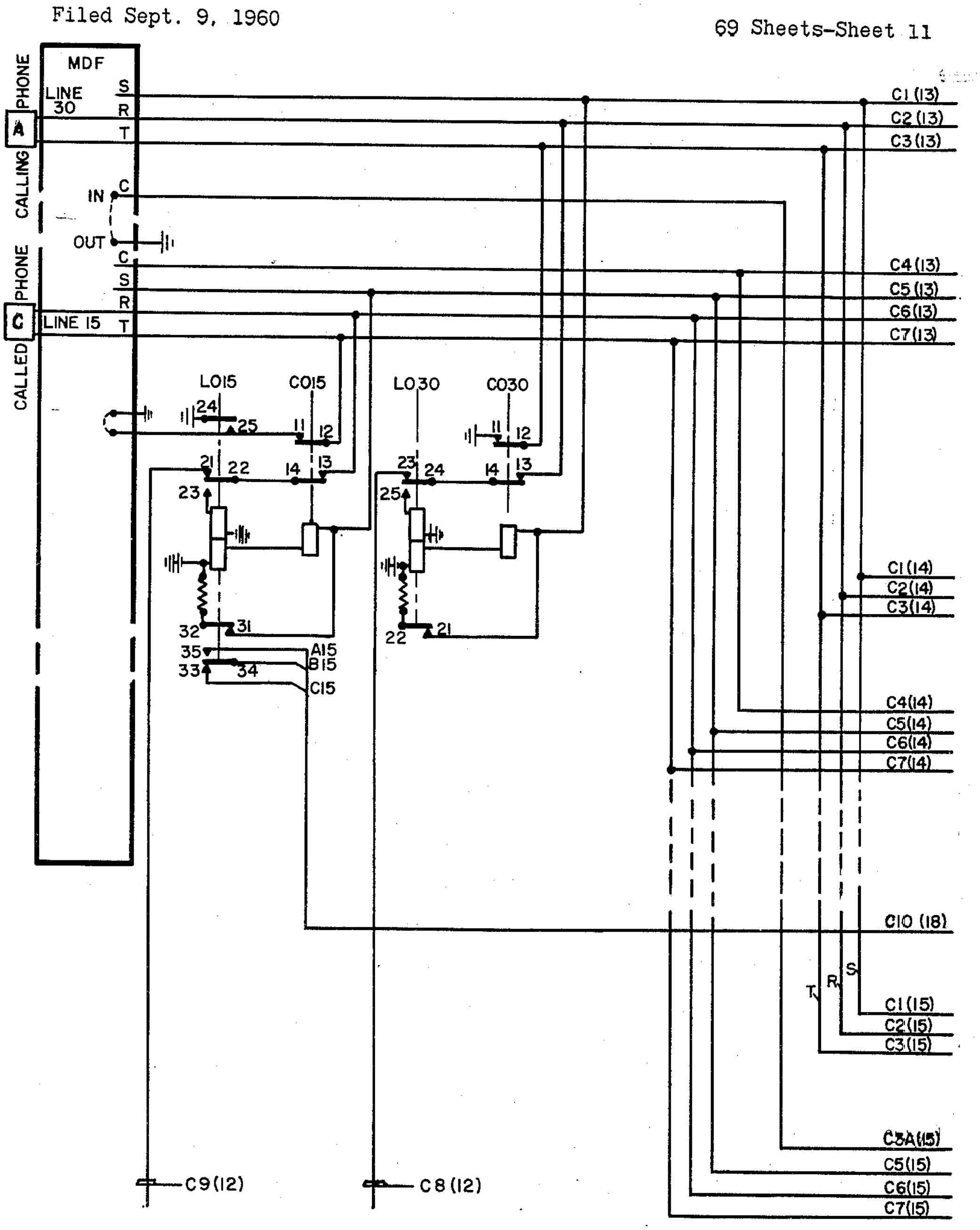

The call which was traced over the block illustration of FIGURES 3–8 from a calling phone A on the line connected to horizontal 30 of the first switch combination of the first ninety line group to called phone B on the line which is connected to horizontal 15 of the first switch combination of the first ninety line group is now traced in detail over the system stages shown in FIGURES 11–68. Such call is, of course, merely exemplary of calls between the calling and called phones on other lines connected to other of the horizontals of the switch combinations of the ninety line groups.

Figure 19:
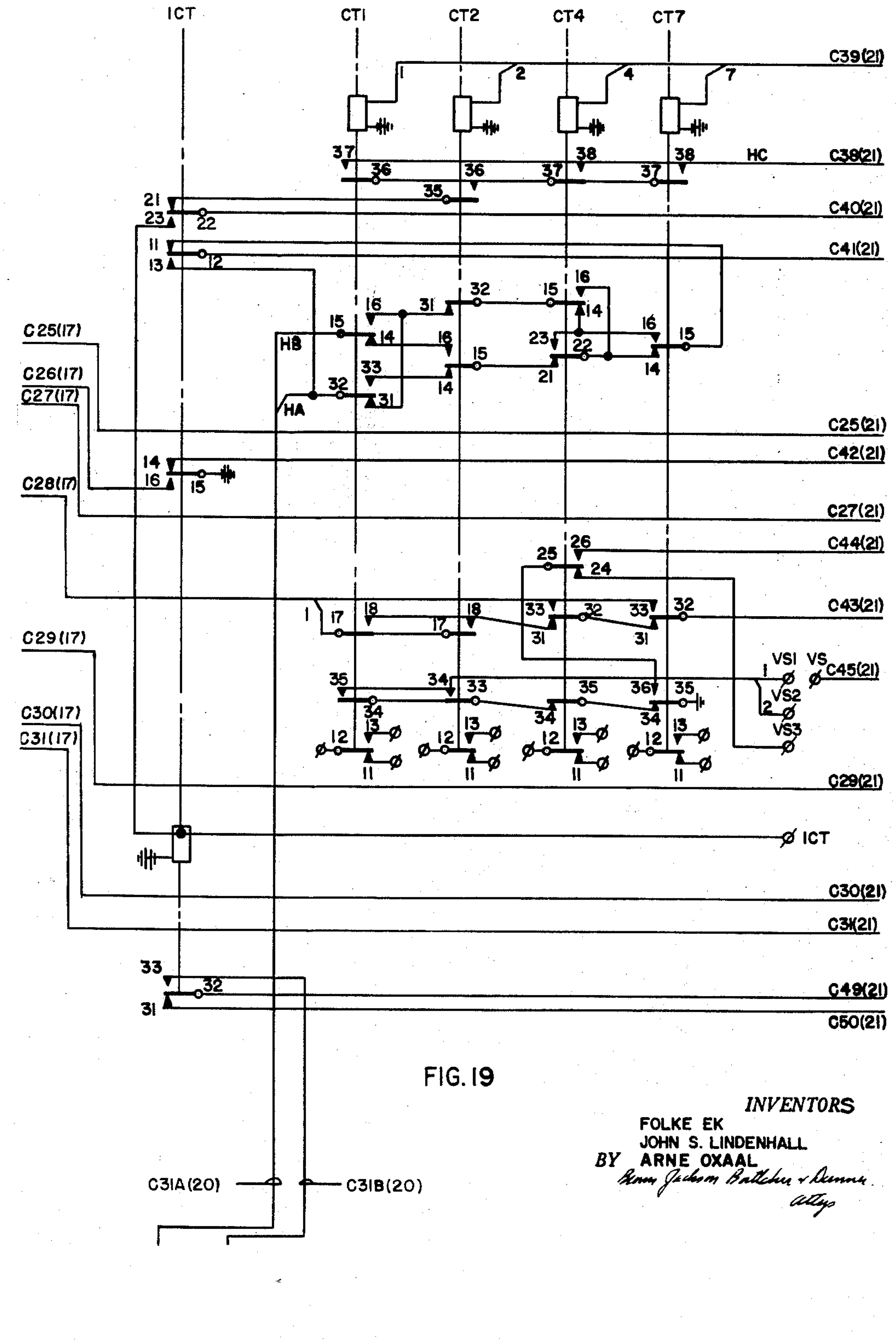

Preliminary to such description, it is noted that certain legends and abbreviations will be used to facilitate the teaching. Thus, "Relay LR3 in FIG. 12" will be abbreviated relay LR3(12); "Contacts 22 of relay LR3" will be abbreviated "contacts LR3–22"; a single conductor within a figure will be called a "lead"; a single conductor or a cable between figures will, for convenience, be called a cable and will bear the prefix "C." Thus, in the example, C38(21) (FIG. 19); C38(19) (FIG. 21), C38 is a conductor (but will be called a cable) between FIGURES 19 and 21. C38(21) means the cable C38 going from FIGURE 19 to FIGURE 21. C38(19) means the conductor C38 going from FIGURE 19 to FIGURE 21.

Figure 12:
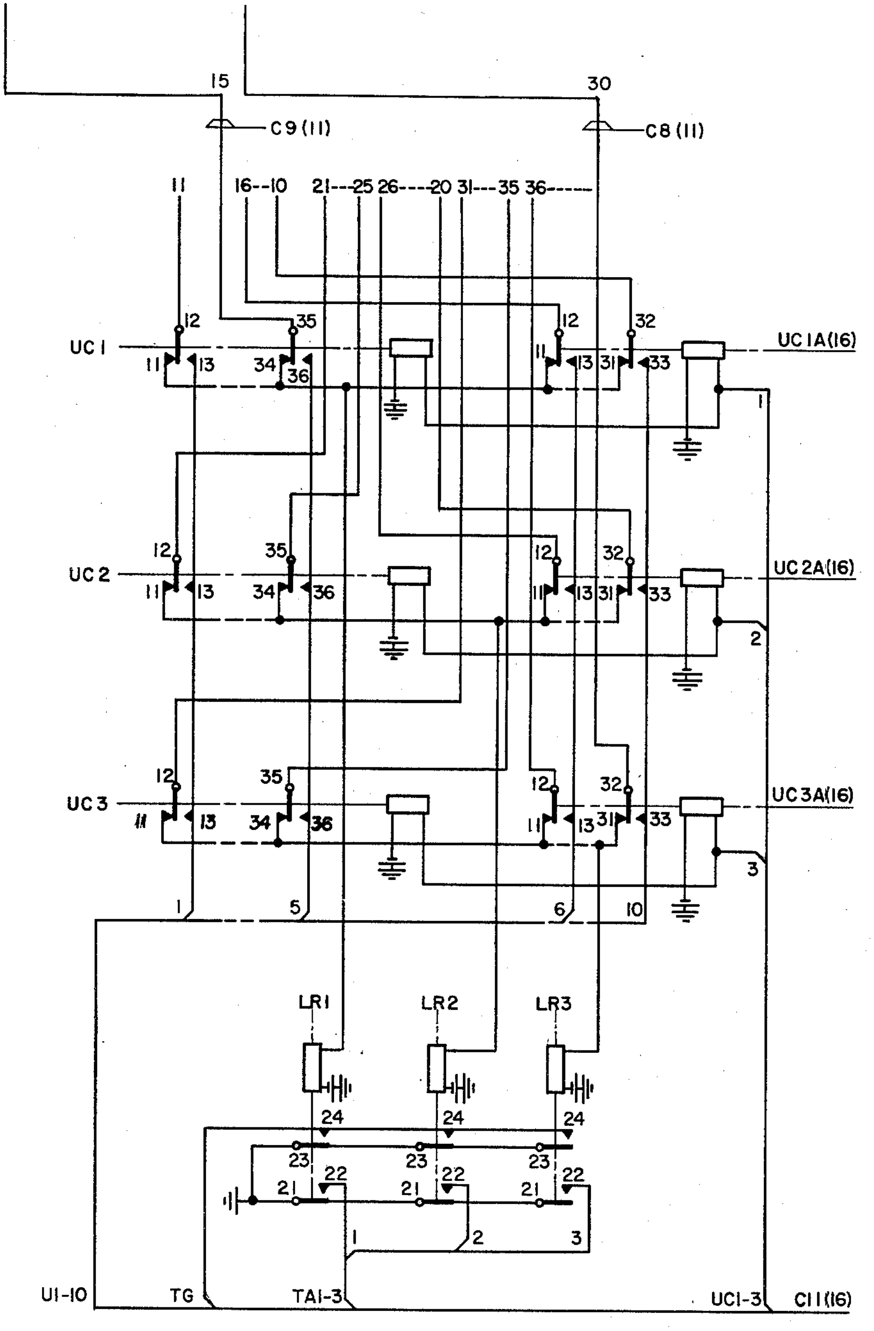

Also, in the example:

U1-10 TG TA1-3 UC1-3 Fig. 12 Fig. 16 FPC1 VP1-8
C11(16) C11(12)

C11 is a cable between FIGURES 16 and 12. C11(16) means the cable C11 going from FIGURE 12 to FIGURE 16. C11(12) means the cable C11 going from FIGURE 16 to FIGURE 12.

The positive pole of the office battery is grounded and is referred to as "ground" and designated in the figures ⏚. The negative pole of the office battery will be referred to as "battery" and designated in the figures ⊖.

In the text, the operation of a relay in the text will be indicated by a line under the relay number. For purposes of orientation, reference is made to FIGURE 70 which sets forth the manner of assembly of the drawings to provide the circuit disclosure for the system. Thus, FIGURES 11–16 as assembled in the manner set forth thereat include the line finder connector switches; FIGURES 17–24 disclose the connector control; FIGURES 25–31 disclose the linefinder control; FIGURES 32–36 disclose the STT; FIGURE 37 discloses the SOT; FIGURES 38–42 disclose the originating register; FIGURE 43 discloses the register selector guard; FIGURES 44 and 45 disclose the register guard; FIGURE 47 discloses the number group link; and FIGURES 48–68 disclose the GSA and GSB modules.

As indicated by the legend thereat, the main path for a connection as established between a pair of subscribers, such as subscribers A,C, extends over FIGURES 11-15-37-48-49-50-58-35-34-33-32-13-11. The manner in which such connection is established using by-path principles will now be set forth in detail.

*Initiation of Call*

When the calling subscriber removes the handset at the calling substation A (FIG. 11) which is connected to line 30 in the system, a direct current loop is completed over substation A from the ring conductor R to the tip conductor T of line 30.

*Tens Identification of Calling Line*

The first function of the system is to find and completely identify the calling line. Accordingly the closure of the loop circuit completes an energizing circuit for line relay LR3(12) in the linefinder connector switch circuit which, according to one inventive concept, is connected common to the ten subscriber lines which are connected on horizontals 31–30, the energizing circuit extending from battery over the winding of relay LR3(12), contacts UC3–31, 32, cable C8(11), contacts LO30–23, 24, CO30–13, 14 out over the ring conductor R, through the direct current loop in substation A, back over the tip conductor T, and contacts CO30–11 to ground. For purposes of simplifying the description of certain of the circuits such as the path just traced, the following abbreviations will be used: battery, LR3(12), UC3–31, 32, C8(11), LO30–23, 24, CO30–13, 14, ring conductor, substation A, tip conductor, CO30–11, ground.

Line relay LR3 operates and at its contacts LR3–21, 22, places ground on lead TA3 which serves as a call signal from the linefinder switch to the linefinder control circuit (FIGS. 25–31), the call signal being extended to the line tens identifier and guard relays to effect the identification of the group of ten lines including the calling line. In the present example, line tens identifier relay TA3(26) is operated over the circuit which extends over the path from ground, LR3–22, lead TA3, cable TA1–3, C11(16), C11(25), cable TA1–3, C83(26), lead TA3, the coil of relay TA3(26), lead 3, TAA–15, 16 to battery. Relay TA3 operates and at its contact TA3–35, 36 extends its operating ground to operate end relay TAA(26) for the tens selection relays TA1–TA9.

Figure 26:
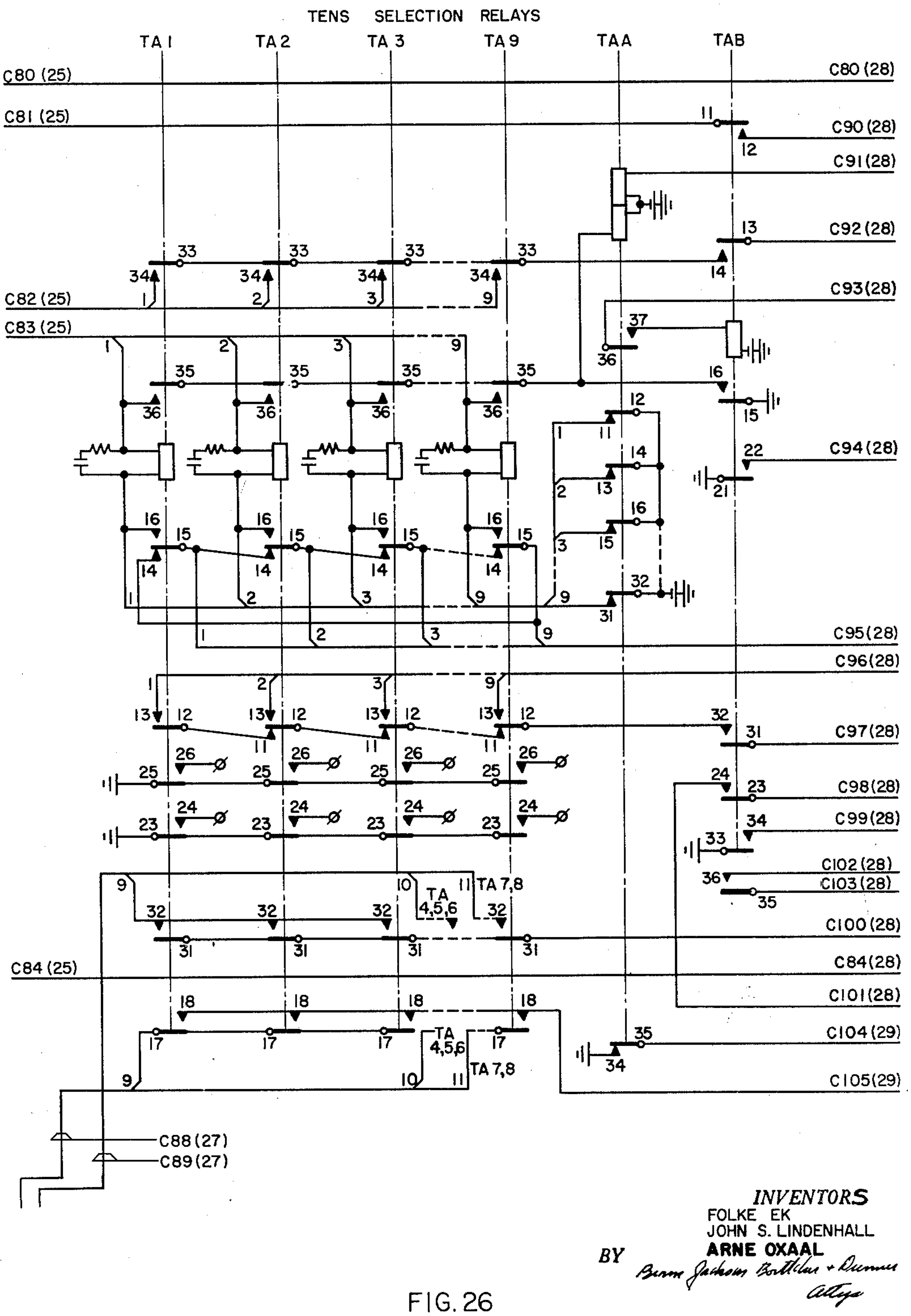
Figure 27:
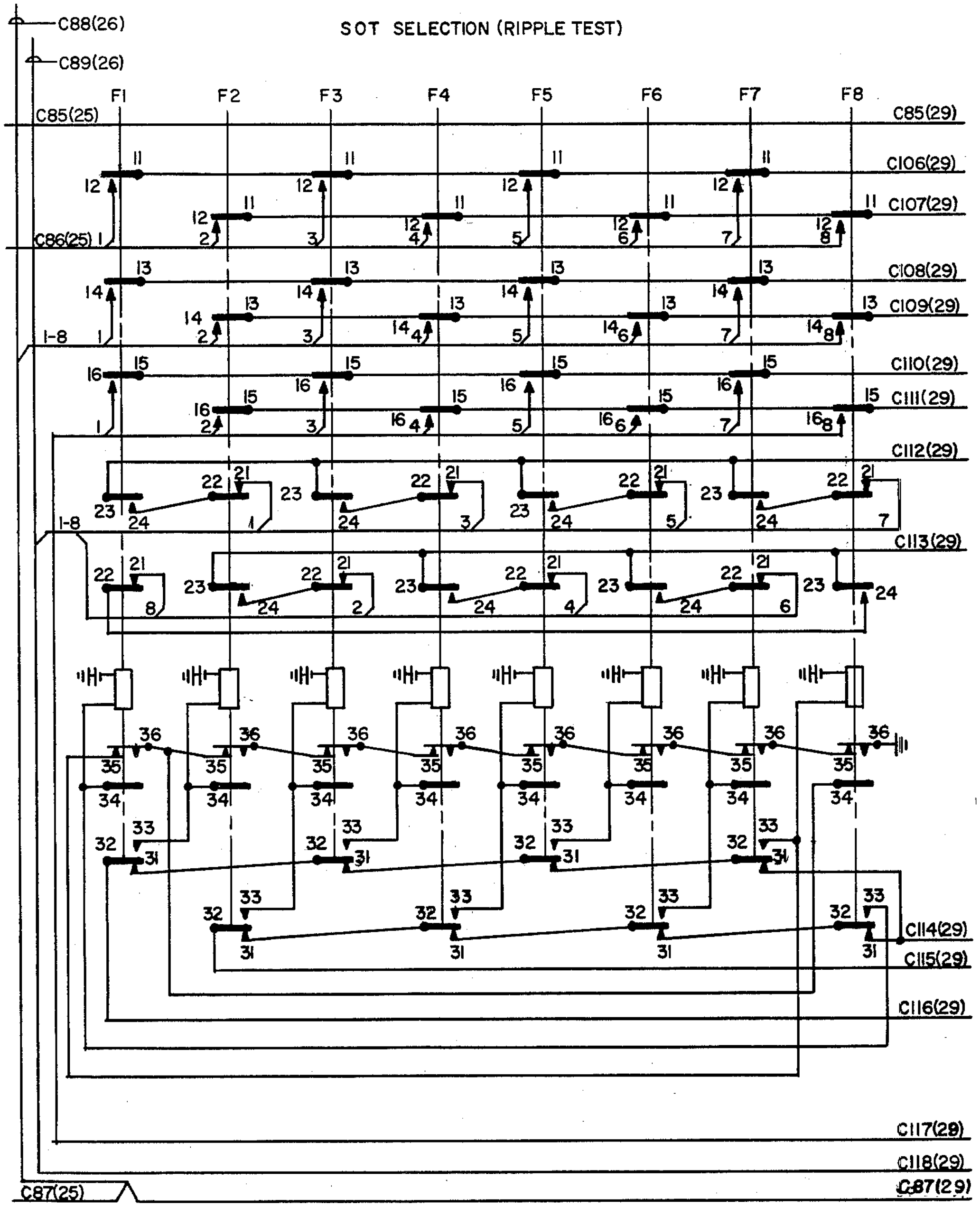
Figure 28:
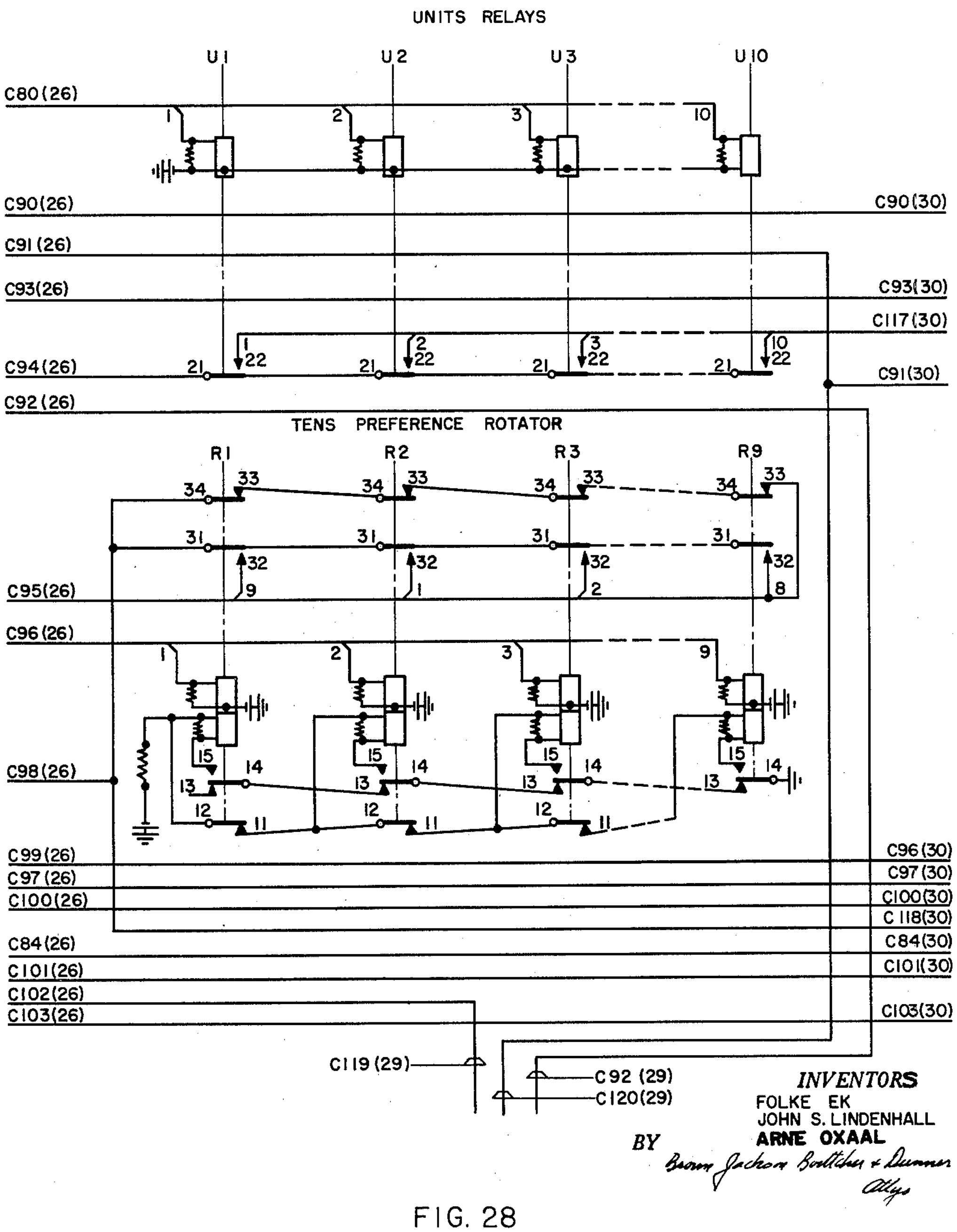

As indicated heretofore, each calling group of lines has an identification relay TA. The first thirty subscriber lines (as shown in FIGURE 26) has its tens call relays TA1, TA2, and TA3; the second thirty lines has its tens call relays TA4, TA5, and TA6; and the remaining thirty lines of the ninety line group has its call relays TA7, TA8, and TA9. Assuming that the tens preference rotator relays R1 to R9 of FIGURE 28 have established a preference for relay TA1, when the TAA relay operates, any other TA relays which may have operated at the same time as a result of another call, will be released.

Relay TAA operates and at its contacts 36, 37 completes an enregizing circuit for relay TAB(26) which extends over the path from battery, TAB(26), TAA–36, 37, C98(28), C93(30), UAA–11, TO1–34, 35, to ground. Relay TAB which is a secondary relay for relay TAA at its contacts 35, 36 completes a circuit for relay PV929, which extends from battery through a 1200 ohm resistor, PV(29), C119(28), C102(26), TAB–35, 36, C103(28), C103(30), UAA–31, 32 to ground. Relay PV operates at this time and at its contacts prepares to be shunted-down for vertical pulling later in the sequence.

Relay TAB at its contacts TAB–15, 16 locks relay TA1 operated independent of the line relay LR3, which releases shortly.

*Unite Identification of Calling Line*

The linefinder control circuit now causes the units connect relays (UC) to operate for the identified group of ten lines, and specifically to connect the ring side of the ten lines into the units relays to thereby identify the calling one of the ten lines, and more specifically relay TAB at its contacts TAB 14, 13 places ground on the UC3 lead, operating relays UC3(12) and UC3A(12) over the path which extends from battery over UC3 and UC3A in parallel, lead 3, cable UC1–3, C11–16, C11–25, cable UC1–3, C28(26), lead TA3–33,34, TAB–13, 14, C92(28), C92(29), C92(30), TO2–33, 32 to ground. Relay UC3A(12) operates and at its contacts 32, 33 releases LR3(12). Relays UC3, UC3A operate and at contacts 11, 12; 34, 35, etc., transfer the ring leads of subscriber lines 31—30 away from relay LR3, and connect them over contacts 12, 13; 35, 36, etc., to leads U1 to U10 which terminate in the secondary line relays U1 to U10 of FIGURE 28 for the purpose of identifying the calling line in the ten line group. In that the calling substation in the exemplary call is substation 10 of the group of ten, unit relay U10(28) operates over the path which extends from battery over U10, lead U10, C80(26), C80(25), cable U1–10 for linefinder switch #1, C11(16), C11(12), cable U1–10, lead U10, UC3A–32, 33, C8(11), to the ground which was extended to relay LR3 by the completion of the substation loop.

Units relay U10(28) operates and at contacts U10–21, 22 energizes relay UA10(30) over the path from battery, UAB–33, 34, lead 10, UA10, lead 10, C117(28), lead 10, U10–21, 22, C94(26), TAB–22, 21 to ground. Unit selection relay UA10 operates auxiliary identifier relays UAA(30) and UAB(30) over the path which extends from battery over UAA(30) and UAB(30) in parallel, and UA10–16, 15 to ground. Relay UAB operates to effect the release of any other UA relays which may have operated simultaneously with UA10, due to an off-hook condition of any of the other nine lines in the ten line group including calling line 30.

*SOT Path Testing*

Now that the calling line has been identified, the linefinder control circuit looks for an idle SOT from among the eight which serve the verticals of the linefinder switch.

More specifically, relay UAA operates and at its contacts 35, 34 energizes relay TB1(31) over the path from battery, TB1(31), lead 9, C118(30), C118(29), C118(27), C89(26), conductor 9, TA1–32, 31, C100–28, C100–30, UAA–35, 34 to ground. Relay TB1 operates and at its contacts TB1–11–34 connects the test battery leads of the SOT's serving the verticals of the first linefinder switch into the SOT selection relay chain comprising relays F1–F8 of FIGURE 27.

Also, relay TB1 operates relay ST(29) over the path which extends from battery over ST, C117A(31), TB1–36, 35 to ground. Relay ST operates to signal the start of the testing for an idle SOT by closing a circuit to operate a relay of the SOT selection chain F1–F8, this chain being for the purpose of hunting for an idle SOT and for advancing the point of priority. In operation the chain advances until an idle SOT is found, then, upon release of the linefinder control steps over to the next chain relay in readiness for the next call.

Let us assume that relay F8 is operated and locked as a result of the previous call over the path which extends from battery over F8, F1–35, 36, F8–34, 36, to ground. When start relay ST operates, if the eighth SOT were available, the test relay 2T1(29) for even numbered test battery leads would operate, and at its contacts 2T1–11 would prevent any advance of the chain F1–F8 at this time. Assuming that the eighth SOT is busy, the operation of start relay ST causes the ripple chain to start moving in search of an idle SOT.

It is now assumed, for exemplary purposes, that the first SOT is idle. Upon the operation of relay ST, a circuit is completed to operate ripple test relay F1(27) over the path from battery, F1, F8–33, 32; F6–31, 32; F4–31, 32; F2–31, 32; C115(29); 2T1–21, 22; 1T2–12, 11; E–22, 1; ST–14, 13 to ground. Relay F1 operates and locks over contacts F1–34, 36; F2–35, 36; F3–35, 36; F4–35, 36; F5–35, 36; F6–35, 36; F7–35, 36; and F8–35, 36; to ground.

Ripple test relay F1 at its contacts F1–35 releases ripple test relay F8 and at its contacts F1–24 operates odd number test relay 1T1(29) over the path from test battery source (FIG. 40), 800 ohm resistor, ON2–31, 32; C211–(38); BY–31, 32; RD–17, 18; H–34, 35; C206(37); CT–21, 22; TB lead, C123(31), lead 1; TB–11, 12; lead 1; C118(30), C118(29), C118(27), lead 1; F2–21, 22; F1–24, 23; C112(29), 1T1, E–32, 31; to ground.

Relay 1T1 operates and at its opened contacts 1T1–21 prevents any further advance of the chain at this time. Relay 1T1(29) also operates auxiliary relay 1T2(29) over the path from battery, relay 1T2, 1T1–23, 22; 2T1–12, 11; E–24, 23; ST–16, 15; to ground. Relay 1T2 operates and locks over its contacts 1T2–13, 12; 2T1–22, 21; C115(27), F2–31, 32; F4–32, 31; F6–32, 31; F8–32, 31; C114(29) and ST–32, 31; to ground.

Relay 1T2 at contacts 35, 36 operates end of test relay E(29) to mark the end of SOT testing in that the first SOT has been selected.

*Switch Connecting and Pulling*

The third function of the linefinder control is to effect switch connecting and pulling. That is, by means of the identification made on the tens and units relays, the control causes the horizontal selecting bars of the linefinder switch to be operated to a position ready to select the calling line. In the present example, the linefinder control relay 1T2 at contacts 1T2–18, 17 places battery over lead C105(26), contacts 18, 17 of the operated tens selector relay TA3, lead 9, C88(27), C87(25) to the FPC–1 lead for linefinder switch #1 associated with the eight verticals which were tested. If switch #1 is idle this battery is extended over CBL11, 12 to operate relay FE(16) which at its contacts FE11–38 extends the horizontal pulling battery leads from the linefinder control to the #1 switch circuit, and FVP(16) which at its contacts 11–26 extends the vertical pulling leads from linefinder control to the #1 switch circuit and at its contacts FVP–22 serves to block the switch from occupation by the connector control. Relay HCC(16) operates from battery on the FPC–1 lead, UC3A–36, coil of HCC to ground if the call is from a line requiring the operation of relay HC1(15).

Relay 1T2 also operates relays PH1 and M1 associated with the first linefinder-connector switch combination over the path from battery (FIG. 29) through contacts 1T2–17, 18, C105(26), TA3–17, 18, lead 9, C87(29), C87(31), lead 9, coils of PH1(31) and M1(31) in parallel to ground.

If a connector control is in the process of extending a call by use of the linefinder connector switch combination #1, relay CBL will have been operated over the path from battery through contacts ICT–15, 16 (FIG. 19), C26(17), PB1–11, contacts C–11, 12, conductor CPC–1, C24(16), lead CPC–1, contacts FVP–22, 21, and the winding of relays CE and CBL to ground. The circuit of relays FE and FVP will be open at contacts CBL–11 and the linefinder control will have to wait until the connector control has finished setting up its connection.

Assuming, however, that the switch combination #1 circuit is idle, relay FVP operates and at its contacts 25, 26 operates relay HE(16) which provides the operating grounds for the horizontals in the linefinder connector switch combination #1, the path extending from the FVP pulling battery through contacts FVP–26, 25 and the lower winding of relay HE to ground. (It might be noted at this point, that relay HE has opposed windings so that in the case of a simultaneous attempt at seizure from linefinder control and connector control with relays FVP and CBL operated momentarily, both opposed windings of relay HE will be energized so that relay HE will not operate, no horizontals will be "flipped.")

By the time the control circuit of switch #1 circuit has been seized, the line-finder control will have placed battery on one of the horizontal pulling leads H1–H10, corresponding to the units identity of the calling line. Had the calling line been in the first or second tens group, relay UC1A or UC2A would have provided battery for pulling the HA or HB horizontal magnet. Since the calling line is in the third tens group, relay HC1 will be pulled instead.

The operation of relay HE provides ground for pulling the horizontals in the linefinder switch. More specifically, in that the calling line in the present example is line 30, the operation of relay HE effects the pulling of horizontal magnet H0 (FIG. 15) over the path from battery (FIG. 30) through contacts UA10–25, 24, lead 10, C84-(28), C84–26, C84–25, cable #1–H10, C11–16, cable H1–10, contacts FE–34, 33, conductor I–O, cable C181-(15), conductor 10, horizontal magnet H0, lead N, cable C19(16), lead N, contacts HE–16, 15 to ground.

Relay HE(16) shunts vertical pulling relay PV(29) in the linefinder control over the path from ground, through contacts HE–11–12, FVP–23, 24, lead FCH, C11(25), C85–26, C85–29, to the side of the winding of PV connected to resistance battery, indicating to the line-finder control that the horizontals are being pulled in the linefinder switch #1.

Vertical pulling relay PV(29) releases slowly. When relay PV has released, a circuit is completed at its contacts PV21, 22 to operate the vertical magnet of line-finder vertical #1 (FIG. 15), and the HC1 relay (FIG. 15) in parallel; battery through the left winding of vertical magnet V1, C20(16), contacts FVP–12, 11; lead 1; and battery through the lower winding of relay HC1, C22(16), contacts HCC–12, 11 and FVP–12, 11 to the same lead 1; then cable VP1–8, C11–25, C86–26, lead 1, contacts F1–12, 11; C106(29), 1T2–22, 21; PV–21, 22; to ground. Vertical magnet V1 at its contacts V1–14, 13; and relay HC1 through contacts HC1–32, 31 and V1–14, 13 are prepared to lock to S-wire ground on the sleeve of the calling line as extended thereto.

Vertical pulling relay PV(29) at its contacts PV–24, 25 also places ground on the PH lead to the selected SOT to operate register connect relay RC(37) therein over the path from ground, PV–24, 25; 1T2–25, 26; C110(27), F1–15, 16; lead 1, C117(29), C117(31), lead 1, PH1–11, 12; lead 1, C121–37, CT–24, 25 and the lower winding of relay RC to battery.

The operation of register connect relay RC(37) in the selected SOT–1 operates holding relay H(38) in the originating register which serves SOT–1 over the path from the PH lead ground (FIG. 37) which operated relay RC, through contacts RC–31, 32; C205–39, C205(38) and H(38) to battery.

Register relay H(38) operates to provide a holding circuit for the SOT relay RC over the path from battery through the upper winding of relay RC(37), RC–34, 33; the HA lead, C203–38, and H–14, 13 to ground.

*Release of Linefinder Control*

The equipment now grounds the calling line to operate the cut-off relay and lockout relay in the line circuit to thereby remove the calling line loop to the line circuit and release the control. More specifically, with register relays RC(37) and H(38) operated, ground (FIG. 38) through contacts H–13, 14; C203(37), RC–33, 34; CT–17, 18; RC–25, 26; to the sleeve conductor S, C23(15), holds vertical magnet V1 and relay HC1. The same ground is extended over contacts HC1–16, 15, make contacts of horizontal magnet H0, C1(11), CO30(11), LO30(11), to battery, operates relays cut-off CO30(11) and lockout relay LO30(11).

Register relay H(38) at its contacts H–34 removes test battery from the SOT TB test lead which multiples to the other SOT's served by this register and at its contacts H–36 places ground thereon to release odd number test relay 1T1(29). This ground on the TB lead to the other SOT's served by this register makes these other SOT's artificially busy until the register is released.

With ground on the S-wire operating cutoff and lockout relays CO30 and LO30, and the test wire switched from battery to ground releasing relay 1T1, the linefinder switch control circuit an the linefinder control circuit release, with the SOT test chain taking a step.

More specifically, the release of odd number test relay 1T1(29) operates relay F2(27) over the path from battery, F2(27), F1–33, 32; C116(29), 1T1–21, 22; 1T2–15, 16; to ground.

Relay F2(27) operates and at its 31–32–33 transfer, switches the holding circuit of relay 1T2(29) from ground as traced to battery through the winding of relay F3, releasing relay 1T2; and at its contacts F2–35 releases relay F1.

Relay 1T2(29) in releasing opens its contacts 1T2–18, removing the battery therethrough, which releases relays PH1(31), M1(31), FE(16), FVP(16), HE(16) and HCC(16). Relay HE(16) restores and at its contacts HE–16 opens release horizontal magnet H0. The operation of cut-off relay CO30 initiates the release of other relays in sequence as follows: CO30(28) releases U10(28); U10(28) releases UA10(30); UA10(30) releases TAB(26); TAB(26) releases TA3(26), UC3(12), and UC3A(12); TA3(26) releases TB1(31); TB1(31) releases ST(29); and ST(29) releases TAA(26), E(29), UAA(30), and UAB(30).

Release of relay TAA completes the release of the linefinder control which is now able to receive a new call.

*Seizure of Register*

The equipment next seizes a register unit for use in the storage of digits which are dialled by the calling subscriber. It will be recalled that the SOT has access to one of four registers in the module via a register connect relay RC. As described above, when the linefinder control places ground on the PH lead of the first SOT, relay RC(37) in the SOT operates, in turn operating master ground holding relay H(38) in the associated register, which holds relay RC.

Register connect Relay RC in the SOT also completes a path over the main path calling loop to operate pulsing relay P(38) in the register, this path being traced from battery through the lower winding of relay P(38), contacts CO–13, 14, C200(37), ring lead RR, contacts RC–24, 23; CT–34, 35; ring lead R, C23(15), lead R, contacts HC1–14, 13; make contacts of horizontal crosspoints H0 of line 30, lead R, C2–11, ring lead R out over the calling loop and back on tip lead T, C3(15), make contacts of horizontal crosspoints H0 of line 30, contacts HC1–11, 12, lead T, C23(37), lead T, contacts CT–32, 31; RC–22, 21; lead RT, C199(38), contacts CO–12, 11; through the upper winding of relay P to ground, these two windings being in aiding relationship.

Relay P(38) operates and at contacts P12, 11 holds relay H(38) over the path from battery through relay H, rectifier H, contacts P–12, 11 and RD–38, 37; to ground. Relay P at contacts P12 operates relay PA(38) over the path from battery, 500 ohm resistor, relay PA, rectifier CS, contacts P12, 11 and RD–37 to ground. Relay P through its make contacts P–13 also furnishes ground to its compensating winding.

Pulsing auxiliary relay PA operates and locks over contacts PA–14, 13 and H–26, 25 to ground. The purpose of relay PA is to prevent the premature operation of the off-normal relays on seizure.

It should be recalled that the operation of relay H(38) effected the release of the linefinder. With the linefinder released, the calling loop holds relay P(38) which holds relay H(38). Dial tone is furnished over the calling loop to the subscriber by induction from the tone winding of relay P. At this time, a register has been seized by the subscriber originating trunk (SOT) for use in storing the digits dialled by the calling subscriber.

*Dialing into the Register*

We shall assume that the called telephone B (see FIGS. 3 and 11) has the directory number CHestnut 6–1000 which is equivalent to the digits 246–1000, and that the calling subscriber at phone A (see FIGS. 3 and 11) proceeds to dial the called number on receiving the dial tone over the loop.

It will first be recalled that the register is arranged to receive up to seven digits, a counting chain being connected to determine the value of each digit, and to transfer the value as ascertained to storage bins in the register. Before the description of the dialing of the specific called number CHestnut 6–1000, in order to set forth the operation of the register, the operation of the counting chain in response to the receipt of ten pulses is first described.

The counting chain (FIG. 40) of the register circuit (FIGS. 38–42) is basically controlled by the pulsing relay P. On the break period of the first pulse when the calling dial interrupts the line loop described above, relay P(38) releases and at contacts P32 operates off-normal relay ON1(40) over the path from battery through the upper winding of relay ON1, contacts ON133, ON2–15, 14; ON121, C216A(41), contacts TCS–33, 34, C219(38), P–32, 33; PA–12, 11 to ground. Relay ON1 at its contacts ON1–22, 21 locks independent of contacts ON2–14, 15; and at its contacts ON1–34, 33 extends the above described ground through the lower winding of relay ON1 to battery. The windings are opposed but the upper winding is of much higher ampere turns than the lower winding and controls. With this arrangement, relay ON1 is fast operating but when ground is subsequently removed, the two windings are in series and a circulating current flows in aiding relationship, making the relay slow to release. Relay ON1 at contacts ON1–16, 15 operates relay ON2(40) over the path from battery through relay ON2, contacts ON1–16, 15; C216(41), C224(39), H–16, 15; to ground. Relay ON2 operates and at contacts ON2–14, 15 opens the original energizing circuit of relay ON1.

On the make period of the first pulse, relay P reoperates, in turn operating the first counting chain relay CC1(40) over the path from battery through the upper winding of relay CC1, contacts CC2–14, 15; CC3–14, 15; CC4–14, 15; CC5–14, 15; ON1–37, 35; C213–38; P–31, 33; PA–12, 11; to ground.

On the break period of the second pulse, relay P releases, holding relay CC1 and operating relay CC2(40) over the path from battery through the upper advance winding of relay CC2, lower winding of CC1, contacts CC1–13, 12; C216E(41), C216(42); CS–27,28; C216B(41); ON1–22; C216A(41); TCS–33, 34; C219(38); P–32, 33; PA–12, 11; to ground. Relay CC2 operates and at its contacts CC2–14 opens the original operating circuit of relay CC1 and at contacts CC2–16 prepares a holding circuit for itself.

On the make period of the second pulse, relay P reoperates, removing ground from the "Advance ground" lead, releasing relay CC1, and placing ground on the "Hold ground" lead, holding relay CC2. On the break period of the third pulse, relay CC3 operates. On the make period of the third pulse, relay CC2 releases. On the break of the fourth pulse, relay CC4 operates. On the make of the fourth pulse, relay CC3 releases. On the break of the fifth pulse, relay CC5 operates. On the make of the fifth pulse, relay CC4 releases.

On the make of the sixth pulse when relay P(38) releases, relay CC6(40) operates over the path from the advance ground lead through the lower winding of relay CC5, contacts CC6–34, 35; winding of CC6 to battery. Relay CC6 operates and at its contacts CC6–35, 33 which make before contacts CC6–34, 35 break, holds over the contacts ON2–17, 16, C212–38, PA–12, 11 to ground, and at contacts CC6–34 releases relay CC5.

On the make of the sixth pulse, relay CC1 reoperates over the path previously traced, and during the remainder of pulsing up to and including the tenth pulse the same pattern of operation described for pulses 1–5 repeats. With relay CC6 operated code leads above and below the relay chain are shifted.

When relay P(38) reoperates following the tenth break, the circuit of relay ON1 is opened, and relay ON1 releases after an interval to begin the registration period. Relay ON1 releases and opens the circuit of slow release relay ON2 which releases after an interval. Between the release of relays ON1 and ON2, registration ground can be traced over the path from ground through contacts ON2–13 and ON1–11 to operate register bin relays as will now be described.

*Dialing the Specific Called Number*

Figure 40:
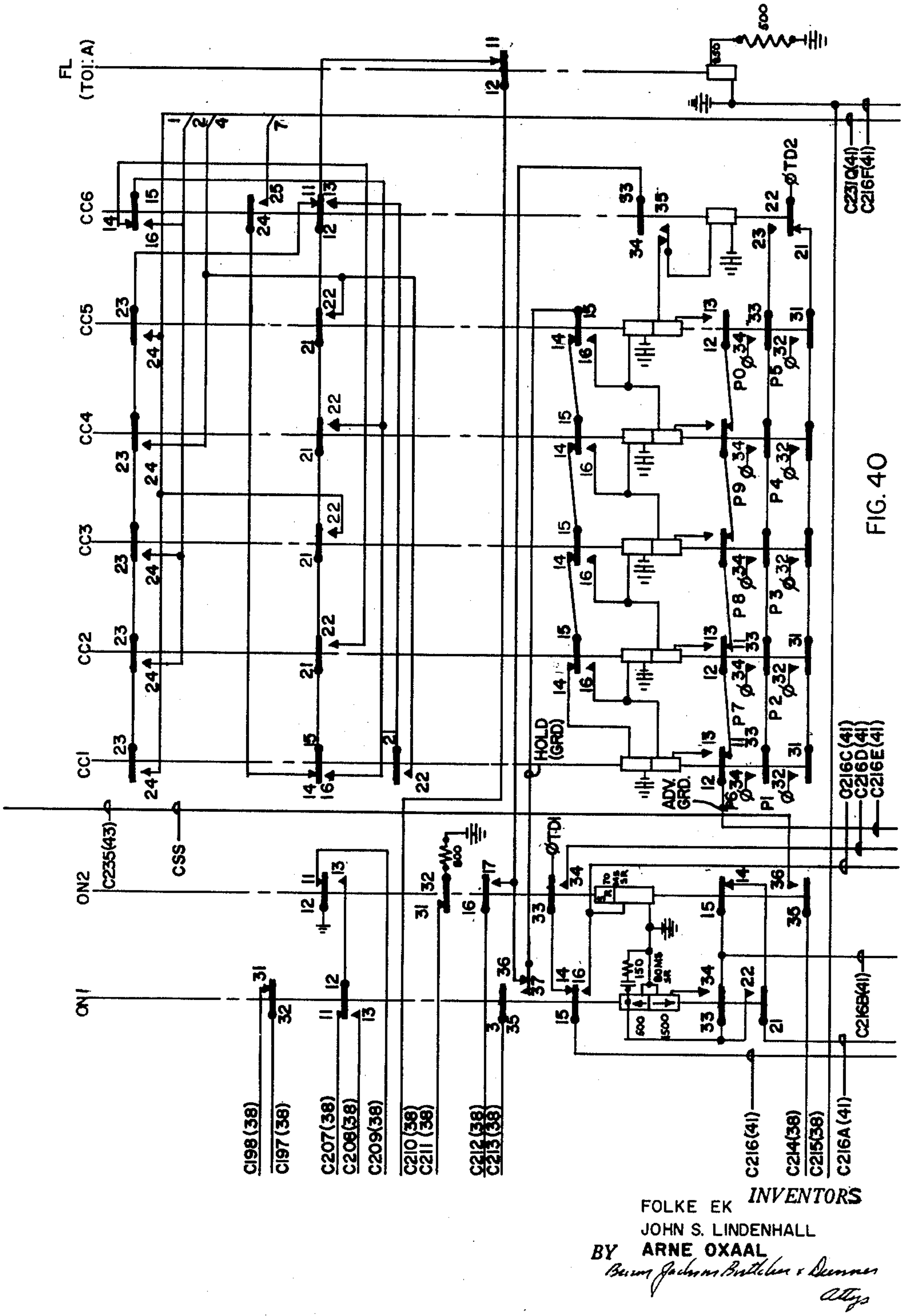

The following sets of terminals in FIGURES 40 and 41 should be considered strapped to illustrate the operation of the register responsive to the dialing of the called number CHestnut 6–1000.

| | |
|---|---|
| P2 to PC | PC6 to RQ6 |
| P4 to PC4 | RQ5 to RP2 |
| PC3 to RP1 | TD1 to LH |
| P6 to PC7 | BH to TD2 |

*Dialing "2" (First Digit)*

As the calling subscriber dials "2," pulsing relay P pulses twice, driving the counting chain as noted above, and as relay P releases on the break of the second pulse, relay CC2 operates. Relay P reoperates on the make of the second pulse to release relay CC1, and to initiate the release of relay ON1 which releases after an interval.

With off-normal relay ON1 released, a circuit is completed to operate register bin relay 12(42) of the first register bin over the path from ground (FIG. 40), contacts ON2–12, 13; ON1–12, 11; C207(38), contacts H–32, 33; C210(40), FL–12, 11; CC6–11, CC2–23, 24; lead 2; C231Q(41), C231Q(42), lead 2, contacts RA1–15, 14; lead 12, cable, lead 12, winding of relay 12 to battery.

Off-normal relay ON1 in releasing also operates analyzing relay PC(41) over the path from ground (FIG. 38), H–15, 16; C224(41); C216(40); ON1–15, 14; terminal TD1 strapped to terminal LH (FIG. 41); contacts RQ2–38, 37; terminal BH strapped to terminal TD2 (FIG. 40), contacts CC6–22, 21; CC2–31, 32; terminal P2 strapped to terminal PC, lower winding of relay PC(41) to battery. Analyzing relay PC operates and locks over its contacts PC–28, 27; C224–39 and H–16, 15; to ground.

Relay ON1 at contacts ON1–35, 36, 37 transfers the holding circuit of counting chain relay CC2 over contacts ON1–36 and ON2–17, 16, and at contacts ON1–15, 16 opens the circuit of off-normal relay ON2 which releases after an interval.

Analyzing relay PC operates and at its contacts PC–37 breaks dial tone. When relay ON2 releases, it opens the circuit of relay CC2 which releases. The release of counting chain relay CC2 opens the original operating circuit of relay 12(42), whereupon register advance sequence relay RA1(42) operates in series with relay 12 over the path from battery through the winding of relay 12, winding of relay RA1, FL–14, 13; C216(42); C224(39); H–16, 15: to ground, relay RA1 having been shunted by the original operating ground of relay 12 until relay ON2 released, removing the digit registration ground. With relay RA1 operated, the next digit received will go into the next bin.

Figure 42:
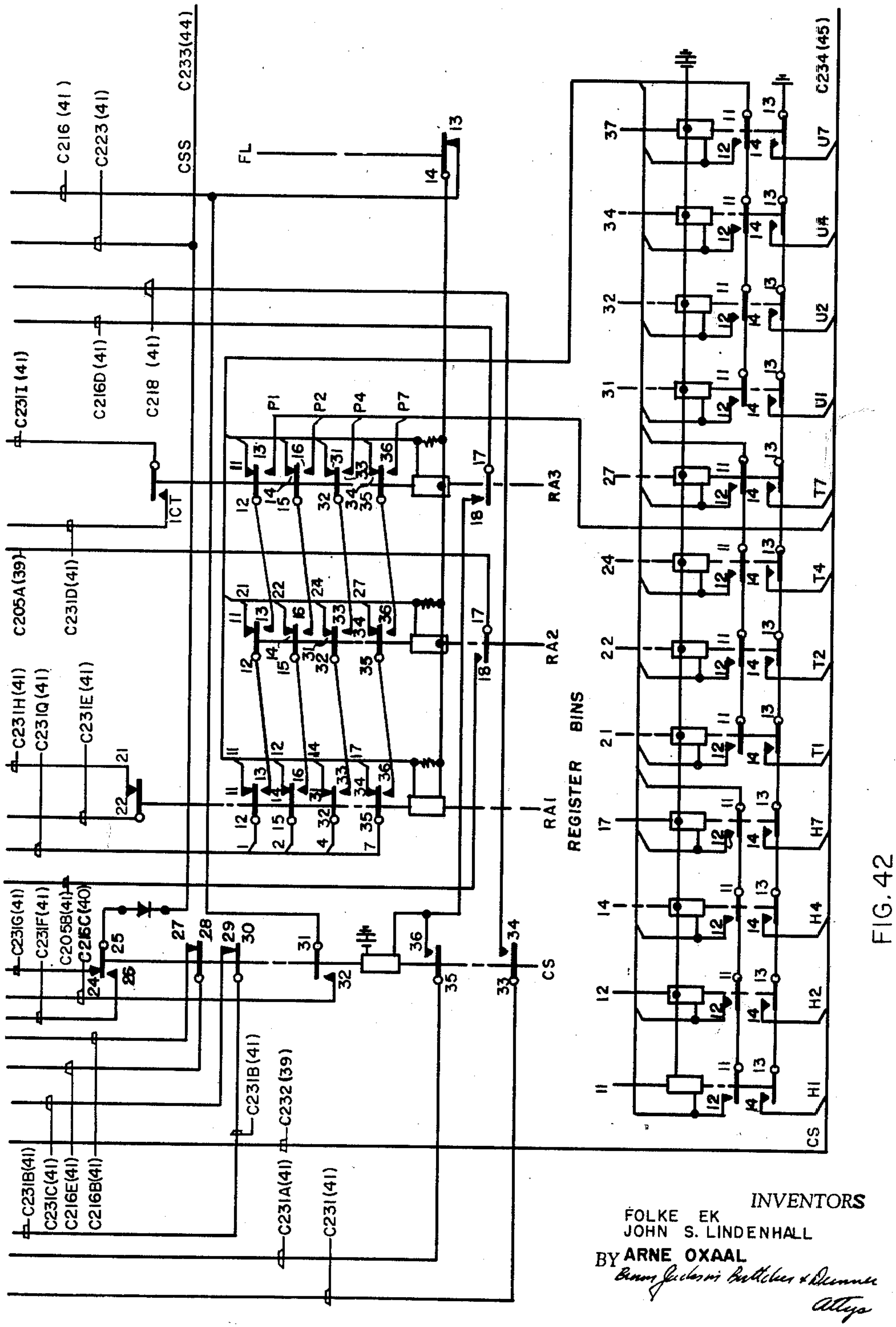

It should be understood that the first register bin comprises relays 11, 12, 14, and 17 in FIGURE 42; the second register bin comprises relays 21, 22, 24, and 27 in FIGURE 42; and that the third register bin comprises relays 31, 32, 34, and 37 in FIGURE 42.

Storage in register bins comprises the following pattern using the first bin for example:

| Digit | Relays Operated |
|---|---|
| 1 | **11** |
| 2 | **12** |
| 3 | **11**, **12** |
| 4 | **14** |
| 5 | **11**, **14** |
| 6 | **12**, **14** |
| 7 | **17** |
| 8 | **11**, **17** |
| 9 | **12**, **17** |
| 0 | **14**, **17** |

Thus, in the present example, the operation of relay 12 in bin 1 in effect has stored digit 2 therein.

*Dialing "4" (Second Digit)*

As the calling subscriber dials digit "4," relay P pulses four times, driving the counting chain to the position in which relay CC4 is operated. When relay P reoperates at the end of the fourth pulse, relay ON1 slowly releases. Relay ON1 in releasing operates register relay 24 in the second bin to store digit "4"; operates relay RP1(41); and opens the circuit of slow release relay ON2. The operating circuit for bin relay 24 extends from ground (FIG. 40), over contacts ON2–12, 13; ON1–12, 11; C207(38); H–33, 33; C210(40); FL–12, 11; CC6–12,

11; CC4–24; lead 4, cable, C231Q(41), C231Q(42), lead 4, RA1–32, 33; RA2–32, 31; lead 24, cable, lead 24, winding of relay 24 to battery. Operation of bin relay 24 effectively stores digit "4" in the second bin.

Analyzing relay RP1 (FIGURE 41) operates over the path from ground (FIG. 38), H–15, 16; C224(39); C224(41); C216(40); ON1–15, 14; ON2–33, terminal TD1 strapped to terminal LH(41), RO2–38, 37; terminal BH strapped to terminal TD2(40); CC6–21; CC4–32; terminal P4 strapped to terminal PC4(41), PC–15, 16; terminal PC3 strapped to terminal RP1(41), relay RP1, to battery.

When off-normal relay ON2 releases, it releases counting chain relay CC4 and operates register advance relay RA2 which was shunted. The release of relay CC4 removes ground from terminal RP1(41) operating relay RQ1(41), which was shunted, in series with relay RP1(41) over the path which extends from battery, over relay RP1, RP1–26, 28; relay RQ1, C224–39, C224–38, H–16, 15 to ground.

*Dialing "6" (3rd Digit)*

As the calling subscriber next dials digit "6," the pulsing relay P pulses six times to drive the counting chain to the position in which relays CC6 and CC1 are operated, relay CC6 becoming operated on the break period of sixth pulse and relay CC1 becoming operated when relay P reoperates following the sixth break.

The reoperation of pulsing relay P also releases off-normal relay ON1 which operates bin relays 32 and 34 of the third register bin to register digit "6"; operates analyzing relay RP2, and opens the circuit of slow release off-normal relay ON2.

Relays 32 and 34 operate over makes of register advance relays RA1 and RA2 and breaks of relay RA3, the circuit of relay 32 extending from ground (FIG. 40), ON2–12, 13; ON1–12, 11, C207(38); H–32, 33; C210(40); FL–12, 11; CC1–15, 16; CC6–16, 15; lead 2, cable C231Q(41); lead 2, RA1–15, 16; RA2–15, 16; RA3–15, 14; lead 32, cable, lead 32, relay 32, to battery. The circuit of relay 34 can be traced from the same ground through FL–12, 11; CC6–12, 13; CC1–21, 22, lead 4, cable C231Q(41); lead 4, RA1–32, 33; RA2–32, 33; RA3–32, 31; call lead 34, and relay 34 to battery.

Analyzing relay RP2 operates over the path from ground (FIG. 38), contacts H–15, 16; C224(30); C224(41), C216(40); ON1–15, 14; terminal TD1(40), strapped to terminal LH(41), RQ2–38, 37; terminal BH strapped to terminal TD2(40), CC6–22, 23; CC1–33, 34; terminal P6(40) strapped to terminal PC7(41); PC–12, 13; terminal PC6 (FIG. 41) strapped to terminal RQ6(41), RQ1–16, terminal RQ5(41) strapped to terminal RP2(41), relay RP2, to battery. Relay RP2 operates and at its contacts RP2–15 prepares a circuit in series with RQ2 but relay RQ2 is shunted by the operating ground of relay RP2.

Analyzing Relay RP2 operates "flush" relay FL(40) over the path from ground (FIG. 41), RQ2–27, 28; RP2–11, 12; C216F(40); relay FL, 500 ohm resistor to battery. Relay FL operates and at its contacts FL–13, 14 releases bin relays 12 and 24 and register advance relays RA1 and RA2; and at its contacts FL–12, 12; releases bin relays 32 and 34. Accordingly, relay RA3 does not operate. When off-normal relay ON2 releases, it opens its contacts ON2–17 to release relays CC1 and CC6.

With relay CC1 released, the ground shunt is removed from relay RQ2(41) which operates in series with relay RP2. Analyzing relay RQ2 at RQ2–27 releases relay FL and opens the ground fed to terminal TD2(40) to prevent false level signals on further dialing of the local number.

Thus as a result of the receipt of the local office code CHestnut 6 (246), relay RQ2 has been operated, marking the call as a "call to local" and the three storage bins have been flushed in preparation for the last four digits of the 2–5 directory number.

*Dial "1" (4th Digit)*

As the calling subscriber dials digit "1," relay P pulses once, and on the break of the first pulse, off-normal relay ON1 operates and in turn operates relay ON2. When relay P reoperates on make of the first pulse, it operates counting chain relay CC1 and releases relay ON1. Upon the release of ON1, registration ground operates bin relay 11. The release of relay ON1 in turn releases relay ON2 and the release of relay ON2 releases relays CC1 to operate register advance relay RA1. Digit "1" is thus stored in the first bin.

*Dial "0" (5th Digit)*

As the calling subscriber dials digit "0," relay P pulses ten times. On the sixth pulse, relay CC6 operates and locks as usual. When relay P releases on the break of the tenth pulse relay CC5 operates. When relay P reoperates on the make of the tenth pulse, it releases relay CC4 and opens the circuit of relay ON1 which releases after an interval.

Relay ON1 operates bin relays 24 and 27 and opens the circuit of relay ON2 which releases after an interval. Relay ON2 releases relays CC6 and CC5, operating register advance relay RA2.

Digit "0" is thus stored in the second bin.

*Dial "0" (6th Digit)*

As the calling subscriber dials digit "0," pulsing relay P pulses ten times. On the sixth pulse counting chain relay CC6 operates and locks. When pulsing relay P releases on the break of the tenth pulse, counting chain relay CC5 operates and when pulsing relay P releases on the break of the tenth pulse, counting chain relay CC4 and off-normal relay ON1 release. Relay ON1 operates bin relays 34 and 37 and releases relay ON2. Relay ON2 releases relays CC6 and CC5 to operate register advance relay RA3.

Digit "0" is thus stored in the third bin.

*Dial "0" (7th Digit)*

As the calling subscriber dials digit "0" one more pulsing relay P pulses ten times. On the sixth pulse relay CC6 operates and locks. When relay P releases on the tenth pulse, relay CC5 operates. When relay P reoperates on the make of the tenth pulse, it releases relay CC4, and opens the circuit of relay ON1 which releases after an interval.

The fourth digit "0" is thus registered and stored on the counting chain. At this time, the first three digits have been analyzed and since it is a local call, the first three digits have been "flashed" from the register, and only the last four digits are stored. The four digits 1000 have been received and are stored in the register.

*Call Signal to Register Guard and Number Group Link*

In that each of the digits have been dialled for the local call, a call signal is sent to the register guard and number group link circuit. The purpose of the register guard is to prevent more than one register in a number group (or By-Path Link Circuit) at any given time.

More specifically, as relay ON1 releases the local call signal relay CS(42) operates over the path from ground, H–15, 16 (FIG. 38); C224(39); C224(41); C216(40); ON1–15, 14; ON2–33, 34; C216D(41); C216D(42); RA3–17, 18; relay CS to battery. Local call relay CS(42) operates and locks over CS–36, 35; C231A(41); C224–39; C224–38 and H–16, 15 to ground and opens the circuit of off-normal relay ON2.

Local call signal relay CS furnishes ground to hold ON2 over the path from ground, H–15, 16; C224–39; C224–41; C216(42); CS–31, 32; C216C(41); relay ON2, to battery. Relay ON2 at its closed contacts ON2–17, 16 (FIG. 40) holds the counting chain operated, thus permitting the counting chain to store the last digit of the directory number which was dialed.

Relay CS also initiates a call signal to the register guard circuit for the purpose of engaging a number group selector and link circuit. Since four registers may make application to the same guard circuit, the guard circuit has an "R" relay corresponding to each register. We shall assume that the register shown is register #1. Accordingly, relay CS operates relay R1(44) in the guard circuit of FIGURE 44 over the path from ground, RD–12, 11 (FIG. 38); BY–35, 36; C218(41); C218(42); CS–33, 34; C231(41); MI–22, 21(39); C232–42, lead CS; C234(45); lead CS; C217C(44); winding of relay R1, lead 1, cable, lead 1, RC1–11, 12; C252(46); RST–17, 18; TO–33, 34; to battery. Relay R1 operates and locks to the same battery over contacts R1–33, 35, C253(46), TO–33, 34 to battery.

Ground relay R1(44) for register #1 at contacts R1–13, 14 operates guard common relay RC1(41) over the path from ground, R1–13, 14; relay RC1 to battery. Relay RC1 operates and at its contacts RC11, RC1–14, RC1–21, and RC1–31 removes the battery for the other three R relays associated with the registers in the group. By this means, other registers in the group seeking to call in the register guard must wait until the guard is free. Guard relay R1 also operates the associated register link relays C1(45) and C1A(45) over the path from ground (FIG. 44), RC1–36, 37; R1–15, 16; and over the windings of relays C1 and C1A in parallel to battery.

*Selection of Number Group and Transfer of Directory Number From Register to Number Group*

The number stored in the present example is 1000, and it is apparent therefrom that the directory number stored in the register is made up of the thousands, hundreds, tens, and units digits (assuming terminal per station operation).

At this time, the stored information is extended to the number group selection circuit and into the number group in turn operates the associated link relays to pass the directory number into the number group.

More specifically, when relay C1(45) operates, the digit "1" stored in the first bin effects the operation of thousands selection relay TH1(46) over the path from ground (FIG. 42), contacts 13, 14 of bin relay 11, lead H1, cable, C234(45), lead H1, C1–11, 12; C242(46); RST–12, 11; lead 1, cable, lead 1, relay TH1 to battery. Relay TH1 operates and locks over TH1–17, 18; C251–44; RC1–18, 17; to ground. Relay TH1(46) also completes a circuit to holding ground relay HG(46) over the path from ground (FIG. 44), RC1–17, 18; C251(46), TH1–31, 32, and relay HG, to battery.

Relay HG operates and completes a call signal to the number group for the thousands group as determined by relay TH1 over the path from ground, HG–22, 23; TO–14, 15; TH1–12, 13; TH2–35, 34; TH4–32, 31; TH7–15, 14; lead 1, C257–47, lead 1, terminal 1 strapped to terminal NG1 for the first number group, lead 26, cable, lead 26 to the number group–1 circuit. Such signal constitutes the call signal (1) from the first register group. It should be appreciated that any number group may have call signal leads entering it from a plurality of register groups including local originating register groups and incoming trunk register groups. Accordingly the number group circuit contains a guard circuit which allows only one register group to have access thereto at a time. Assuming that the register shown gains access to the number group, the number group places ground on the corresponding link pull (1) lead which emerges from number group–1 as lead 25, and this circuit can be traced into a cable, emerging from the cable as lead 25, through the windings of number group link relays N1(47) and N1A(47) in parallel to battery.

With the register link relays C1(45), C1A(45) and the number group link relays N1(47) and N1A(47)

operated, the hundreds, tens, and units digits of the directory number "000" are passed from the register into the number group via contacts on these relays.

More specifically, the digit "0" stored in the second bin comprising relays 21, 22, 24 and 27 by the operated condition of relays 24 and 27 is transferred to the number group over two marking circuits. The first circuit extends from ground (FIG. 42) over contacts 13, 14 over relays 24, lead T4, cable, C234(45), lead T4, C1–23, 24; lead 11, C247(46), C255(47), lead 11, N1–36, 35; lead 11, cable entering number group–1 comprising information leads 1–3, 5–24. The second circuit extends from ground (FIG. 47) over contacts 13, 14 of relay 27 via lead T7 to the number group over circuits which are similar to those described; and circuits from ground through contacts 34–14 via lead U4, and ground through contacts 13, 14 of relay 34 via lead U7 to the Number Group–1 through the cable comprising information leads 1–3, 5–24.

It will be recalled that digit "0" is stored in the counting chain by the operation of relays CC5 and CC6 and such digit must also be transferred to the number group. An information circuit for transferring the marking on relay CC5 can be traced from ground (FIG. 40), ON2–12, 13; ON1–12, 11; C207(38); H–32, 33; C210–40; FL–12, 11; CC5–21, 22; lead 4, C231Q(41); C231Q(42), lead 4, RA1–32, 33; RA2–32, 33; RA3–32, 33, lead P4, cable C234(45); lead P4, C1A–15, 16; lead 19, C247(46); C255(47); lead 19, N1A–26, 25, lead 19, and the information leads cable to number group–1. A similar information circuit for transferring the marking on relay CC6 can be traced from ground (FIG. 40), over ON2–12, 13; ON1–12, 11; C207(38), H–32, 33; C210–40; FL–12, 11; CC1–15, 14; CC6–24, 25; lead 7, C231Q(41), etc. to Number Group–1.

The directory number digits 1000 have now been transferred from the register to the number group.

*Conversion of Directory Number to Terminal Number and Party Digit*

Upon receiving the three digits of the directory number, number group–1 translates this information into thousands, hundreds, tens, units and party digits and passes this information, together with the signal for the call signal link (CSL), to the By-Path Link Circuit (FIGS. 53–56; 66–67). At the same time, a signal is returned to the register to operate relay FL in the register which flushes the bins to prevent mutilation of the information returned by the number group.

More specifically, ground is placed on information lead 22 by the number group, and this circuit can be traced as emerging from the Information Leads Cable as lead 22 (FIG. 47) through contacts N1A–33, 34; lead FL which is lead 22, cable, C255(46), lead 22(FL), C246(45), C1A–23, 24; lead FL, cable, C217(44), C217(41), lead FL, 216F(40), relay FL, to battery. Relay FL operates and at contacts FL–13 and FL–11 releases the bins and counting chain.

We shall assume that the substations on the illustrated 900 lines comprise single party lines and multiparty lines which require a total of not more than two thousand directory numbers and therefore not more than two number groups are required.

*Marking of Thousand and Hundred Groups and Selection of By-Path Link*

As noted above, when the number group has translated the number, the number group also places ground on lead 24 (CSL), emerges from the Information Leads Cable in FIG. 47, and the circuit passes through N1A–37, 38, and passes over C301(53) through the winding of relay CSL(53) of the By-Path Link Circuit to battery, operating relay CSL. (The By-Path Link Circuit comprises FIGURES 53–56; 66–67.)

Relay CSL(53) operates and closes information leads to the thousands and hundreds code relays (TH1, TH2, etc.; H1, H2 etc.), which will become operated in accordance with the information received. The TH relays have the capacity to mark one of six thousand groups (actually one of six ninety-line groups), and the H relays have the capacity to mark one of ten connector groups of ninety lines each.

Two thousand groups can be reached through one GSB module. Therefore, in order to reach four thousand groups, two GSB modules would be equipped. In order to reach six thousand groups three GSB modules would be equipped. This is indicated in the circuits drawings by showing two TH leads for the first GSB module; two more TH leads for the second GSB module. Thus the GSB module to be used is selected by the thousands code relay TH.

As illustrated, to serve 900 lines, which may consist of single party lines and multi-party lines, only one thousands terminal group requiring ten levels only of the twenty levels of the first GSB module of each of seven selectors is required. Accordingly information is required only on the first thousands lead, and the other leads allow for future expansion. As also illustrated, 900 lines comprise ten groups of ninety lines each, and information is required on all ten of the hundreds leads.

More specifically the called line 15 in FIGURE 11 "terminally" is the fifth line in the first tens group of the first switch of the first ninety line group of the first thousands group, and the number group will provide the following translation:

| | |
|---|---|
| Thousands digit | —1 |
| Hundreds digit (i.e., 90 line group) | —1 |
| Tens digit | —1 |
| Units digit | —5 |
| Party digit (for example) | —1 |

The operation of relay CSL(53) effects the operation of thousands relay TH1(53) in the By-Path Link Circuit over the path from battery, relay TH1, CSL–32, 31; lead TH1, C299(47), lead TH1, N1–12, 11; lead 1, information leads cable to number group-1, and lead 1 to ground placed on this lead by the number group.

Digressing, if more thousands groups were equipped the thousands relay TH1, TH2, TH4, would be operated as follows:

| | |
|---|---|
| TH2 | Second Thousand. |
| TH1 and TH2 | Third Thousand. |
| TH4 | Fourth Thousand. |
| TH1 and TH4 | Fifth Thousand. |
| TH2 and TH4 | Sixth Thousand. |

The operation of relay CSL(53) also effects the operation of relay H1(54) in the By-Path Link Circuit over the path from battery, relay H1(54), C290(53), CSL–21, 22; lead H1, C299–47, lead H1, N1–22, 21; lead 5, Information Cable to number group-1, lead 5, to ground placed thereon by the number group. The number group marks other hundreds group in the 1, 2, 4, 7 code in a similar manner.

*Selection of By-Path Link*

Relay TH1(53) located in the portion of the By-Path Line Circuit which is in the GSA module operates relays 1TH1(66) and 2TH1(66) which is located in the portion of the By-Path Link Circuit in the GSB module, the circuit extending over the path from ground (FIG. 53), CSL–17, 18, TH1–22, 23; TH2–25, 24; TH4–12, 11; TH1 lead designated 1, C294(66), lead TH1, relays 1TH1(66) and 2TH1(66) in parallel to battery.

It should be understood that the By-Path Link Circuit controls access to two common highways or by-path links, each of which comprises a plurality of conductors extending from the By-Path Link Circuits of the various register-selector groups to the connector controls of the various line groups. The By-Path Link Circuit extends a connection to one of these highways if idle. At this time, therefore, relay 1TH1(66) closes the test lead of each of the two by-path links, or "highways," to the link test relays 1TL1(55) and 1TL2(56).

Assuming both by-path links are idle, both test relays will attempt to operate. Assuming further that rotator relay LOT(55) is not operated, the operating circuit for test relay 1TL1(55) may be traced from battery (FIG. 66, lower left corner), 800 ohm resistor, terminal LK1, 1TH1-36, 35; lead TL1, C321(56), C313(55), rectifier 1TL1, relay 1TL1(55), 2TL1-33, 32; CH2-24, 23; LOT-14, 15; C315(56), 2TL2(56), 2TL2-11, 12; 1TL2-21, 22; 2TL2-33, 32; C314(55); CH2-22, 21; LOT-31, 32; C311(56); 2TL2-35, C312(55), LOT-24, 25; 2TL1-35, 36; LOT-34, 35; C306(53), CSL-14, 13 to ground.

Also, the operating circuit for test relay 1TL2(56) may be traced from battery (FIG. 66, lower left corner), 800 ohm resistor, terminal LK2, 1TH1-38, 37; lead TL2, C322(56), rectifier 1TL2, relay 1TL2(56), 2TL2-33, 32; C314(55), CH2-22, 21; LOT-31, 32; C311(56), 2TL2-35, 36; C312(55), LOT-24, 25; 2TL1-35, 36; LOT-34, 35; C306(53), CSL-14, 13; to ground.

It will be noticed that a break contact of relay 1TL2 appears in the circuit of relay 1TL1, whereas no contact of relay 1TL1 appears in the circuit of relay 1TL2, whereby relay 1TL2 in operating can take preference over relay 1TL1, so that if both links are idle, both relays 1TL1 and 1TL2 will attempt to operate but relay 1TL2 will operate and release relay 1TL1 giving link 2 preference over link 1. Of course, if link 2 had been busy, relay 1TL1(55) would have remained operated, effecting the selection of link 1.

Assuming, however, that 1TL2 is operated and 1TL1 is released, the operation of relay 1TL2(56) effects the operation of slave relay 2TL2(56) over the path from its operating ground through contacts 1TL2-22, 23; and the winding of 2TL2 to battery. Relay 2TL2 operates and locks over 2TL2-34, 36; C312(55), LOT-24, 25; 2TL1-35, 36; LOT-34, 35; C306(53) and CSL-14, 13 to ground. Relay 2TL2 also lock relay 1TL2 over contacts 2TL2-33, 31 to its locking ground.

Relay 2TL2(56) operates and connects ground over its contacts 2TL2-13, 14 to test lead TL2, replacing the ground through the winding of relay 1TL2, thus busying link 2 to other By-Path Link Circuits. Relay 2TL2(56) also marks lead PL2 from ground (FIG. 53) through CSL-15, 16; C304(55), C304(56), 2TL2-15, 16; to lead PL2, C319(66), lead PL2, C319(66), 2TH1-37, 38; C389(67), and 3LC2(67) in parallel to battery.

It has been assumed that relay LOT(55) was in the non-operated position, which gave preference to link-2. Had relay LOT been in the operated position, however, no contact of relay 2TL2(56) would have appeared in the operating circuit of relay 1TL1(55), whereas a contact of relay 1TL1 would have appeared in the circuit of 1TL2, in which case relay 1TL1 could have taken preference over relay 1TL2, giving link-1 preference over link-2 and link-1 would have been selected, operating relays 1LC1(67), 2LC1(67), and 3LC1(67).

More specifically, if relay LOT had been operated and both links idle, the circuit of relay 1TL1 would have been traced from resistance battery on lead TL1, C313(55), rectifier 1TL1, relay 1TL1, 2TL1-33, 32; CH2-24, 23; LOT-26, 25; 2TL1-34, 36; LOT-33, 31; C311(56); 2TL2-35, 36; C312(55); LOT-36, 35; C306(53); CSL-14, 13; to ground.

The circuit of 1TL2 would have been traced from resistance battery on lead TL2, rectifier 1TL2, relay 1TL2, 2TL2-33, 32; C314(55); CH2-22, 21; LOT-23, 22; 2TL1-11, 12; 1HL1-21, 22; 2TL1-33, 32; CH2-24, 23; LOT-26, 25; 2TL1-35, 36; LOT-33, 32; C311-56; 2TL2-35, 36; C312(55); LOT-36, 35; C306-53, to ground.

Accordingly, if relays 1TL1 and 1TL2 both had tried to operate, relay 1TL1 would have taken preference.

Relay 1TL1(55) would have effected the operation of slave relay 2TL1(55) over the path from ground through contacts 1TL1-22, 23 and the winding of relay 2TL1 to battery. Relay 2TL1 locks over 2TL1-34, 36; LOT-33, 31; C311(56); 2TL2-35, 36; C312(55); LOT-36, 35; C306(53); CSL-14, 13; to ground.

Relay 2TL1 would have operated and locked to ground over contacts 2TL1-34, 36; LOT-33, 31; C311(56); 2TL2-35, 36; C312(55); LOT-36, 35; C306-53, CSL-14, 13 to ground.

Relay 2TL1 at contacts 2TL1-33, 31 also locks relay 1TL1 to its locking ground, and at contacts 2TL1-13, 14, connects ground over C309(56) to terminal TL1 to busy link-1 to other By-Path Link Circuits. Relay 2TL1(55) would also have operated relays 1LC1(67); 2LC1(67); and 3LC1(67) over the path from ground (FIG. 53), CSL-15, 16; C304(55); 2TL1-15, 16; C308(56); lead PL1, C320(66); lead PL1, 2TH1-35, 36; C388(67); and the windings of relays 1LC1, 2LC1, and 3LC1 in parallel to battery.

Relay LOT operates and releases on successive calls, alternately giving preference to link 1 and link 2 as follows.

Relay CSL(53) operates and releases (as indicated above) on every call to the By-Path Link Circuit. On the first call, relay LOTA operates from ground (FIG. 53), CSL-11, 12; C307(55); LOT-12, 11; C318(56); relay LOTA(56); 660 ohm resistor to battery. Relay LOTA operates and prepares a circuit through contacts LOTA-21, 22; and conductor C316(55) to operate in series with the upper winding of relay LOT to ground. Relay LOT however is shunted by the operating ground of relay LOTA. When relay CSL releases to open the operating ground, relay LOT(55) operates in series with relay LOTA.

Relay LOT operates and at contacts LOT 18-17 prepares a locking circuit over its lower winding and LOT-18, 17; C307-53; CSL-12, 11; to ground; at its contacts LOT-12, 11 holds the original path to relay LOTA open; and at its contacts LOT-12, 13 prepares a shunt to the battery supply of relay LOTA.

When contacts CSL-12 close upon the next operation of relay CSL, relay LOT(55) holds through LOT-17, 18; and relay LOTA(56) is shunted by ground through contacts LOT-12, 13 and releases.

When contacts CSL-12 open upon the release of relay CSL, relay LOT releases.

If two By-Path Link Circuits should try to seize the same link simultaneously, the test relays are so designed that two of them in parallel cannot operate through the 800 ohm resistor (FIG. 66) in the test circuit. Accordingly the operation will be blocked. In order to break such a block, the test circuit is opened intermittently by relay CH2(55), which will pulse slowly under control of relay CH1(55), if the test operation is not completed at a normal rate of speed. Relay CH1(55) which is provided with a short circuited winding to slow its operation and release, is energized through the circuit for the test relays to ground through CSL-14.

For example, if the By-Path Link Circuits associated with two selectors should both try to seize link-1 simultaneously, relay 1TL1(55) in each circuit try to operate through the 800 ohm resistor (FIG. 66) for link 1. Neither can operate, but relay CH1 in both circuits can operate over the path from battery through the upper winding of relay CH1, 1500 ohm resistor, LOT-21, 22; (with relay LOT non-operated), 2TL1-11, 12; 1TL1-21, 22; 2TL1-33, 32; CH2-24, 23; LOT-14, 15; C315(56); 2TL2-11, 12; 1TL2-21, 22; 2TL2-33, 32; C314(55); CH2-22, 21; LOT-31, 32; C311(56); 2TL2-35, 36; C312(55); LOT-24, 25; 2TL1-35, 36; LOT-34, 35; C306(53), CSL-14, 13 to ground.

Relay CH1(55) at contacts CH1-22, 21 operates relay CH2(55). Relay CH2 operates and opens the circuits of relay 1TL1 and CH1. Relay CH1 releases presently in turn releasing relay CH2. The release of relay CH2 reestablishes the circuit of relay 1TL1 and CH1.

Relays CH1 and CH2 pump in both By-Path Link Circuits attempting to seize link 1. As they are not synchronized in both circuits a difference in phase will occur allowing relay 1TL1 in one of the circuits to operate.

*Seizure of Connector Control*

At this time the By-Path Link extends information regarding the desired line including the markings to be placed upon the STT to connector control equipment, which in turn operates to set up a path between the STT and the called line in a ninety-line group. The connector control next functions in response to a signal from the STT to set up a path over the connector switch from the called line to the STT, and thereafter tests the sleeve wire of the called line for a busy, idle or lockout condition. The connector control thereafter effects ringing of busy tone in accordance with the results of the test. The connector control also includes PBX detection means for effecting a test to the indicated PBX group.

In the present example, in that the called substation is in the first ninety line group (which is called the first hundreds group), the number group operates the first hundreds relay HL(54) (FIG. 54) over the path from ground placed on Information Lead 5 by number group–1 (FIG. 47), Information Leads cable, lead 5, N1–21, 22; H1 lead, C299(53), H1 lead, CSL–21, 22; C290(54), relay H1, to battery.

Relay H1(54) operates and prepares a circuit for proceed relay PR(54) in the By-Path Link Circuit in series with relay 1A2(22) in the guard circuit of the connector control for the first group of ninety lines. If the connector control is busy, this circuit will be open at contacts AA–11 (FIG. 24) and the call will wait in the link for a fraction of a second, until the control becomes free and the battery reappears. When the connector control is idle, this circuit will be completed for the proceed relay over the path from ground through the winding of relay PR(54); H1–32, 33; H2–32, 31; H4–32, 31; H7–32, 31; lead 1; CSC cable; C289(66); lead 1; 2TH1–11, 12; C387(67); 2LC2–23, 24; call signal lead CS1 for link 2; C79(24); lead 2; C71(22); relay 1A2; lead 2; C70(24); lead 2; AA–13, 14 to battery. Assuming that rotator relay A1 is non-operated, giving preference to link guard and connect relay 1A2 (and accordingly link 2), relay 1A2 operates and locks over contacts 1A2–15, 13; C73(24); A1–11, 12; TO3–23; to battery, and at its contacts 1A2–14, disables the locking circuit of relay 1A1.

Digressing, if relay A1 had been operated, preference would have been given to link 1 in that rotator relay 1A2 would have locked over 1A2–16, 18; 1A1–17, 18; C72(24); A1–13, 12; TO3–22, 23; to battery, and rotator relay 1A1 would have had preference over relay 1A2 in case of a simultaneous landing. Relays A1 and A2 constitute a rotator which gives preference in locking to one link and then the other on alternate calls.

Link guard and connect Relay 1A2(22) operate relay AA(24) over the path from ground (22), 1A2–11, 12; C74(24) and the upper winding of relay AA to battery, which at contacts AA38, 37 prepares a locking circuit for itself over its lower winding. The operation of relay AA, which is the end relay for relays 1A1 and 1A2 which represent both links, will prevent entry into the connector control by the other By-Path Link, and in case both links have tried to enter simultaneously, will cause the release of one of them by opening the original operating circuits, whereby preference in locking becomes effective.

End relay AA operates relay 2A2(22) over the path from battery, relay 2A2, 1A2–37, 38; C69(24); AA–34, 33; to ground, and at its contacts AA–32, 31 operates relay A2(24) and shunts relay A1(24).

Secondary link connect relay 2A2 extends the operating paths for the tens storage relays CT and the units storage relays CU from the link 2 information leads into the connector control. Since we assumed that the call was for line 15, relay CT(19) is operated for the tens digit "1," and relays CU1(20) and CU5(20) are operated for the units digit "5."

Tens storage relay CT1(19) operates over the path from ground placed on information lead 9 by number group-1 (FIG. 47), information leads cable, lead 9, N1–31, 32; lead T1, C300(67), lead T1, 1LC2–11, 12; lead T1, information cable for link 2, C79(24), information cable for link 2, C62(23), C62(22), lead T1, 2A2–11, 12; lead T1, C39(21), C39(19), lead 1, relay CT1 to battery.

Units storage relay CU1(20) operates over the path from ground placed on information lead 13 by number group-1 (FIG. 47), information leads cable, lead 13, N1A–12, lead U1, C300(67), lead U1, 1LC2–21, 22; lead U1, information cable for link 2, C79(24), information cable for link 2, S62(23), C62(22), lead U1, 2A2–21, 22; lead U1, C51(21), C51(20), lead 1, relay CU1, to battery. Units storage relay CU4(20) operates over a similar path from ground placed on information lead 15 by number group-1 (FIG. 47).

At this point the line information necessary for the operation of the connector control has been received over the By-Path Link #2, and the control awaits a signal from a subscriber terminating trunk STT as chosen by a selector to handle the call.

Figure 55:
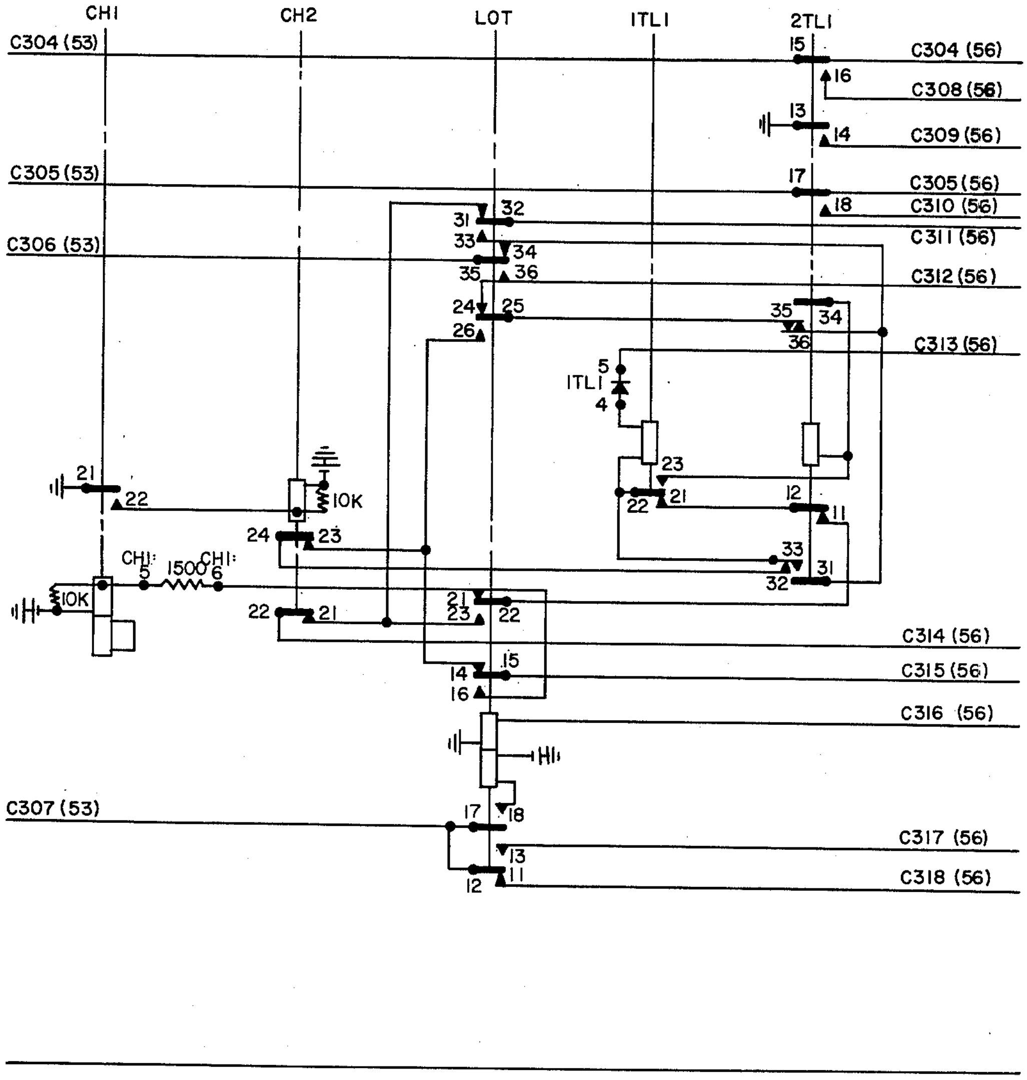
Figure 56:
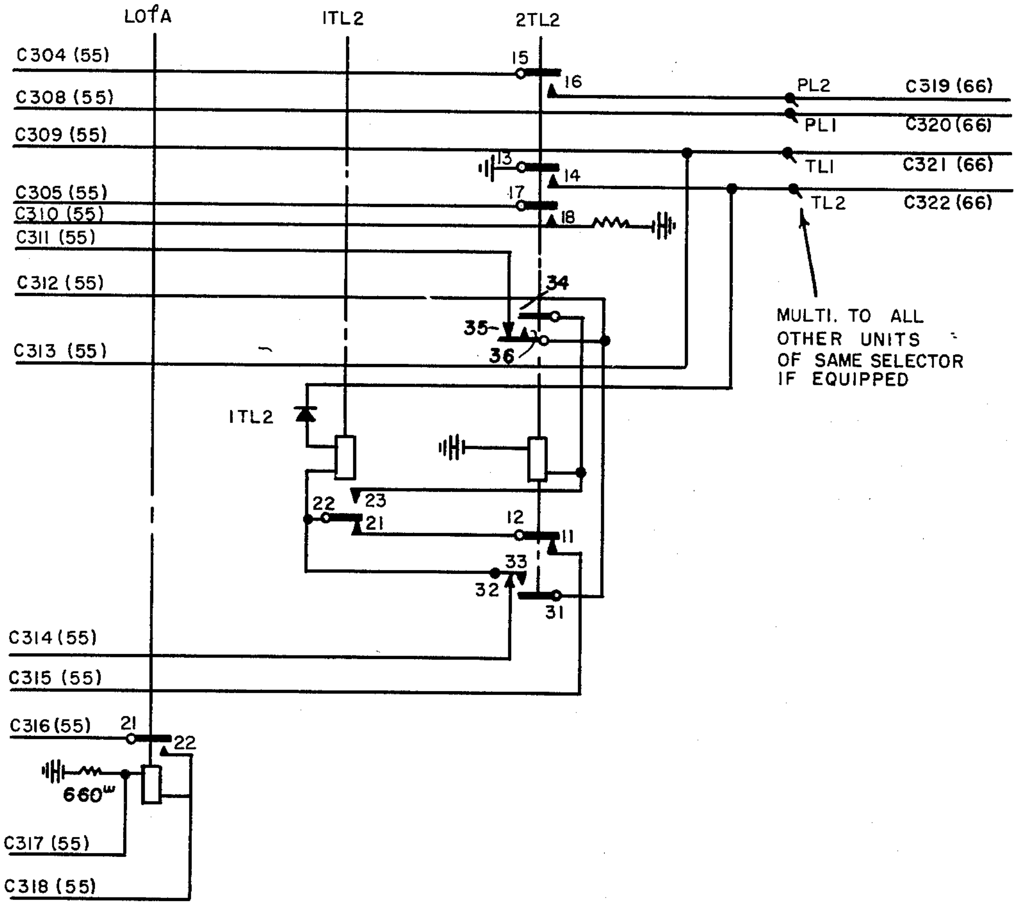
Figure 57:
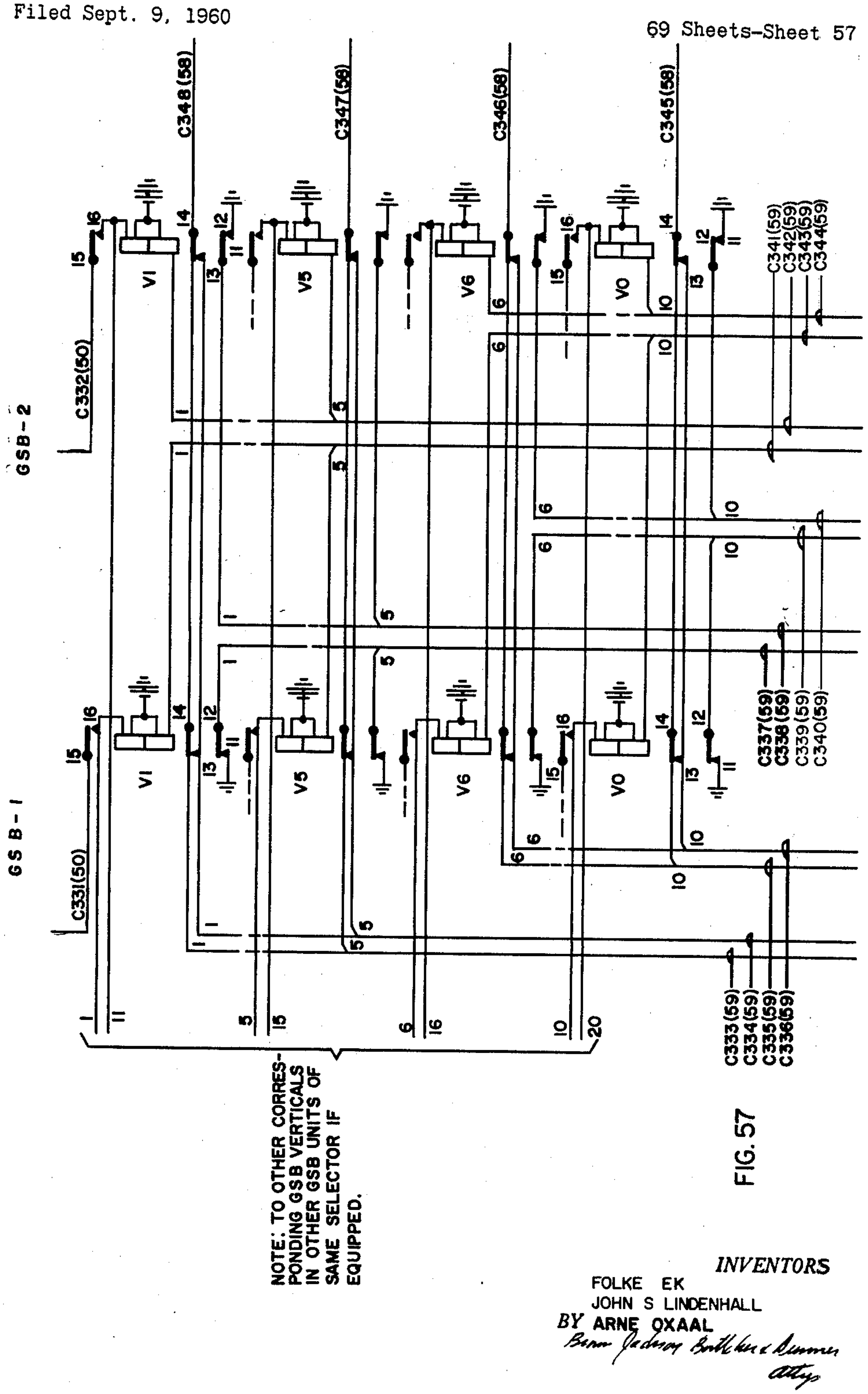

It should be observed that (1) The selection of link 1 or link 2 (FIG. 67) is dependent upon the rotator relays LOT and LOT–A(56) and the idle or busy condition of the links as reflected by relays 1TL1, 2TL1, 1TL2, and 2TL2 (FIGS. 55, 56).

Figure 53:
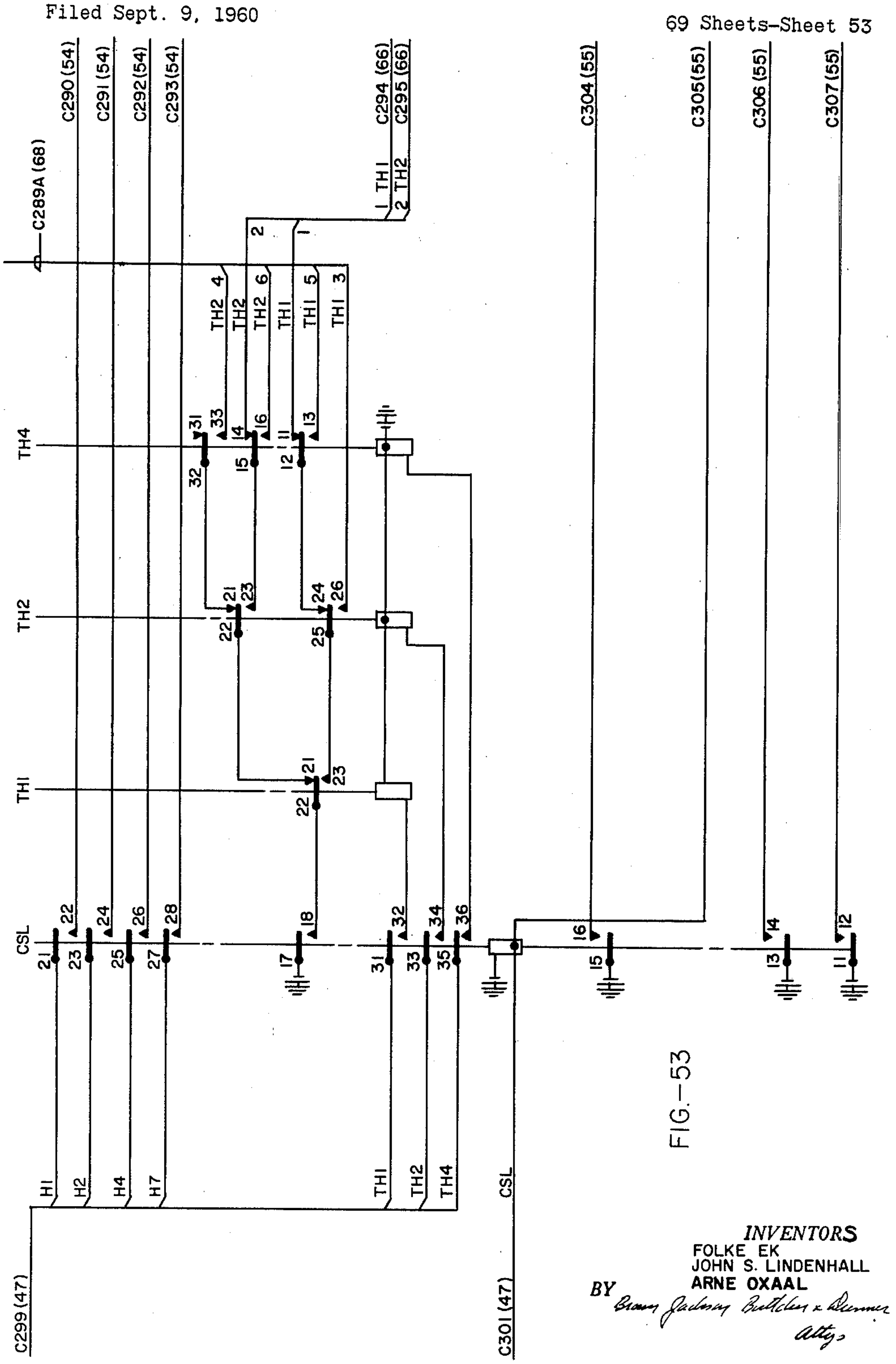
Figure 54:
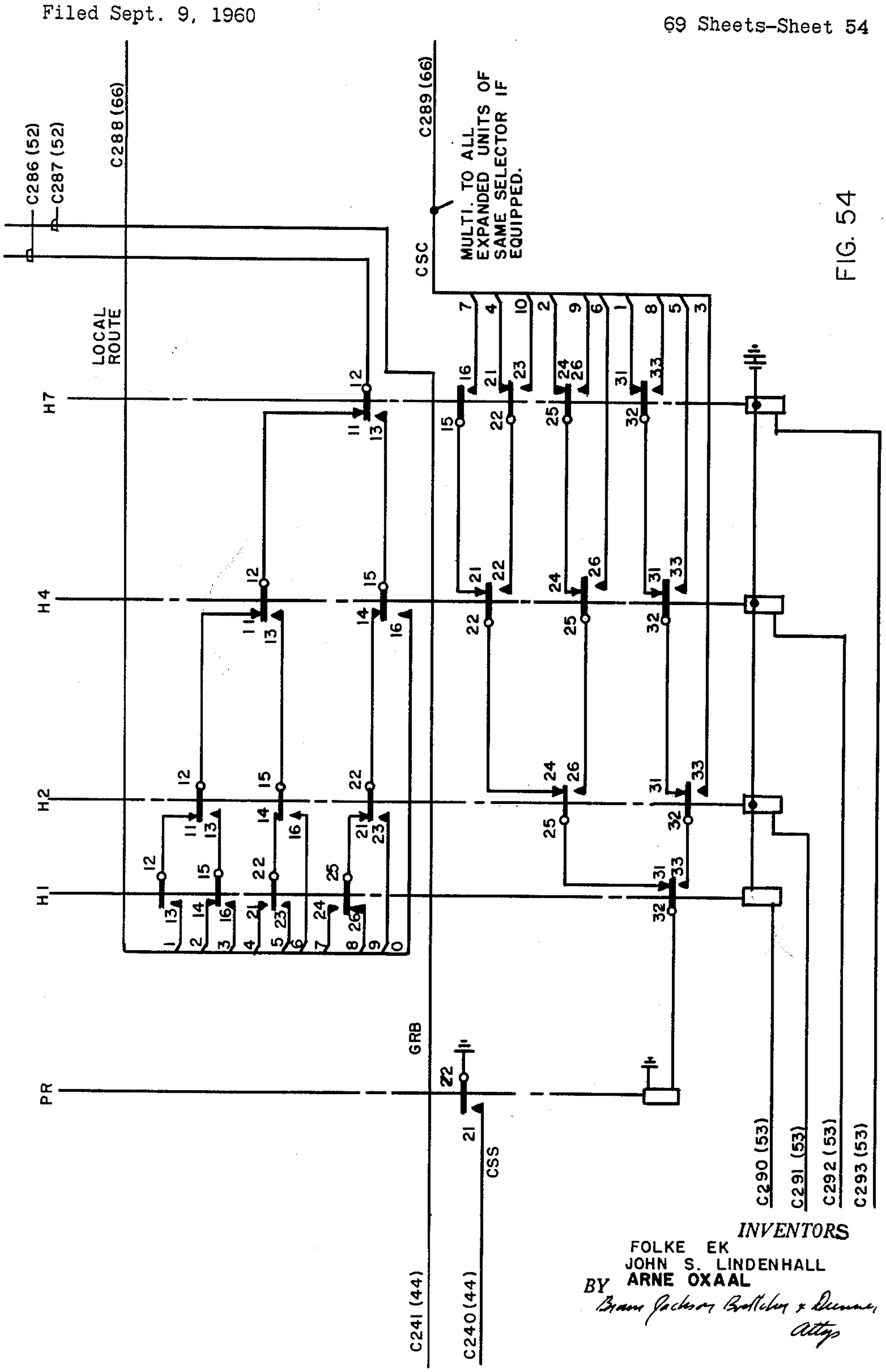

(2) The selection of the particular call signal lead for a called line group is determined:

(*a*) As to the thousands group by the operation of thousands relays TH1, TH2, TH4 of FIG. 53 which in turn control the operation of thousands relays 2TH2, and 2TH1 (FIG. 66) for the first GSB By-Path Link Circuit; similar relays 2TH2 and 2TH1 for the second GSB By-Path Link Circuit if there are four thousands groups; and similar relays 2TH2 and 2TH1 for the third GSB By-Path Link Circuit if there are six thousands groups after the following pattern:

| | | |
|---|---|---|
| TH1 | 2TH1 | 1st GSB unit |
| TH2 | 2TH2 | 1st GSB unit |
| TH1 and TH2 | 2TH1 | 2nd GSB unit |
| TH4 | 2TH2 | 2nd GSB unit |
| TH1 and TH4 | 2TH1 | 3rd GSB unit |
| TH2 and TH4 | 2TH2 | 3rd GSB unit |

(*b*) As to the hundreds group (ninety line group) by the operation of the hundreds relays H1, H2, H4, and H7 in the well known 1, 2, 4, 7 pattern. For any given link relay 2TH1 for the first thousands group in conjunction with relays H1–H7 determine call signal leads CS1–CS10 for the ten groups of ninety lines in the first thousands group; relay 2TH2 for the second thousands group in conjunction with relays H1–H7 determine call signal leads CS11–CS19 for nine groups of ninety lines in the second thousands group. Thus if there are two thousands groups there would be 19 call signal leads for link 1 and 19 more call signal leads for link 2.

(*c*) Each additional GSB unit added to the GSA unit has its own By-Path Link Circuit, two more links, and separate call signal leads which go to a different group of connector controls.

*Seizure of the Selector Control*

As noted above, operation of the proceed relay PR(54) in the By-Path Link Circuit indicates that connection has been made to an idle connector control and that the By-Path Link Circuit may seize the selector control circuit which in turn may engage a subscriber terminating trunk STT to handle the call.

Accordingly, relay PR(54) applies ground to lead CSS (call signal for the selector), to operate the guard relay GR1(43) associated with the calling register-1. Relays GR1–GR4 guard entrance from the four registers to the selector control.

More specifically, as the first register is calling, guard relay GR1(43) in the register guard operates over the path from ground (FIG. 54), PR–22, 21; lead CSS which is C240(44), lead CSS, VP–21, 22; C254(46), C248(45), C1A–38, 37; lead CSS, C217(44), C233(42), C223(41), C223(38), BY–33, 34; RD–32, 31; C214(40), ON2–35, 36; C235(43), relay GR1, lead 1, cable, lead 1, rectifier GR1, lead GRA, C296(51), lead GRA, GRA–31, 32; GRA–33, 34; lead TO, C296(43), lead TO, terminal TO strapped to terminal CC (assuming only one GSB module per selector), GR4–22, 23; GR3–22, 23 (not shown, but indicated); GR2–22, 23; GR1–22, 23; lead 1, terminal AA strapped to terminal B1, lead B1, C296(51), lead B1, GR2–31, 32 (assuming GR2 non-operated); TO–33, 34; GRA–21, 22; C278(52), CB–21, 22; CB–23, 24; CB–25, 26; upper winding of relay CB (which is the low resistance winding, through a fuse to battery. A path also can be traced from C278(52) through the lower winding of relay CB (which is the high resistance winding), in series with the low resistance upper winding through the fuse to battery, independent of contacts of relay CB. Circuit breaker CB does not operate under normal circumstances.

Relay GR1 at contacts GR1–36 applies ground to lead GRAP operating relay GRA(51) in the selector control over the path from ground (FIG. 43), GR1–35, 36; lead GRAP, C296(51), lead GRAP, and the winding of relay GRA to battery. The relay GRA is the end relay for the guard relays GR1–GR4. Relay GR1 at contacts GR1–31, 32 also operates auxiliary guard relay GC1(43) over the path from ground (FIG. 43), GR1–31, 32; lead 1, cable, lead 1, relay GC1(43) to battery.

Relay GRA(51) operates and opens the initial circuit for relay GR1(43), but relay GR1 remains locked to battery through the winding of relay GRB(52), which now operates in series with relay GR1 over the path from ground through the winding of relay GR1, GR1–21, 23; terminal AA strapped to terminal B1, lead B1, C296(51), lead B1, GR2–31, 32; TO–33, 34; C272(52), relay GRB to battery.

*Selection of an STT and Operation of the Selector Switches*

The equipment now operates to select a subscriber terminating trunk. That is, relay GRB completes the circuit for the operation of the route relay W1(58) for the wanted connector group which has been assumed to ninety line group 1, the circuit originating in the selector guard circuit and extending from ground (FIG. 43) over GC1–37, 38, lead G1, C238(44), lead G1, R1–22, 23; lead GRB, C241(54), C287(52), GRB–35, 36; C286(54), H7–12, 11; H4–12, 11; H2–12, 11; H1–12, 13; lead 1, local route cable C288(66), lead 1, 1TH1–11, 12; lead 1, cable 1–10, C378(61), lead 1, first local route terminal strapped to the first terminal of the "1WDG (1–20)" group, lead 1, C376(58), relay W1(58), lead 1, terminal 2WDG1 strapped to terminal WA, relay WA(60), to battery.

Figure 61:
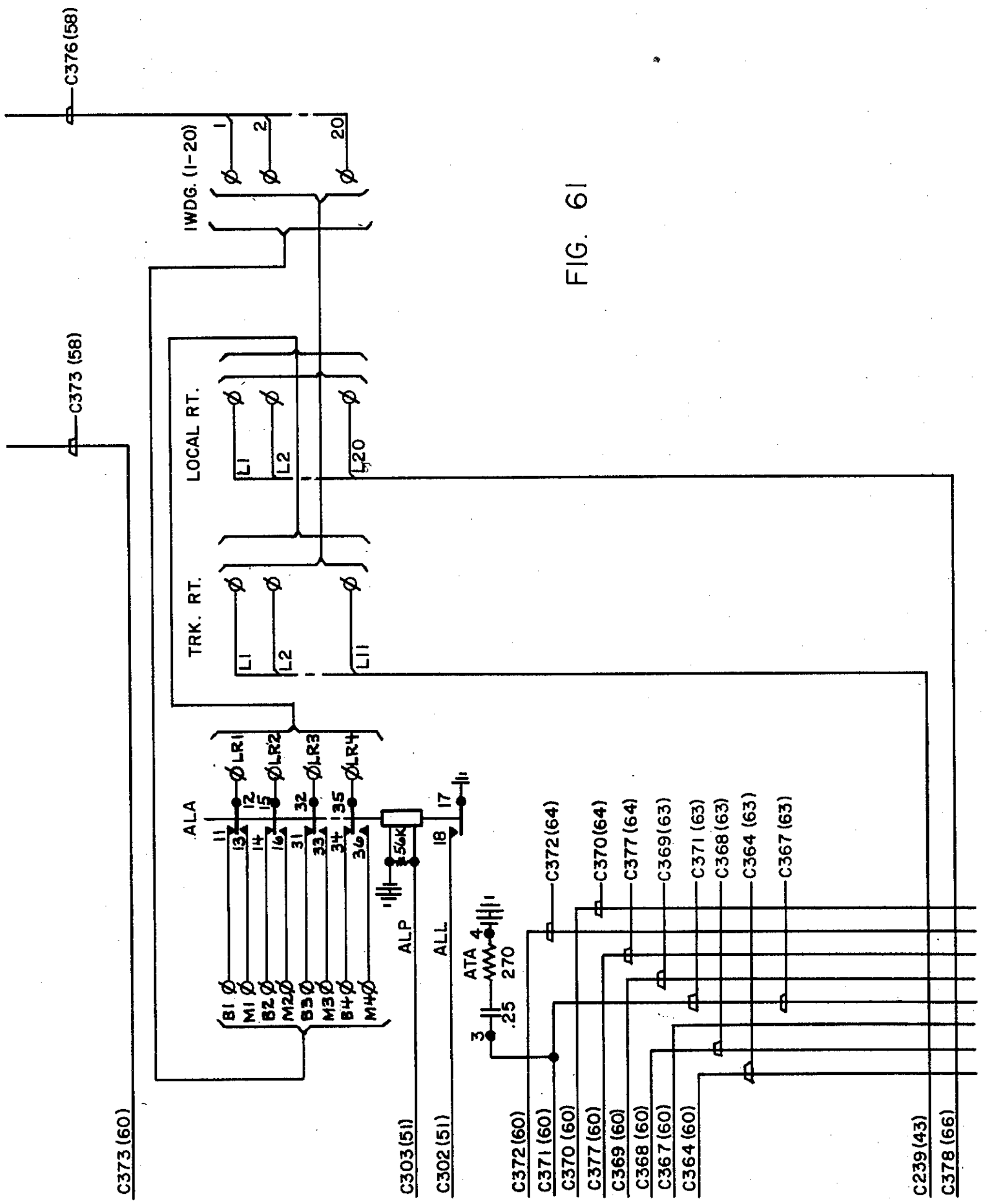
Figure 62:
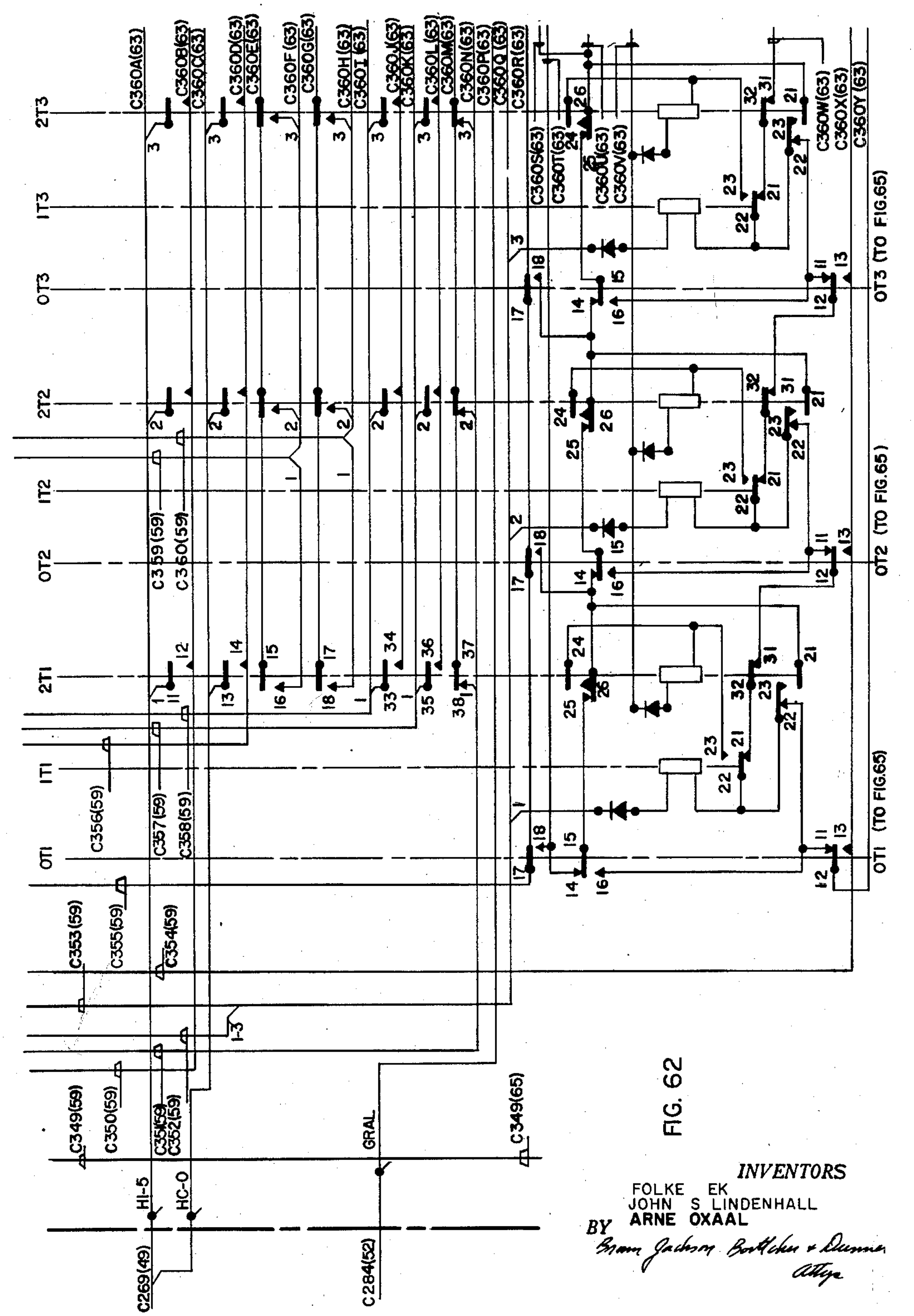

Of course, the incoming lead 1 in the upper right of FIGURE 61 could have been strapped to any one of local route terminals 1–10 (or 11–20 if more line groups were equipped) whereby the particular line group strapped would have become line group 1.

Relays W1(58) and WA(60) operate in series. Route end relay WA at contacts WA–33, 34 operates relay ATA(60) over an obvious path, and relay ATA at contacts 12, 14, etc., operates horizontal magnets H1 and HA of both GSB switches. More specifically, magnets H1(50) of GSB–1 and H1(50) of GSB–2 operate over the path from ground through the windings of the magnets in parallel, lead 1, C330(58), W1–37, 38; lead 2, C373(61), C373(60), lead 2, ATA–13, 14; lead BP2, C280(52), lead 2, lead BP2, GRB–13, 14; CB–21, 23; CB–23, 24; CB–25, 26; upper winding of relay CB, fuse, to battery.

Magnets HA(50) of GSB–1 and HA(50) of GSB–2 operate over the path from ground through the windings of these magnets in parallel, lead 11, C329(58), lead 11, W1–35, 36; lead 1, C373(61), C373(60), lead 1, ATA–11, 12; lead BP1, C280(52), lead BP1, GRB–11, 12; CB–21, 22; CB–23, 24; CB–25, 26; upper winding of relay CB, fuse, to battery.

Route relay W1(58) operates and at contacts 11, 12 extends the test leads TB of the ten STT's of line group 1 which are graded to be reached over selector level 1 into the selector control circuit. Route end relay WA(60) at contacts WA32, 31 operates connecting relay TG15(59) (assuming rotary relay GRA(54) is non-operated) over the path from ground (FIG. 60), WA–31, 32; lead TTR3, C276(51), lead TTR3, GR2–12, 11; lead TTR1, C276(60), lead TTR1, TR–11, 12; C366(59) lead 1, relay TG15, to battery. If rotator relay GRA(54) had been operated, ground sent out on lead TTR3 would have been returned on lead TTR2 and would have operated relay TG60(59) instead of relay TG15.

Connecting relay TG15 at contacts 12–21 and 23–33 further extends the test leads 1–5 for which the corresponding vertical in either or in both of the GSB switches is free, to the windings of test relays 1T1 to 1T5 (FIGS. 62–63); and at contacts 35, 36 operates relay CK15(59) over the path from ground, TG15–35, 36; relay CK15, to battery. Connecting relay CK15(59) operates a short interval after connecting relay TG15, assuring that the circuits to the test relays 1T1 to 1T5 are all closed, and connects operating ground to these relays.

Assuming that the first subscriber terminating trunk STT is idle, test relay 1T1(62) operates over the path from battery (FIG. 32), 800 ohm resistor, RS–22, 21; C125(33), CO–34, 33; BY–12, 11; C162(34), 162(35), TB–12, 11; MB–21, 22; TB lead for the first STT in the first ninety line group, C195(58), the TB lead for the first selector outlet, W1–12, 11; C348(57), contacts 14, 13 of one or both vertical magnets V1 or GSB–1 and GSB–2 if the verticals are idle, lead 1 C334(59), lead 1, TG15–24, 23; lead 1, cable 1–5, cable 1–3, C352(62), lead 1, rectifier in the conducting direction, relay 1T1, 2T1–23, 22, OT1–16, 15 (assuming that relay OT1 of the preference chain OT1–OT5 is operated), 2T1–25, 26, OT2–14, 15, 2T2–25, 26, OT3–14, 15, 2T3–25, 26; 360U(63), OT4–14, 15; 2TR–25, 26; OT5–14, 15; 2T5–25, 26; 360T(63), OT1–18, 17; C355(59), CK15–38, 37; C363(60), WA–14, 13 to ground.

Assuming the second STT idle in the first ninety line group, a similar circuit obtains for test relay 1T2 through contacts 2T2–22, 23; OT2–11, 12; 2T1–31, 32; 1T1–21, 22.

Assuming the third, fourth and fifth STT's to be idle, similar circuits obtain for test relays 1T3, 1T4, and 1T5 through break contacts of preceding test relays.

Providing that GSB verticals are available so that break contacts 13 of the vertical magnets are closed, and all five of the first five STT's are free, all of test relays 1T1 to 1T5 will attempt to operate.

Assuming preference rotator relay OT1(62) is operated, test relay 1T1 only will remain operated since the circuit for the succeeding relays is opened at 1T1–21, 22.

Trunk test relay 1T1(62) operates and at contacts 1T1–23 operates test relay 2T1(62) and end relay TA(63) in series over the path from ground through contacts 1T1–22, 23 (FIG. 62), relay 2T1, rectifier in the conducting direction, C360V(63), relay TA, lead B designated also C349B(68), RMA–14, 15, C279B(51), GRA–23, 22; C278(52), CB–21, 22; CB–23, 24; CB–25, 26; upper winding of relay CB, fuse, battery.

Test relay 2T1 operates and completes checking circuits from the verticals V1 of switches GSB–1 and switch GSB–2 to the winding of relays VR1(64) and VR2(64) respectively. One or both of relays VR1 and VR2 will operate accordingly as one or both of the verticals V1 of switches GSB–1 and GSB–2 are free, but only one will remain operated depending on which of the leads VR1 or VR2 is connected to battery by the preference alternate relay GR2(51).

The circuit for preference relay VR1 can be traced from ground (FIG. 57), contacts 11, 12 of vertical V1 of GSB–1, lead 1, C337(59), lead 1, CK15–11, 12; lead 1, C357(62), lead 1, 2T1–36, C360L(63); C393(64), relay VR1, VR1–16, rectifier VR1, VR2–14, 15; VR1–14, 15; lead VR1, C277(51); lead VR1, GR2–34, 35; (assuming alternator relay GR2 is non-operated), C278(52), CB–21, 22; CB–23, 24; CB–25, 26; upper winding of relay CB, fuse, battery. The circuit for preference relay VR2 can be traced from ground (FIG. 57), contacts 11, 12 of vertical V1 of GSB–2, lead 1, C338(59), lead 1, CK15–23, 24; lead 1, C358(62), 2T1–33, 34; C360J(63), C392(64), relay VR2, VR2–16, rectifier VR2, VR2–14, 15; VR1–14, 15; to battery on lead VR1 as described above.

Accordingly, assuming alternator relay GR2(51) to be non-operated, relay VR1 can take precedence over relay VR2, and vertical V1 of GSB–1 will be chosen instead of vertical 2 of GSB–2 if both are idle. However, if alternator relay GR2(51) were operated, vertical V1 of GSB-2 would be chosen.

Assuming that preference relay VR1(61) remains operated, circuits are completed to operate the horizontal magnets in the GSA switches. The circuit for operating the horizontal HA magnets (FIGS. 48 and 49) can be traced from ground through these magnets in parallel, C271(64), VR1–33, 32; VR2–32, 31; C372(61), C372(60), ATA–15, 16; lead BP3, C280(52); lead BP3, GRB–15, 16; CB–21, 22; CB–23, 24; CB–25, 26; upper winding of relay CB, fuse, battery. Hereinafter such battery source is identified as "CB" battery. It should be noted that relay VR1 gives precedence to GSB–1 and GSB–1 is reached by means of the horizontals controlled by the HA magnets of the GSA switches. Accordingly, preference relay VR1 determines that magnets HA rather than HB be pulled, the circuit for operating the horizontal H1 magnets (FIGS. 28 and 49) extending from ground through these magnets in parallel, C269(62), cable H1–H5, lead 1, 2T1–11, 12; C350(59), TG15–37, 38; C364(60), C364(61), C364(63), TA–17, 18; C371(61), C371(60), ATA–17, 18, lead BP4, C280(52), lead BP4, GRB–17, 18, to "CB" battery.

It should be observed that connecting relay CK15(59) operated connecting relay VP15(59) over the path from battery, relay VP15(59), CK15–35, 36; lead 2, C366(60), lead 2, TR–31, 32, lead TTR1, C276(51), lead TTR1, GR2–11, 12; lead TTR3, C276(60), lead TTR3, WA–32, 31 to ground. Relay VP15 operated and at contacts VP15–12 prepared vertical pulling circuits for the GSB switches. Now with relay VR1 operated, vertical magnet V1 of the GSB–1 switch is energized over the path from battery (FIG. 57), lower winding of vertical V1, lead 1, C341(59), lead 1, VP15–12, 11; lead 1, C359(62), lead 1, 2T1–16, 15; C360E(63), C390(64), VR1–36, 35; VR2–35, 34; C370(61), C370(60), ATA–25, 24, lead GP, C280(52), lead GP, GRB–34, 33; to ground. Magnet V1(57) will operate and lock over its upper winding and contacts 15, 16 to ground on the lead S when such ground appears.

Back-tracking, it should be appreciated that selector control guard relay GR1(43) operated trunk test timing relay X(52) over the path from battery, relay X, lead P also designated C282(59), lead P strapped to lead PG, VP60–34, 33; VP15–34, 33; lead GX strapped to lead G1, also designated C297(43), lead G1, GR1–34, 33; to ground. Relay X operates preparatory to measuring the time allotted for the testing of trunk STT.

Timing relay X at contacts 33 operates relay Y(52) over the path from battery, relay Y, X–33, 31 lead Y also designated C285(63), terminal Y strapped to terminal YP, C394(64), VR1–12, 11, VR2–12, 11, to lead R strapped to lead GY which also is designated C349(63), C349(65), lead GY, C349(62), lead GY connected to terminal G1, C297(43), lead G1, GR1–34, 33 to ground. Relay Y operates and at contacts Y–31 prepares to determine the time for the closure of lead VP after a successful trunk or STT test, at its contacts Y–31, holds the busy lead BY open, and at contacts Y–14, closes a circuit to make relay X slow release.

When signal relay VP15(59) operated to transmit the ground to the GSA vertical, the circuits for relay X were open but, being slow to release, relay X remained in the operated position during the short time required for the successful test for an idle STT, and when test relay TA(61) operated, a holding circuit was completed for timing relay X over the path X–14, 13 (FIG. 52), lead XL designated C281(63), lead XL, TA–23, 22 to ground.

When preference relay VR1(61) operates contacts VR1–11 open the circuit of timing relay Y(52) releasing relay Y.

The relase of timing relay Y effects the operation of vertical magnet V1 of the first vertical of the GSA–1 switch (FIG. 48) over the path from battery, vertical V1, lead VP, C196(37), lead VP, RC–36, 35; C197(38), C197(40), ON1–31, 32; C198(38), BY–18, 17; lead VP, C222(41), C236(43), lead VP, GR1–11, 12; lead VP, C296(51), lead VP, C275(52), Y–12, 11; lead VPG also designated C283(63), lead VPG, TA–32, 31; to ground. Vertical magnet V1(48) locks over the path from battery through the upper winding, V1–12, 11; lead S, C196(37), lead S, RC–17, 16; lead FS, C198(38), BY–18, 17; lead VP to ground as traced above through TA–32 (FIG. 63).

Figure 63:
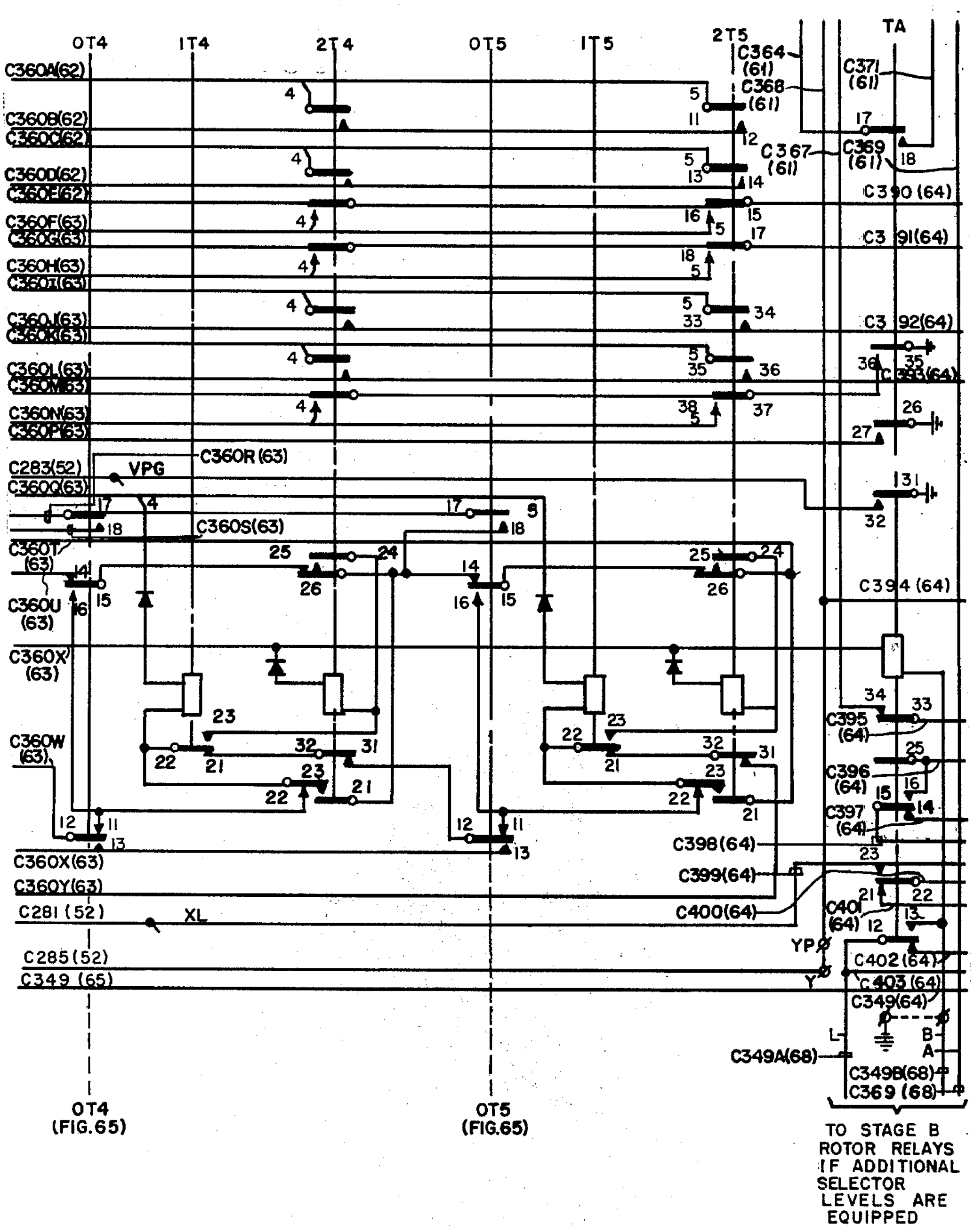
Figure 64:
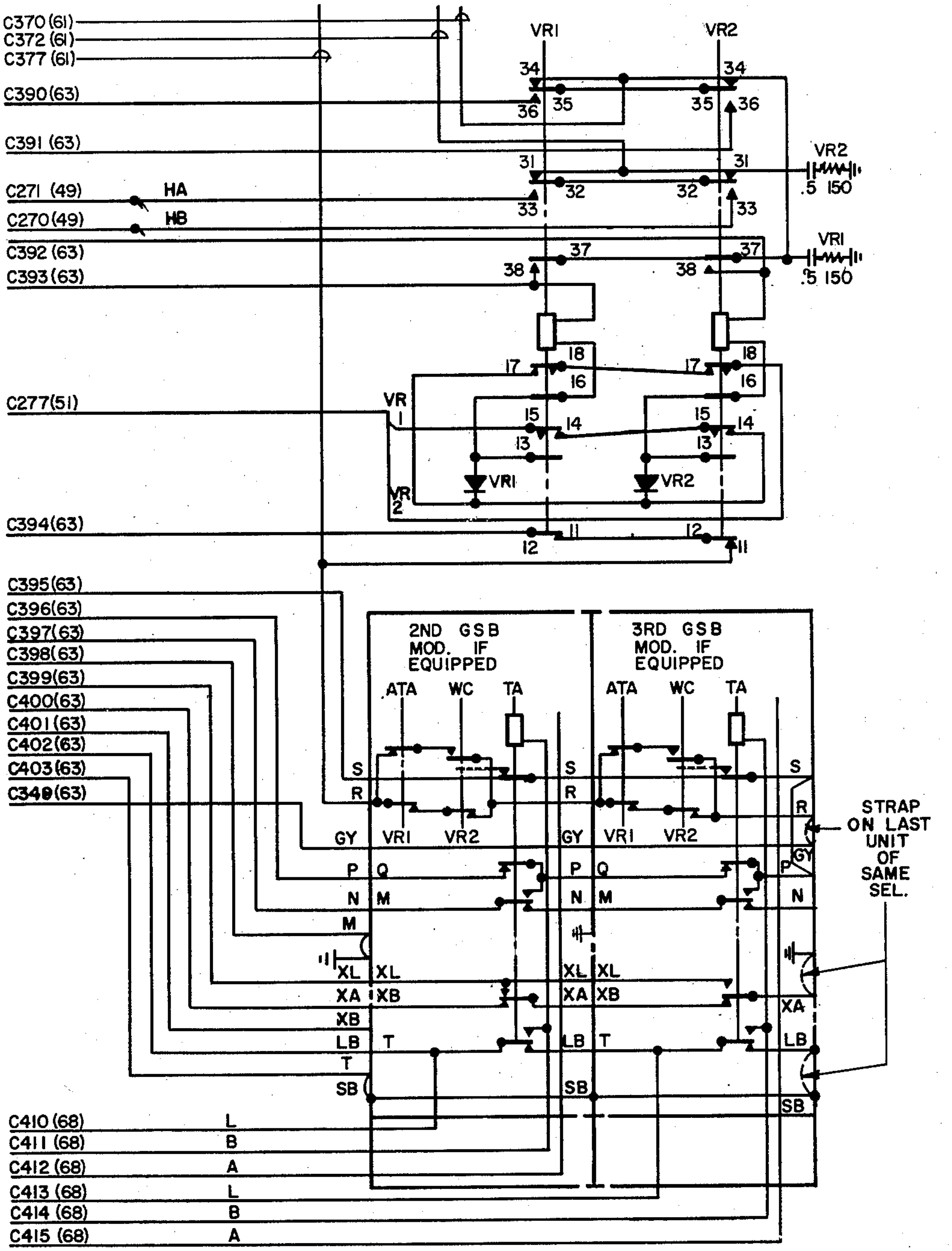
Figure 65:
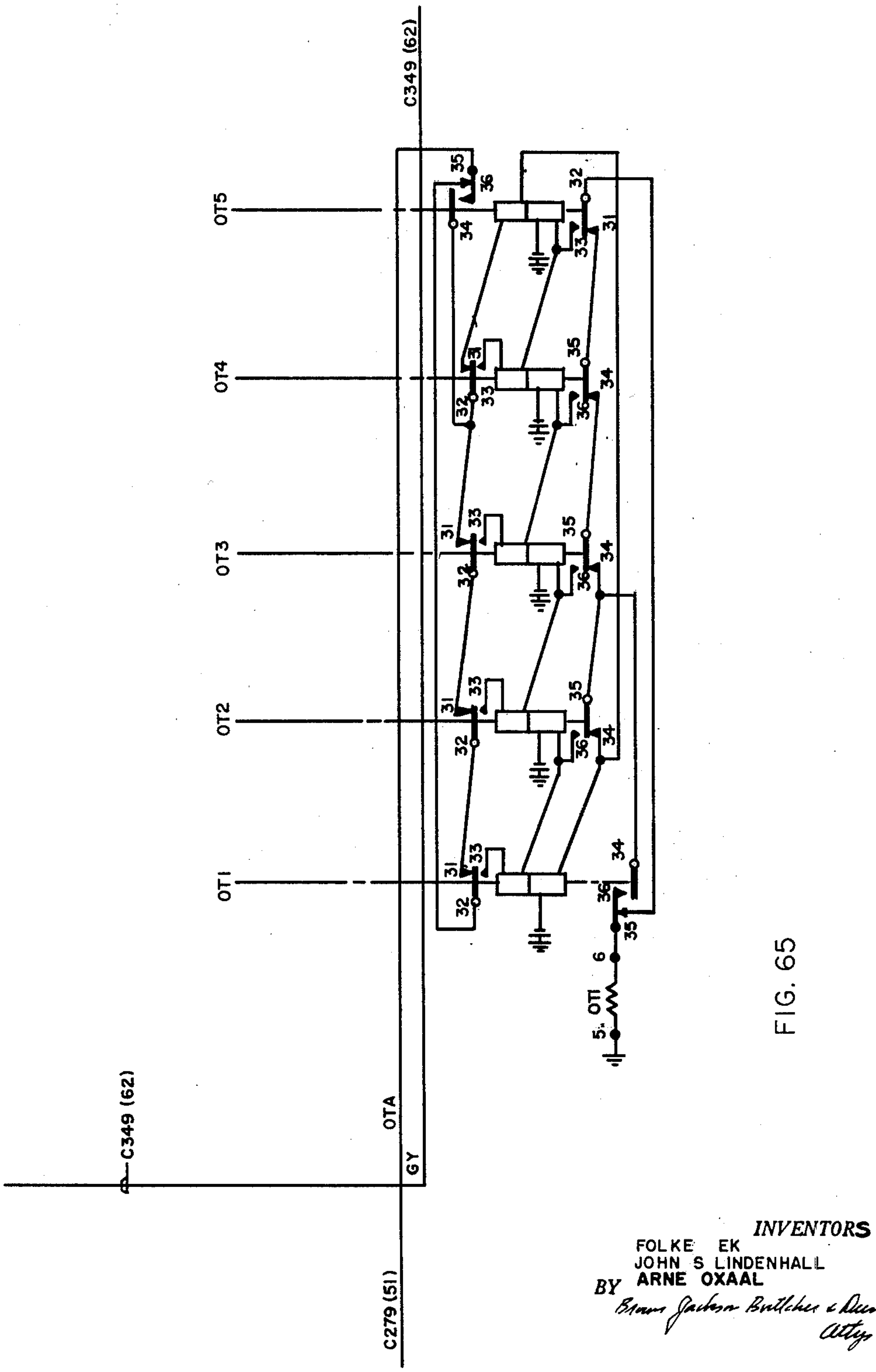
Figure 66:
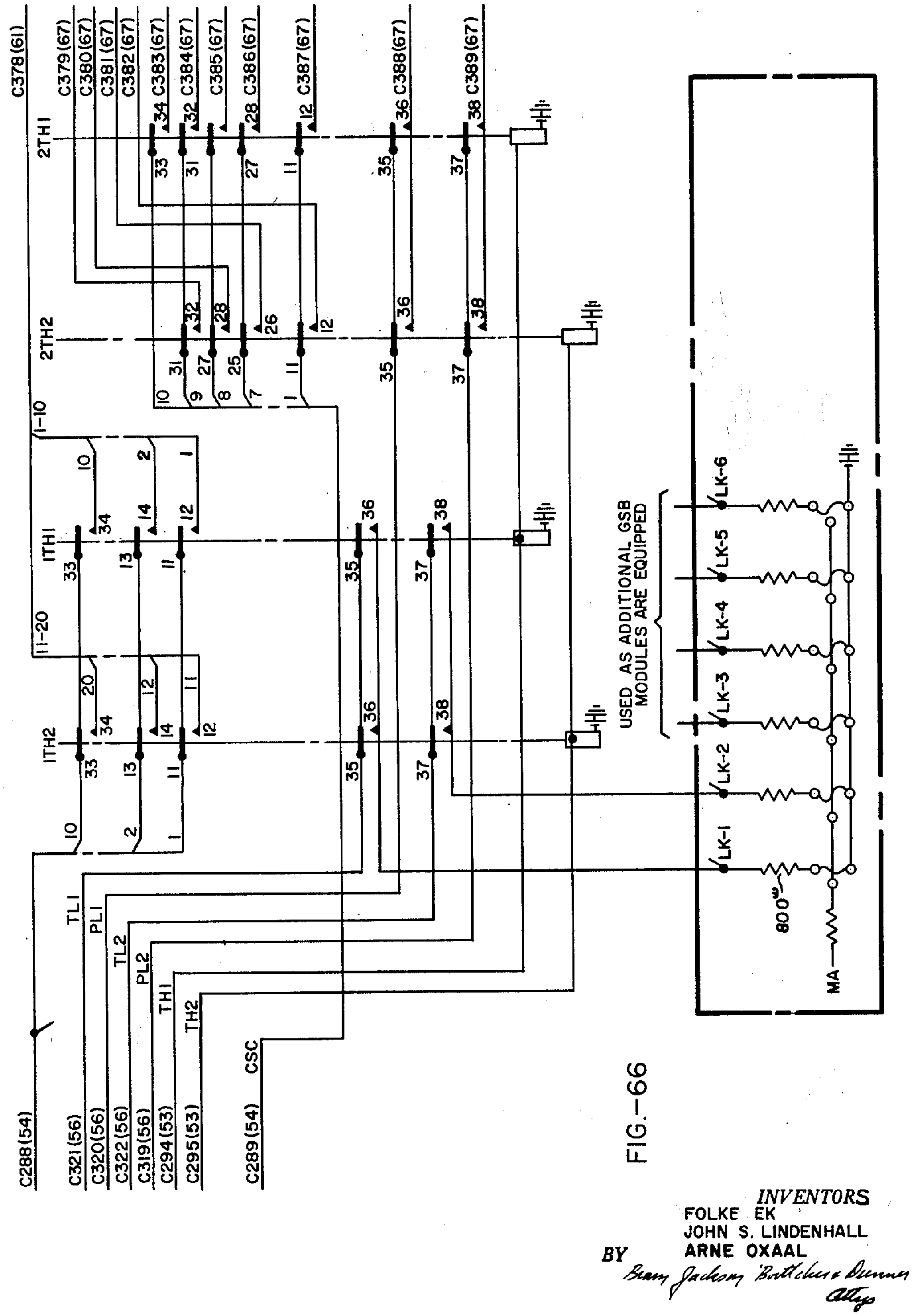
Figure 67:
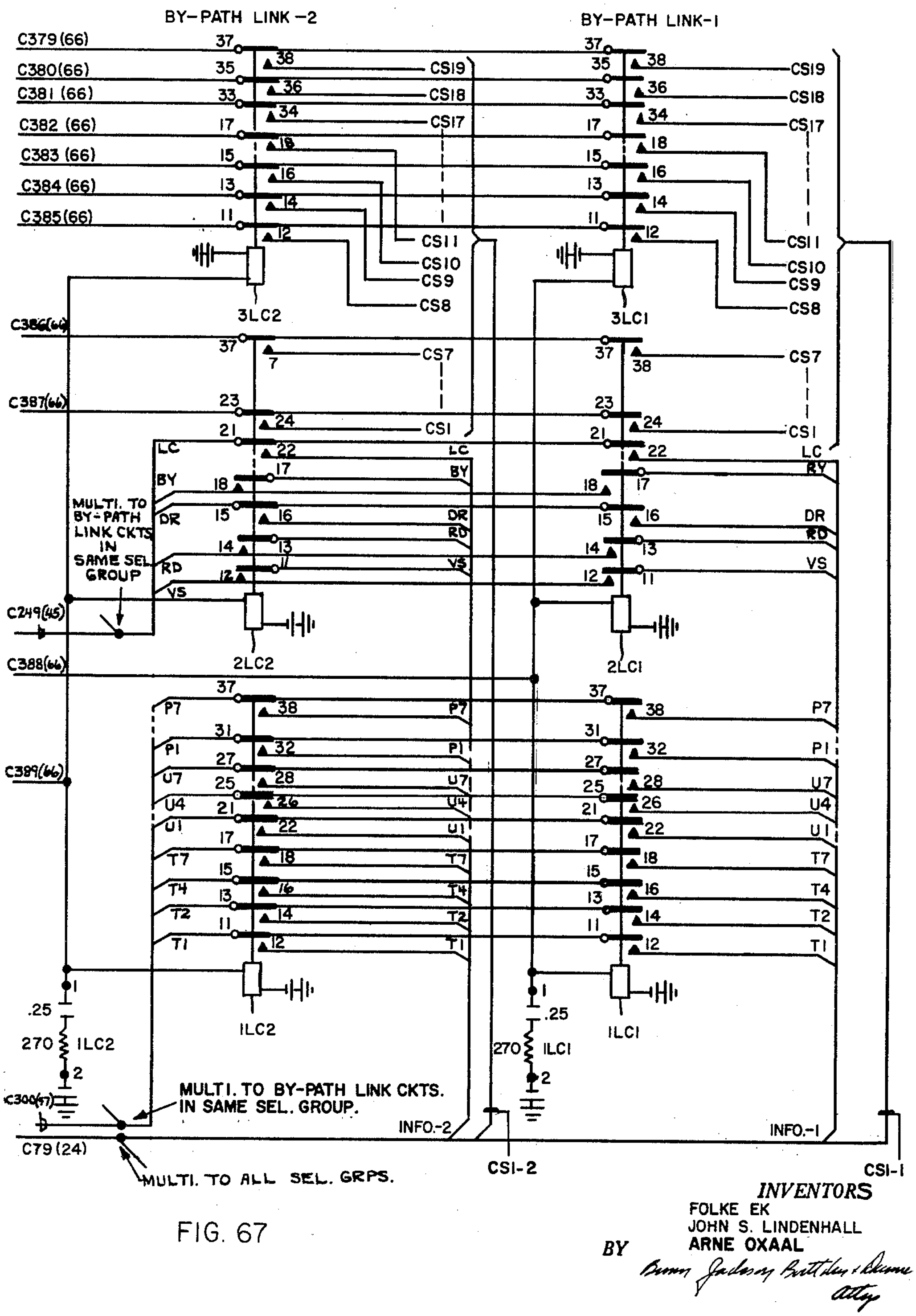

The release of timing relay Y also effects the operation of relay VP(44) in the number group guard and link circuit over the path from battery, relay VP, R1–32, 31; lead VP, C217(41), C217(38); lead VP, to ground as traced above through TA–32 (FIG. 63). Relay VP(44) locks over the path from battery through the winding of VP, VP–25, 24; RC1–35, 34 to ground, the locking ground thus also supplying ground to the VP lead which can be traced to the S-lead which holds the GSA and GSB verticals after test relay TA (FIG. 63) releases. A holding circuit can be traced for vertical magnet V1, V1–11, 12; lead S, C196(37), lead S, RC–17, 16; lead FS, C198(38), BY–17, 18; lead VP to the right, C217(41), C217(44), lead VP, R1–31, 32; VP–25, 24; RC1–35, 34; to ground. Signal relay VP at its contacts VP–21 initiates the release of the selector control by opening the selector call lead CSS.

In the preceding example, it has been assumed that a successful test for an STT took place among STT's 1–5 under the control of test relays TC15, CK15, and signal relay VP15. If the preference alternator relay GR2(51) had been in its operated position, ground through contacts WA–32 (FIG. 60) over lead TTR3 would have been returned on lead TTR2 instead of TTR1, operating relay TG60(59) instead of TG15. Connecting relay TG60 would have operated connecting relay CK60 which would have effected the operation of connecting relay VP60, and the test would have taken place among STT's 6–10 instead of 1–5 as would be understood.

In either case, if the test fails in the first attempted group of five STT's, transfer relay TR(60) operates. The operating circuit for transfer relay TR, which is slower than the test relays to operate, is derived from the operating circuit for the test relays on the common side and is interrupted immediately when a test relay 1T1–1T5 operates. Relay TR, when operated, locks independent of the test relay contacts.

More specifically, when connecting relays TG15(59) and CK15(59) operated a circuit was completed to relay TR(60) over the path from battery, relay TR, C361(59), RP–25, C354(62), OT1–13, 12; C360Y(63), 2T5–31, 32, 1T5–21, 22, 2T5–23, 22, OT5–11, 12, 2T4–31, 32, etc., through series break contacts of the test relays 1T4–21, 22; 2T4–23, 22; OTY–11, 12, C360W(63), 2T3–31, 32; 1T3–21, 22; 2T3–23, 22; OT3–11, 12; 2T2–31, 32; 1T2–1, 22; 2T2–23, 22; OT2–11, 12; 2T1–31, 32; 1T1–21, 22; 2T1–23, 22; OT1–16, 15; 2T1–25, 26; through series break contacts of the test relays, OT2–14, 15; 2T2–25, 26; OT3–14, 15; 2T3–25, 26; C360O(63), OT4–14, 15; 2T4–25, 26; OT5–14, 15; 2T5–25, 26; C360–T(62), OT1–18, 17; C355(59), CK15–38, 37; C363(60), WA–14, 13; to ground. Normally the operation of relay VP(44) effects the release of the selector control before relay TR(60) operates.

However, if an idle STT is not found, vertical pull relay VP(44) does not operate immediately and transfer relay TR(60) has time to operate over the circuit traced.

Transfer relay TR(60) operates and locks over contacts TR–18, WA–14, to ground, and also switches the test to the other group of five STT's by releasing one set of TG, CK, and VP relays and operating the other set as will be understood.

If both tests are unsuccessful, end relay TA(61) for the test relays will not operate, the holding circuit of timing relay X(52) will not be completed, and relay X will release, in turn releasing timing relay Y(52), which releases slowly. With both timing relays X and Y released, busy relay BY(38) in the register is operated over the path from ground (FIG. 52), GRB–33, 34; X–11, 12; Y–32, 31; C273(51), lead BY, C296(43), lead BY, GR1–14, 13; lead BY, C236(41), C222(38), lead BY, lower winding of relay BY to battery. Busy relay BY operates and locks over its upper winding, BY–22, 21; H–26, 25 to ground, at its contacts BT–16, 15 extends the busy tone source through the tone winding of line relay P to induce busy tone on the calling line; and at its contacts BY–33, 34 initiates the release of the selector control by opening the selector call lead CSS.

*Release of Selector Control*

When the selector call lead CSS, over which guard regulator relay GR1(43) was operated, is opened by the operation of signal relay VP(44) at its contacts VP–21 after a successful attempt to seize an idle STT, or by busy relay BY(38) in the register after an unsuccessful call (and relay BY can be operated under various conditions leading to an unsuccessful call), guard relay GR1(43) and ground forwarding relay GRB(52) in the selector control release. Ground relay GR1(43) releases its slave relay GC1(43).

The release of ground forwarding relay GRB(52) removes battery from leads BP1–4 and the ground from lead GP. The removal of battery from leads BP1 and BP2 causes the horizontals of the GSB switches to release; whereas the removal of battery from leads BP3 and BP4 causes the horizontals of the GSA switches to release. The removal of ground from lead GP deenergizes the GSB vertical pulling winding and the operated relay VR1 or VR2.

The release of ground forwarding relay GRB also opens the circuit for the route relay W1 at GRB–36 (FIG. 52), causing route relay W1(58) and route end relay WA(60), to release. The release of route relay WA(60) effects the release of relays ATA(60), TG15 (59), VP(44), 2T1(62), and TA(62). Relay CK15(59) releases when its operating circuit is opened by relay TG15. Timer relay X(52) and battery relay GRA(51) release when their locking circuits over leads XL and GRAL, are opened by relay TA(62). When relay GRA (51) releases, it places a ground on lead OTA also designated C279(65) energizing the OT relay next following the one operated. Both relays remain operated until the GRA relay again operates and removes the ground from lead OTA. The initially operated OT relay then releases whereas the succeeding one remains locked in the operated position, thus advancing the preference for the test relays one step.

No new local call can be attempted from any register associated with the By-Path Link Circuit, Selector Control, and Selector until the number group selector and link becomes free, but the selector control may be seized by any other associated register to handle a call to a trunk level immediately upon the release of relay GRA.

The GSA and GSB verticals are now locked over the S lead through the register and over RC1–35 (FIG. 44) to ground in the number group guard. Later when the register has released, the ground is furnished and controlled by the STT.

*Seizure of Subscriber Terminating Trunk (STT)*

The subscriber terminating trunk (STT) serves as a connector trunk on calls to local lines, and the equipment is now operative to seize an STT for such purpose. More specifically, with the vertical magnets V1 of GSA–1 (FIG. 48) and V1 of GSB–1 (FIG. 50) operated, the HA and H1 crosspoints in vertical 1 of GSA–1 are closed and a circuit extends from ground through RC1–35 (FIG. 44) through the register to the S lead and thence to the first STT which is assumed to be that shown in FIGS. 32–36 to operate trunk busy relay MB therein and to seize the STT. More specifically, relay MB(35) operates over the path from ground (FIG. 44), RC1–34, 35; VP–24, 25; R1–32, 31; lead VP, C217(41), C217(38), BY–17, 18; C198(37), lead FS, RC–16, 17; lead S, C196(48), lead S, HA crosspoints of vertical V1 of GSA–1, H1 crosspoints of same vertical, C263(49), C268(50), lead S, HA crosspoints of vertical V1 of GSB–1, H1 crosspoints of same vertical, C325(58), upper conductor of outlet 1, C195(35), lead S, relay MB(35) to battery.

Relay MB(35) at its contacts MB–21, 22 disconnects test battery from the TB lead, and at its contacts MB–23, 22 places ground thereon, making the STT busy to other calls; at its contacts MB–11, 12 grounds the H lead multipled to the three connector verticals of associated crossbar switches in preparation to hold a vertical; and at its contacts MB–24, 25 operates relay CC(35) over the path from battery, relay CC, A–12, 11; C175(34), BY–14, 13; CO–24, 23; C149(32), RS–32, 31; RV–14, 15; C150(33), C150(34), C150(35), MB–25, 24; C143-(34), C143(33), C143(32), lead D which is also designated C78(23), DT–12, 11, to ground.

When relay CC(35) operates, it switches a plurality of leads CC–TD (FIG. 35) from the connector control into the STT. These leads comprise leads for conveying party information, class information, and leads for effecting control between the STT and connector control. It should be noticed that whereas the tens and units information was stored upon the tens and units relays in the connector control with seizure of the connector control, the party information, class information, and leads for effecting control between the STT and connector control are presently in marking conductor form rather than on storage relays. It should be appreciated that these leads from the connector control are multipled to the other eleven STT's in the ninety line group.

As soon as relay CC(35) operates, a circuit is completed in the STT over class marking lead LC to operate local call marking relay LC(34) over the path from battery relay LC(34), lead LC, C176(34), lead LC, CC–14, 13; lead LC, C76(23), lead LC(23), TK–34, 33, C48(22), 1A2–22, 21; lead LC, C62(23), C62(24), Information-2 cable, C79(67), lead LC, 2LC2–22, 21; lead LC, C249(45), lead LC, CLA–27, 28; lead LC, C217(44), C217(41); lead LC, C204B(39), M2–34, 35; to ground. Local call marking relay LC(34) operates to set up the originating and terminating tip and ring leads T and R for connection to the battery feed relays and condenser bridge, and arranges the S-leads for holding the connection from the STT under control of the calling subscriber.

Also as soon as CC(35) operates, a circuit is completed in the STT over party lead P1 (assuming the called party such as party 1 has a phone which responds to ringing current determined by the operation of P1), to operate party relay P1 over the path from battery, P1(36), lead P1, C161(35), lead P1, CC–22, 21 lead P1, C62(23), C62(24), C76(23), lead P1, TK–12, 11; C63(22), 2A2–32, 31; lead P1, C62(23), C62(24), Information-2 cable, C79(67), Information-2 cable, lead P1, 1LC2–32, 31; lead P1, C300(47), lead P1, N1A–22, 21; lead 17, Information leads cable to Number Group-1, to ground placed on lead 17 by the number group.

Figure 13:
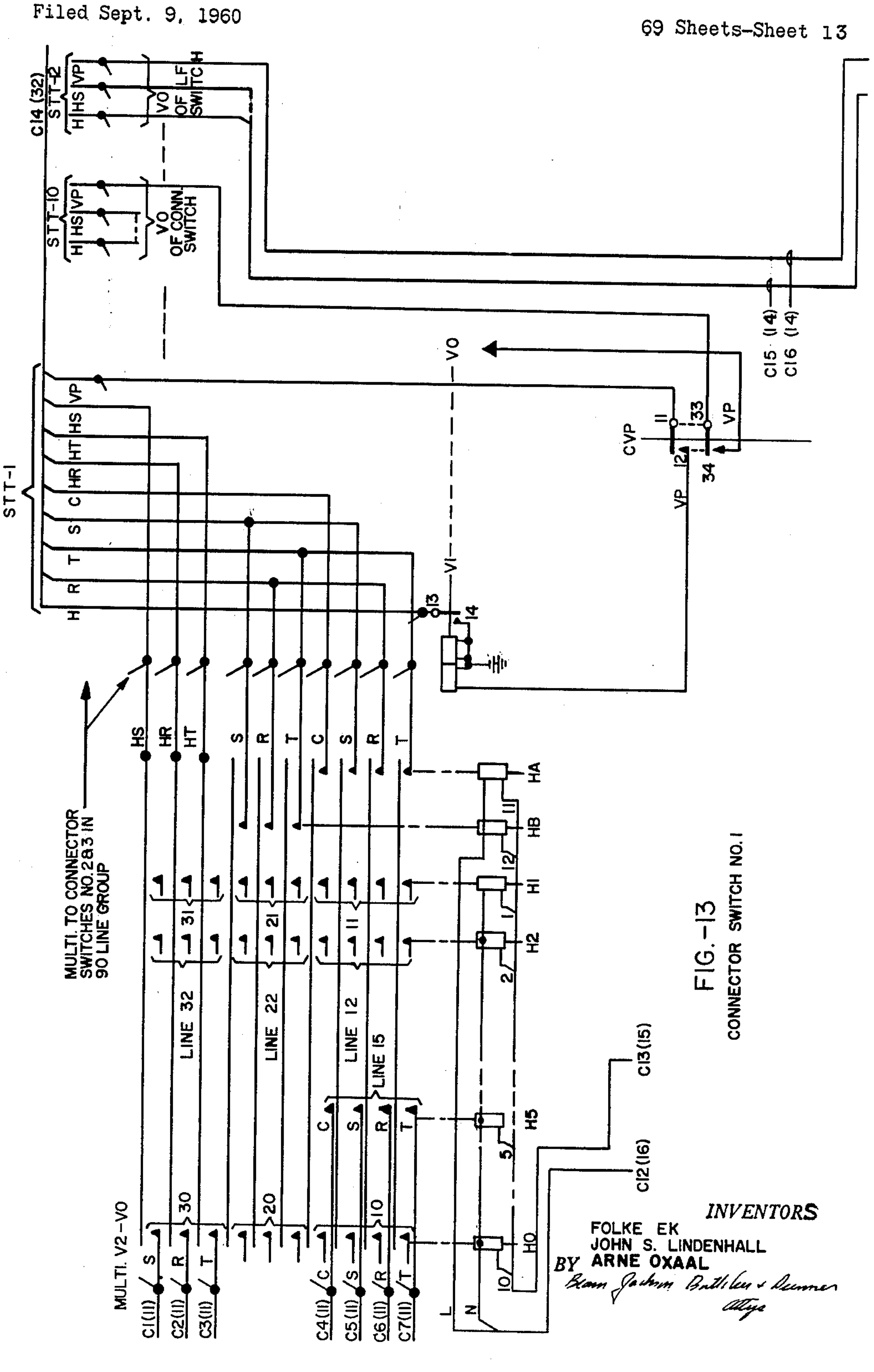
Figure 14:
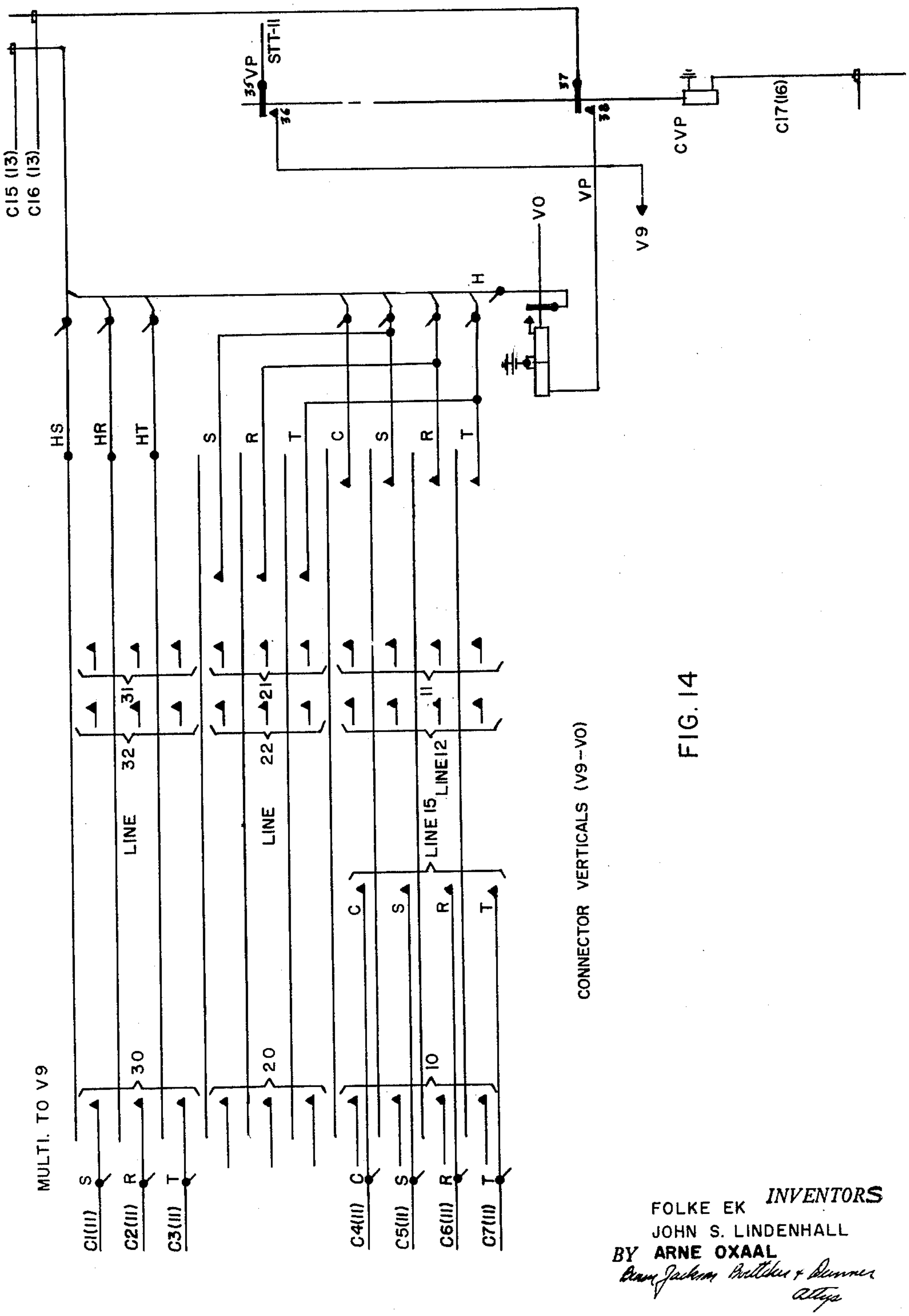

We have assumed that the called line is reached over the horizontal 15 which is in the first tens group of the first linefinder switch of the first ninety line group, and accordingly relay HC(32) will be non-operated. If, however, the called line had been in the third tens group, i.e., horizontals 31–30, relay HC(32) would be operated over the path from battery, HC(32), lead HC, C161(33), C161(36), C161(35), lead HC, CC–34, 33; lead HC, C76(23), lead HC, C38(22), C38(21), C38(19), C51–37, 36; and CT2–36, 35 for example, ICT–21, 22; C40(21), CH–32, 31; to ground when CH operates. At such time relay HC(32) would be operated to extent the HR, HT, and HS leads for the third tens lines vertical split of the connector vertical (see FIG. 13 for example), into the STT of FIGS. 32–35. Referring to FIGURE 13 it will be seen that the HR, HT, and HS leads from the STT are multipled to the corresponding verticals of the other two linefinder connector combinations crossbar switches in the same ninety line group. Thus a single relay (HC) in the STT suffices as a switching member for a vertical in each of three different crossbar switches.

*Switch Connecting and Pulling*

Furthermore, when connector control connecting relay CC(35) in the STT operates, it signals the connector control via lead CC that it is ready for switch pulling. More specifically, this signal operates check relay C in the connector control over the path from ground (FIG. 35), CC–12, 12; lead CC, C76(23), lead CC, C29A(24), AA–25, 26; X29(22), C29(21), C29(17), relay C, to battery.

Check relay C operates connector blocking relay CBL(16), connector horizontal pulling relay CE(16), and connector vertical pulling relay CVP(14) in the linefinder connector switch circuit in parallel over the path from battery (FIG. 19), ICT–15, 14; C42(21); PBX–22, 21; C43(19), CT7–32, 31; CT4–32, 31; CT1–18, 17; lead 1, C28(17), lead 1, C–12, 11; lead CPC–1, C24(16), lead CPC–1, FVP–21, 22; branching in parallel through relay CE to ground; through relay CBL to ground; through C17(14), and relay CVP(14) to ground. Operation of relay CBL(16) causes the switch circuit to be blocked from entry by the linefinder control.

Check relay C(17) operates vertical pulling relay VP(21) over the path from ground C–35, 36; C34(20), C34(21), C34(23), AA–35, 36; C58(21), relay VP(21) 1200 ohm resistor, to battery. Vertical pulling relay VP operates and extends its operating ground through VP–11, 12 and the upper winding of relay TT(21) to battery to operate test time relay TT(21).

When connector blocking relay CBL(16) in the linefinder connector switch circuit operated, it extended its operating battery to operate horizontal pulling relay HE(16) over the path from CBL–14 and the upper winding of relay HE to ground. It might be observed at this point that if finder vertical pull relay FVP had been operated due to a simultaneous attempt to seize the circuit for linefinding, the lower winding of horizontal pulling relay HE would have been energized also over the path from the operating battery of relay FVP(16), FVP–25, 26; and the lower opposed winding to ground, and relay HE would not have pulled, preventing simultaneous use of the circuit.

The operation of horizontal pulling relay HE(16) effects the return of a ground signal on the CCH lead to the connector control operating switch check relay CH(21) in the connector control over the path from ground (FIG. 16), HE–11, 12; CBL–31, 32; lead CCH, C24(17), lead CCH, C25(19), C25(21), C25(22), 1A2–35, 36; C57(21) and relay CH(21) to battery. Switch check relay CH(21) operates the horizontal "C" relay HC(32) for the connector at this time as described above, if the called line were in the third tens group. As the called line is in the first tens group, relay HC does not operate for the example given.

Relay CH(21) also operates the horizontal magnets HA and H5 in the connector switch.

Horizontal magnet HA(13) operates over the path from battery (FIG. 21), TA–32, 31; CH–34, 33; C41(19), ICT–12, 11; CT7–15, 14; CT4–22, 21; CT2–15, 14; CT1–33, 32; lead HA, C31A(20), C33(17), C24(16), cable 1–12, lead 11, CE–36, 35; lead 11, C18(15), lead 11 to one side of the HA magnet in FIGURE 15 (incidentally at this time), back out into the cable, C13(13), lead 11, magnet HA, lead L, C12(16), lead L, HE–34, 33; to ground.

Horizontal magnet H5(13) operates over the path from battery (FIG. 21), TA–34, 33; CH–36, 35; C49(19), ICT–32, 31; C50(21), PBX–25, 24; C53(20), CU7–35, 34; CU4–32, 33; CU32, 31; CU1–32, 33; lead H5, cable, C33(17), C24(16), cable 1–12, lead 5, CE–20, 19; lead 5, C18(15), lead 5 to one side of the H5 magnet in FIGURE 15 (incidental at this time), back out into the cable, C13(13), lead 5, magnet H5, lead N, C12(16), lead N, HE–32, 31 to ground.

Figure 21:
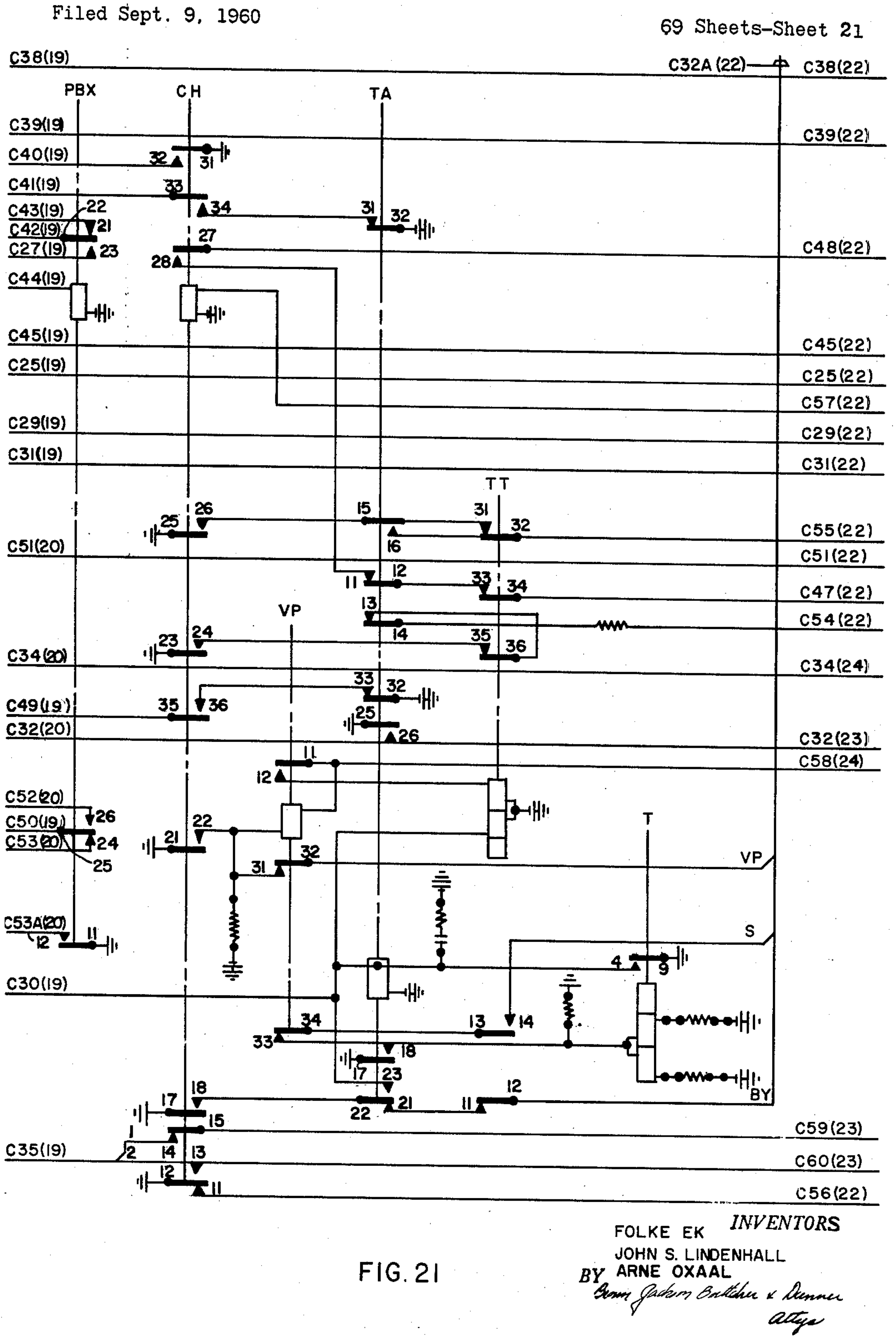
Figure 22:
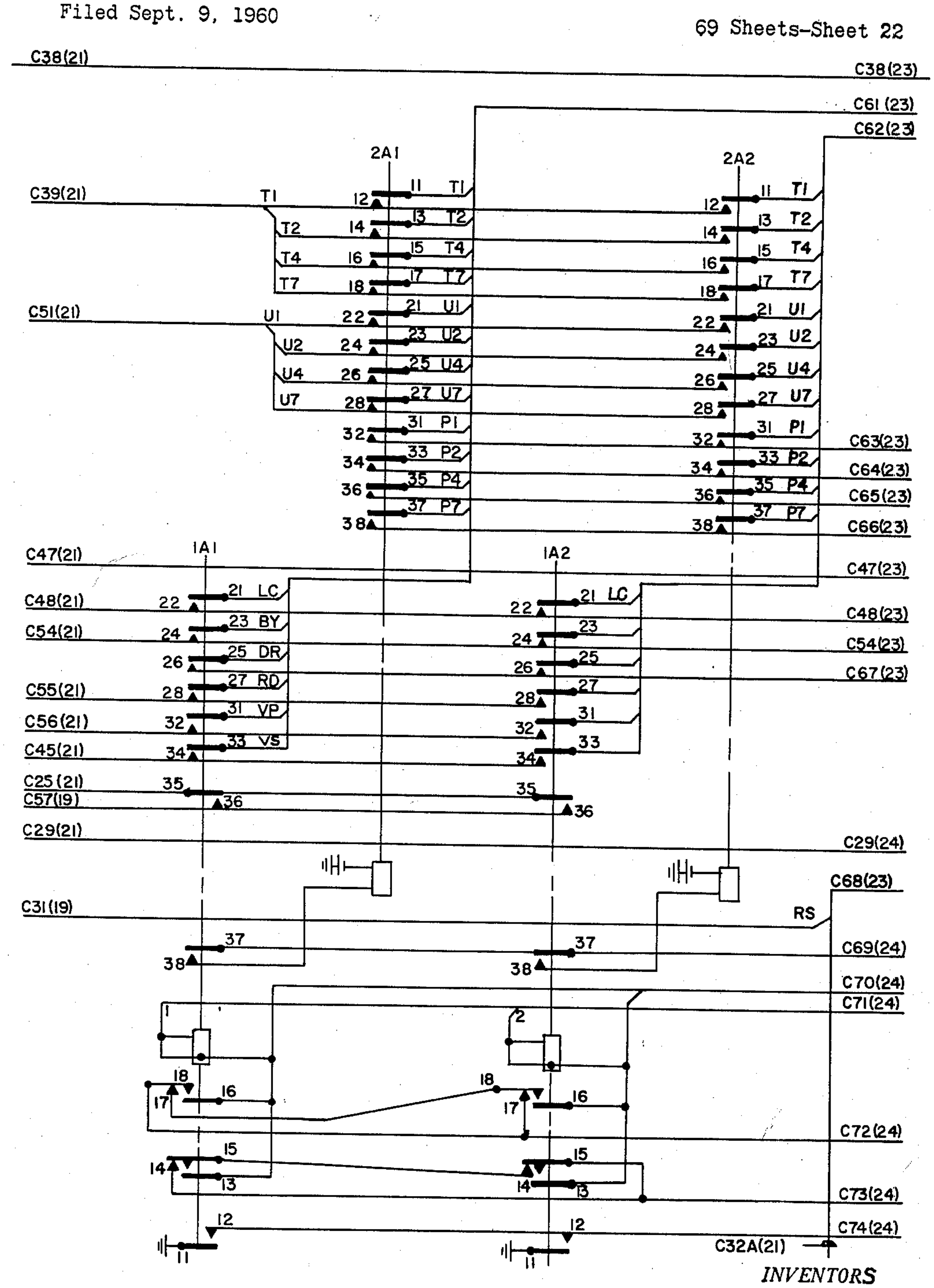

Switch check relay CH(21) at contacts CH–22 shunts vertical pulling relay VP(21) through ground (FIG. 21). Relay VP thereupon goes through a slow release. When relay VP releases, a circuit is completed to operate the vertical magnet V1 (FIG. 13), over the path from ground (FIG. 21) CH–21, 22; VP–31, 32; lead VP, C32A(22), C68(23), lead VP, C76(35), lead VP, CC–35, 36; TB–13, 14; C129(34), C129(33), C129(32), lead VP, C14(13), lead VP, CVP–11, 12; left winding of vertical magnet V1, to battery. Vertical magnet V1(13) locks from battery, through its right winding, V1–14, 13; lead H, C14(32), lead H, C124(33), C124(34), C124(35), MB–12, 11 to ground. Thus the vertical magnet is held by ground supplied on the H lead by the STT.

As vertical pulling relay VP(21) releases it is effective at its contacts VP–11, 12 to open the circuit for relay TT(21) which begins its slow release to time the period allotted for the idle test.

*Called Line Test*

With the switch vertical closed, the sleeve of the called line is extended back through the STT to the connector control so that the line may be tested for an idle, busy, or lockout condition on the sleeve lead.

The circuit from the S-lead of the called line (i.e., the line reached via horizontal 15) can be traced from lead S of horizontal 15 (FIG. 11) C5(13), lead S through H5 crosspoints, HA crosspoints, lead S, C14(32) lead S, WC–14, 15; lead S, C161(33), C161(36), C161(35), lead S, CC–32, 31; lead S, C76(23) lead S, C68(22), lead S, C32A(21), lead S, TT–14, 13; VP–34, 33; to the network comprising polar relay T(21).

If the called line is idle, the line end of this circuit will be connected through 370 ohms to battery. The 370 ohms results from the path through the winding of CO15 (11) in series with the lower winding of LO15(11) and this in parallel with a 500 ohm resistor to battery. Under this circumstance polar relay T(21) attracts its armature 9 to its T–4 contact.

If the called line is busy, the line end of this circuit will be connected to direct ground by another SOT or STT. Under this circumstance polar relay T(21) moves its armature 9 away from its T–4 contact.

If the line is on lockout, contacts LO15–31 (FIG. 11)

will be open and the line end of this circuit will be connected through 145 ohms to battery over the circuit comprising the winding of relay CO15(11) and the lower winding of relay LO15(11) to battery. Under this circumstance, polar relay T(21) does not attract its armature to make any contact.

Summarizing, polar relay T(21) is arranged to mark the "idle" condition of the called line by closing its contacts T–4 and to mark "not idle" by not closing its contacts T–4, "not idle" comprising the "busy" and "lockout" conditions. Differentiation between "busy" and "reverting call" is made in the STT as such conditions are encountered.

We shall assume that the called line is idle and that relay T(21) closes its contacts T–4. As will be seen, as a result of contacts T–4 closing because of the line testing idle, a ring start signal is sent over the RS lead from the connector control to the STT, a register disconnect signal is sent back over the RD lead from the connector control to the register, and timer relay TT(21) is prevented from releasing because of ground supplied thereto over the path from ground, T–4, lower winding of relay TT to battery.

More specifically, idle test relay T(21) operates relay TA(21) over the path from ground, T–4, winding of relay TA to battery. Test auxiliary relay TA(21) at its contacts TA–22, 23; completes a self holding circuit, and a holding circuit through contacts CH–17, 18.

Relay TA(21) at its contacts TA–31 releases horizontal magnets HA(13) and at its contacts TA–33 releases H5(13), the HA and H5 crosspoints remaining closed because the vertical magnet is in the operated position. Relay TA(21) also operates the cut-off relay CO15(11) and the lockout relay LO15(11) of the called line over the path from ground (FIG. 21), TA–17, 18, VP–33, 34; TT–13, 14; lead S, C32A(22), C68(23), lead S, C76(35), lead S, CC–31, 32; lead S, C161(36), C161(33), C161(32), lead S, WC–15, 14; lead S, C14(13), lead S, HA crosspoints, H5 crosspoints, lead S, C5(11), relay CO15, lower winding of relay LO15 to battery, which disconnects the called line from the LR1 relay circuit so that ringing current subsequently will not pass over this circuit. It will be assumed that the terminals in FIG. 20 connected to 33—34—35 transfer of relay LO15 are not cross-connected to any other terminals but are left vacant.

Relay TA(21) also releases relay T(21) by ground through TA–17, 18; to the polar test relay T network. When contacts T–4 open, relays TA(21) and TT(21) will be held by ground through TA–22, 23 and CH–17, 18. Relay TA(21) also transmits the register disconnect signal to the register, the effects of which will be discussed more fully hereinafter.

*Sequence Initiated By Ring Start Signal*

Back-tracking, idle test relay T(21) when it operated, in addition to operating test auxiliary relay TA(21), closed a circuit to energize slow operating cut-off pulling relay CO(33) in the STT over the path from ground (FIG. 21), T–4, C30(19), C30(17), C–21, 22; C31(19), C31(21), C31(22), lead RS, C68(23), lead RS, C76(35), lead RS, CC–15, 16; lead RS, C176(34), C176A(33), relay CO(33), to battery, operating cut-off pulling relay CO(33) after the slow operate interval of relay T(21). Relay CO(33) operates and locks over CO–22, 21; C178(34), C178(35), MB–27, 26; C143(34), C143(33), C143(32), lead D also designated C78(24), DT–12, 11, to ground.

Cut off pulling relay CO(33), also connects ground to the terminating S-wire over the path from ground (35), MB–11, 12; C124(34), C124(33), CO–16, 17; C170(34), LC–33, 32; C–21, 22; C128(33), C128(32), WC–32, 31, lead S, C14(13), lead S, HA crosspoints, H5 crosspoints, lead S of inlet 15 and C5(11) which holds LD15 and CO15 and keeps the called line busy when connection control relay CC(35) and the connector control release.

Cut off pulling relay CO(33) at its contacts CO–23, 24 drops relay CC(35) which at its contacts CC–11, 12 releases relay C(17) in the connector control, and also at its contacts CO–38, 37 energizes slow to operate ring start relay RS(32) over the path from battery; lower winding of relay RS, C156(33), CO–38, 37; C169(34), LC–32, 33; C170(33), CO–17, 16; C124(34), C124(35), MB–12, 11; to ground.

When ring start relay RS(32) operates, it connects the called party tip conductor over RS–36, 35; C127(33), RT–12, 11; C184(36), P7–11, 12; P2–34,35, lead MRG, cable which is C161A(35), to the ringing and tone distributor where it picks up ground; and at contacts RS–33, 34 connects the called party ring conductor over RS–33, 34, C126(33), RT–15, 14; C185(36), P7–14, 15; P2–24, 25; C186(33), to the winding of the ring trip relay RT in preparation for ringing.

Ring start relay RS(32) also connects ring pickup relay PU(33) to the ringing circuit over the path from battery, relay PU(33), C157(32), RS–14, 13; C158(33), RT–18, 17; C183(36), rectifier P4 as shown, lead RPU, C161A(35), lead RPU in the ringing circuit, which grounds lead RPU at the proper time for ringing. When the ringing circuit grounds lead RPU, relay PU operates and locks over the path from battery, relay PU, C157(32), RS–14, 13; C158(33), RT–18, 17; PU–35, 34, C181(35), MB–34, 33 to ground.

Relay RS(32) at its contacts RS–11, 12 extends ground to lever #15 of connector switch holding relay H(34), so that as relay H operates the ground is extended over H–15, 16; C134(35), to the S-wire from the selector to hold the originating connections and relay MB(35) in the STT when the register and number group guard release.

Ring pickup relay PU(33) will operate immediately if the call is for a one-ring party (1–5), or upon receipt of the next pickup pulse if the call is for a two-ring party (6–10). When relay PU operates, it extends a connection from the winding of the ring trip relay RT(33) through PU–32, 33; C187(36), P7–32, 31; P4–12, 11; P2–32, 31; P1–35, 36; lead 1, C161A(35), lead 1, to the ringing circuit lead 1F1 for ringing frequency #1, and through the ringing machine to battery. Relays P7, P4, P2, P1 comprise a 1–2–4–7 called party code register. After ring pickup relay PU operates and locks, the called party is rung over the called tip and ring conductors and through the winding of the ring trip relay RT.

The path for ringing party 1 extends from battery-connected ringing generator and interrupter into the STT on lead 1F1 (FIG. 35), C161A(36), lead 1, P1–36, 35; P2–31, 32; P4–11, 12; P7–31, 32; C187(33), PU–33, 32; through the trip winding of ring trip relay RT, C186(36), P2–25, 24; P7–15,14; C185(33), RT–14, 15; C126(32), RS–34, 33 and out on the ring side of the line, through the subscribers loop (bridged ringing for example), back over the tip side of the line through RS–36, 35; C127(33), RT–12, 11; C184(36), P7–11, 12; P2–34, 35, lead MRG, C161A(35), lead MRG to machine ring ground. For parties 6–10, the contacts on the party relays will reverse the connections, placing ringing on the tip, and ground on the ring.

The ring trip relay RT(33) is designed to respond to D.C. current but not to A.C. ringing current. It will operate only when an off-hook on the called line provides a D.C. path from trip battery to ground. The trip battery is supplied from the back contacts PU–31 prior to operation of PU; from the interrupter back contacts in the ringing circuit during silent periods, and from the ringing generator during ringing.

Ring-back tone is provided to the calling subscriber as follows. Ring-back tone from lead RBT (FIG. 35) from the ringing circuit, C161A(36), lead RBT, C159(33), C159(32), RV–12, 11; C136(33) PU–14, 15; C138(34), through the tone winding of relay C140(33), PU–17, 16;

lead DTG, C135(34), C135(35), cable, lead DTG (Dial Tone Ground), to ground through the ringing circuit to thereby induce tone from the windings of relay B(34) through the windings of relay A(34) to which the tip and ring will be connected.

The called person is rung in such manner.

*Sequence Initiated By Register Disconnect Signal*

Back-tracking, as before stated, relay TA(21) in the connector control transmitted the register disconnect signal to the register as a result of having found the called line idle. The signal effects the operation of register disconnect relay RD(38) in the register over the path from ground (21), CH–25, 26; TA–15, 16; register disconnect lead RD also designated C55(22), 1A2–28, 27; lead RD, C62(23), C62(24), Information-2 cable, C79(67), Information-2 cable, lead RD, 2LC2–13, 14, lead RD, C249(45), lead RD, C1A–36, 35; lead RD, C217(44), C217(41), C217(38), lead RD, relay RD(38), to battery.

Register disconnect relay RD(38) operates; at its contacts RD–25, 26 locks to ground through H–26, 25 (FIG. 38); at its contacts RD–11, 12 releases register guard relay R1(44) which in turn releases relays C1(44), C1A(44) and RC1(44) thus allowing the register guard and certain circuits held therethrough to release; at its contacts RD–31, 32 opens a further point in the CSs signal lead, the selector guard and selector control having been released previously; at its contacts RD–23, 24 operates the cut-through relay CT(37) in the SOT over the path from ground, H–11, 12; RD–23, 24; C202(37), RC–14, 15; CT–14, 15; relay CT, to battery.

Cut through relay CT(37) locks over the path from ground (FIG. 37), CT–16, 18, RC–25, 26, CT–13, 15, relay CT, to battery, connecting this ground to the S-wire until relay RC releases. Relay CT at its contacts CT–14, 15 disconnects its original operating path; at its contacts CT–38 interconnects the originating and terminating sleeve wire; at its contacts CT–17 opens the locking circuit of relay RC to the S-wire ground; at its contacts CT–24 disconnects the lower winding circuit of relay RC; at its contacts 31—32, 33 and 34—35—36, transfers the incoming tip and ring conductors from the register through the selector to the STT and at its contacts CT–31 and CT–34 releases relay P(38).

When the calling loop is connected into the STT, "A subscriber" relay A(35) operates over the calling loop which may be traced from battery, upper winding of relays A, C190(34), B–32, 33; LC–26, 25; C182(35), ring lead R, C195(58), outlet 1, C325(50), ring lead R, through H1 crosspoints, HA crosspoints, C268(49), C262(48), a ring lead through H1 crosspoints, HA crosspoints, C196(37), lead R, CT–36, 35; C23(15), lead R, HC1–14, 13; H0 crosspoints, C2(11), through the calling subscriber loop, over similar circuitry, through the lower winding of relay A(35) to ground.

Subscriber relay A(35) operates holding relay H(34) over the path from ground (FIG. 35), A–32, 31; C194(34), winding of relay H to battery. Relay H is made slow to release by connecting a diode in parallel with its winding.

With holding relay H(3) and ring start relay RS(32) operated, a path is completed from ground (FIG. 32), RS–11, 12; C172(33), C172(34), H–15, 16; C134(35), to the S-wire incoming to the STT for the purpose of holding the originating connections and make busy relay MB(35). This S-wire holding path from the STT is established before the register releases in order to provide a holding ground continuity on the S-wire incoming to the STT. With relay H(34) operated, ground through contacts H–11, 12 passes through LC–33, 32 in parallel with ground through MB–11, 12 to the called S-wire.

When register disconnect relay RD(38) in the register operated, it opened the holding circuit of relay H(38) at its contacts RD–37, and as relay P(38) released the circuit was further opened. Relay H, however, requires approximately 125 milliseconds to release, and holds register disconnect relay RD operated over the path from battery (FIG. 38), RD–26, 25; H–26, 25; to ground.

Register disconnect relay RD and hold H relay RC(37) over the path from battery through the upper winding of RC, RC–34, 33; C203(38), and RD–13, 12 and H–14, 13 in parallel to ground. Relay RC maintains a circuit from ground, CT–16, 18, RC–25, 26; to the S-wire which has been extended to the STT by contacts CT–38. Such ground obtains on the S-wire until a short time after ground is returned on the S-wire from the STT.

When holding relay H(38) releases, it releases relays CS(42), PC(41), RP1(41), RQ1(41), RQ2(41), RP2(41), 11(42), 24(42), 27(42), 34(42), 37(42), RA1(42), RA2(42), RA3(42), RD(38); and opens the holding circuit of relay ON2(40) which has a slow release characteristic. Register disconnect relay RD(38) releases relay RC(37) in the SOT, which at its contacts RC–26 which open, removes the ground circuit from the SOT to the S-wire, ground then obtaining on the S-wire from the STT. When relay ON2(40) releases, it in turn releases relays PA(38), CC5(40), and CC6(40).

It should be observed that when relay CT(37) operated, contacts CT–23 grounded the TB lead to keep the SOT busy to subsequent SOT path testing and that when relay ON2 released, it reestablished 800 ohm test battery at ON2–31 to the register TB lead making the register available to other calls from SOT's.

When relay RD(38) released the register guard relay R1(44); relay R1(44) in turn released relays RC1(44), C1(45), and C1A(45) as before stated. Relay C1(45) in releasing, releases relays CT1(19), CU1(20), and CU4(20). Relay CT1(19) in releasing releases relays HE(16), CBL(16), CE(16), and CVP(14) in the linefinder connector switch circuit.

Relay HE(16) releases relay CH(21). Relay CH(21) releases relay TA(21) and opens the circuit of relay TT(21) which goes through its slow release. Relay TA(21) opens the lower winding circuit of relay AA(24) which goes through its slow release, assuming that relay 1A2 has also opened its upper winding circuit at 1A2–12.

The release of relay AA(24) removes the shunt from rotator relay A1(24) allowing relay A1 to operate. Now relays A2 and A1 are operated and the By-Path Link selection path preference is shifted at transfer contacts 11—12—13 of relay A1, from Link–2 to Link–1. At the beginning of the next call A2 will release, and at the end of the call A1 will release. When relay AA(24) closes its contacts AA–11 and AA–13, the connector control becomes available for seizure by a By-Path Link Circuit for a new call.

When relay RC1(44) released, it in turn released relays HG(46) and TH1(46) in the number group selection circuit. Relays HG(46) and TH1(46) release to remove the call signal on the lead 1 strapped to terminal NG1 to Number-Group 1 giving the disconnect signal to Number-Group 1 over lead 26. As a result, Number Group-1 releases, removing ground from lead 25, releasing relays N1(47) and N1A(47).

The release of relay N1A(47) removes the call signal from the number group via call signal lead CSL also designated C301(53), releasing relay CSL(53) in the By-Path Link Circuit. Relay CSL(53) in releasing, in turn releases the following By-Path Link Circuit relays: H1(54), TH1(53), 1TH1(66), 2TH1(66), 1TL2(56), 2TL2(56), 1LC2(67), 2LC2(67), and 3LC2(67). The release of relay CSL(53), at its contacts CSL–12 removes the shunt from relay LOT(55) which then operates in series with relay LOTA(56) in the example assumed.

The release of relay H1(54), at its contacts H1–33 (and the release of relays 2TH1 and 2LC2) open the series connection between relays PR(54) in the By-Path Link Circuit and 1A2(22) in the connector control to release such relays.

Relay 1A2(22) releases relay 2A2(22); and at its contacts 1A2–12 opens the upper winding circuit of relay AA(23). Relay AA(23) cannot release unless its upper winding circuit has been opened by release of the By-Path Link Circuit; and additionally its lower winding circuit has been opened by the release of the connector control.

On the next operation of relay CSL, relay LOT is held but relay LOTA is released. On the release of relay CSL, relay LOT is released and on the next operation of relay CSL, relay LOTA operates.

*Answer*

When the called subscriber answers ring trip relay RT(33) operates over the circuit hereinbefore described, and locks over the path from battery through the lower winding thereof, RT–22, 21; C179(36), C179(35), MB–32, 31; to ground.

Ring trip relay RT at its contacts RT–33 and RT–31 opens the ring-back tone circuit; at its contacts RT–15, 16 extends the called ring conductor over C163(34), LC–36, 35 and the middle winding of "B subscriber" relay B(34) to battery; at its contacts RT–13, 12 extends the called tip conductor over C165(34), LC–38, 37 and the upper winding of relay B, to ground; at its contacts RT–23, 24 releases party 1 relay P1; and its contacts RT–17 releases pickup relay PU. Contacts RT–22 are adjusted to make before contacts RT–33 and RT–31 open.

"B subscriber" relay B operates over the called subscriber loop in the above described circuit, reversing the battery feed polarity to the originating end, and the calling and called parties may now converse.

*Release*

When the originating subscriber hangs up, the calling D.C. loop is broken releasing "A" subscriber relay A(35), which at its contacts A–31, 32 opens the circuit of hold relay H(34) which goes through its slow release period, finally releasing. Relay H(34) at its contacts H–16 removes ground from the S-wire, releasing relays LO30(11) and CO30(11), linefinder vertical magnet V1(15), CT(37), GSA-1 vertical V1(48), GSB–1 vertical V1 (FIG. 50); and opening the circuit of relay MB(35). Relay H(34) at its contacts H–12 also removes ground from the called S-wire releasing relays LO15(11) and CO15(11).

After relay MB(25) has gone through its slow release period, it releases, in turn releasing relays RS(32), LC(34); and opening the circuit of relays CO(33), and RT(33). Relay MB at its contacts MB–12 removes ground from the H-wire to the connector circuit releasing connector vertical magnet V1(13). Relays CO(33) and RT(33) go through their slow release periods and release.

The release of relay MB removed ground from the TB lead associated with the STT at MB–25. When relays RS and CO have released the circuit for 800 ohm test battery is reestablished over the path from battery, 800 ohm resistor, C125(33), RS–21, CO–33, BY–11, C126(34), C162(35), TB–11, and MB–22, making the STT available for another call.

*Call to Trunk*

To illustrate a call to a trunk we shall assume that the calling subscriber (FIGS. 9, 11) on the line connected to horizontal input 30 of the first linefinder switch combination of the first ninety line group lifts the receiver and dials a subscriber in a distant office over a free service trunk via selector level 20 by use of a 2–5 directory number, such as CHestnut 5–1000 which is equivalent to the digits 245–100. The description of such a call is the same as the call described up to the point of landing in the register, and receiving the dial tone.

*Dialing the Specific Number*

The following terminals in FIGURES 40 and 41 should be considered strapped to illustrate the results of dialing the called number CHestnut 6–1000. These strappings are additional to those described with reference to a call to a local subscriber.

PC to PC10
PC9 to RQ9
RQ8 to L4

*Dialing "2"*

The same as that described for a local call, including the storage of digit "2" in the first digit bin which is incidental, and the operation of relay PC(41).

*Dialing "4"*

The same as that described for a local call, including the storage of digit "4" in the second digit bin which is incidental and the operation of relays RP1 and RQ1.

*Dialing "5"*

As the calling subscriber dials "5," pulsing relay P(38) pulses five times, and drives the counting chain to the position in which counting chain relay CC5(40) is operated. The reoperation of pulsing relay P at the end of the fifth pulse releases counting chain relay CC4(40); releases off-normal relay ON1 which stores the third digit in the third digit bin (incidental in the present call), and opens the circuit of slow release off-normal relay ON2.

In the trunk call relays RP2 and RQ2 do not operate in that digit "5" was dialed instead of digit "6." In that relay RP2 is not operated, the flush relay FL(40) is not operated. However, due to the strapping noted above, during the digit registration period, trunk call signal relay TCS(41) operates over the path from ground (FIG. 38), H–15, 16; C224(39), C224(41), C216(40), ON1–15, 14; terminal TD1(40), strapped to terminal LH(41), RQ2–38, 37; terminal BH strapped to terminal TD2(40), CC6–22, 21; CC5–31, 32; terminal P5 (FIG. 40), strapped to terminal PC10 (FIG. 41), PC–26, 25; PC9 (FIG. 41) strapped to terminal RQ9 (FIG. 41), RQ1–13; terminal RQ8 (FIG. 41) strapped to terminal L1 (FIG. 41), rectifier in the conducting direction, relay TCS(41), to battery.

Trunk call signal relay TCS operates and holds relay ON2 from releasing over the path from battery, ON2(40), C216C(41), TCS–13, 14; C224(39), C224(38), H–16, 15 to ground. With ON2 held operated, relay RA3 does not operate.

Backtracking, the operating ground of relay TCS(41) extends over C231G(42), CS(24), rectifier in the conduction direction, C223(41), C223(38), BY–33, 34; RD–32, 31; C214(40), ON2–35, 36; C235(43), relay GR1(43), to ground as traced hereinbefore for a call to a local subscriber. Relay GR1(43) operates and in turn operates relay GO1(43) to seize the selector control as hereinbefore described.

Thereupon, ground traced to terminal L1(41) extends over lead 1, C237(43), lead 1, GC1–11, 12; lead L1, C239(61), lead L1 terminal cross-connected to terminal 1WDG20, lead 20, C376(58) relay W20(58), lead 20, terminal 2WDG20, cross-connected via C374(58) to terminal WA (FIG. 60), route end relay WA, to battery, operating relay WA.

Thereupon testing for a free trunk and the pulling of the GSA and GSB horizontals and verticals, take place in the same manner as described for a call to a local level. Referring to FIGURE 4 and assuming that the first trunk on level is idle and selected, the path from SOT–1 could be completed, for example, over GSA–1 vertical V1, GSA–1 horizontal–1 (HA and H1 horizontal magnets of GSA–1 operated, GSB–1 vertical 1, GSB–1 horizontal 20 (HB and H0 horizontal magnets of GSB–1 operated) to the selected idle trunk.

However, in this case, with trunk call signal relay TCS operated, and with register guard relay R1(44) nonoperated, the ground applied to the VP lead by the selector control for the operation of the first GSA–1 vertical (FIG. 48), instead of operating relay VP(44), operates register disconnect relay RD over the path from ground (FIG. 63), TA–31, 32, lead VPG, also designated C283(52), Y–11, 12; C275(51), lead VP, C296(43), lead VP, GR1–12, 11; lead VP, C236(41), lead VP, TCS–15, 16; lead RD, C217(38), lead RD, and the winding of relay RD(38) to battery. Relay RD operates and locks over RD–26, 25; and H–26, 25 to ground.

The operation of register disconnect relay RD(38) effects cut-through in the SOT and release of the register as described for a local call. Relay RD at contacts RD–31 opens the selector call signal lead CSS, releasing selector guard relay GR1 which releases relay GC1, in turn releasing the selector control in the same fashion that the operation of relay VP(44) opened lead CSS, releasing the selector guard and selector control on a call to local. Thus on a call to a trunk, the selector control and register are released at the same time.

With the GSA and GSB crosspoints closed, ground on the S-wire through these crosspoints enters the selected trunk and operates a seizing relay therein which is the equivalent of relay MB(35) of an STT.

Ground (FIG. 37) through CT–16, 18, RC–25, 26; CT–37, 38; GSA crosspoints and GSB crosspoints obtains on the S-wire until after the trunk, places ground on the S-wire subsequent to the seizure thereof. Thereafter, register disconnect relay RC(37) releases, and the whole originating connection is held by ground in the S-wire supplied by the trunk. With the cut-through relay CT(37) operated, the calling loop is extended into the trunk and controls the holding of the trunk which holds ground on the S-wire.

Seizure of the local end of the idle trunk causes a signal to be passed to the distant end effecting the landing of a call in the distant office. Landing in the distant exchange has occurred in the interdigital time between the third and fourth digits dialed.

*Dialing 1000*

Thereupon the dialing of the last four digits 1000 takes place over the calling loop directly into the local end of the selected trunk which repeats these digits over the trunk to the distant office to control the equipment thereat to set up a connection to the called telephone and to ring the same. When the called subscriber answers, conversation ensues.

At the end of the conversation, when the calling subscriber replaces his handset the calling loop is opened, releasing the trunk which removes ground from the S-wire, releasing calling connections.

*Call to Operator*

For a call to a dial "0" toll operator, terminal P0 (FIG. 40) would be strapped to terminal L2 (FIG. 41) and would effect the operation of a route relay W1–W20, the cut-through of the SOT, and the release of the selector control and register after the first digit.

*Manual Intercept Call*

For manual intercept terminal M1 (FIG. 39) would be strapped to terminal L3 (FIG. 41).

*Automatic Intercept Call*

For automatic intercept terminal AI (FIG. 39) would be strapped to terminal L4 (FIG. 41).

*Simultaneous Calls Through By-Path Link and Selector Control*

The manner in which the equipment extends simultaneous calls through the by-path link and selector control is now briefly considered.

With reference to a call to a local substation, the operation is similar up to the point at which an STT has been engaged, and relay VP(44) has opened the CSS lead to release ground relays GR1(43) and GRB(52) which effect the release of the register-selector guard and the selector control.

It should be recalled that the register, register-number group guard, number group selector by-path link circuit and by-path link connector control are still held for connector switch pulling, busy test, and ring start.

After the selector control has been released, and the by-path circuit is still held for the establishment of the call to local, a calling subscriber can initiate another call, landing in another register in the same group of registers and dial a call which will be completed over a trunk; and the selector control which was used and dismissed for the first call can set up a connection from the calling SOT to the predetermined trunk.

For example, suppose the first call has register #1 engaged and that the second call engages register #2 resulting in the operation of guard relays GR2(43) and GC2(43), reengaging the selector control. Ground (FIG. 43), through GC2–37, 38, lead G2, C238(44), lead G2, cannot get through open contact R2-23 (FIG. 44) because the register-number group guard, and register relay R2 cannot be engaged and also would not be used. Accordingly, when guard relay GRB(52) operates in the establishment of a call to a trunk, the regular path cannot be established from ground, (FIG. 43), GC2–37, 38; lead G2, C238(44), lead G2, R2–23, lead GRB which is designated C241(54), C287(54), GRB–36, C286(54), to the contact fan of relays H1–H7 (FIG. 54), C288(66), contacts of relay 1TH1 (FIG. 66), C378(61), cross-connect to route relays W1–W20 of FIGURE 58, to battery, and the second call cannot interfere with the first call.

Thus the selector-control and by-path link circuits are arranged so that the selector control can be released as soon as an STT has been engaged, before the release of the by-path link circuit whereby the selector control is free to handle a call to a trunk. This makes for economy of equipment due to shortened holding time.

*Call to PBX Group*

The lines connected to the first five horizontal inputs (which are outputs also) of each linefinder-connector switch combination are equipped so that they may be used as PBX lines if desired. To this end the lockout relays LO11, LO12, LO13, LO14, LO15, LO41, LO42, LO43, LO44, LO45, LO71, LO72, LO73, LO74, and LO75, are each equipped with a transfer contact set having a make contact, a lever, and a break contact designated respectively 35, 34, and 33. (See LO15 FIG. 11, for example). Leads from these elements designated respectively A, B, C are connected to corresponding terminals A11–C75 shown in the lower portion of FIGURE 20. The C leads are also connected as shown to windings of relays PA1–PA5 of FIGURE 18. By strapping these terminals and certain others as will be described, PBX groups can be established. If the A, B, and C terminals of a line such as A15, B15, and C15 for example are left unstrapped, the corresponding line such as line 15 can be used as a regular subscriber line as was done in the description above in which a call to a local line was described.

Figure 20:
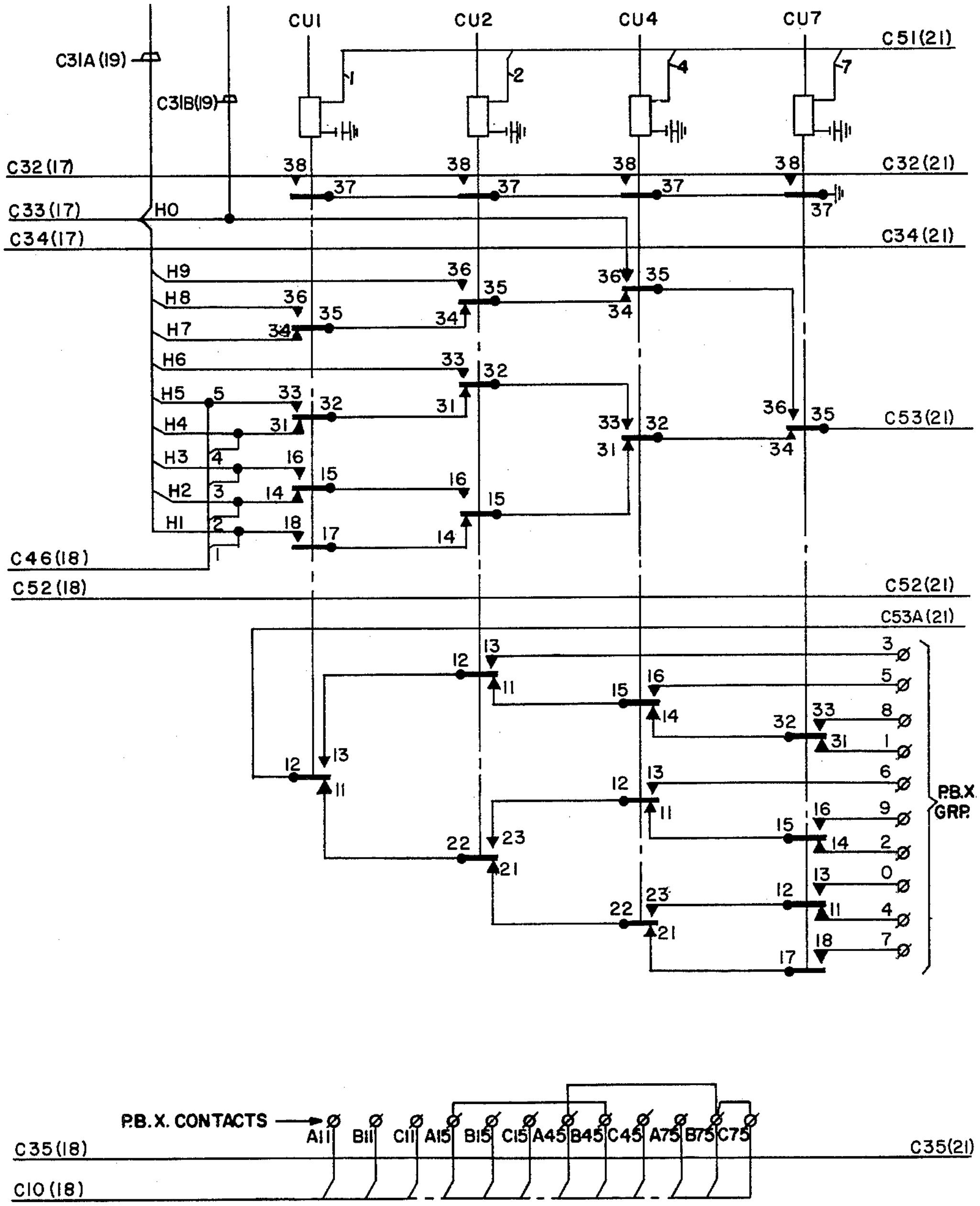

Above the PBX terminals A–11, C75 in FIG. 20 is a contact fan of the units relays CU1–CU7 with output terminals designated 1–0. Each of these terminals represents a PBX grup. The formation of a PBX group is accomplished by strapping the B terminal of the first PBX line in a PBX group to one of these terminals 1–0 which represents the PBX group as translated from the directory number by the number group; and by strapping the remaining terminals associated with the lines in the PBX group in a pattern which will be illustrated.

The formula for establishing a PBX group may be expressed as follows. To form a PBX group, strap the PBX group terminal (i.e., one of the ten terminals off the fan in FIG. 20) to the "B" terminal of the first PBX line in the group. Strap the "A" terminal of the first line to the "B" terminal of the second line, etc. Strap together "B" and "C" terminals of the last line in the group.

In FIGURE 20 are shown strappings to illustrate a three line PBX group comprised of the fifth lines associated with each of the three switch combinations of a ninety line group, these lines being arranged in the PBX group from first to last in the order: 15, 45, 75. We shall assume that terminal B15 is strapped to PBX group terminal 1. (See FIG. 20.)

It will be assumed, for example, that the illustrated PBX group is assigned the directory number CHestnut 6–1001; that the calling subscriber shown in FIG. 11 removes the handset of his telephone instrument, landing the call in a register; that he receives dial tone; and that he dials this PBX directory number which is the same as digits 246–1001.

As a result of receipt of digits "246" the register recognizes the call as being to a local destination. As a result of receipt of the thousands digit "1," the number group −1 will be selected and the last three digits 001 will be stored therein. The operation of the equipment up to this point is essentially the same as that already described for a call to a local line.

As a result of the receipt of digits 001, number group −1 makes the following terminal translation.

| | |
|---|---|
| Thousands digit | −1 |
| Hundreds digit (i.e., ninety line group) | −1 |
| Tens digit | −0 |
| Units digit | −1 |
| Party digit | −1 |

The number group places ground on lead 24 operating relay CLS(53) as before described.

Relay CSL(53) operates and closes information leads to the thousands and hundreds code relays in the by-path link circuit operating thousands marking code relays TH1(53) and H1(54) which operate register connector link relays 1TH1(66) and 2TH1(66) as before. An idle by-path link is thereupon engaged, and proceed relay PR(54) in the by-path link circuit operates in series with link guard relay 1A2(22) in the guard circuit of the connector control for the first group of ninety lines.

Relay 1A2(22) operates relay 2A2(22), and as a result of the translation to the tens digit "0" by the number group (the tens digit "0" being the key to a PBX call), relays CT4(19) and CT7(19) are operated in the 1-2-4-7 code by ground supplied over information leads from the number group as will be understood from the previous description.

Also as a result of the translation to units digit "1" by the number group to signify PBX group 1, relay CU1(20) operates in the 1-2-4-7 code by ground supplied over an information lead from the number group as will be understood from the previous description.

As a result of the operation of relays CT4(19) and CT7(19) for digit "0" in the connector control circuit, relay PBX(21) operates over the path from ground (19) CT7–35, 36; CT4–25, 26; C44(21), relay PBX(21), to battery.

Figure 17A:
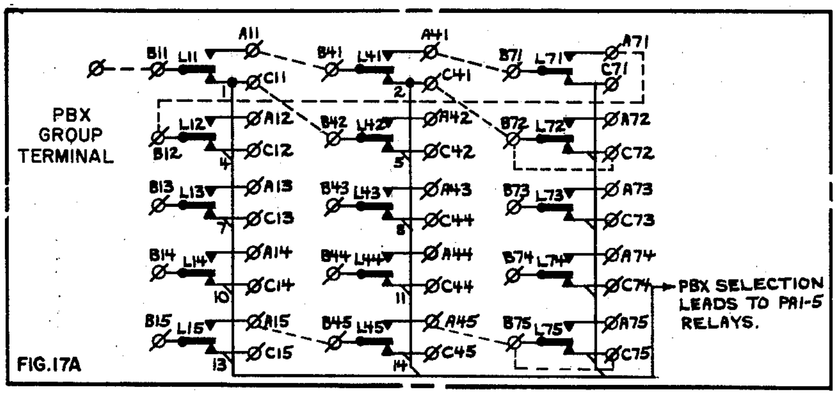
Figure 17:
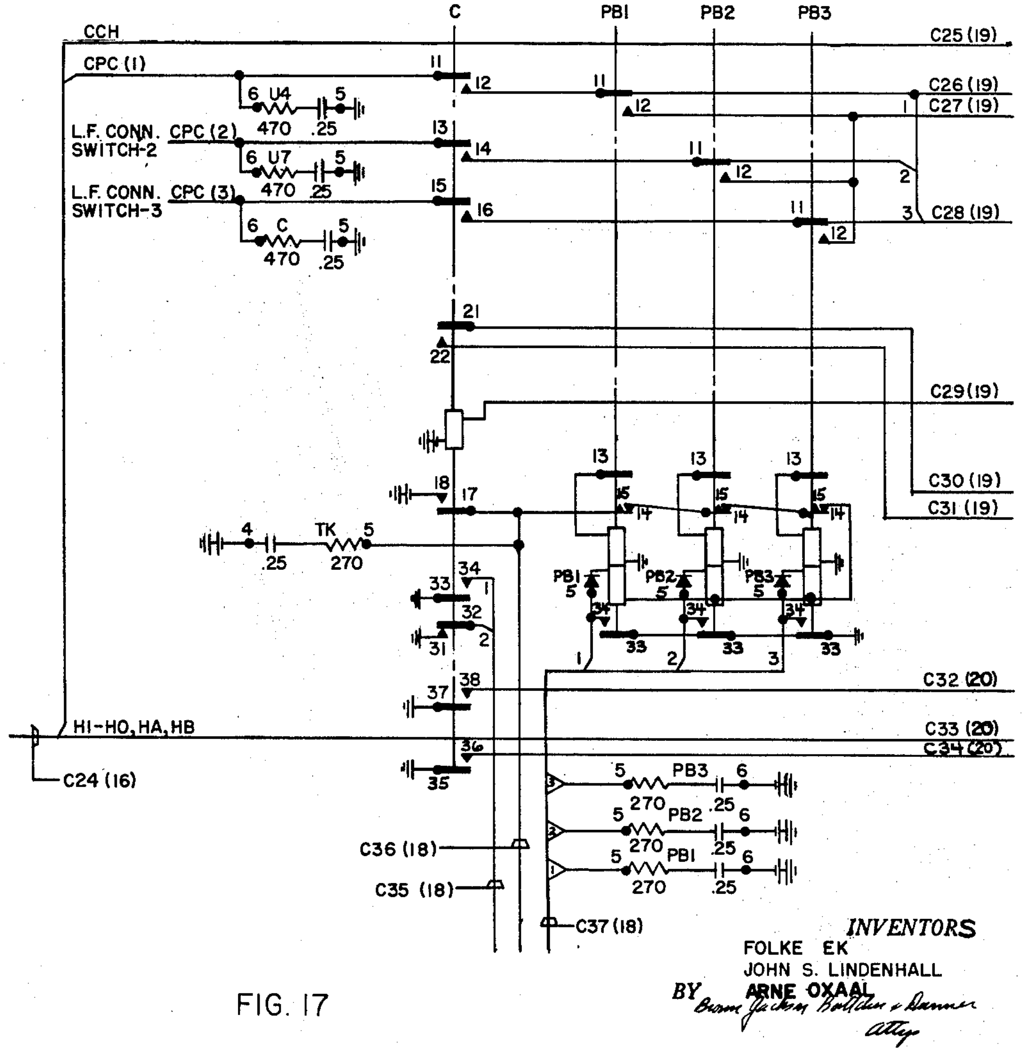
Figure 18:
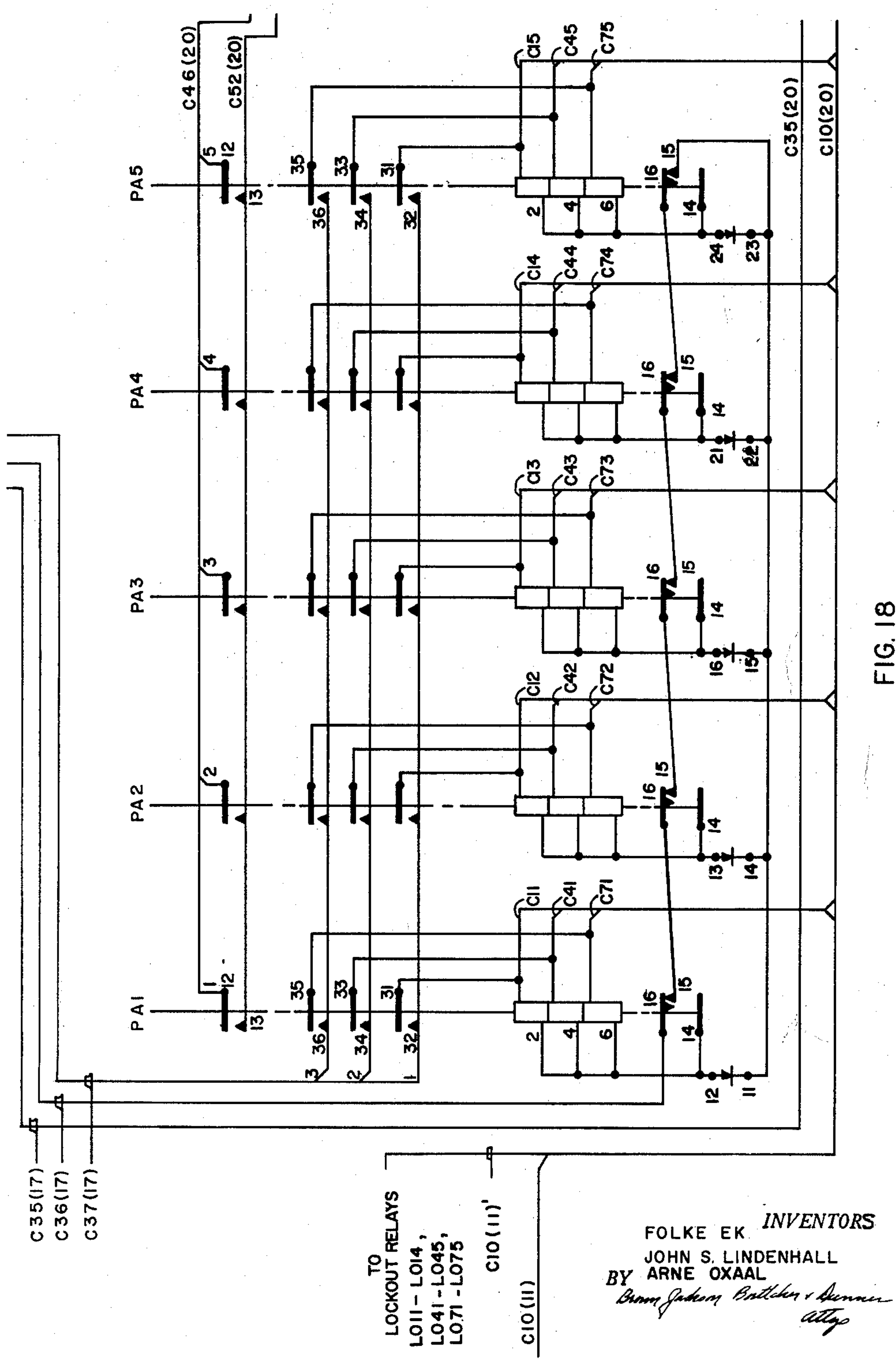

Relay PBX(21) operates and at its transfer contacts 21—22—23, transfers the CPC–1 lead switch selection from the tens relays to the relays PB1–PB3 of FIG. 17; at its transfer contacts 24—25—26, transfers connector switch horizontal pulling from the units relays to the PA1–PA5 relays of FIG. 18; and at its contact PBX–12 connects ground to the input of the units relay fan of FIGURE 20 for PBX group selection.

Assuming the call comes through register-1, relay PR(54) also operates the guard relay GRL(43), engaging the selector control which on the basis of the thousands digit 1 and hundreds digit 1 supplied by the number group to the by-path link circuit and relayed to the selector control, operates route relay WA(60) as before, which engages an idle STT.

Assuming the idle STT is the first STT as before described, the selector control is released by the operation of relay VP(44) as before described. As a result of the selection of the first STT, ground on the S-wire operates relay MB(35) therein which operates relay CC(35).

Relay CC switches the information leads from the number group via the by-path link into the STT and relay LC(34) and P1(34) operate as before described. Relay P1 operates in the 1-2-4-7 code to store the ringing information supplied as a result of the number group translation. As before, relay CC(35) also operates relays C(17) and VP(21) and relay VP operates relay TT(21).

Assuming the first PBX line (i.e., line 15) in the illustrated group to be idle, primary PBX identification information relay PA5(18) operates over the path from ground (FIG. 21), PBX–11, 12; C53A(19), CU1–12, 13; CU2–12, 11; CU4–15, 14; CU7–32, 31; terminal 1 strapped to terminal B15, lead therefrom into cable C10(18), C10–11, lead B15, LO15–34, 33; lead C15, C10(18), lead C15, upper winding of relay PA5(18), lead 2, rectifier in the conducting direction, PA5–15, 16; PA4–15, 16; PA3–15, 16; PA2–15, 16; PA1–15, 16; C36(17), C–18, 17 to battery. Relay PA5 locks over the upper winding, PA5–14, 16 which makes before PA5–15, 16 breaks, disconnecting the operating circuits of the other PA2–PA5 relays. The operation of the particular relay of the primary PBX identification relay group PA1–PA5 marks the connector control as to which of the five lines of any switch combination has been selected as the first idle line.

PBX identification relay PA5(18) operates relay PB1(17) by extending its operating ground over contacts PA5–32, 31; lead 1, C37(17), lead 1, rectifier PB1 in the conducting direction, lower winding of relay PB1(17), PB3–14, 15; PB2–14, 15; PB1–14, 15; C17, 18, to battery. Relay PB1 operates and locks over the path from ground through its upper winding, PB1–13, 15 which closes before PB1–14, 15 opens, C–17, 18, to battery, relay PB1 at its contacts PB1–14 opening the operating circuits of relays PB2 and PB3. The operation of the particular relay of the group PB1–PB3 marks the connector control as to which linefinder connector switch combination the selected PBX line is connected.

Relay PB1(17) operates relays CBL(16), CE(16), and CVP(16) of the first linefinder switch combination over the path from battery (FIG. 19), ICT–15, 14; C42(21), PBX–22, 23, C27(19), C27(17), PB1–12, 11; C–12, 11; lead CPC–1, C24(16), lead CPC–1, FVP–22, 21, and the windings of relays CE(16), CBL(16), and CVP(14) in parallel to ground, relay CVP being reached over conductor C17(14).

As before, relay CBL(16) operates relay HE(16) which operates relay CH(21) in the connector control circuit.

Relay CH(21) operates horizontal magnets HA(13) and H5(13) but over different circuits than obtained for the call to a regular subscriber described before.

The circuit over which horizontal magnet HA(13) operates may be traced from battery (FIG. 21), TA–32, 31, CH–34, 33; C41(19), ICT–12, 11; CT7–15, 16; CT4–23, 22; CT4–16, 15; CT2–32, 31; CT1–31, 32; lead HA, C31A(20), C33(17), C24(16), cable 1–12, lead 11, CE–35, 36; lead 11, C18(15), lead 11 to magnet HA(15) and back out into the cable, C13(13), lead 11, magnet HA(13), lead L, C12(16), lead L, HE–34, 33 to ground.

The circuit over which horizontal magnet H5(13) operates may be traced from battery (FIG. 21), TA–34, 33; CH–36, 35, C49(19), ICT–32, 31; C50(21), PBX–25, 26; C52(20), C52(18), PA5–13, 12; lead 5, C46(20), lead 5, lead H5, C33(17), C24(16), cable 1–12, lead 5, CE–20, 19; lead 5, C18(15), lead 5 to magnet H5(15)

and back out into the cable, C13(13), lead 5, magnet H5(13), lead N, C12(16), lead N, HE–32, 31 to ground.

Thus magnets HA(13) and H5(13) have been operated to prepare connection to the line having lockout relay LO15 and cut-off relay CO15 which was the first idle PBX line in the group. When relay CH(21) operated, it opened the circuit of relay VP(21) which goes through its slow release. When relay VP(21) has released, vertical magnet V1(13) operates over the path before traced.

It should be observed that the first idle lockout relay LO15, determined which of the primary identification relays PA1–PA5 (i.e., PA5) should operate according to its units digit; that the winding of relay PA5, and accordingly the particular make contact of PA5 connected thereto, determined which of the secondary identification relays PB1–PB3 (i.e., PB1) should operate to indicate to the connector control which switch contains the lockout relay LO15; that the operated one of these relays (i.e., PB1) determines over the CPC–1 lead which switch circuit shall have its connector horizontal relay CE, connector blocking relay CBL and connector vertical pulling relay CVP operated; and that when vertical pulling relay VP in the connector control releases, ground is connected through the engaged STT to the three switches connected thereto but can get to the vertical magnet of only the one which has its connector vertical pull relay CVP operated.

At this point the called PBX line has been selected. Thereupon the connector control busy-idle tests the selected PBX line 15 in the usual manner, relay T(22) in the connector control operating if the line is idle (which it will be unless it has become busy due to another call in the meantime which is a very short interval). The sequence thereafter is essentially the same as that described for a call to a regular line, with the exception of certain minor differences which are now set forth.

During release of the connector control the release of relays CT4(19) and CT7(19) releases relay PBX(21); and the release of relay C(17) releases relays PA1(18) and PB1(17).

During a call to a regular line the release of the operated tens relay of the group CT1–CT7 (FIG. 19) released HE(16), CBL(16), CE(16), and CVP(14). However, in the case of a call to a PBX line, relay C(17) at its contacts C–12 releases these relays.

With reference once more to the initial selection of a PBX line, it will be assumed that the first PBX line (i.e., 15) in the group of PBX lines comprising lines 15, 45, and 75 was busy when the connector control attempts to establish a call to the group, but that the second line of the group is idle. Under these circumstances, a circuit would have been completed to operate relay PA5 over a different path, the circuit extending from ground (FIG. 21), C53A(20), CU1–12, 13; CU2–12, 11; CU3–15, 14; CU7–32, 31; terminal 1 strapped to terminal B15, C10(18), C10(11), lead B15, LO15–34, 35; lead A15, C10(18), C10(20), lead A15 to terminal A15, strapping to terminal B45, lead into cable, C10(18), C10(11′) to lockout relay LO45 reached through the second switch circuit ( not shown in detail but like the switch circuit of FIGS. 11–16), through break contacts LR45–34, 33 (not shown but like those of relay LR15), back into cable C10(18), lead C45 through the middle winding of relay PA5(18), to battery as aforedescribed, this operating ground of relay PA5 extending through contacts PA5–33, 34, lead 2, C37(17), lead 2, lower winding of relay PB2, PB3–14, 15; PB2–14, 15; PB1–14, 15; C17, 18; to battery. Relay PB2 operates and locks over the path from ground through its upper winding PB2–13, 15; PB1–14, 15; C–17, 18; to battery, disabling the operating circuit of relays PB1 and PB3. Relay PB2 holds relay PA5 over the path from ground, PA2–33, 34; lead 2, C37(18), lead 2, PA5–34, 33; middle winding of relay PA5, to battery, as described above.

With relays PA5(18) and PB2(17) operated, circuits are completed to operate horizontal magnets HA and H5 and connector vertical V1 in the second switch circuit.

Assume now for further exemplary purposes that the first and second PBX lines (i.e., lines 15 and 45) in the three line group were busy when the connector control attempted to establish a call, but that the third line (i.e., line 75) is idle.

Under these circumstances, a circuit would have been completed to operate relay PA5 over the path from ground (FIG. 21), PBX–11, 12; C53A(20), CU1–12, 13; CU2–12, 11 CU3–15, 14; CU7–32, 31; terminal 1 strapped to terminal B15, C10(18), C10(11), lead B15, LO15–34, 35; lead A15, C10(18), C10(20), lead A15 to terminal A15, strapping to terminal 1 B45, lead into cable C10(18), CO(11′) to the lockout relay LO45, through make contacts LR45–34, 35 (not shown but like those of relay LR15); back into cable C10(18′), lead C75 through the lower winding of relay PA5 to battery aforedescribed, this operating ground of relay PA5 extending through contacts PA5–35, 36; lead 3, C37(17), lead 3, lower winding of relay PB3, PB3–14, 15; PB2–14, 15; PB1–14, 15; C17–18, to battery, operating relays PA5 and PB3.

With relays PA5(18) and PB2(17) operated circuits are completed to operate horizontal magnets HA and H5 and connector vertical V1 in the third switch circuit.

It is now assumed that all three of the PBX lines of the group were busy when the connector control attempted to establish a call.

It should be noted that circuits to the windings of relays PA1–PA5 normally pass through back contacts of the lockout relays. Accordingly if lockout relays LO15, LO45, and LO75 were all in the operated position, no circuit would be extended to a winding of relays PA1–PA5, and accordingly there would be a break in the sequence of relay operation and the call would stall. More specifically, ground on terminal 1 (FIG. 19) strapped to terminal B15 would pass through make contacts of LR15 and return to terminal A15 which is strapped to terminal B45, over terminal B45 through make contacts of relay LR45 and back to terminal A45 which is strapped to terminal B75, over terminal B75 through make contacts of relay LR75 and back to terminal A75 which is not strapped to a further path in that line 75 is the last line in the PBX group. After a time-out period, the connector control would initiate the release of all connections, placing the calling line on lockout.

In order to avoid tying up common equipment for this time-out period, the B terminal of the last line of the PBX group is strapped to the C terminal of this same line, whereby the #33 break contacts of the last lock-out are by-passed and the winding of the relay of the group PA1–PA5 is energized as though the last line were idle.

More specifically, relay PA5(18) would be operated over the path from ground (FIG. 21), PBX–11, 12; C53A(19), CU1–12, 13; CU2–12, 11; CU4–15, 14; CU7–32, 31; terminal 1 strapped to terminal B15, C10(18), C10(11), lead B15, LO15–34, 35; lead A15, C10(18), lead A15 strapped to terminal B45, C10(18), C10(11′) through make contacts LR45–35 of relay LR45 (not shown) and lead A45 as would be understood, C10(11′), lead to terminal A45, strapping to terminal B75, strapping to terminal C75, C10(18), lead C75 through the lower winding of relay PA5 to battery as aforetraced.

As a result, connection is made to line 75, though it is busy, and as a result of the line testing busy in the connector control, relay T(22) does not operate, relay TA(22) is not operated, relay TT(22) is allowed to release, and ground (21) through CH–17, 18; TA–22, 21; TT–11, 12; lead BY, C32A(22), C68(23), lead BY, C76(35), lead BY, CC–17, 18; lead BY, C176(34), C176(33), lead BY, upper winding of relay BY to battery operates relay BY(33) in the STT which locks over its lower winding through BY–17, 18; C177(34), H34, 33; C178(35), MB–27, 26, C143(34), C143(33), C143(32), C78(24), AT-14, 13 to ground, returning busy tone to the calling subscriber. Relay BY(33) releases relay CC(35) which releases relay C(17).

The release of relay TT(21) effects the sending of the register disconnect signal to the register over the path from ground (FIG. 21), CH-25, 26; TT-31, 32; C55(22), 1A2-28, etc. as previously traced. As a result thereof, the cut-through relay CT(37) operates and the calling loop is extended into the STT to provide the calling subscriber with busy tone. Further, the register releases itself, the register-number group guard, the number group selector, the connector control circuit, and the by-path link circuit.

The transfer contact sets of the LO relays of the lines connected to the first five inputs of each of the three linefinder-connector switch combinations of a ninety line group and associated terminals are shown in FIGURE 17A. In the first vertical column are the transfers of lock-out relays L11-L15 associated with the first switch combination of the first ninety line group. In the second column are the transfers of lockout relays L41-L45 associated with the second switch combination of the first ninety line group. In the third column are the transfers of the lockout relays L71-L75 associated with the third switch combination of the first ninety line group. Thus fifteen lines in a ninety line group are arranged for PBX operation, if desired. These lines can be placed in from one to ten PBX groups and can be arranged in any order. As shown in FIGURE 17A, a six line PBX group is shown with the lines in the following order: 11, 41, 71, 12, 42, 75; and a three line PBX group with the lines in the following order is shown: 15, 45, 75. This last group is the one illustrated by strapping in FIGURE 20.

*PBX Type Selection for Trunks on Lines*

Under the circumstance in which trunks, other than PBX trunks, are terminated on line equipment rather than on trunk selectors, lines are used which have lock-out relays provided with 33—34—35 transfer contacts, whereby on calls to the trunk group, the trunk group may be treated as a PBX group for trunk selection. Additionally, a diode should be connected in the conducting direction from the PBX group selection terminal of FIGURE 20 to the TK terminal of FIGURE 23, whereby the TK relay may be operated. This is in addition to the strapping between the PBX group selection terminal and the B terminal of the first trunk in the group.

*Call to Busy Line*

A call to a busy line is the same as that already described up to the busy test which occurs upon operation of the connector vertical magnet.

If the called line is busy, relay T(22) in the connector control does not operate, the ring start signal is not sent to the STT, relay TA(21) in the connector control does not operate, and relay TT(21) is allowed to release.

The release of relay TT(21) operates busy relay BY(33) in the STT over the path from ground (FIG. 21), CH-17, 18; TA-22, 21; TT-11, 12; lead BY, C32A(22), C68(23), lead BY, C76(35), lead BY, CC-18, lead BY, C176(34), C176A(33), lead BY, upper winding of relay BY to battery. Relay BY operates and locks over the path from battery, lower winding of relay BY, BY-17, 18, C177(34), H-34, 33; C178(35), MB-27, 26; C143(34), C143(33), C143(32), C78(24), AT-14, 13; to ground.

Relay BY(33) releases relay CC(35) and connects slow busy tone through the lower winding of relay B which induces slow busy tone into the calling tip and ring. Relay TT(21) also sends the register disconnect signal to the register to operate register disconnect relay RD(38) over the path from ground (FIG. 21), CH-25, 26; TT-31, 32; C55(22), 1A2-28, 27; over the path traced for a call to an idle line, through relay RD(38) to battery.

Register disconnect relay RD(38) operates cut through relay CT(37) which operates the subscriber relay A(35), which operates holding relay H(34). Cut through relay CT(37) releases pulsing relay P(38).

After connector control relay CC releases, the original operating circuit of busy relay BY is opened, but before slow release busy relay BY can release, subscriber relay A(35) operates hold relay H(34) which operates revertive call relay C(34), over the path from ground, relay C(34), C167(33), BY(31, 32), C172(34), H-15, 16; to ground on the S-wire. Revertive call relay C(34) operates and holds busy relay BY(33) by closing contacts C-24 to substitute for contacts H-33. Relay RD(38) also releases relay R1(44) with the attendant release of REG-O, register guard, number group guard, connectorcontrol, and bypath link circuits.

*Miscellaneous*

The flexibility of the novel crossbar system is evidenced by the following brief explanatory description which sets forth various methods of modifying the equipment to provide variations in subscriber service.

(1) In the showing of FIGURE 11, lines 11-15 are equipped for PBX paystations, or regular lines. Lines 6-10 are equipped for paystation or regular line.

(2) Strap to ground is omitted from LO15-25 in FIGURE 11 for PBX with ground on ring seizure.

(3) The "N" C wire (FIG. 11) is strapped to ground for post pay paystation line marking.

Figure 29:
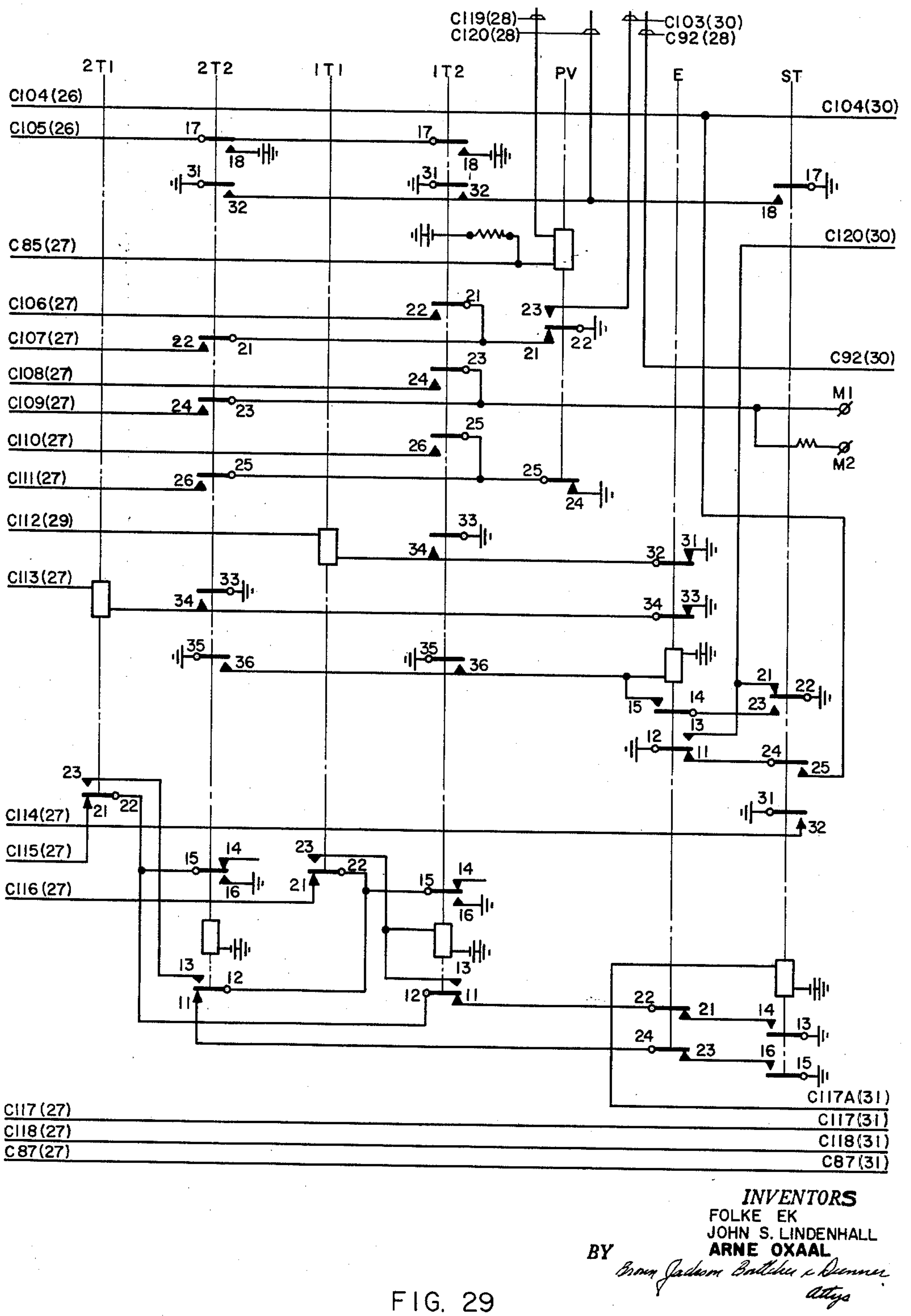
Figure 30:
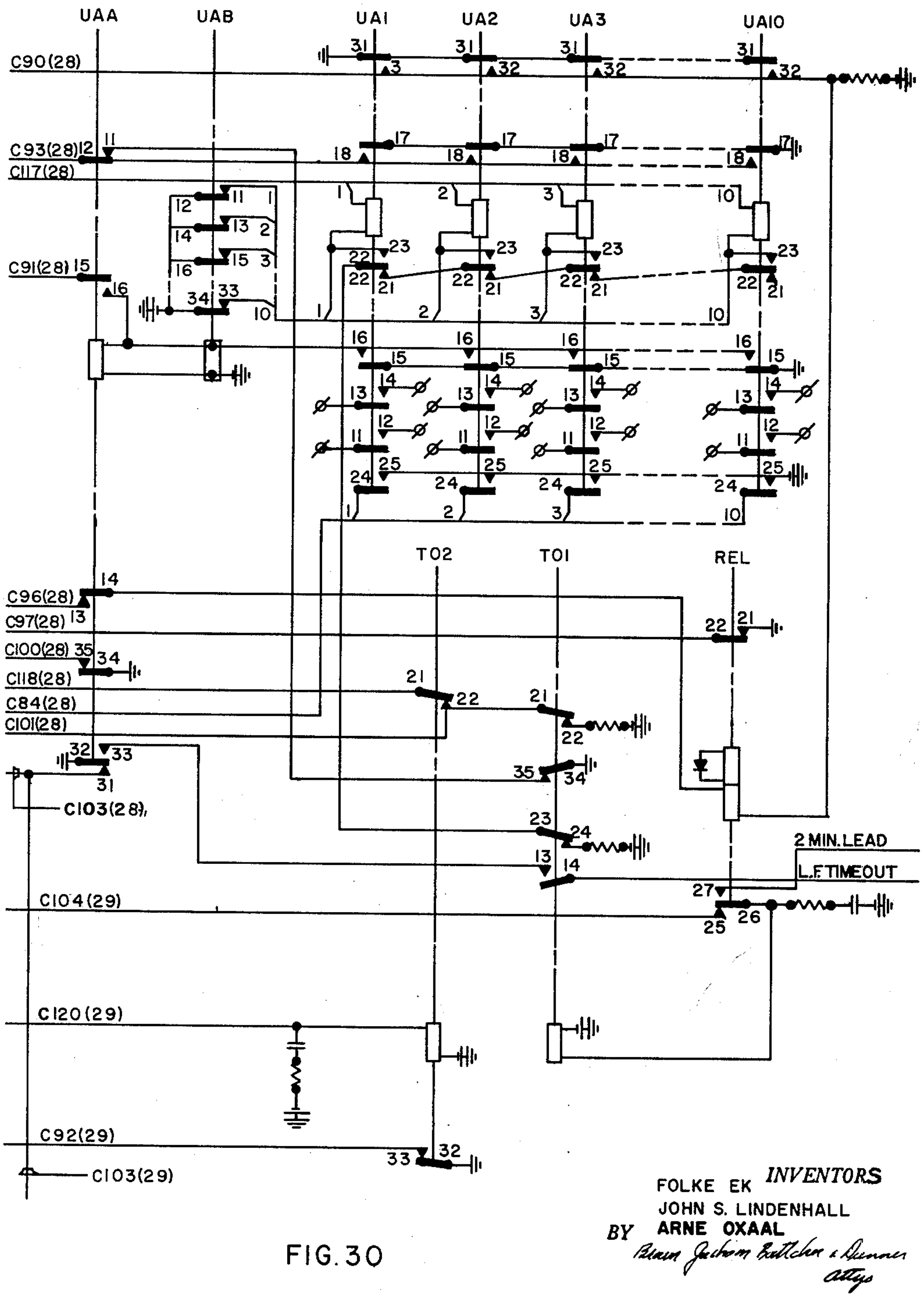

(4) In FIGURES 26, 29, 30, strap terminals M1 and M2 to terminals of contacts on relays TA1-TA9 and UA1-UA10 to provide marking by line number or tens group on M lead.

(5) To form PBX group in FIGURES 17 and 20, strap PBX group terminal to the "B" terminal of the first line in group. Strap the "A" terminal of first line to the "B" terminal of the second line, etc. Strap together "B" and "C" terminals of the last line in the group.

Figure 23:
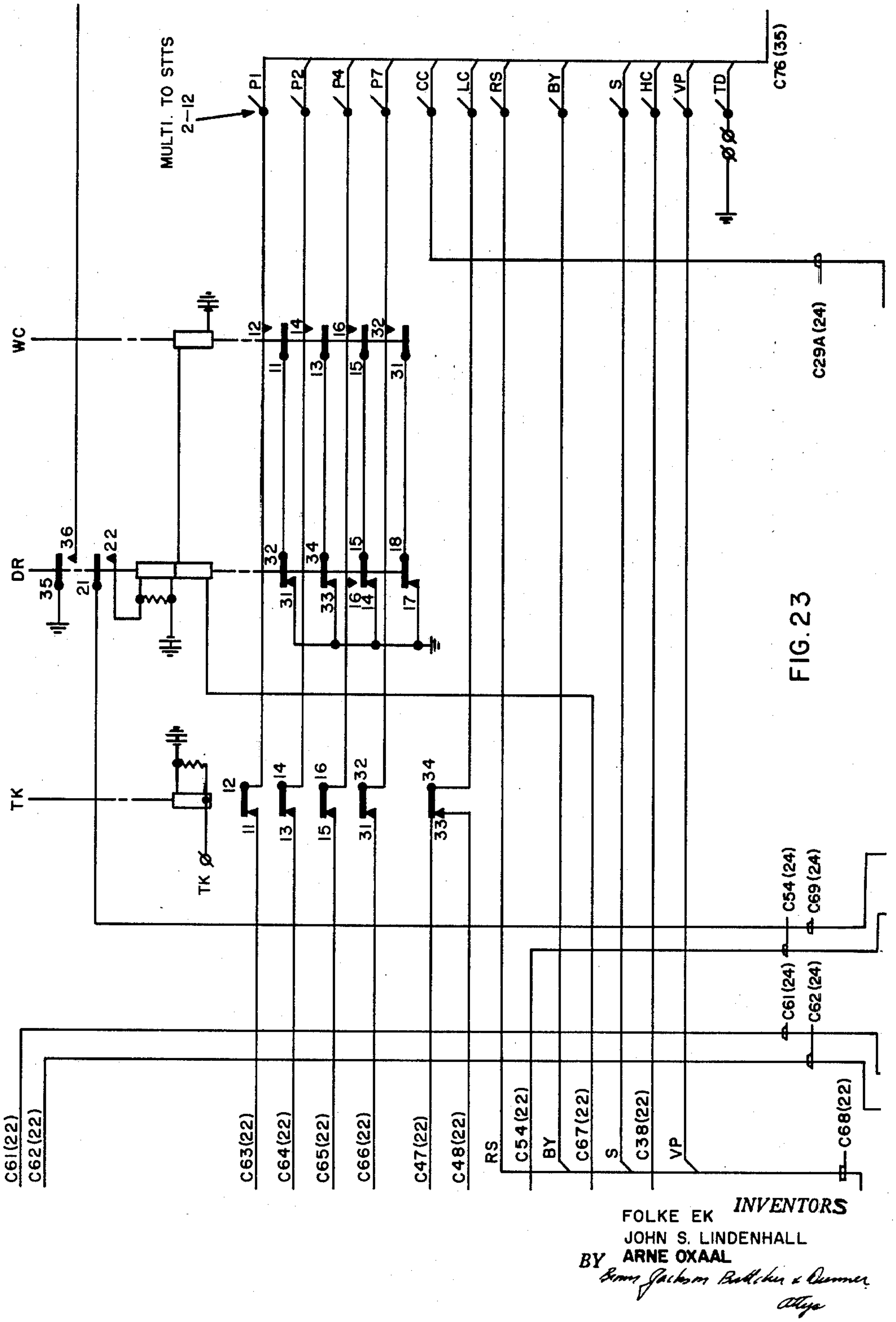
Figure 24:
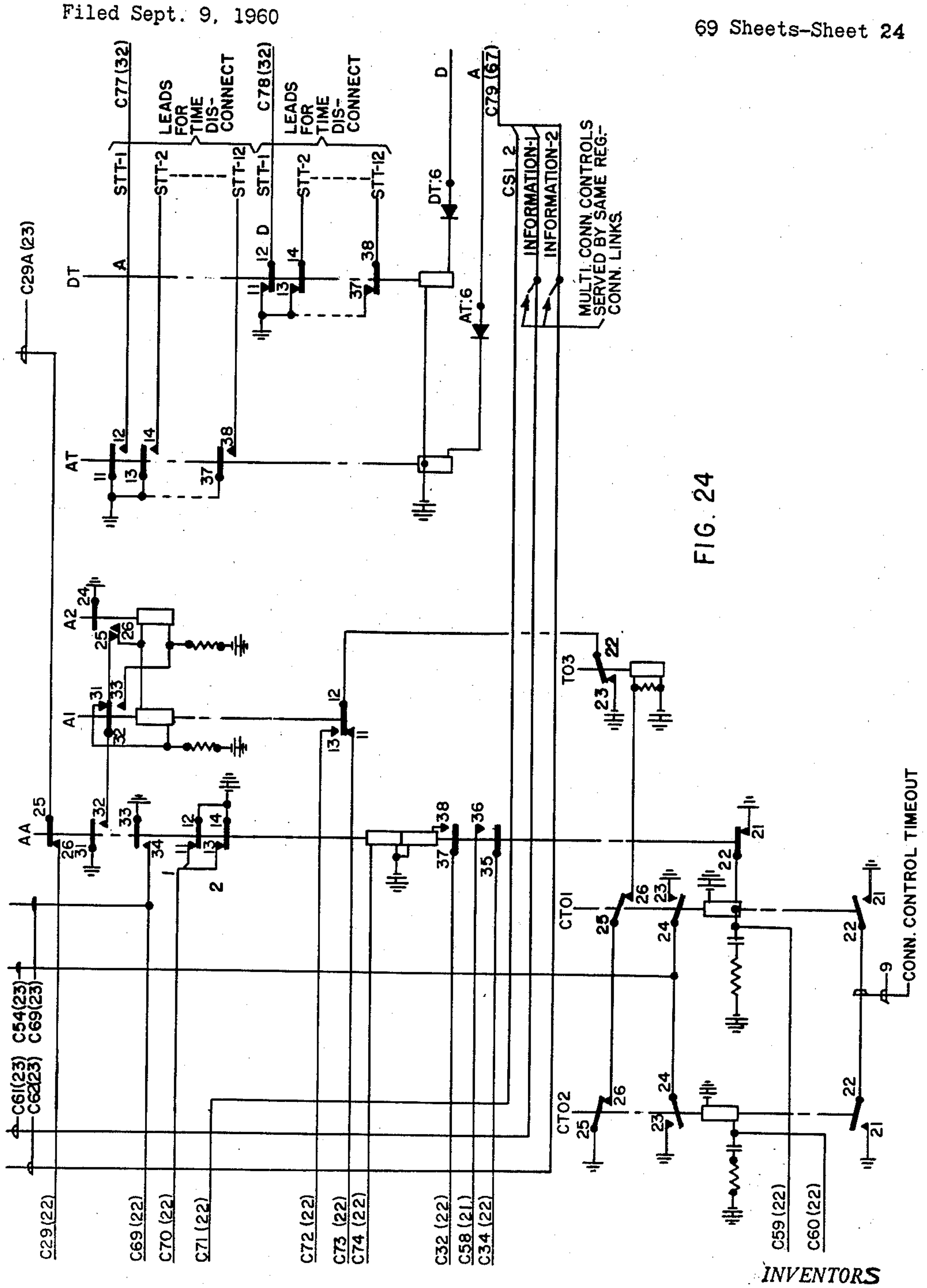
Figure 25:
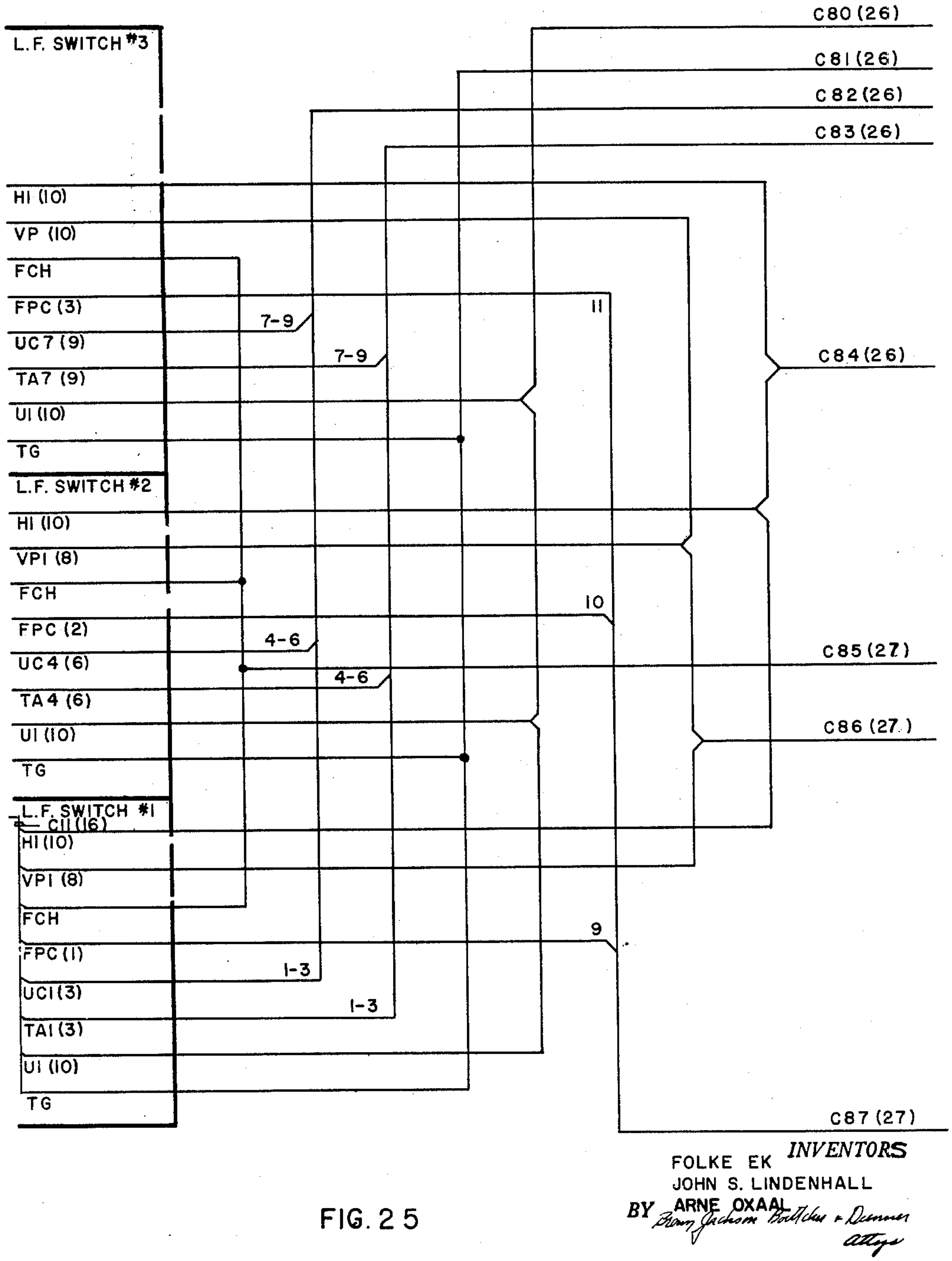

(6) For trunk group on lines, establish group as per note 5 and also connect a diode from PBX group terminal to "TK" terminal to TK relay (FIGURES 20, 23).

(7) (For terminal per line operation only.) When desired to route vacant switch and vacant PBX group calls originating locally to silent lock-out, strap appropriate VS terminals (VS1, VS2, VS3) and PBX group terminals to VS terminal (FIGURES 19 and 20). When message, tone, or operator is required on these calls, strap appropriate VS and PBX group terminals to ICT terminals. Provide intercept facility on line-10.

(8) Provide "TD" strap between terminals when time disconnect is required (FIGURE 23).

(9) When two register modules work into one selector, connect multiple to the second register module (FIGURE 43).

(10) (Strapping in register-selector guard—FIG. 43.) When two register modules connect to one selector connect:

AA to B1 in 1st module.
DD to TO in 1st module.
BB to B2 in 2nd module.
CC to TO in 2nd module.
BB of 1st module to DD in 2nd module.
CC of 1st module to AA in 2nd module.

If one register module per selector is equipped, connect:

AA to B1.
BB to B2.
CC to TO.
DD to TO.
And omit multiple.

(11) Strap lead TH1 (FIG. 47) to ground for terminal per line office.

(12) Strap "ALG" to "GG" (FIG. 51) for alternate access to two 10-outlet groups in order to reach all 12 STT's when traffic requires, and only one local selector is equipped; and/or in order for a selector to reach two 10-outlet groups assigned to a trunk group containing more than 10 trunks when the number of local selectors is less than 4; or when necessary in order to provide each trunk with at least two appearances in the selector multiple. Strap "ALG" to "ALL" when all trunk busy indication is used to provide alternate route.

(13) Use "B" stage rotator relays of FIGURE 68 only when more than one GSB module is equipped to work with one GSA module.

(14) When only two GSB modules are equipped to work with one GSA module, connect dotted strap as shown in FIGURE 68.

Figure 59:
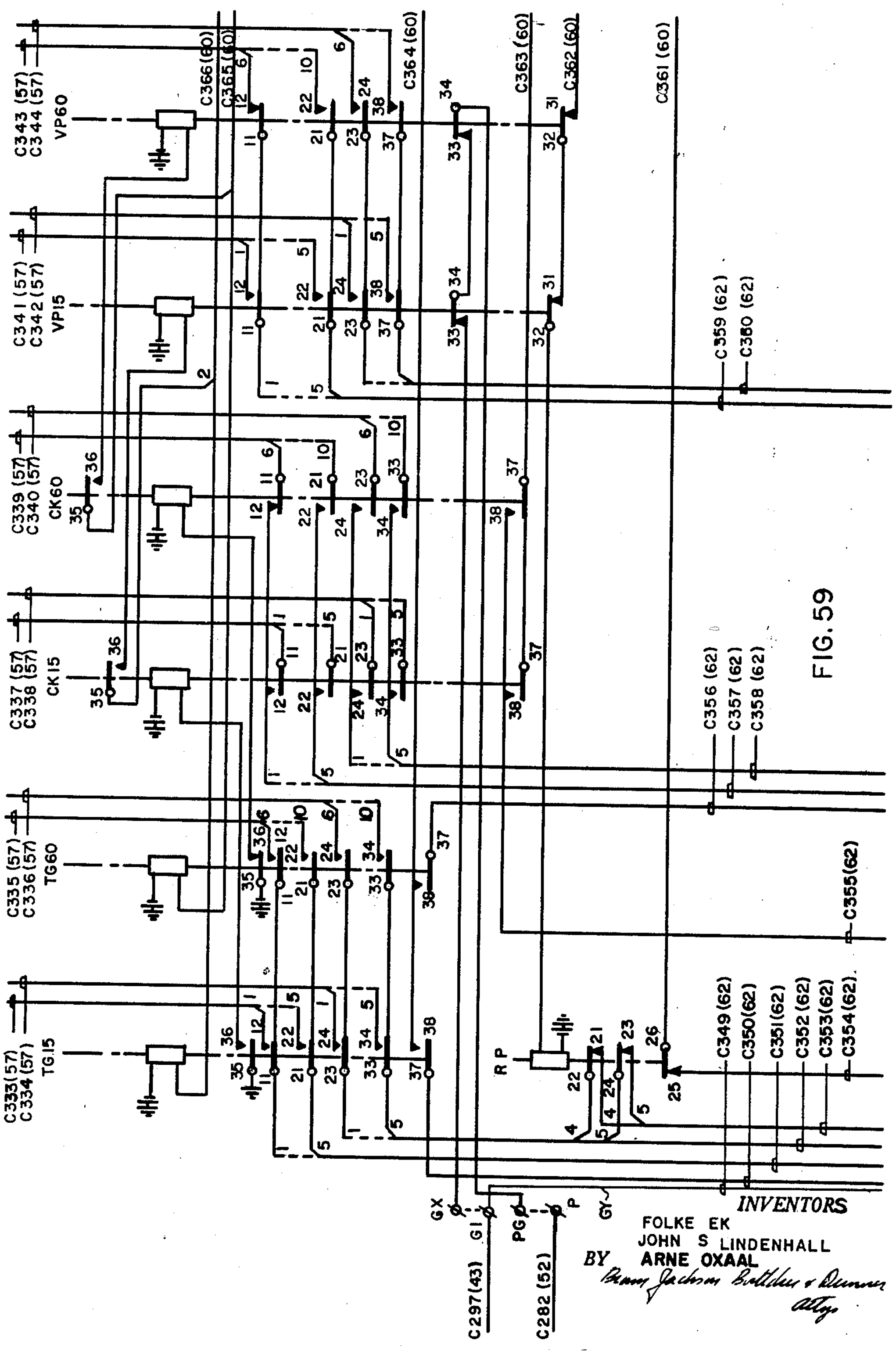

(15) When two (or three) GSB modules are equipped per GSA module, omit strap between PG and P in the first (and intermediate) GSB module and wire PG to GX in the succeeding GSB module. In the last equipped GSB module, strap PG to P. Strap G1 to GY and YP to Y in the first GSB module only (FIGURES 59 and 63).

Figure 58:
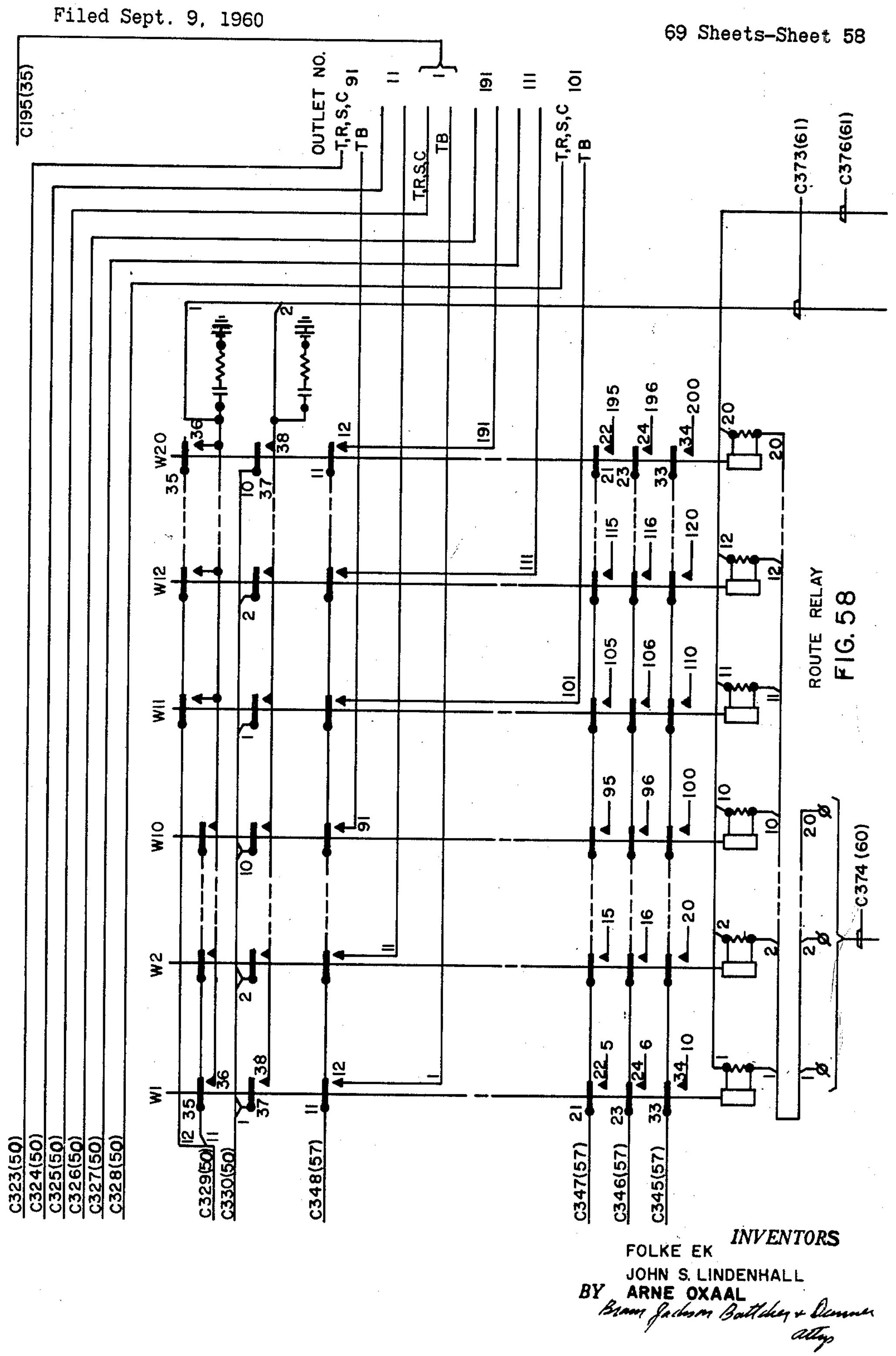
Figure 60:
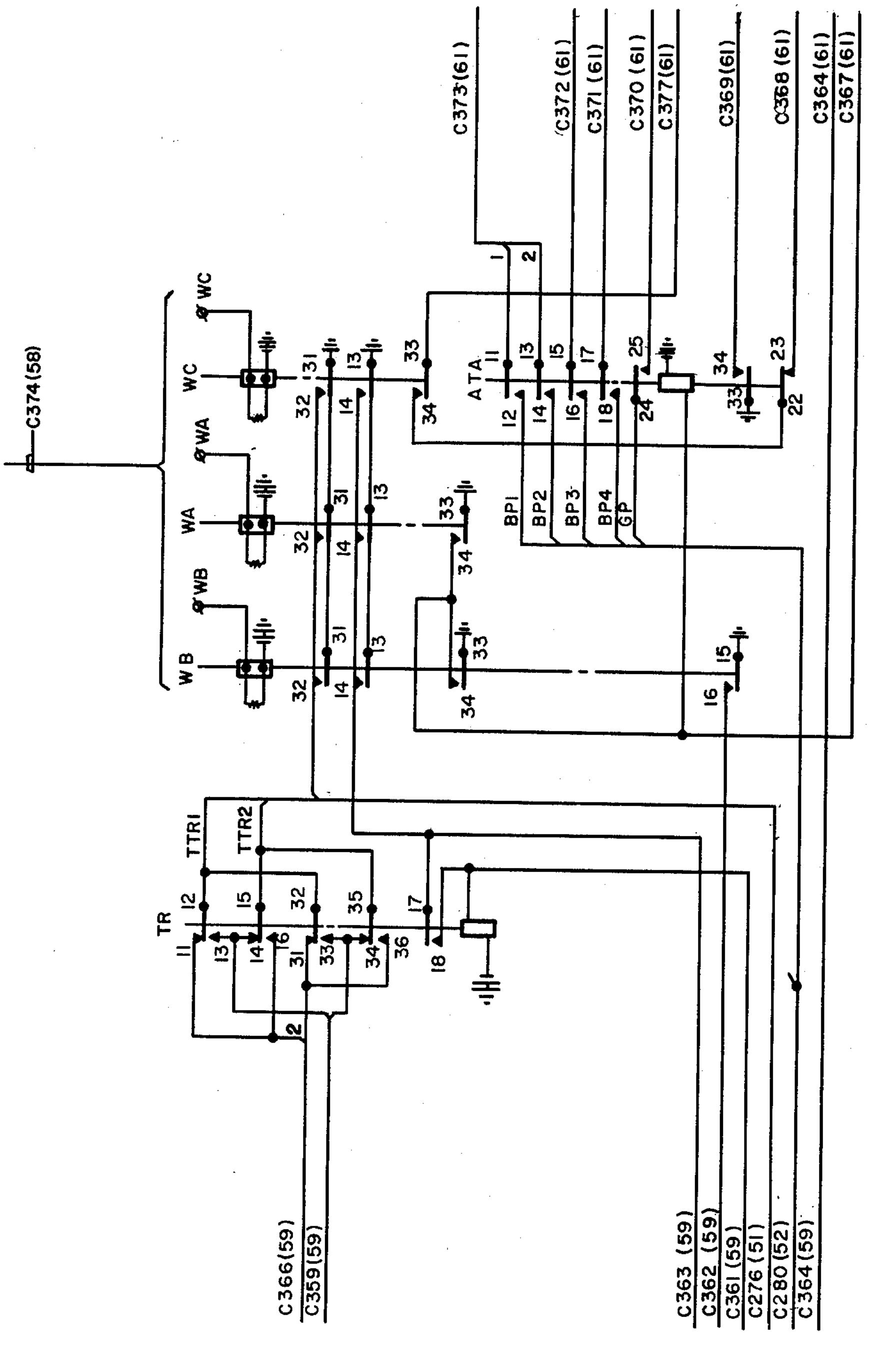

(16) In FIGURES 58, 60 and 61 strap 2WDG to WB for ripple test for small trunk groups. Strap 2WDG to WC for simultaneous test for 20 trunks (10 trunks in each of two GSB modules working with GSA module). In all other cases, strap 2WDG to WA. Strap 1WDG to LOC. RT. or to TRK. RT. as required. For alternate access to two 10 outlet groups, strap LOC. RT. (or TRK. RT.) to L and strap B and M to 1WDG of the first and second 10 outlet group respectively.

(17) Strap lead B (FIGURE 63) to battery when only one GSB module is equipped per GSA module.

(18) Provide "ND" (FIGURE 32) option when conversation time disconnect relays are not equipped.

(19) Provide "RD" (FIGURE 32) option when 2–4 minute timeout of ringing is required on all local calls. Omit when timeout is required on revert call ringing only.

While what is described is regarded to be a preferred embodiment of the invention, it will be apparent that variations, rearrangements, modifications and changes may be made therein without departing from the scope of the present invention as defined by the appended claims.

What is claimed is:

1. In an automatic telephone system having cross-bar switching stages for extending connections between stations connected to subscriber lines, including a first switching stage connected for seizure by a calling one of said lines for use in the extension of a connection toward a called line, a register means connected for seizure by said first switching stage including register circuits for registering at least certain of the digits transmitted by the calling substation, a selector switch for extending the connection thereover in the direction of the called line, a selector control circuit for said selecter switch connected for seizure by said register means, a number group circuit connected for seizure by said register means in response to the registration of digits indicating a call to a local line, a by-path link circuit connected for seizure by said number group circuit including means in said number group for extending information to the by-path circuit indicating the line group in which the called line is located, a switching stage including a connector circuit for a group of lines including the called line, a connector control circuit for use with said connector circuit, means in said by-path circuit including means for seizing said connector control circuit and means for transmitting a call signal over the originating register to said selector control circuit responsive to seizure of an idle connector control circuit, and means in said number group circuit for extending certain of the information relative to the called line location over the by-path link circuit to the connector control circuit for use in controlling the connector circuit to extend the connection to the called line.

2. In an automatic telephone system having crossbar switching stages for extending connections between subscriber lines divided into groups, including a first switching stage connected for seizure by a calling one of said lines, register means connected for seizure by said first switching stage operative to register at least certain of the digits transmitted over the calling line, number group means for translating the digits received to line location information connected for seizure by said register means in response to the registration of certain of said digits, a selector stage including a selector switch and a selector control circuit for controlling said selector switch, a connector stage including a connector switch for extending a connection to a group of lines including the called line, and a connector control circuit for said connector switch; a by-path link circuit connected for seizure by said number group circuit responsive to translation of said digits, means in said by-path circuit for seizing said connector control circuit in response to the receipt of certain of said line location information from said number group, and means in the connector control circuit for extending further information relative to the called line location from the number group and over the by-path link circuit to the connector control circuit for use in controlling the connector switch in the extension of the connection to the called line.

3. An arrangement as set forth in claim 16 which includes a plurality of by-path link circuits, a first and a second highway path each of which comprises a plurality of information conductors connected between the by-path link circuit and the connector control circuits for the different line groups, and means in each by-path link circuit for selecting one of said highways, as idle, for use in transmitting information from the number group over the by-path link circuit to the selected one of the connector controls.

4. An automatic telephone system as set forth in claim 2 in which said by-path link circuit is operative responsive to seizure of said connector control to transmit a signal over said number group and said register means to said selector control to indicate the seizure of a connector control circuit thereto.

5. In an automatic telephone system having modular switching stages for extending connections between subscriber lines which are divided into ninety line groups, each ninety line group being connected for use with three modules of a first class, each of which modules includes a group of thirty lines, a linefinder switch, a connector switch and a first group of subscriber terminating trunks, and one module of a second class including a linefinder control circuit, a connector control circuit and a second group of subscriber terminating trunks; means connecting the linefinder control circuit and linefinder switch of a module for use by the subscriber lines in the module to establish a call to a called line, subscriber originating trunk means connected for seizure by said linefinder circuit, register means connected for seizure by said subscriber originating trunk means operative to register at least certain of the digits transmitted by a calling line; a selector stage including a selector switch, and a selector control circuit for said selector switch; a by-path link circuit, means operatively controlled by said register means to seize said by-path circuit, means in said by-path circuit operative to seize an idle one of said connector control circuits which controls at least one of the connector switches in the module including the called line; means in said selector control circuit controlled by signals from said by-path link circuit for seizing an idle one of the subscriber terminating trunks of either class of module which includes the called line, means in said subscriber terminating trunk operative to connect said subscriber terminating trunk to said one connector control circuit, and means in the connector control circuit for operating one of said connector switches in said module to extend the main path connection over the subscriber terminating trunk to the called line.

6. An automatic telephone system as set forth in claim 5 in which the linefinder switch and connector switch for one module of each ninety line group is comprised of a crossbar switch combination including two crossbar switches, each of which has a plurality of horizontal and vertical conductor circuits, the vertical conductor circuits being divided into three groups of ten, and the horizontal inputs for the two crossbar switches being multipled, means for connecting certain of said vertical circuits for linefinding purposes and others of said vertical circuits to said subscriber terminating trunks for call completion purposes, and means for connecting the thirty lines for said module to the horizontal conductors for the crossbar switches.

7. An automatic telephone system as set forth in claim 5 which includes a plurality of said register means, a plurality of number groups, a number group selector connected for use by said register means in seizing an idle number group, and means in said number group selector operative after seizure of the number group to couple information from said number group to said by-path circuit.

8. An automatic telephone system as set forth in claim 5 which includes forty subscriber originating trunks for each three groups of ninety lines, and in which each of said linefinder switches is of the crossbar type including a plurality of vertical conductors, and means for connecting the linefinder vertical conductors of the three different ninety line groups in graded manner to the forty subscriber originating trunks in two groups of twenty each.

9. An automatic telephone system as set forth in claim 5 which includes forty subscriber originating trunks for each three groups of ninety lines and a selector stage for each group of twenty subscriber originating trunks, each of which comprises two pairs of crossbar switches interconnected to provide twenty input circuits and two hundred output circuits comprised of twenty levels with ten outputs per level.

10. An automatic telephone system as set forth in claim 5 which includes subscriber originating trunks connected for use with said linefinder switches in extending connections toward the selector switches, register means connected for seizure by each group of twenty subscriber originating trunks, and a guard means for providing access for the different register means to the common selector control circuit subsequent to seizure by a subscriber originating trunk.

References Cited in the file of this patent

UNITED STATES PATENTS 2,585,904 Busch ---------------- Feb. 19, 1952

FOREIGN PATENTS 757,025 Great Britain ----------- Sept. 12, 1956

UNITED STATES PATENT OFFICE

CERTIFICATE OF CORRECTION

Patent No. 3,127,480 March 31, 1964

Folke Ek et al.

It is hereby certified that error appears in the above numbered patent requiring correction and that the said Letters Patent should read as corrected below.

Column 68, line 27, for the claim reference numeral "16" read -- 2 --.

Signed and sealed this 4th day of August 1964.

(SEAL)
Attest:

ERNEST W. SWIDER
Attesting Officer

EDWARD J. BRENNER
Commissioner of Patents